(12) United States Patent
Wouhaybi et al.

(10) Patent No.: US 11,330,087 B2
(45) Date of Patent: May 10, 2022

(54) DISTRIBUTED SOFTWARE-DEFINED INDUSTRIAL SYSTEMS

(71) Applicant: Intel Corporation, Santa Clara, CA (US)

(72) Inventors: Rita H. Wouhaybi, Portland, OR (US); John Vicente, Roseville, CA (US); Kirk Smith, Chandler, AZ (US); Robert Chavez, Phoenix, AZ (US); Mark Yarvis, Portland, OR (US); Steven M. Brown, Chandler, AZ (US); Jeremy Ouillette, Chandler, AZ (US); Roderick E. Kronschnabel, Chandler, AZ (US); Matthew J. Schneider, Chandler, AZ (US); Chris D. Lucero, Chandler, AZ (US); Atul N. Hatalkar, Chandler, AZ (US); Sharad Garg, Portland, OR (US); Casey Rathbone, Banks, OR (US); Aaron R. Berck, Hillsboro, OR (US); Xubo Zhang, Fremont, CA (US); Ron Kuruvilla Thomas, San Jose, CA (US); Mandeep Shetty, Chandler, AZ (US); Ansuya Negi, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 65 days.

(21) Appl. No.: 16/650,454

(22) PCT Filed: Sep. 28, 2018

(86) PCT No.: PCT/US2018/053607
§ 371 (c)(1),
(2) Date: Mar. 25, 2020

(87) PCT Pub. No.: WO2019/099111
PCT Pub. Date: May 23, 2019

(65) Prior Publication Data
US 2020/0310394 A1    Oct. 1, 2020

Related U.S. Application Data

(60) Provisional application No. 62/587,227, filed on Nov. 16, 2017, provisional application No. 62/612,092, filed on Dec. 29, 2017.

(51) Int. Cl.
*G06N 5/04* (2006.01)
*G05B 19/418* (2006.01)
(Continued)

(52) U.S. Cl.
CPC ............ *H04L 69/40* (2013.01); *G05B 19/042* (2013.01); *G05B 19/054* (2013.01);
(Continued)

(58) Field of Classification Search
CPC ........ G06N 20/00; G06N 3/08; G06N 3/0454; G06N 3/0445; G06N 7/005; G06F 8/10;
(Continued)

(56) References Cited

U.S. PATENT DOCUMENTS

| 5,925,137 A | 7/1999 | Okanoue et al. |
| 7,024,483 B2 | 4/2006 | Dinker et al. |

(Continued)

FOREIGN PATENT DOCUMENTS

| CN | 111164952 | 5/2020 |
| DE | 112018005879 | 8/2020 |

(Continued)

OTHER PUBLICATIONS

Durisic et al., Addressing the need for strict meta-modeling in practice—a case study of AUTOSAR, 6 pages (Year: 2016).*
(Continued)

*Primary Examiner* — Thuy Dao
(74) *Attorney, Agent, or Firm* — Schwegman Lundberg & Woessner, P.A.

(57) ABSTRACT

Various systems and methods for implementing a software defined industrial system are described herein. For example,
(Continued)

an orchestrated system of distributed nodes may run an application, including modules implemented on the distributed nodes. In response to a node failing, a module may be redeployed to a replacement node. In an example, self-descriptive control applications and software modules are provided in the context of orchestratable distributed systems. The self-descriptive control applications may be executed by an orchestrator or like control device and use a module manifest to generate a control system application. For example, an edge control node of the industrial system may include a system on a chip including a microcontroller (MCU) to convert IO data. The system on a chip includes a central processing unit (CPU) in an initial inactive state, which may be changed to an activated state in response an activation signal.

22 Claims, 60 Drawing Sheets

(51) Int. Cl.

| | | |
|---|---|---|
| *G05B 23/02* | (2006.01) | |
| *G06N 3/02* | (2006.01) | |
| *H04L 29/08* | (2006.01) | |
| *H04L 69/40* | (2022.01) | |
| *H04L 67/10* | (2022.01) | |
| *G05B 19/042* | (2006.01) | |
| *G05B 19/05* | (2006.01) | |
| *H04L 41/082* | (2022.01) | |
| *H04L 41/084* | (2022.01) | |
| *H04L 67/04* | (2022.01) | |
| *H04L 67/1042* | (2022.01) | |
| *H04L 67/12* | (2022.01) | |
| *H04L 67/125* | (2022.01) | |
| *H04L 67/565* | (2022.01) | |
| *H04L 67/00* | (2022.01) | |
| *G06F 8/65* | (2018.01) | |
| *G06F 11/20* | (2006.01) | |
| *H04L 41/0668* | (2022.01) | |

(52) U.S. Cl.
CPC ......... *G05B 19/41835* (2013.01); *G06F 8/65* (2013.01); *G06F 11/2023* (2013.01); *G06F 11/2033* (2013.01); *H04L 41/0668* (2013.01); *H04L 41/082* (2013.01); *H04L 41/0846* (2013.01); *H04L 67/04* (2013.01); *H04L 67/10* (2013.01); *H04L 67/1048* (2013.01); *H04L 67/1051* (2013.01); *H04L 67/12* (2013.01); *H04L 67/125* (2013.01); *H04L 67/2823* (2013.01); *H04L 67/34* (2013.01); *G05B 2219/1105* (2013.01); *G05B 2219/1214* (2013.01); *G05B 2219/32043* (2013.01); *G05B 2219/33112* (2013.01); *G06F 2201/805* (2013.01); *G06F 2201/82* (2013.01); *G06F 2201/85* (2013.01)

(58) Field of Classification Search
CPC ........... G06F 16/9024; G06F 16/24568; G06F 9/5072; G06F 30/20; G06F 8/65; A61B 5/1103; A61B 5/4064; G06Q 10/067; G01M 13/045; G01M 13/028; G05B 19/41885; G05B 19/042; G05B 19/054; G05B 19/41835; G05B 2219/32043; Y02P 90/02; H04L 69/40; H04L 67/12
See application file for complete search history.

(56) References Cited

U.S. PATENT DOCUMENTS

| | | |
|---|---|---|
| 7,139,925 B2 | 11/2006 | Dinker et al. |
| 7,206,836 B2 | 4/2007 | Dinker et al. |
| 7,852,754 B2 | 12/2010 | Khanna et al. |
| 8,055,933 B2 | 11/2011 | Jaehde et al. |
| 8,873,380 B2 | 10/2014 | Tochio |
| 8,874,274 B2 | 10/2014 | Mcdonald et al. |
| 9,065,810 B2 | 6/2015 | Nair et al. |
| 9,075,769 B2 | 7/2015 | Tochio |
| 9,774,658 B2 | 9/2017 | Borzycki et al. |
| 10,612,999 B2 * | 4/2020 | Ide .................. G06N 7/005 |
| 10,739,761 B2 | 8/2020 | Chavez et al. |
| 10,868,895 B2 | 12/2020 | Wouhaybi et al. |
| 2008/0222621 A1 | 9/2008 | Knight et al. |
| 2010/0153736 A1 | 6/2010 | Kilian |
| 2011/0289489 A1 | 11/2011 | Kumar et al. |
| 2014/0119608 A1* | 5/2014 | Lee .................. G06T 7/20 382/103 |
| 2014/0146673 A1 | 5/2014 | Parker |
| 2016/0065653 A1 | 3/2016 | Chen et al. |
| 2016/0217387 A1* | 7/2016 | Okanohara ............ G06N 20/00 |
| 2016/0274978 A1* | 9/2016 | Strohmenger ...... G06F 11/1458 |
| 2016/0337403 A1 | 11/2016 | Stoops et al. |
| 2016/0357523 A1 | 12/2016 | Zhang et al. |
| 2017/0093587 A1 | 3/2017 | Glisson |
| 2017/0109003 A1* | 4/2017 | Angermayer ..... G06F 16/90335 |
| 2017/0255784 A1* | 9/2017 | Donohoe .............. G06F 21/602 |
| 2018/0012145 A1* | 1/2018 | Maurya .................. G06N 5/022 |
| 2018/0084111 A1 | 3/2018 | Pirat et al. |
| 2019/0041824 A1 | 2/2019 | Chavez et al. |
| 2019/0041830 A1 | 2/2019 | Yarvis et al. |
| 2019/0042378 A1 | 2/2019 | Wouhaybi et al. |
| 2021/0243284 A1 | 8/2021 | Wouhaybi et al. |

FOREIGN PATENT DOCUMENTS

| | | |
|---|---|---|
| JP | 2021503639 A | 2/2021 |
| WO | WO-2018144059 A1 | 8/2018 |
| WO | WO-2019099111 A1 | 5/2019 |

OTHER PUBLICATIONS

"U.S. Appl. No. 16/147,190, Non Final Office Action dated Jan. 16, 2020", 37 pgs.
"International Application No. PCT/US2018/053607, Invitation to Pay Additional fees dated Jan. 16, 2019", 15 pgs.
"International Application Serial No. PCT/US2018/053607, International Search Report dated Mar. 13, 2019", 6 pgs.
"International Application Serial No. PCT/US2018/053607, Written Opinion dated Mar. 13, 2019", 10 pgs.
Hu, Yun Chao, et al., "Mobile Edge Computing A key technology towards 5G", ETSI White Paper No. 11, (Sep. 2015), 16 pgs.
"U.S. Appl. No. 16/147,148, Notice of Allowance dated Apr. 8, 2020", 11 pgs.
"U.S. Appl. No. 16/147,190, Response filed Apr. 14, 2020 to Non Final Office Action dated Jan. 16, 2020", 11 pgs.
"U.S. Appl. No. 16/147,168, Non Final Office Action dated Apr. 29, 2020", 15 pgs.
"U.S. Appl. No. 16/147,190, Final Office Action dated May 14, 2020", 41 pgs.
"International Application Serial No. PCT US2018 053607, International Preliminary Report on Patentability dated May 28, 2020", 12 pgs.
"U.S. Appl. No. 16/147,148, Corrected Notice of Allowability dated Jun. 10, 2020", 2 pgs.
"German Application Serial No. 112018005879.4, Office Action dated Jun. 26, 2020", W English Translation, 2 page.
"U.S. Appl. No. 16/147,190, Examiner Interview Summary dated Jul. 16, 2020", 3 pgs.
"U.S. Appl. No. 16/147,168, Response filed Jul. 29, 2020 to Non Final Office Action dated Apr. 29, 2020", 8 pgs.

(56) References Cited

OTHER PUBLICATIONS

"U.S. Appl. No. 16/147,168, Notice of Allowance dated Aug. 11, 2020", 9 pgs.
"U.S. Appl. No. 16/147,190, Pre-Appeal Brief filed Aug. 14, 2020", 5 pgs.
"U.S. Appl. No. 16/147,190, Appeal Brief Based on Pre-Appeal Brief Review filed Oct. 14, 2020", 28 pgs.
"U.S. Appl. No. 16/147,190, Advisory Action dated Oct. 30, 2020", 2 pgs.
"U.S. Appl. No. 16/147,190, Examiner's Answer dated Jul. 6, 2021", 6 pgs.
"U.S. Appl. No. 16/147,190, Reply Brief filed Sep. 1, 2021", 5 pgs.
"U.S. Appl. No. 17/120,512, Notice of Allowance dated Oct. 22, 2021", 12 pgs.
"U.S. Appl. No. 17/120,512, Preliminary Amendment filed Apr. 23, 2021", 7 pgs.

\* cited by examiner

CONFIGURATION OF ORCHESTRATABLE MODULES

CONFIGURATION OF ORCHESTRATABLE MODULE AND LEGACY MODULE

ORCHESTRATION OF ORCHESTRATABLE DEVICE

ORCHESTRATION OF LEGACY DEVICE

DISTRIBUTED SOFTWARE-DEFINED INDUSTRIAL SYSTEMS

PRIORITY CLAIM

This application is a U.S. National Stage Application under 35 U.S.C. 371 from International Application No. PCT/US2018/053607, filed Sep. 28, 2018, published as WO 2019/099111, which claims the benefit of priority to United States Provisional Patent Application Ser. No. 62/587,227, filed Nov. 16, 2017 and titled "DISTRIBUTED SOFTWARE DEFINED INDUSTRIAL SYSTEMS", and 62/612,092, filed Dec. 29, 2017, and titled "DISTRIBUTED SOFTWARE DEFINED INDUSTRIAL SYSTEMS"; all of which are incorporated herein by reference in their entirety.

TECHNICAL FIELD

Embodiments described herein generally relate to data processing and communications within distributed and interconnected device networks, and in particular, to techniques for defining operations of a software defined industrial system (SDIS) provided from configurable Internet Of Things devices and device networks.

BACKGROUND

Industrial systems are designed to capture real-world instrumentation (e.g., sensor) data and actuate responses in real time, while operating reliably and safely. The physical environment for use of such industrial systems may be harsh, and encounter wide variations in temperature, vibration, and moisture.

Small changes to system design may be difficult to implement, as many statically configured I/O and subsystems lack the flexibility to be updated within an industrial system without a full unit shutdown. Over time, the incremental changes required to properly operate an industrial system may become overly complex and result in significant management complexity. Additionally, many industrial control systems encounter costly operational and capital expenses, and many control systems are not architecturally structured to take advantage of the latest information technology advancements.

The development of Internet of Things (IoT) technology along with software-defined technologies (such as virtualization) has led to technical advances in many forms of telecom, enterprise and cloud systems. Technical advances in real-time virtualization, high availability, security, software-defined systems, and networking have provided improvements in such systems.

However. IoT devices may be physically heterogeneous and their software may also be heterogeneous (or may grow increasingly heterogeneous over time), making such devices complex to manage.

Limited approaches have been investigated to utilize IoT devices and IoT frameworks even despite the technical advances that have occurred in industrial automation and systems. Further, industry has been hesitant to adopt new technologies in industrial systems and automation, because of the high cost and unproven reliability of new technology. This reluctance means that typically, only incremental changes are attempted; and even then, there are numerous examples of new technology that underperformed or took long periods of time to bring online. As a result, wide-scale deployment of IoT technology and software-defined technologies has not been successfully adapted to industrial settings.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

Figure 5A:
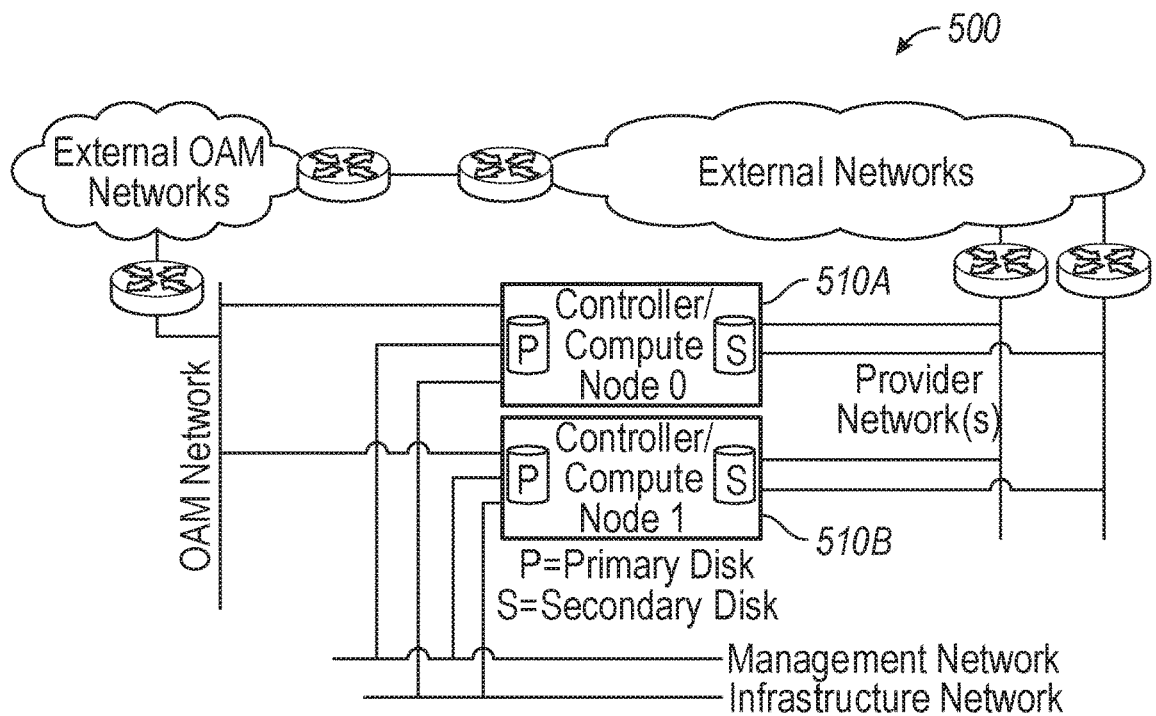
Figure 5B:
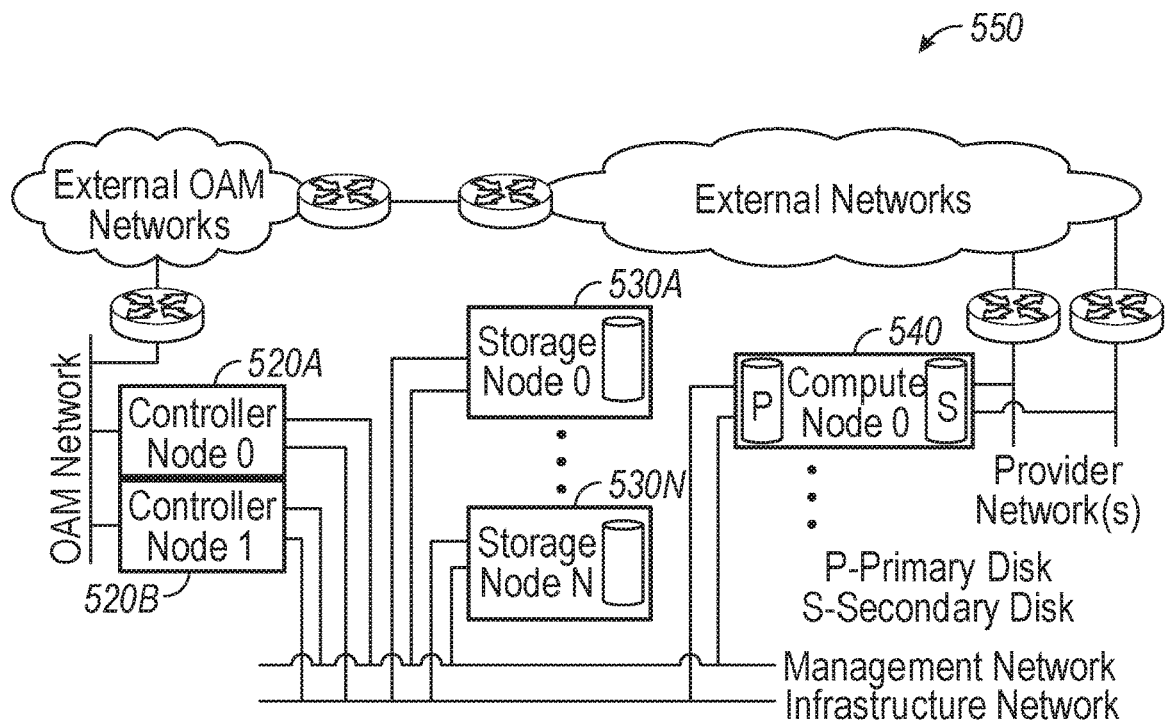
Figure 6:
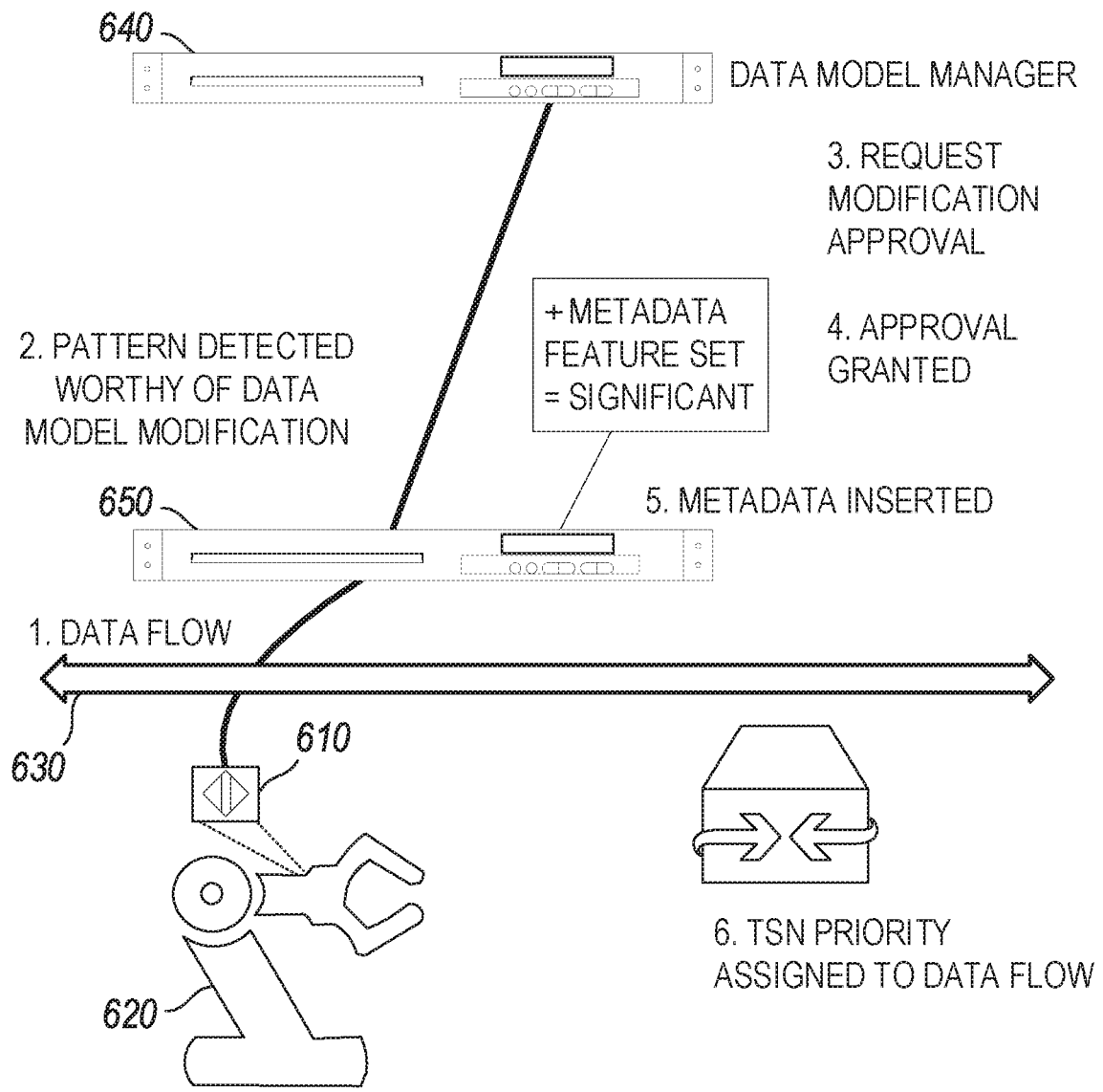
Figure 7:
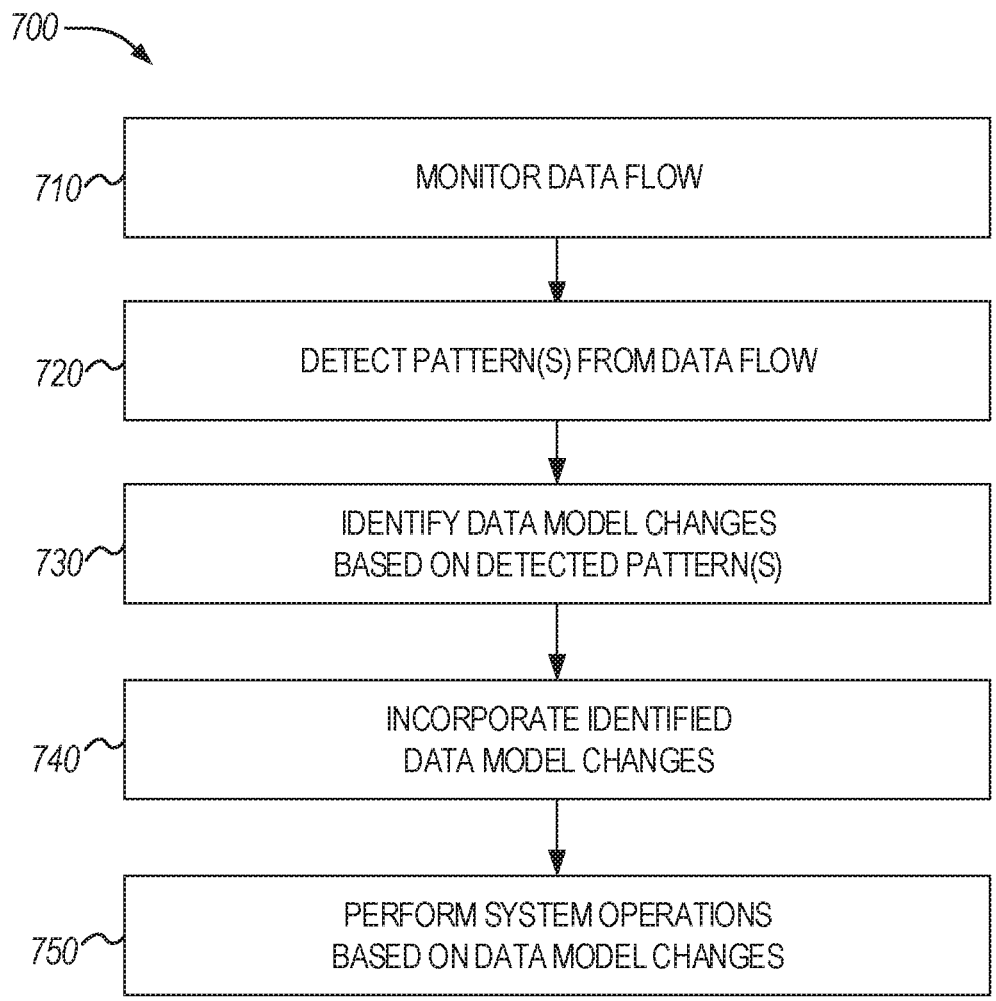
Figure 8:
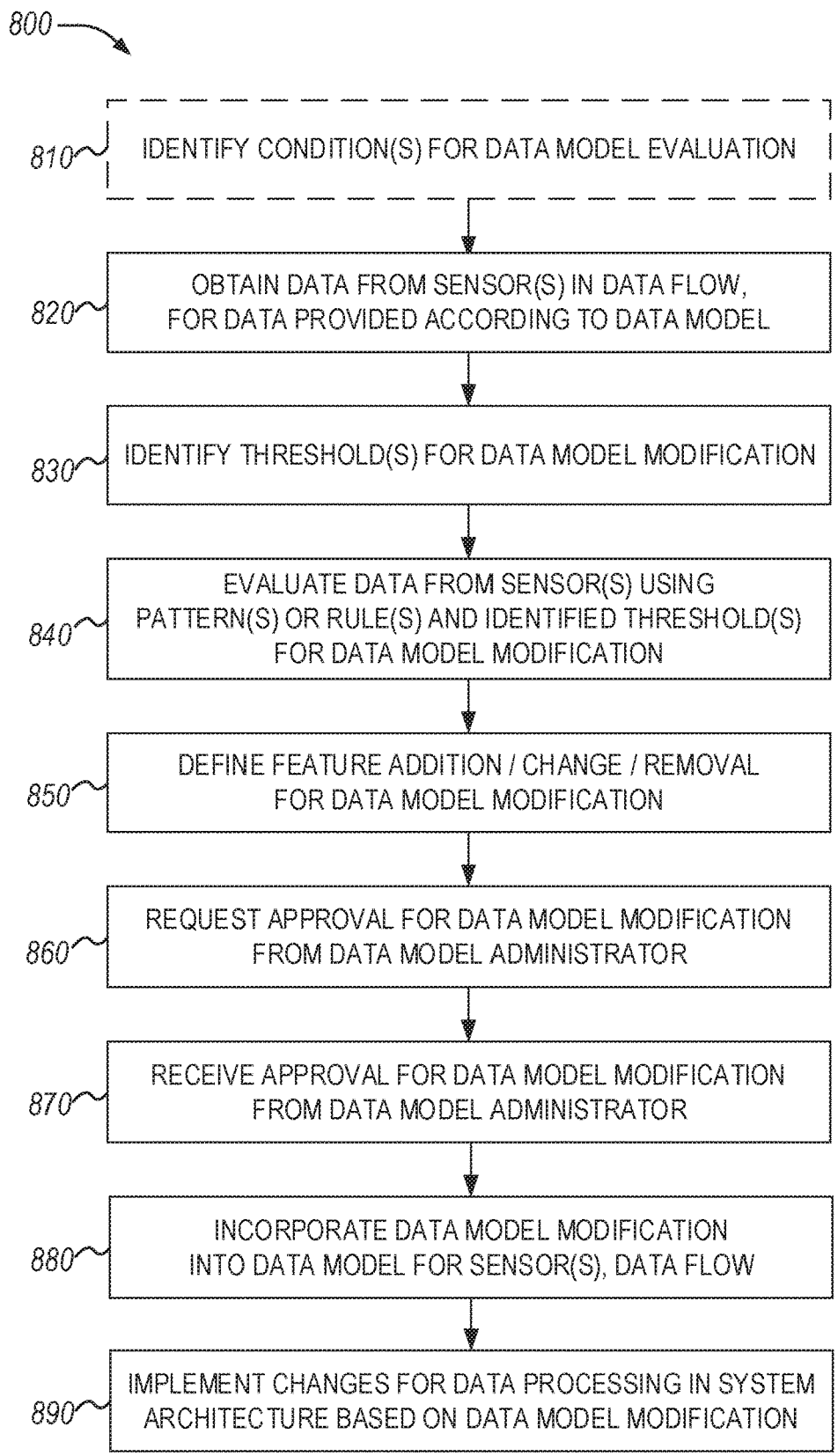
Figure 9:
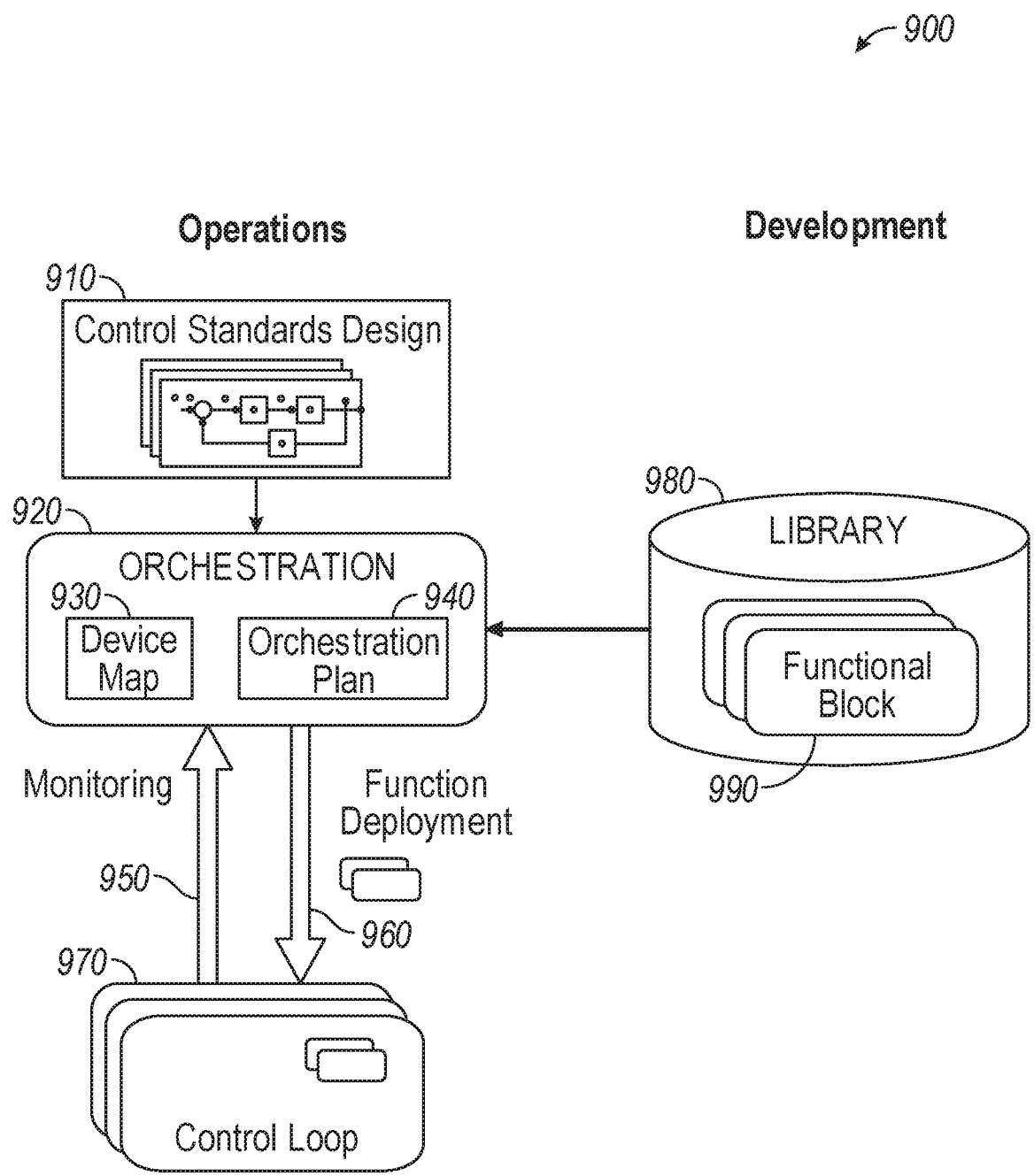
Figure 10:
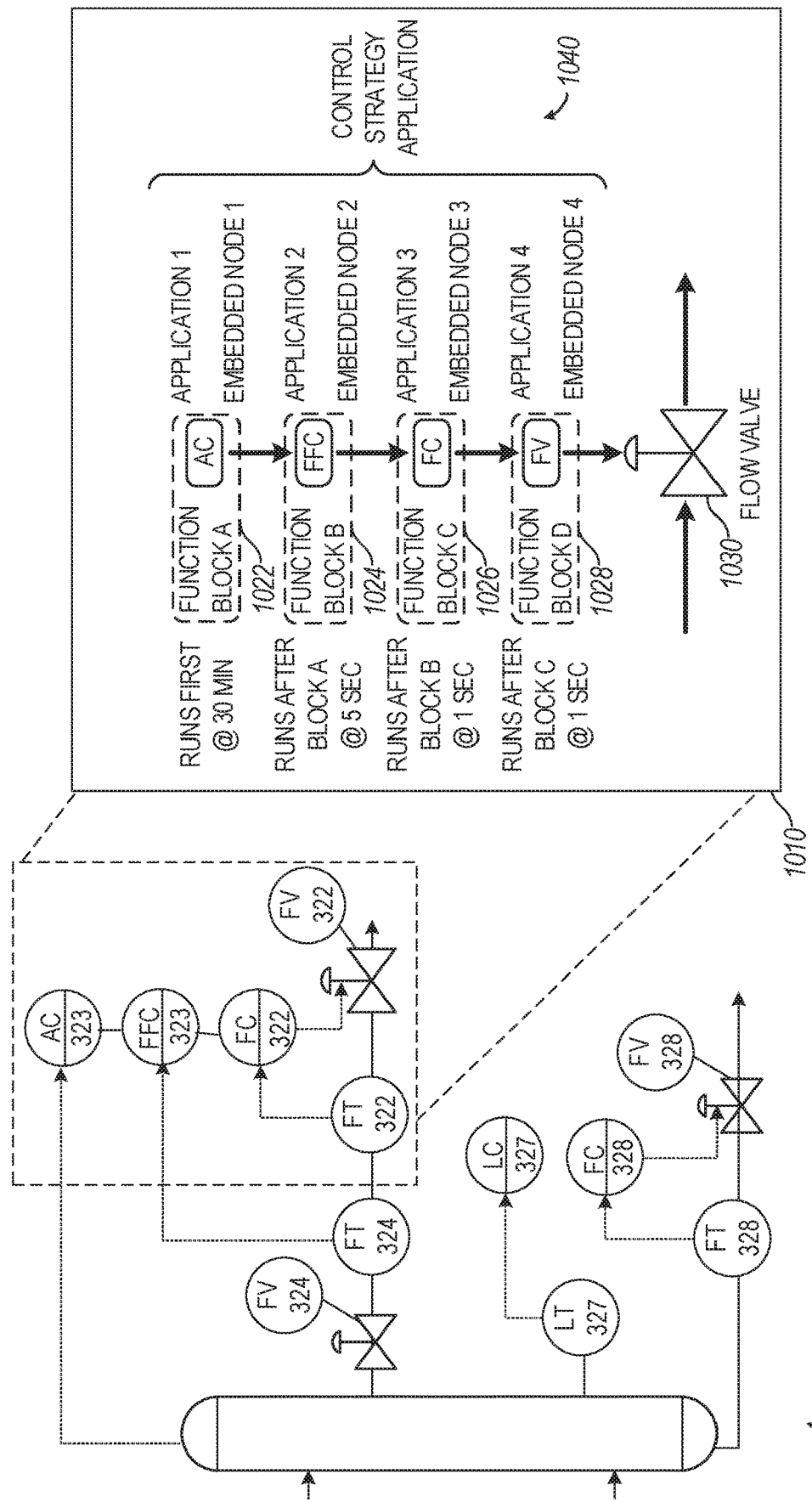
Figure 11:
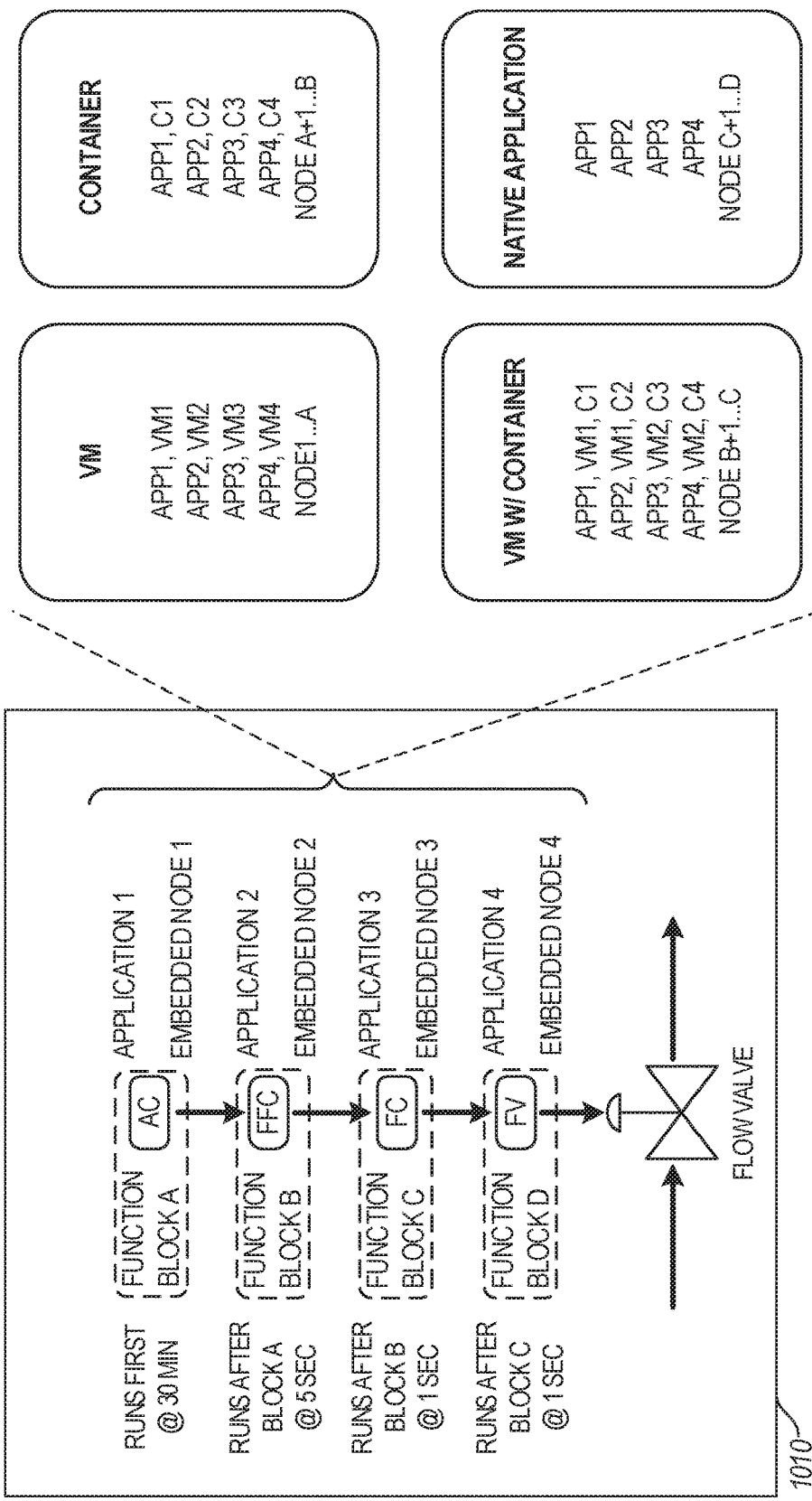

FIG. SA illustrates a first network configuration for deployment of SDIS subsystems, according to an example;

FIG. 5B illustrates a second network configuration for deployment of SDIS subsystems, according to an example:

FIG. 6 illustrates a protocol in an example scenario for dynamically updating a data model in a SDIS operational architecture, according to an example;

FIG. 7 illustrates a flowchart for generating and utilizing a dynamically updated data model in a SDIS operational architecture, according to an example;

FIG. 8 illustrates a flowchart of a method for incorporating a dynamically updated data model into use with a SDIS operational architecture, according to an example;

FIG. 9 illustrates a dynamically established set of orchestration operations in a SDIS operational architecture, according to an example;

FIG. 10 illustrates an orchestration arrangement of a cascade control application based on distributed system building blocks, according to an example;

FIG. 11 illustrates an application distribution mapping for a control strategy of an orchestration scenario, according to an example.

Figure 12:
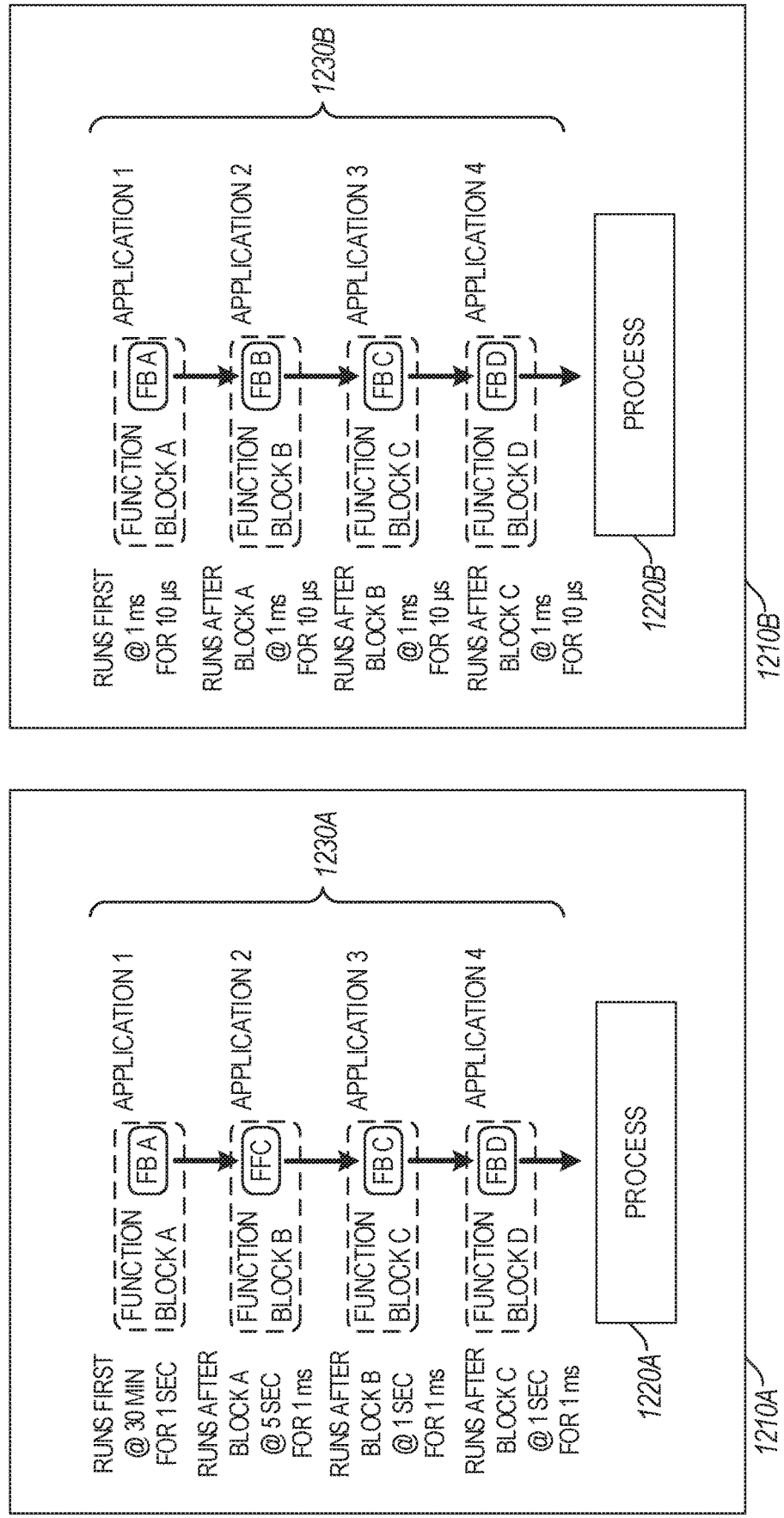

FIG. 12 illustrates orchestration scenarios adapted for handling function block application timing dependency, according to an example.

Figure 13:
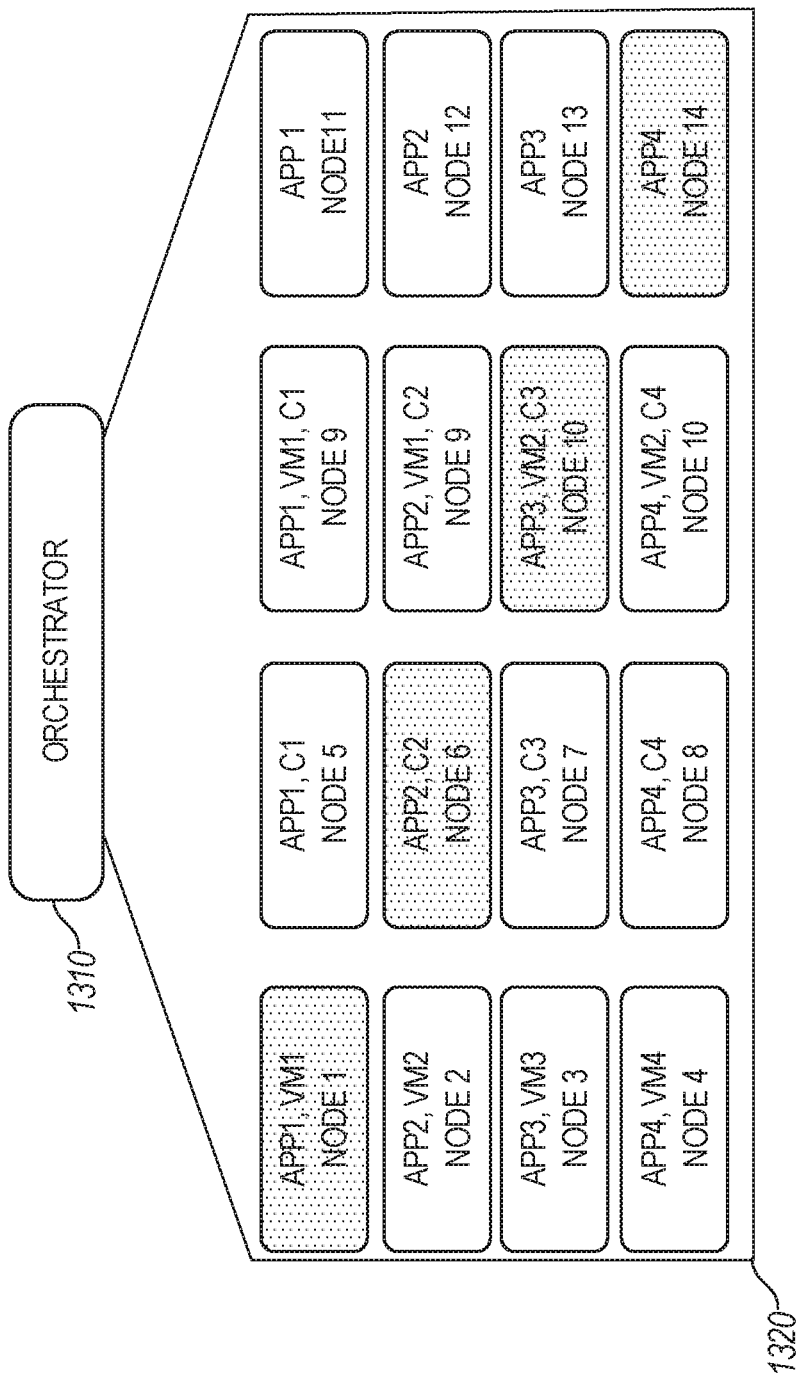

FIG. 13 illustrates an orchestration asset deployment for applications under the control of an orchestrator, according to an example.

Figure 14:
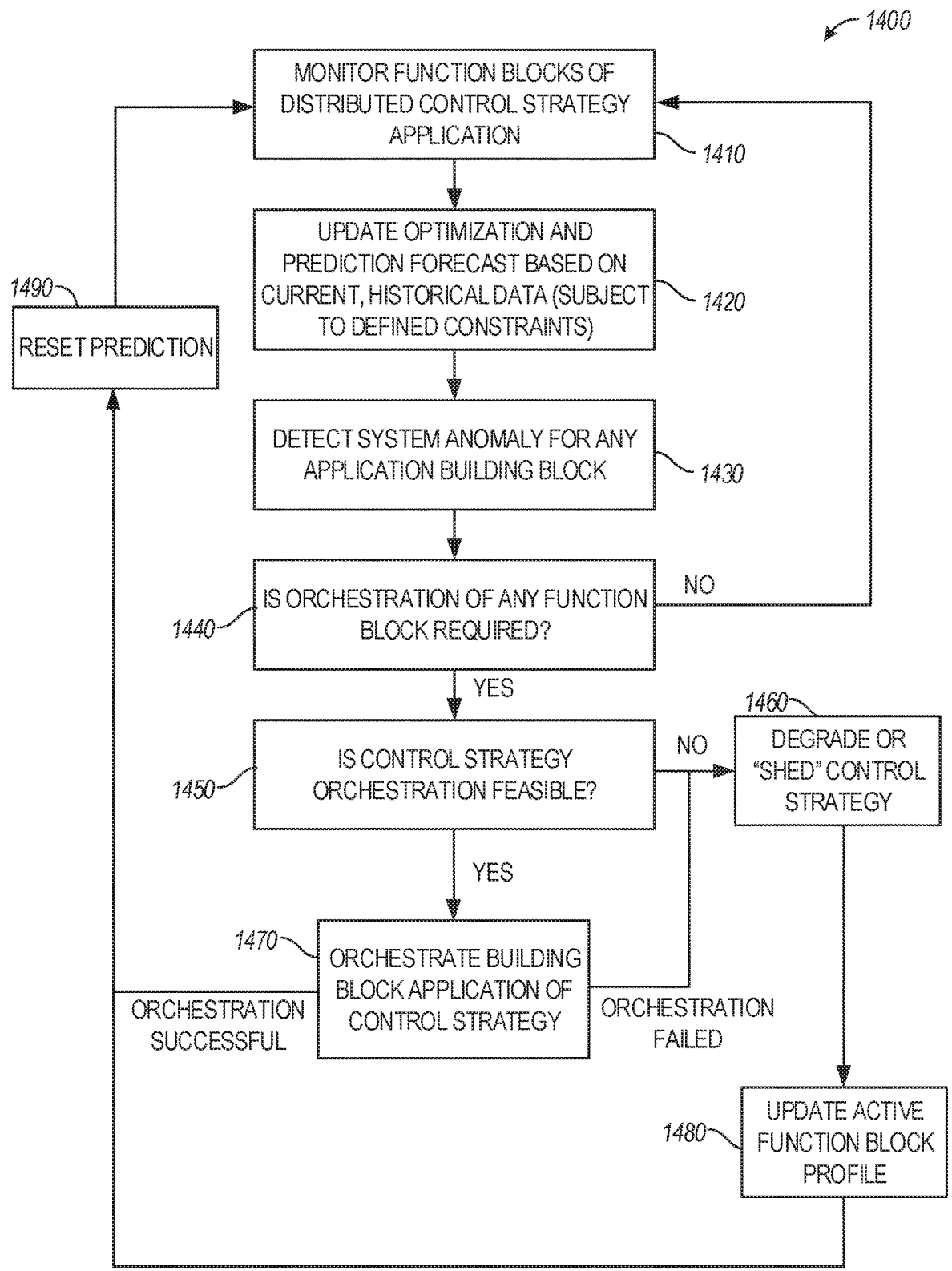

FIG. 14 illustrates a flowchart of an orchestration sequence for a distributed control application strategy, according to an example.

Figure 15:
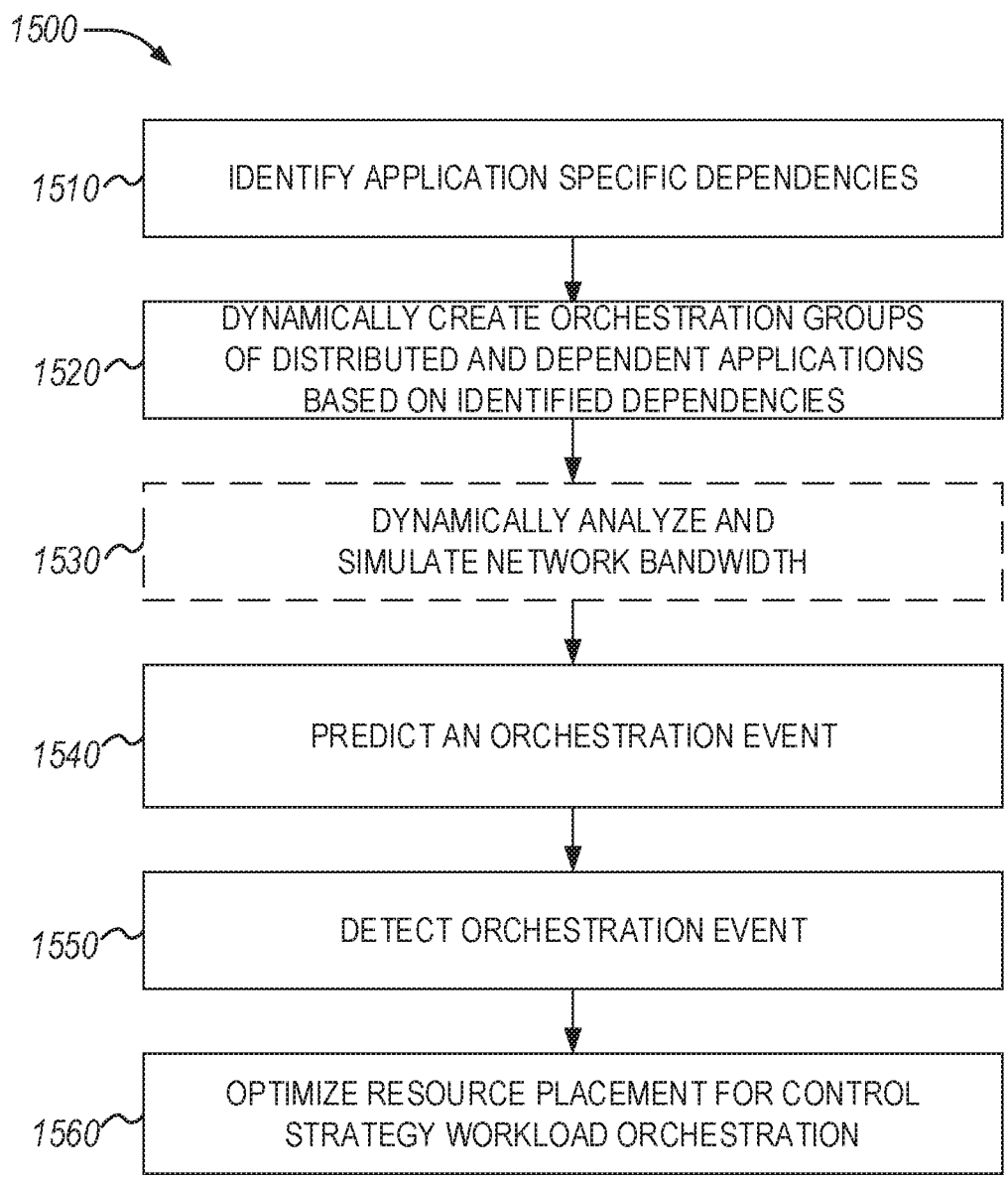
Figure 16A:
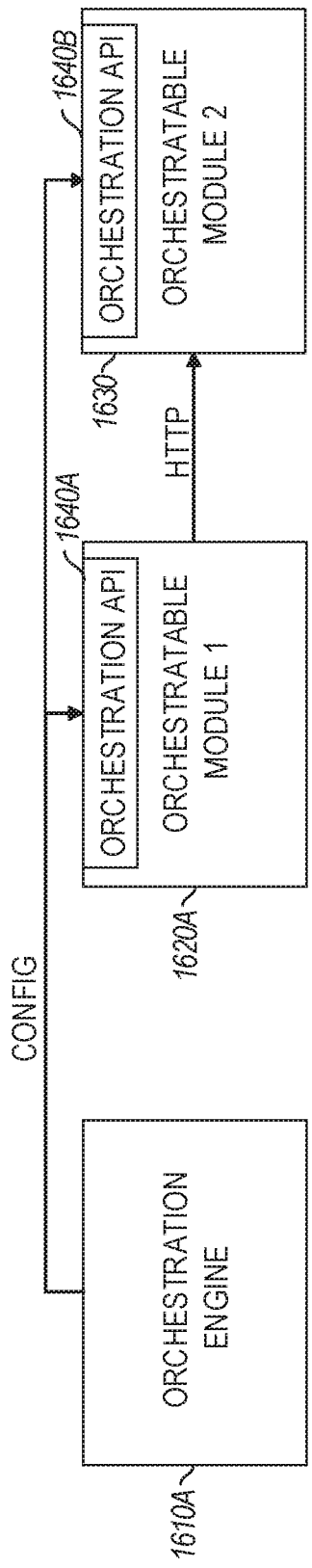
Figure 16B:
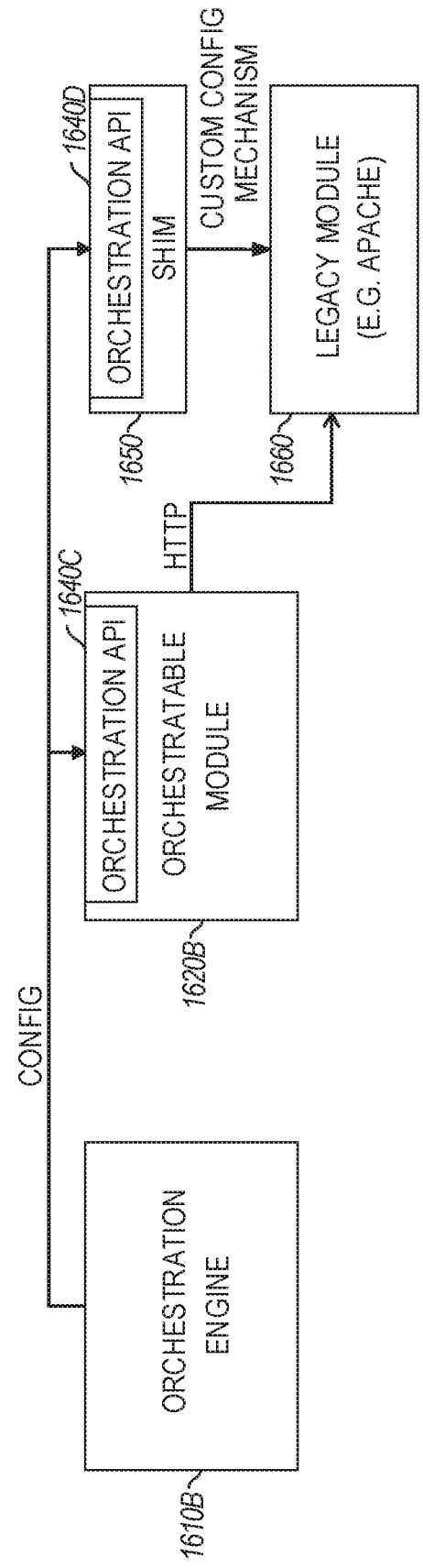
Figure 17A:
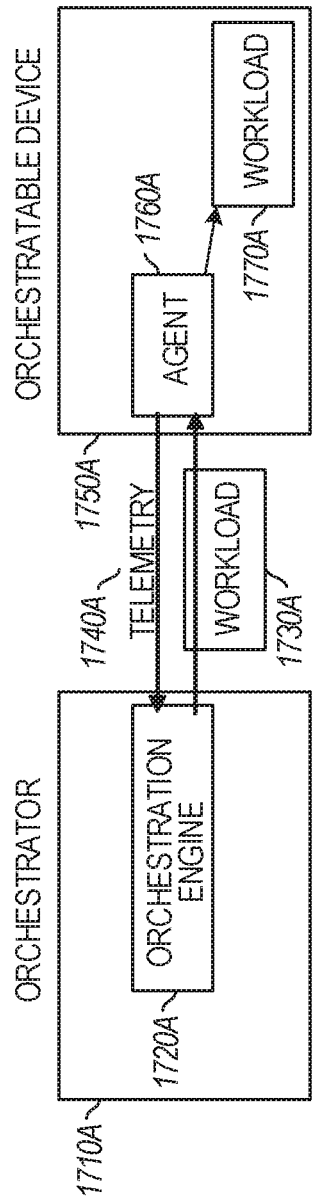
Figure 17B:
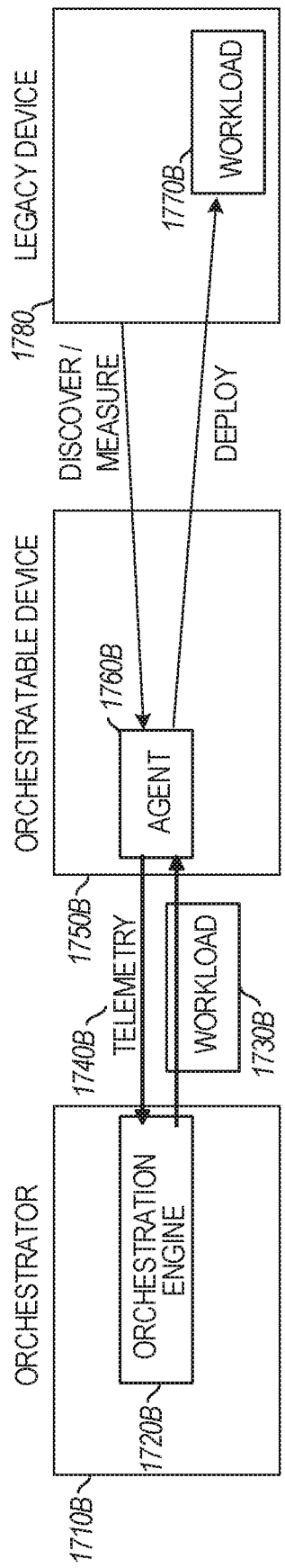
Figure 18:
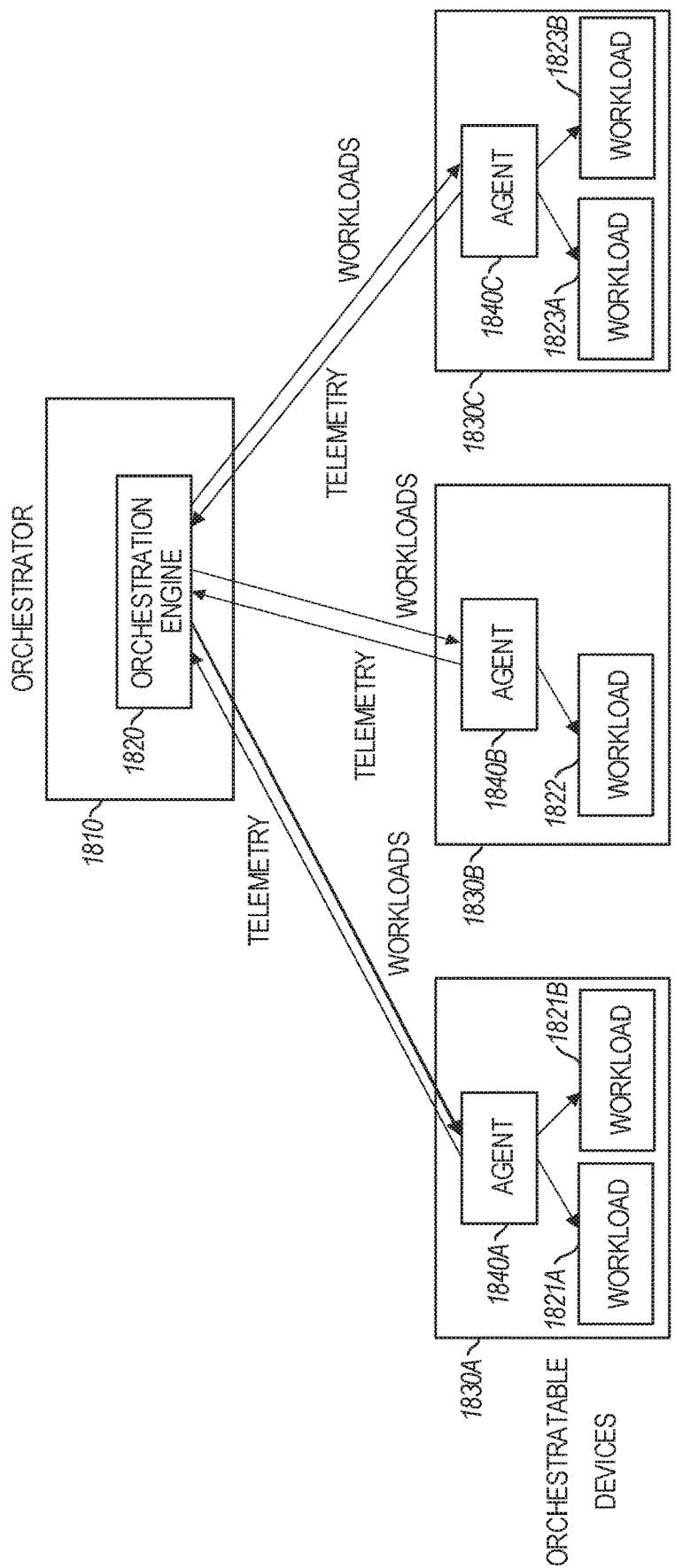
Figure 19:
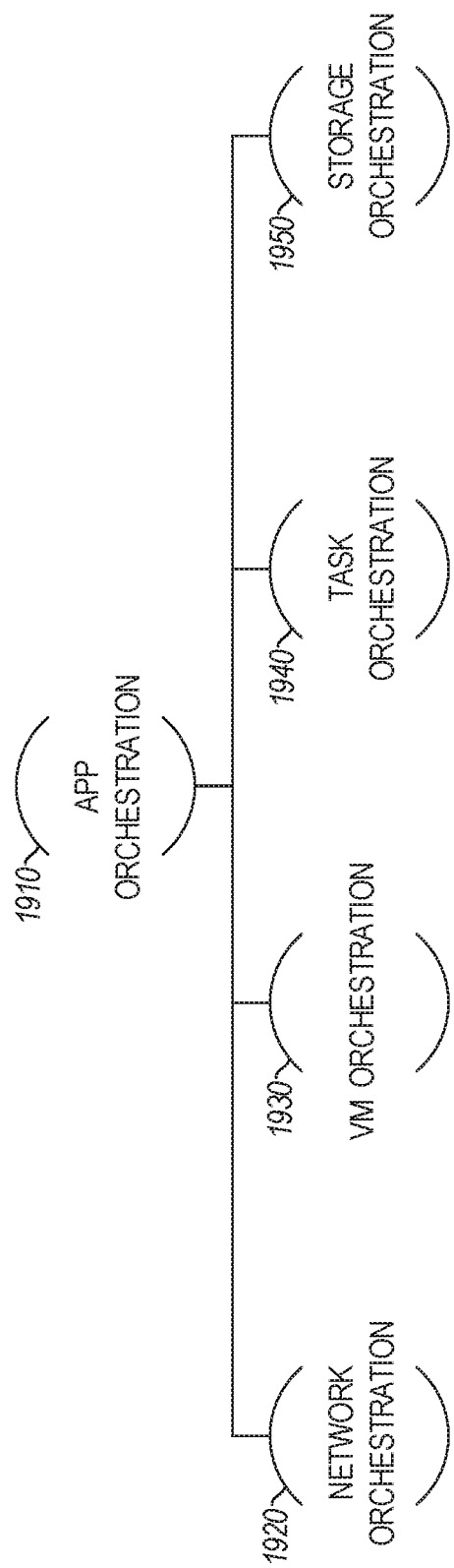
Figure 20:
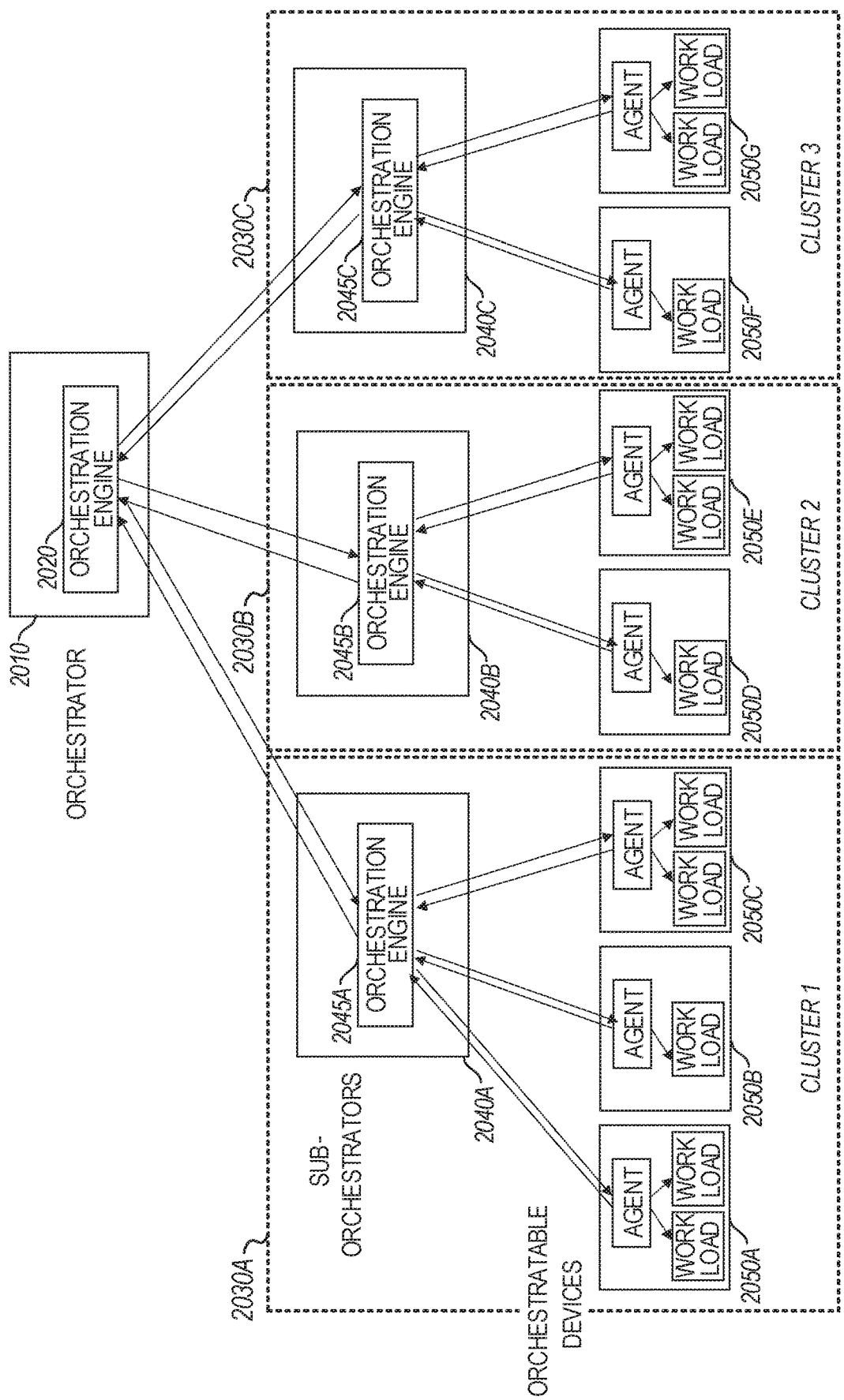
Figure 21:
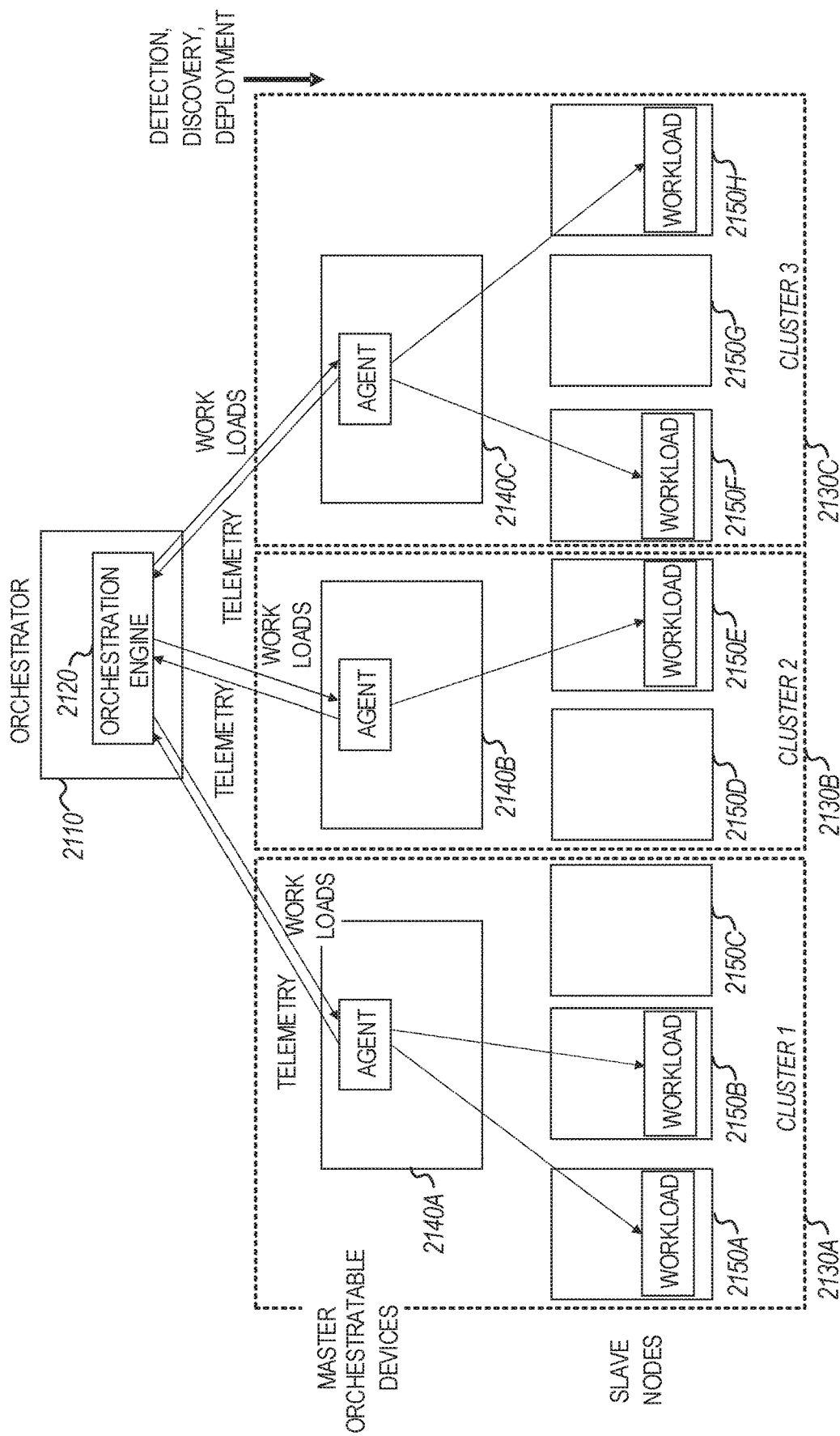
Figure 22:
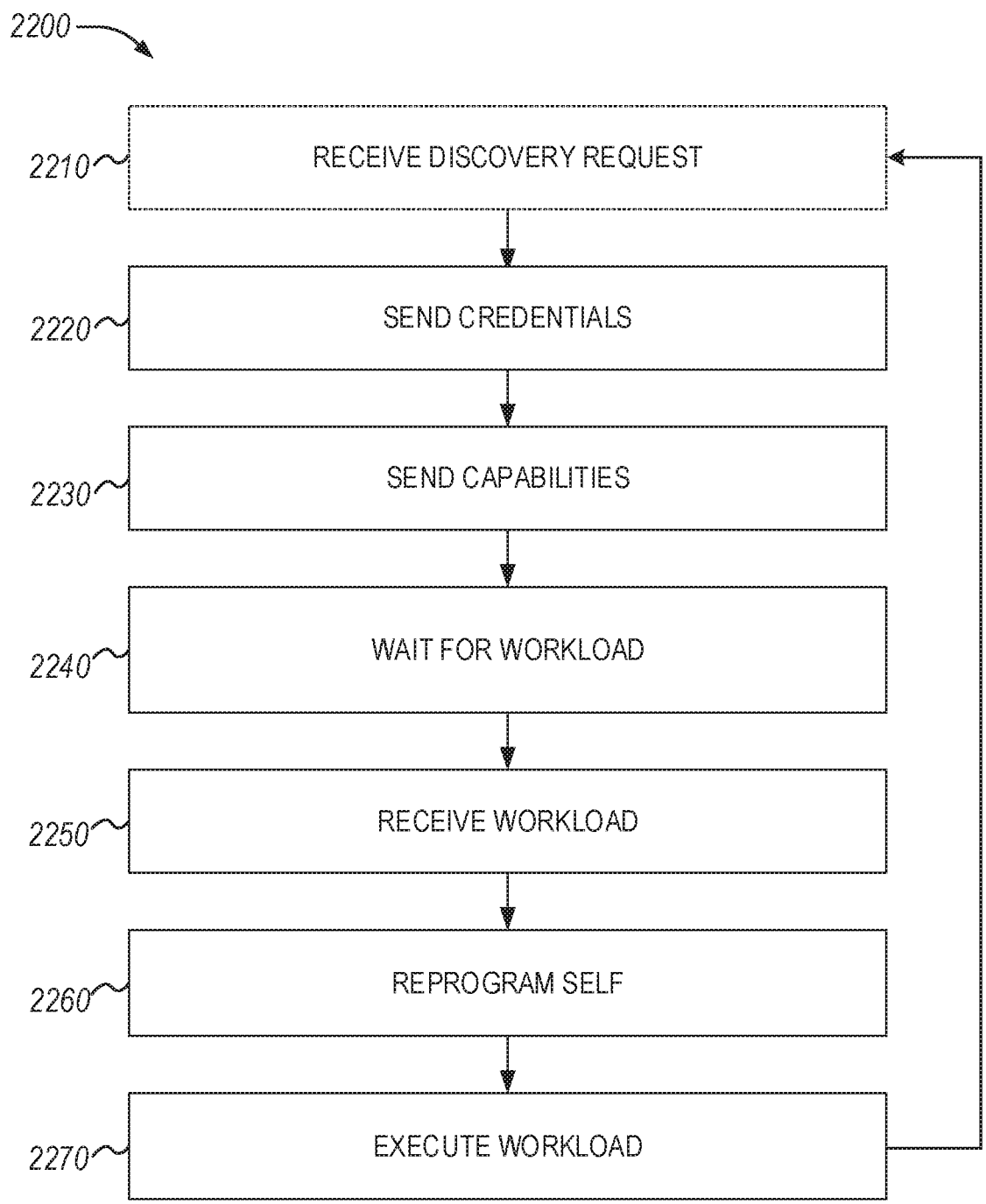
Figure 23:
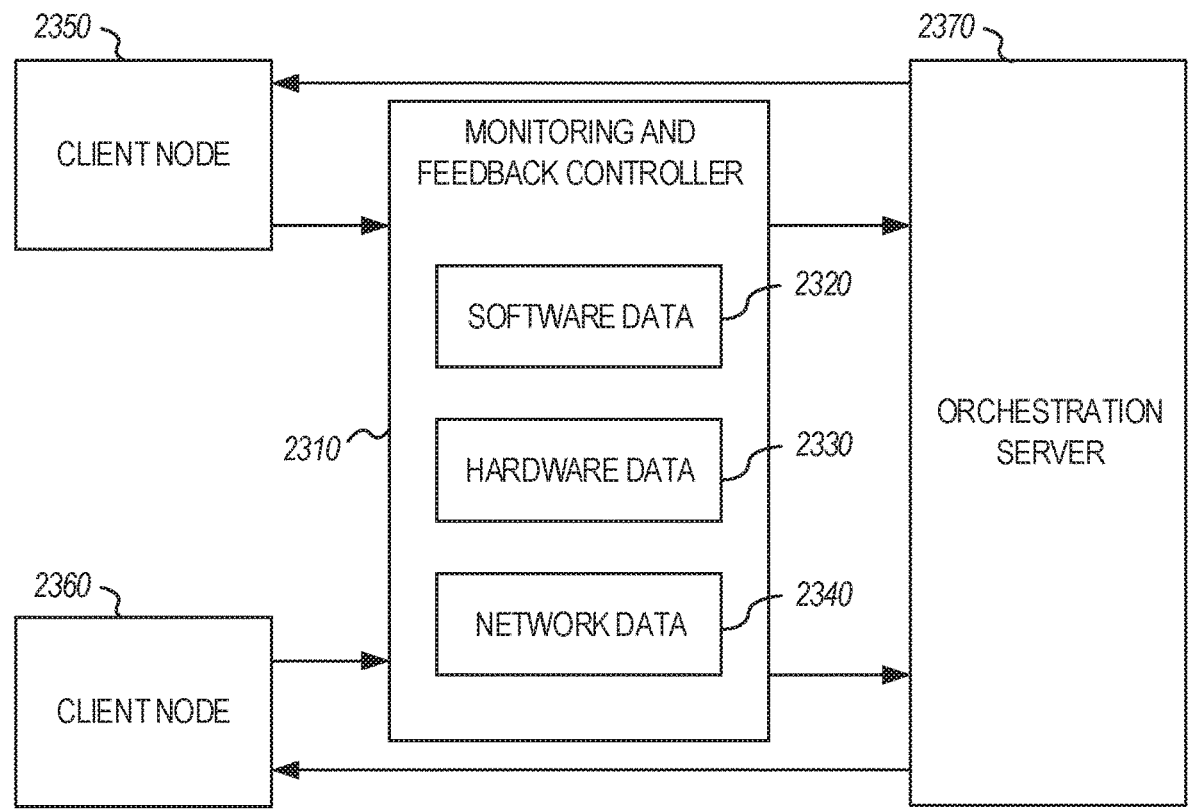
Figure 24:
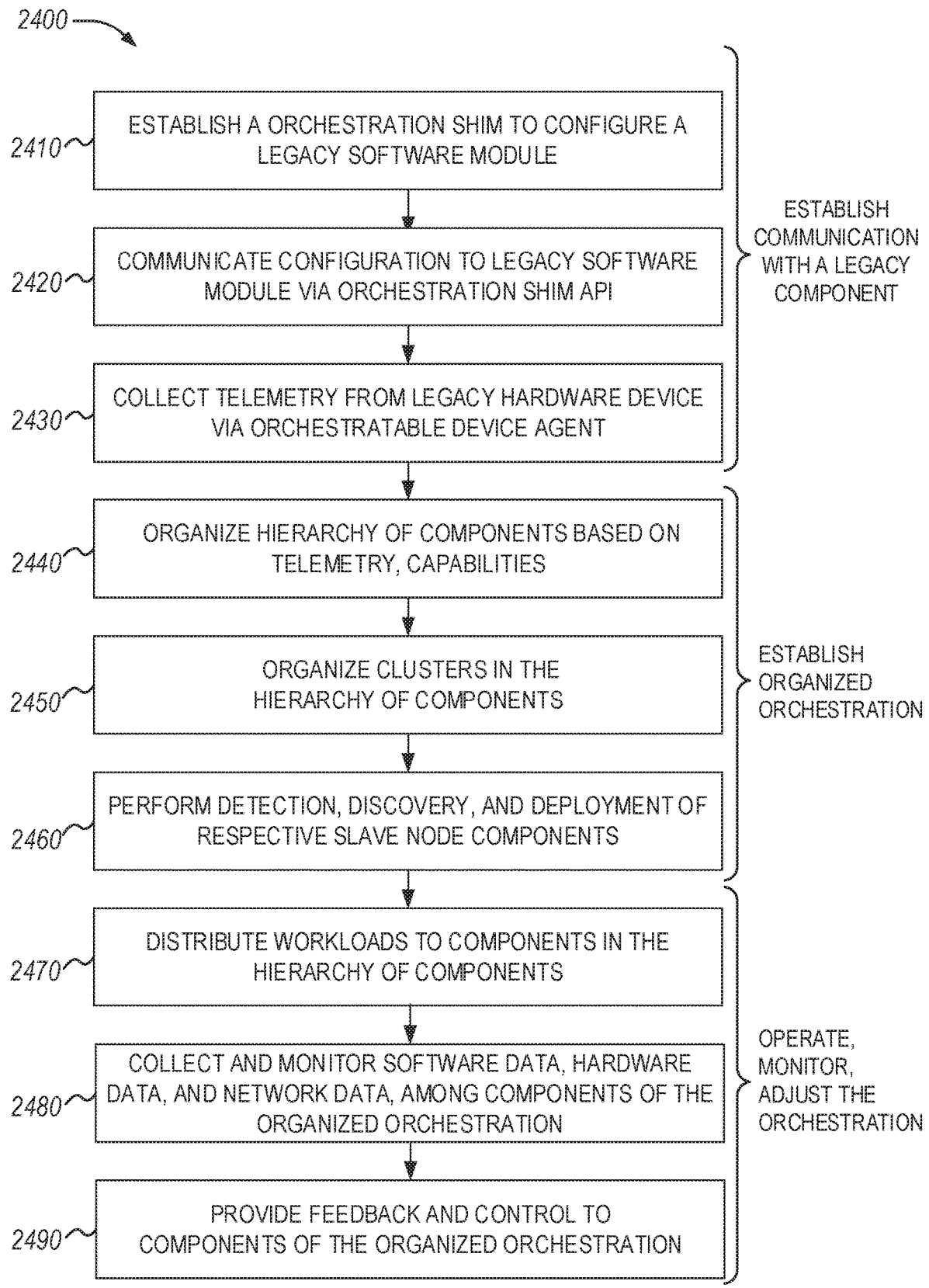
Figure 25:
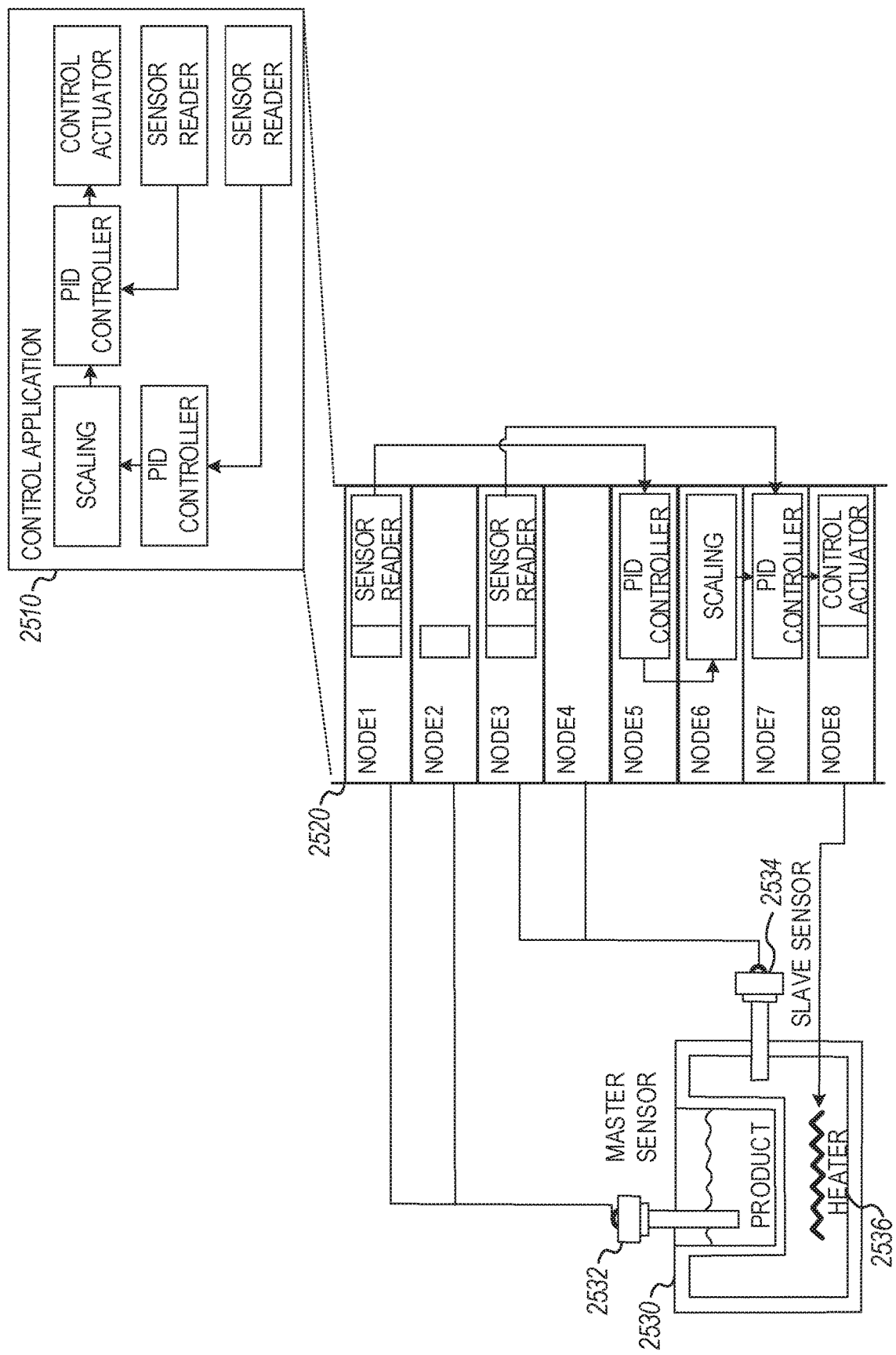
Figure 26:
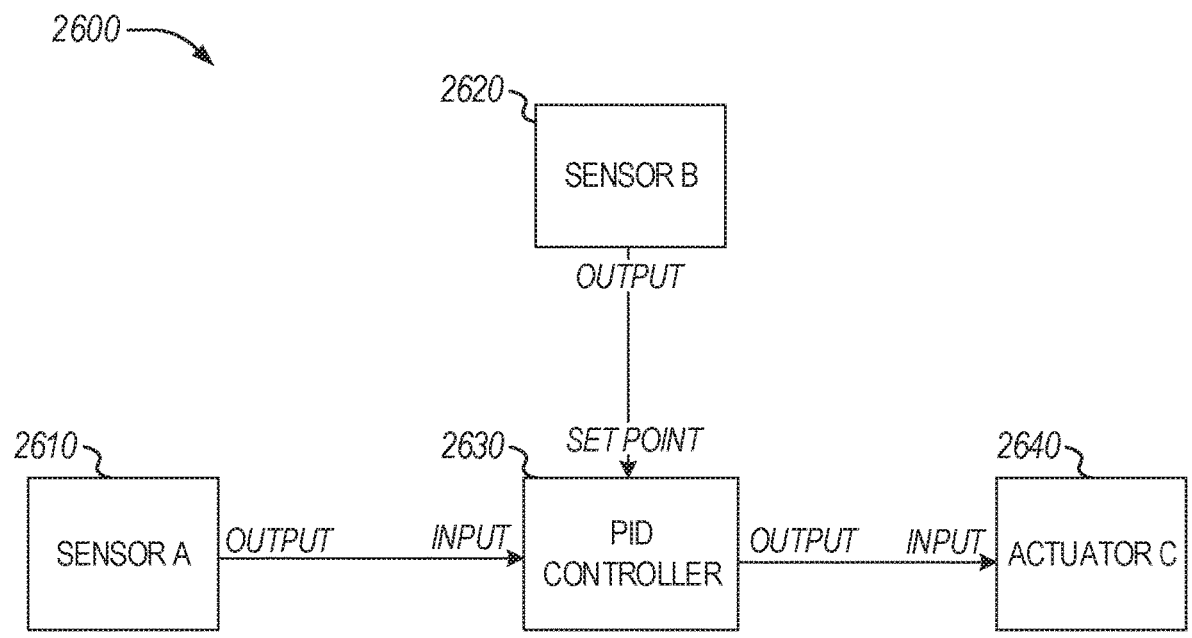
Figure 27:
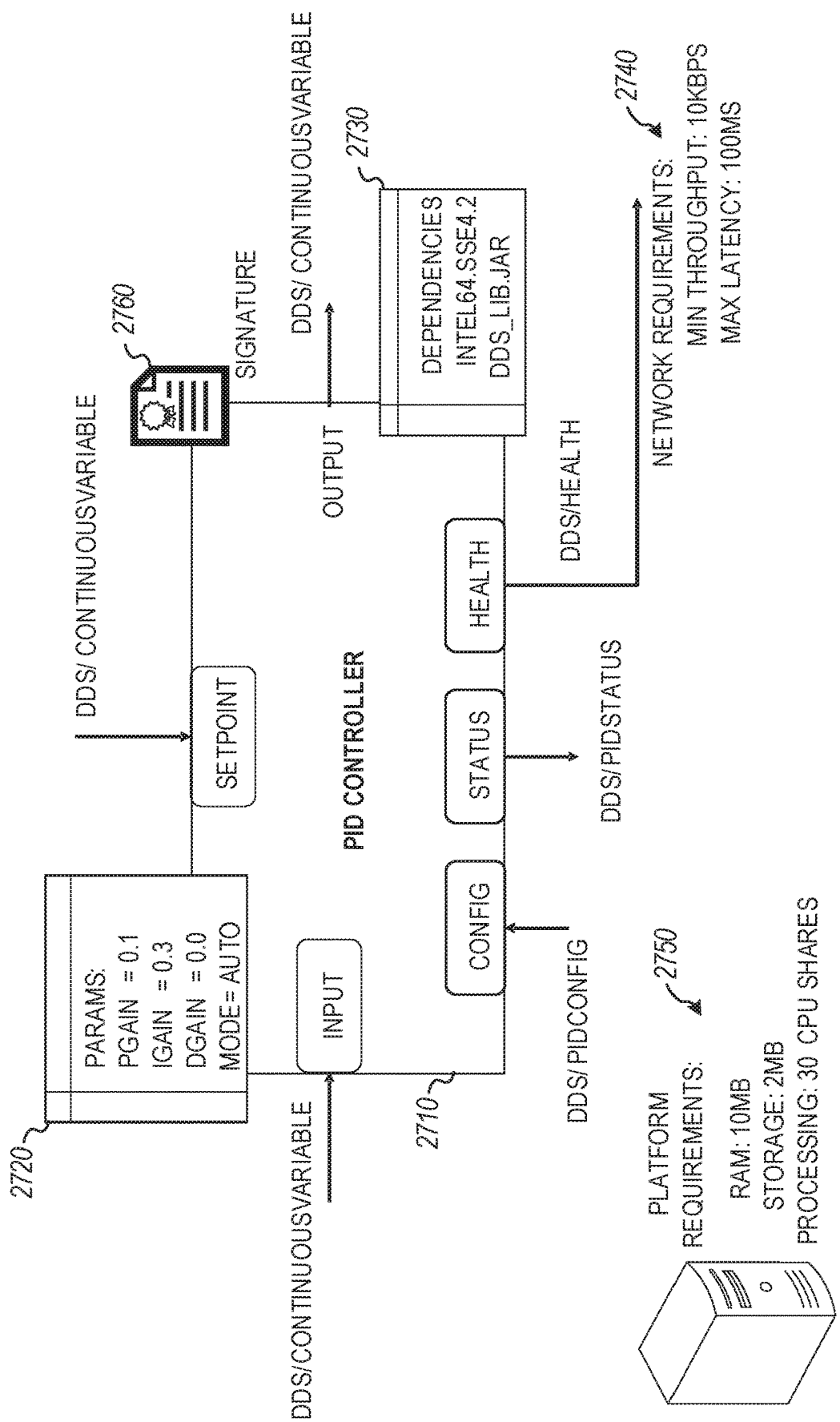
Figure 28:
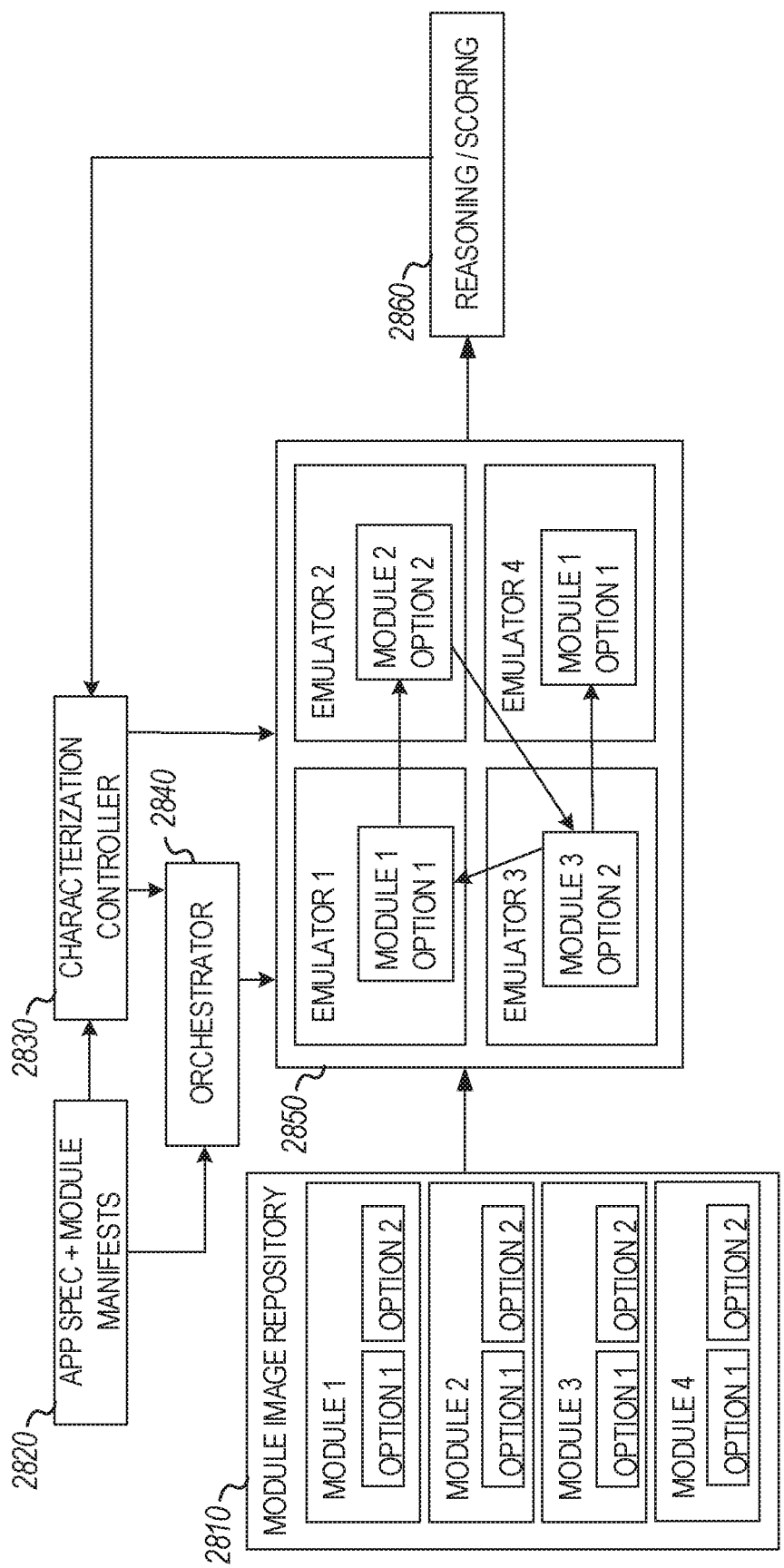
Figure 29:
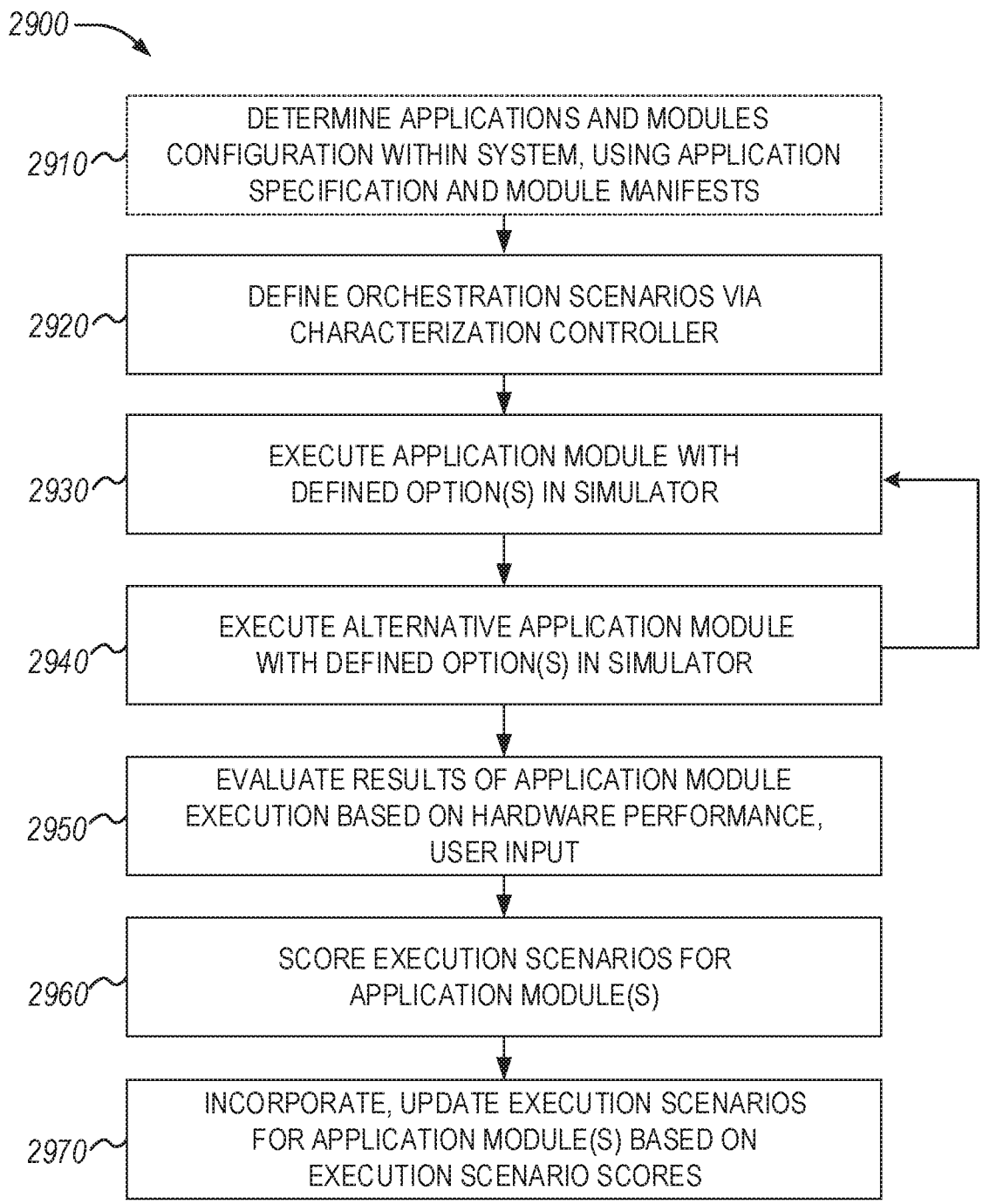
Figure 30A:
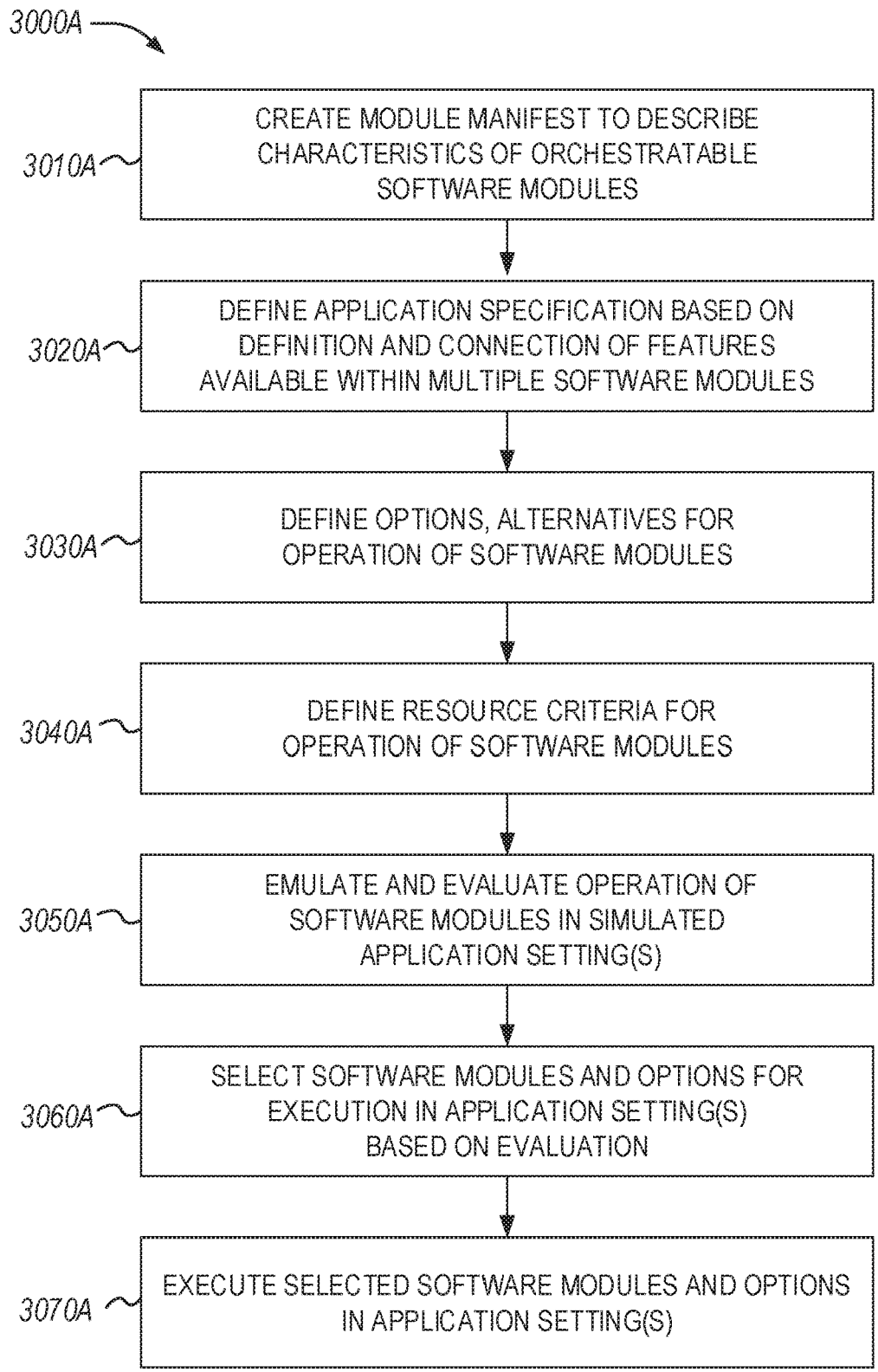
Figure 30B:
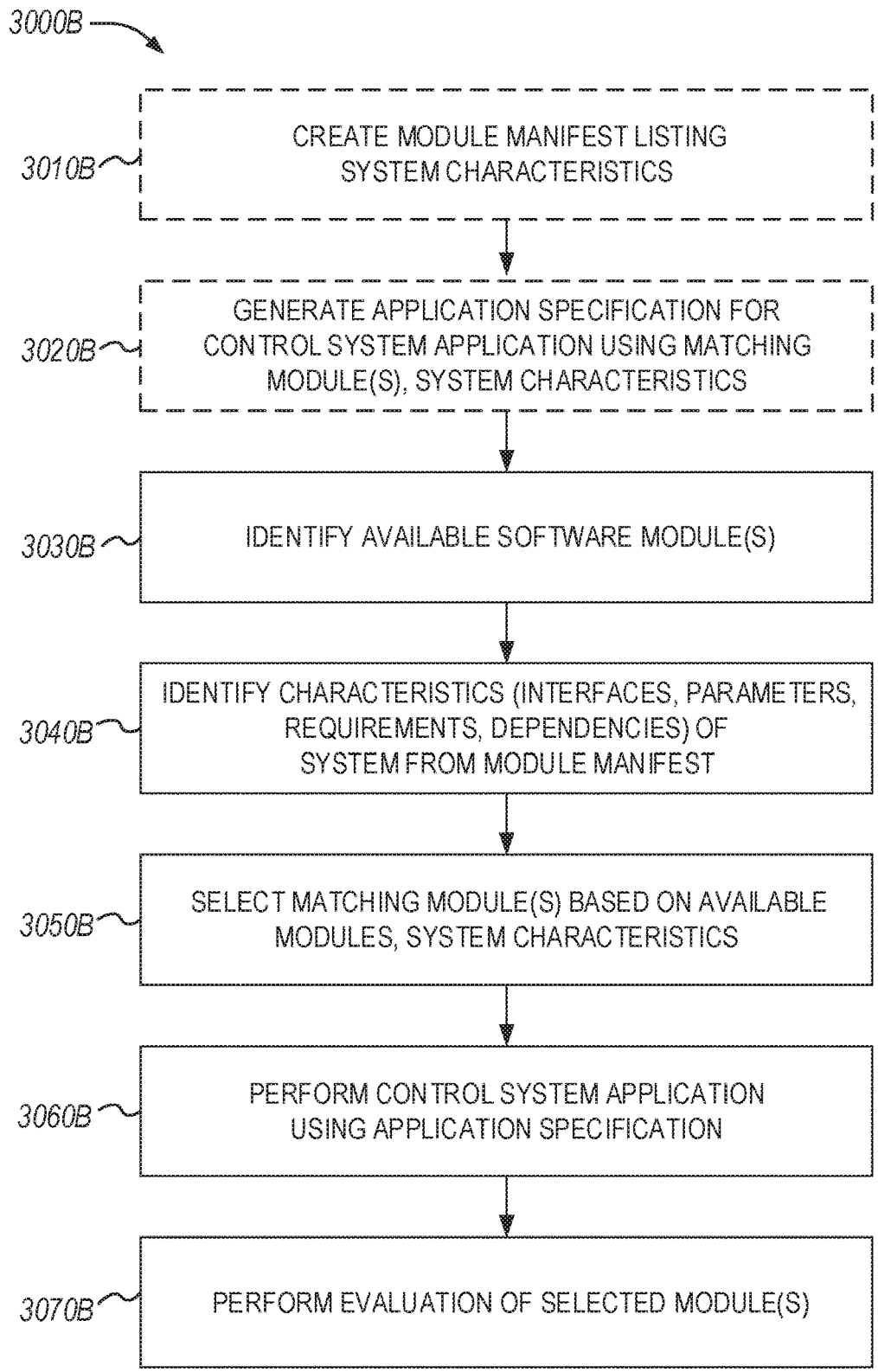
Figure 31:
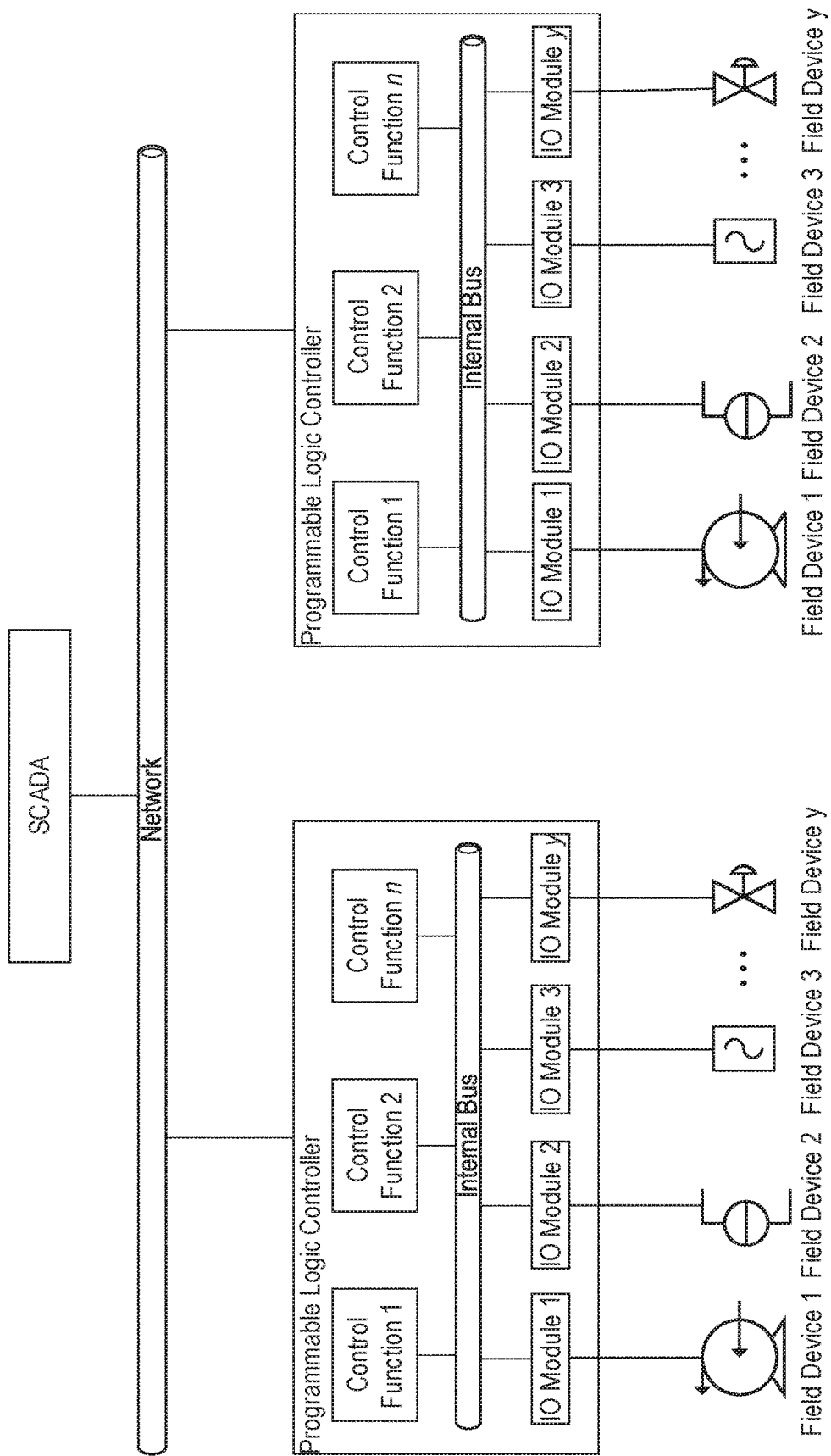
Figure 32:
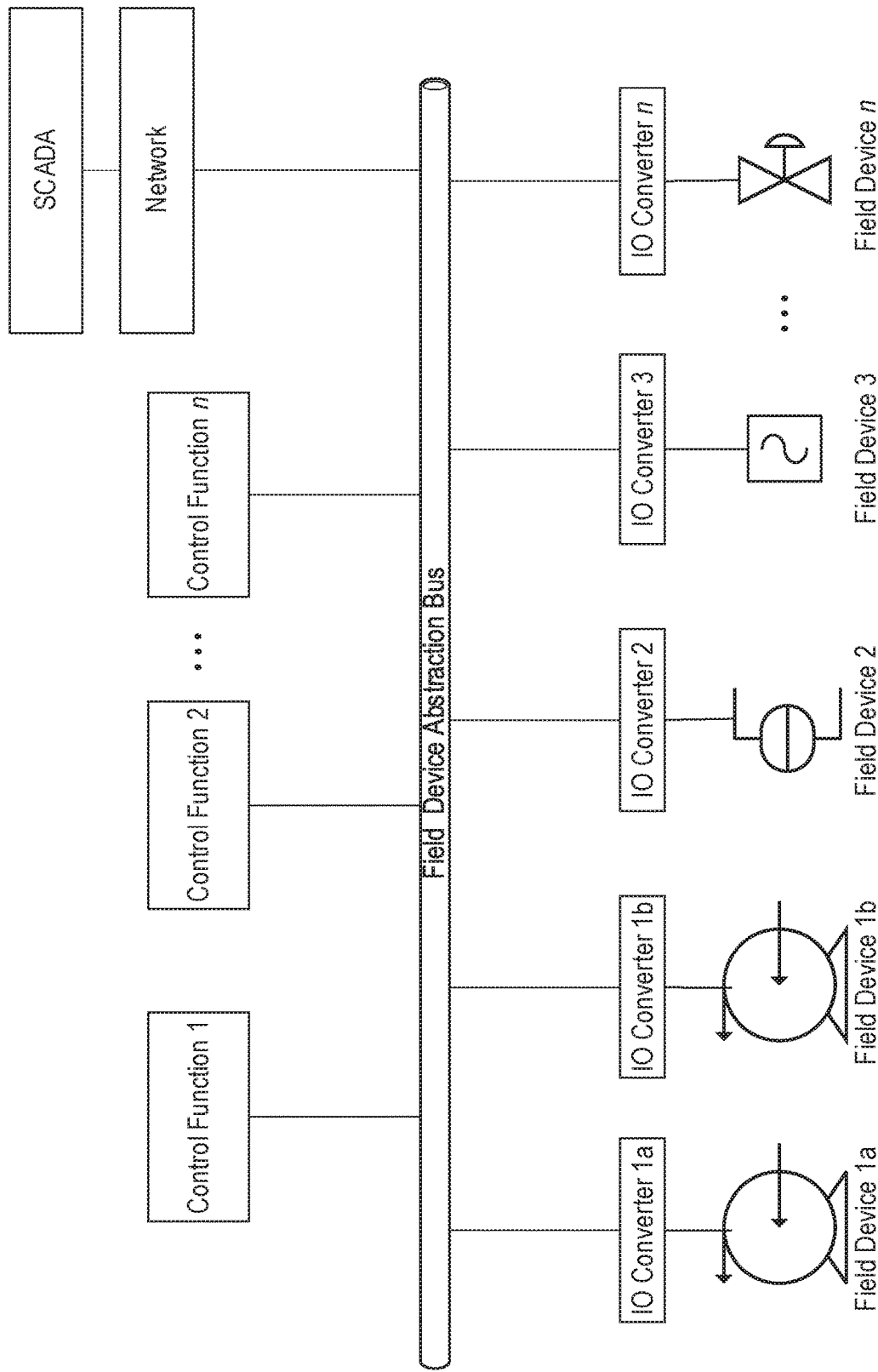
Figure 33:
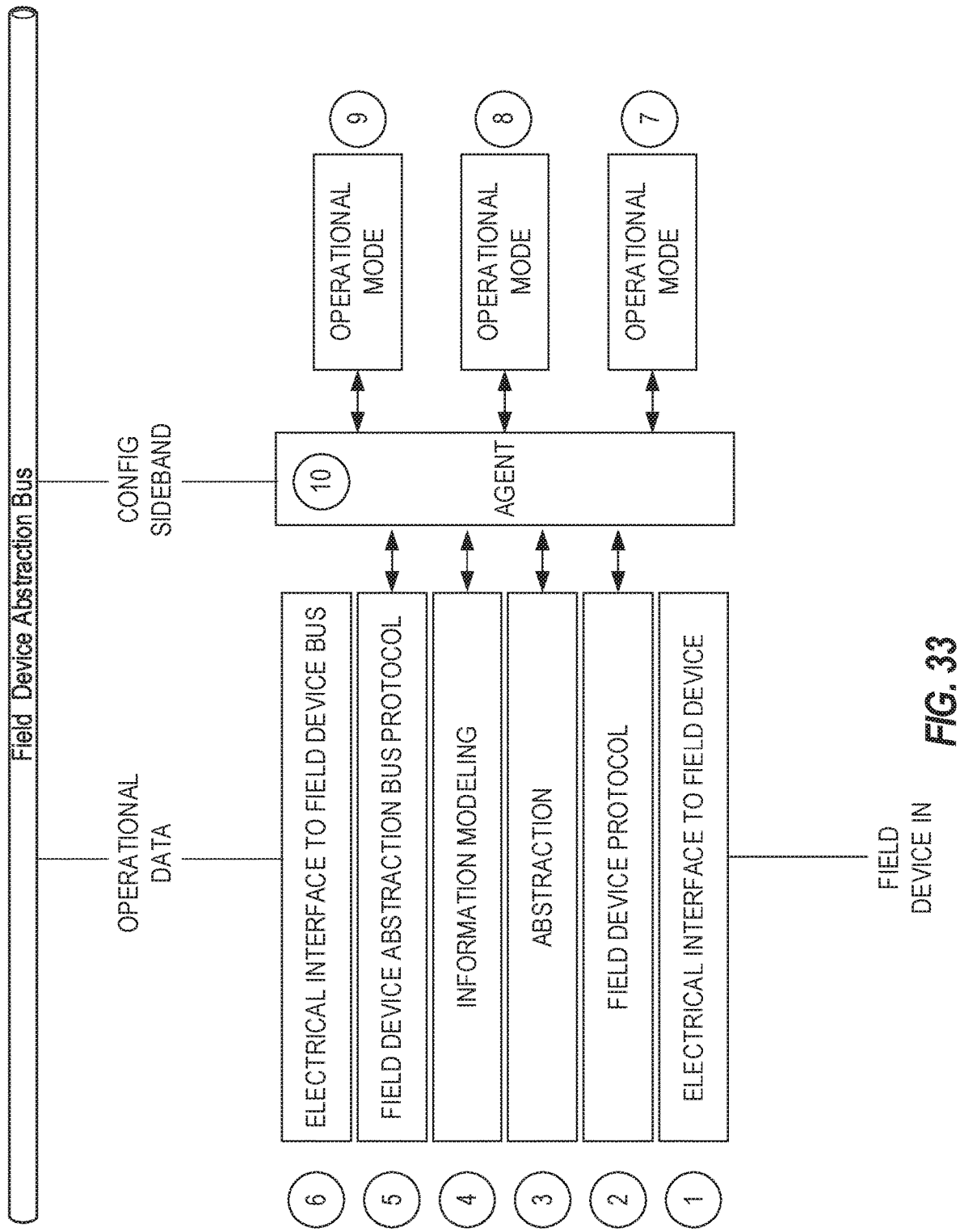
Figure 34:
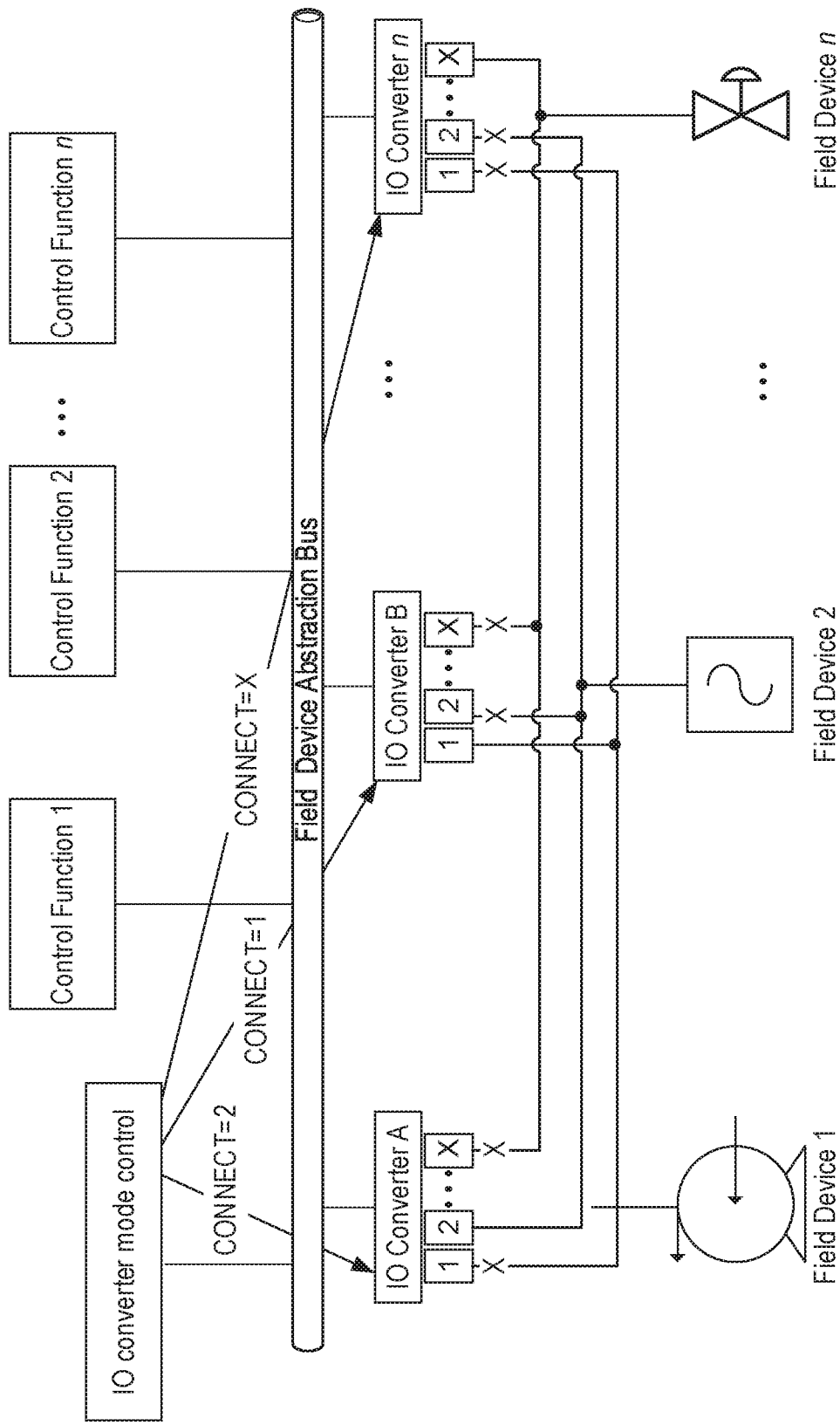
Figure 35A:
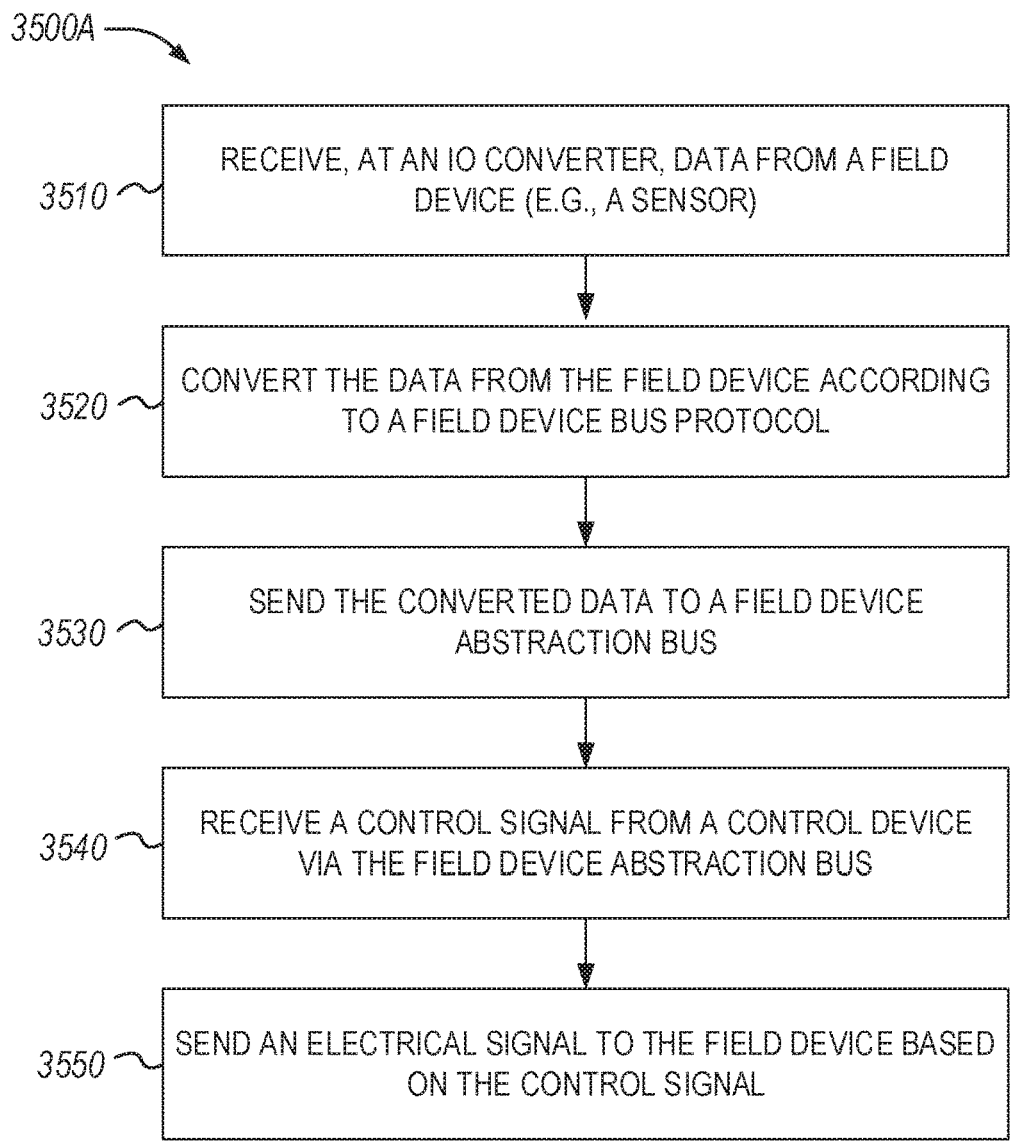
Figure 35B:
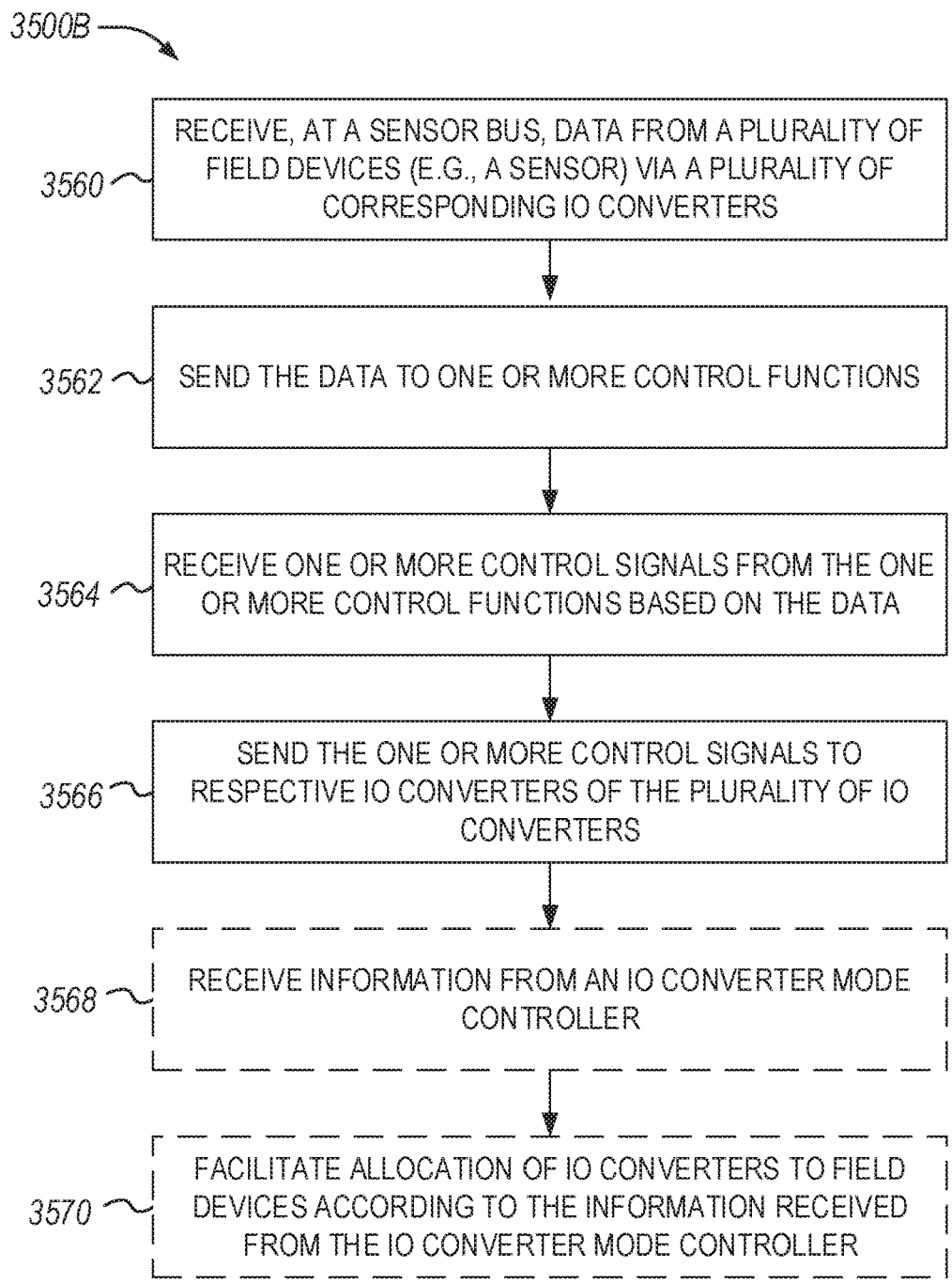
Figure 36:
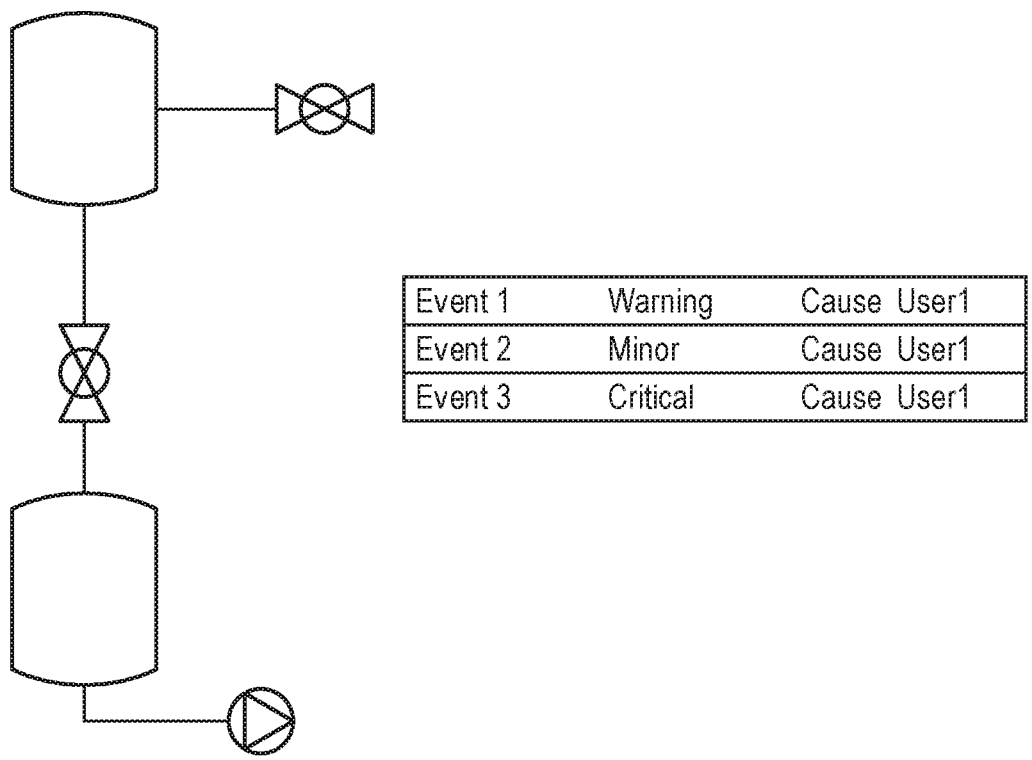
Figure 37:
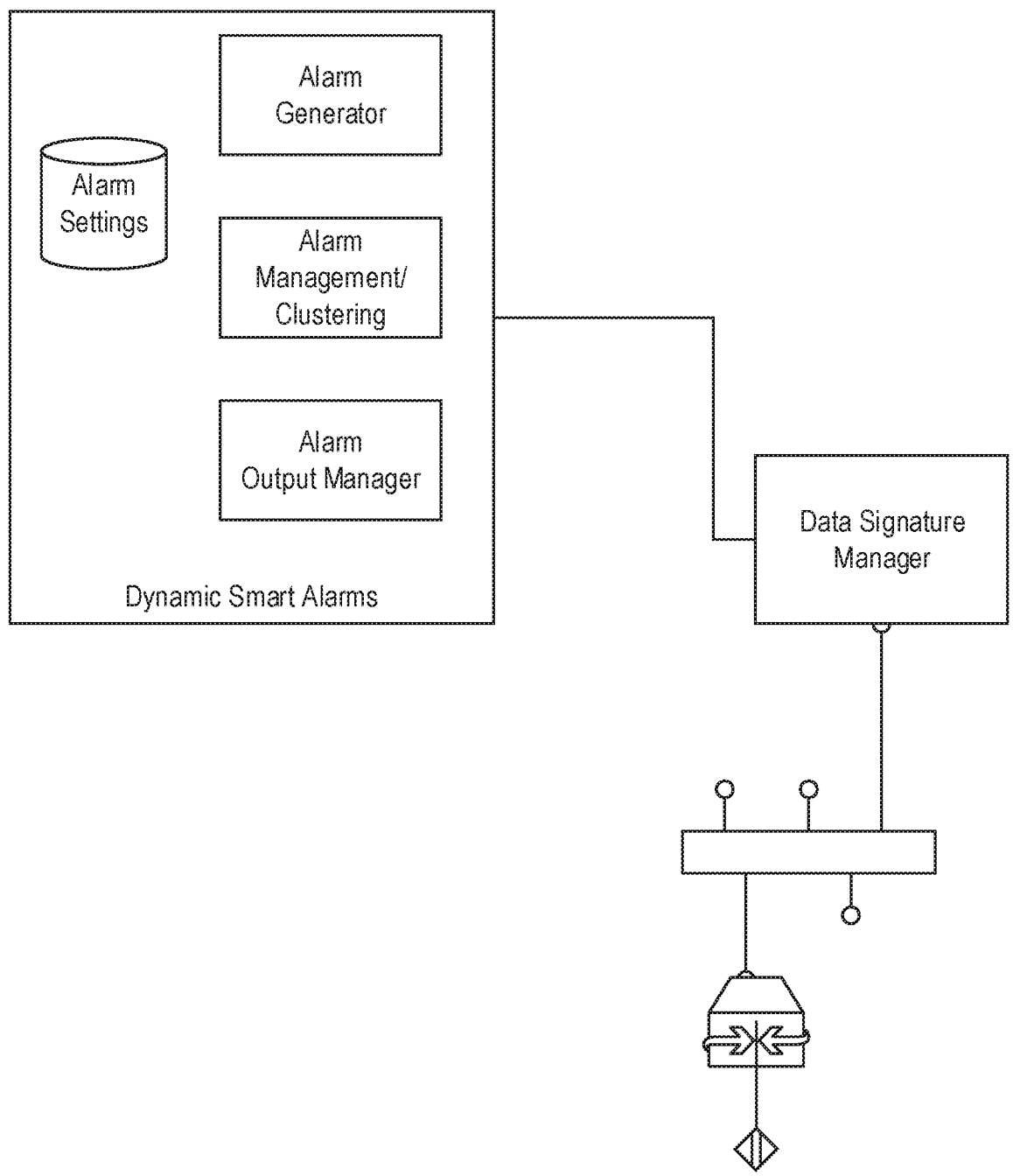
Figure 38:
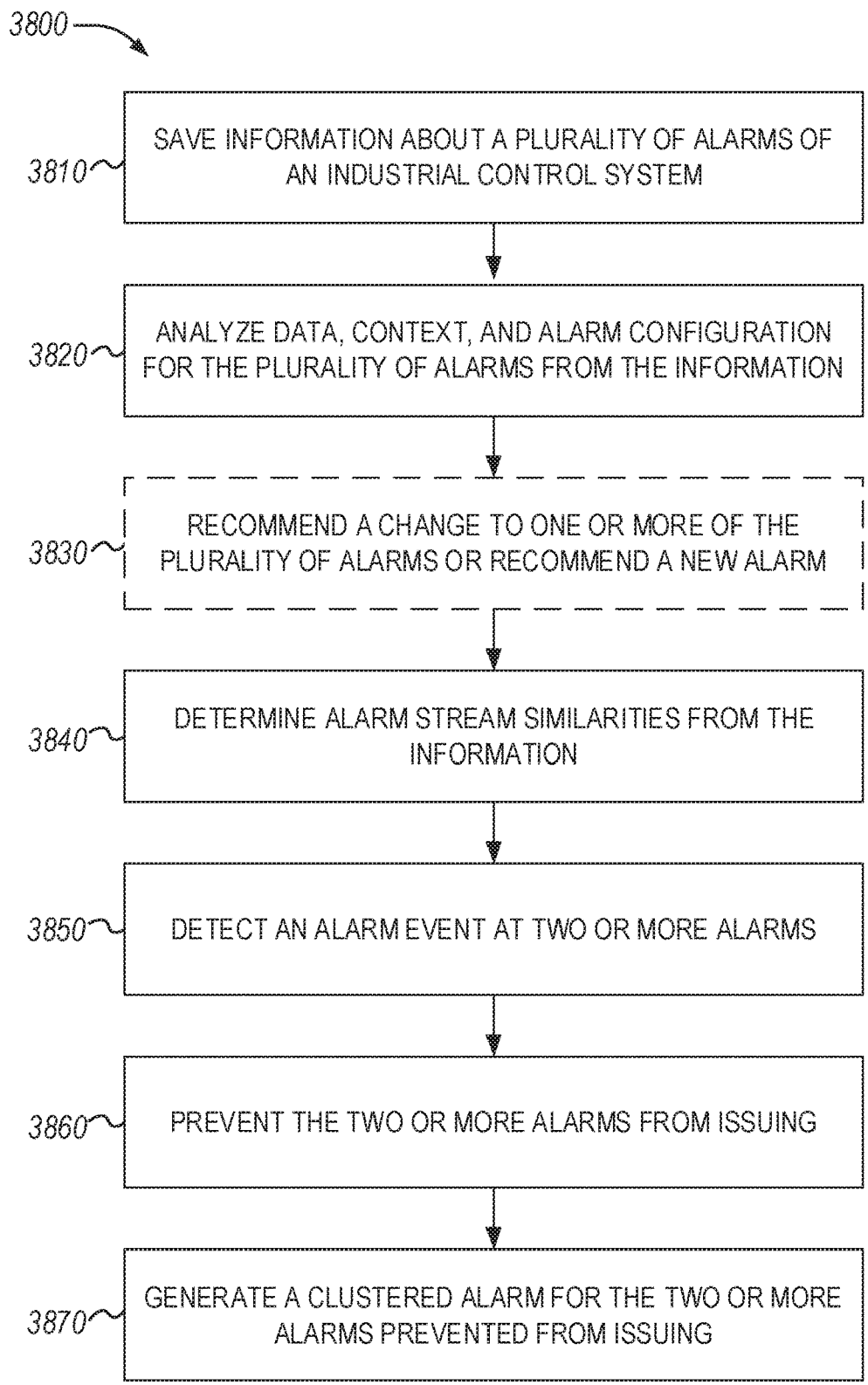
Figure 39:
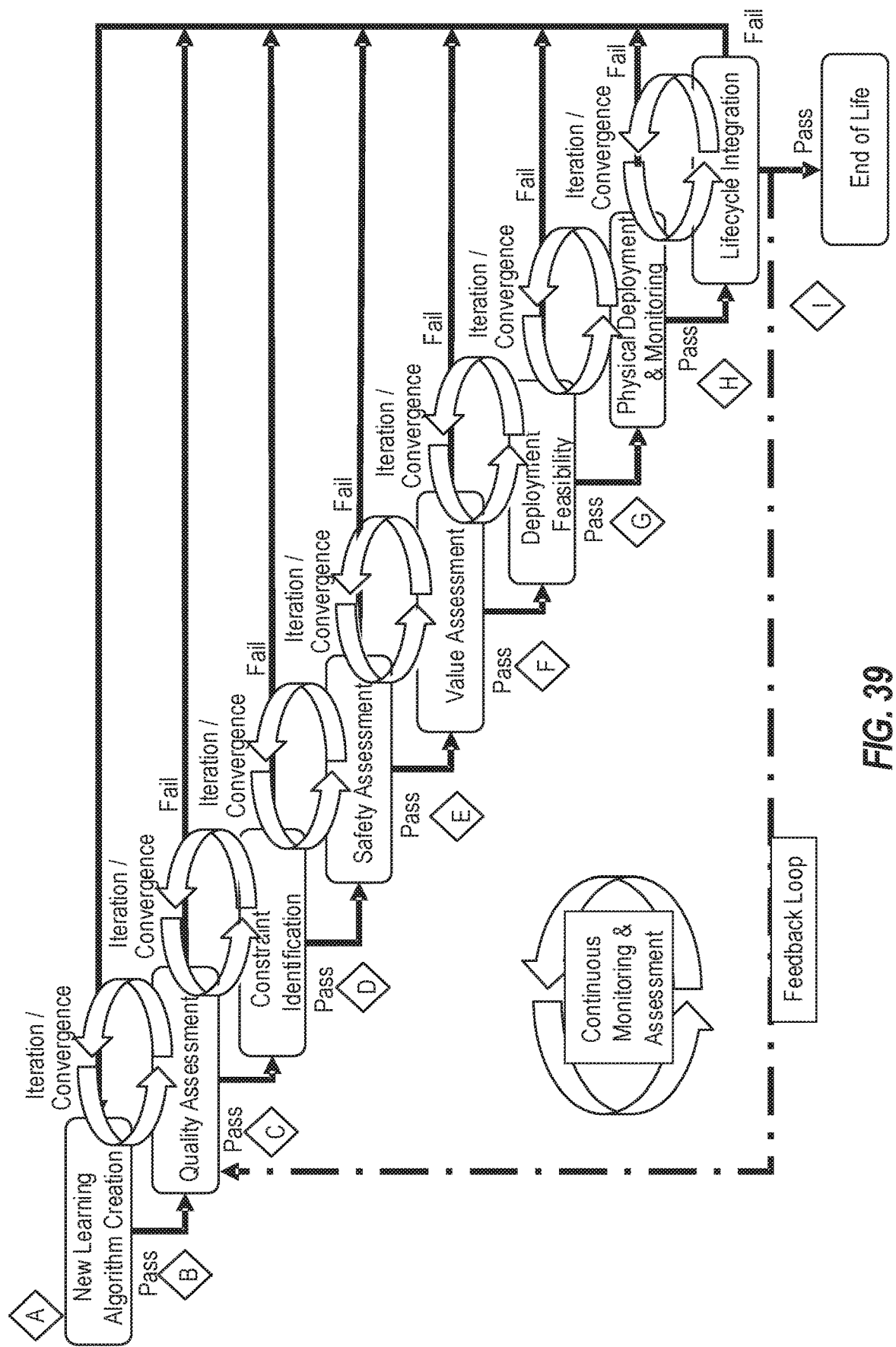
Figure 40:
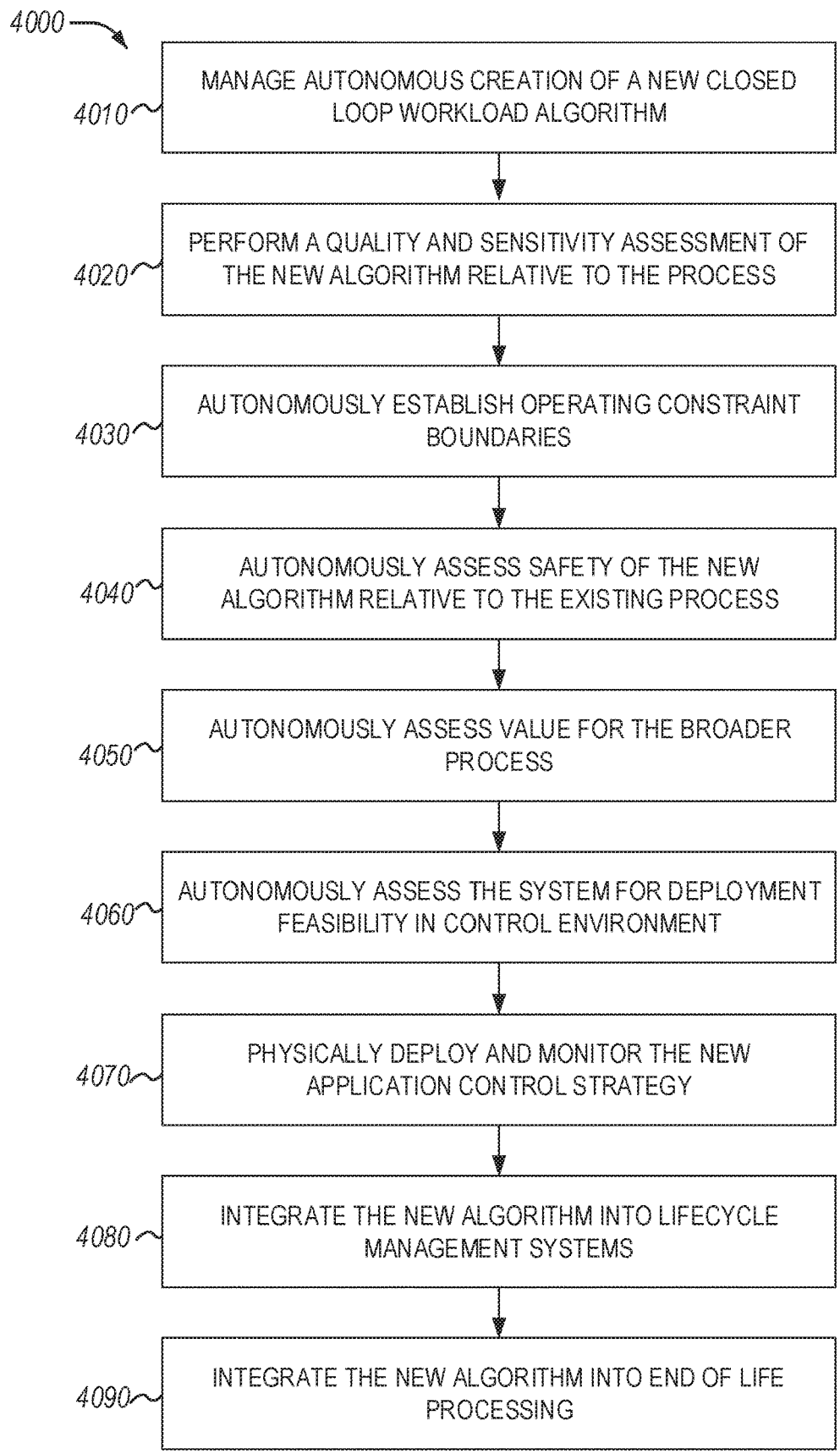
Figure 41:
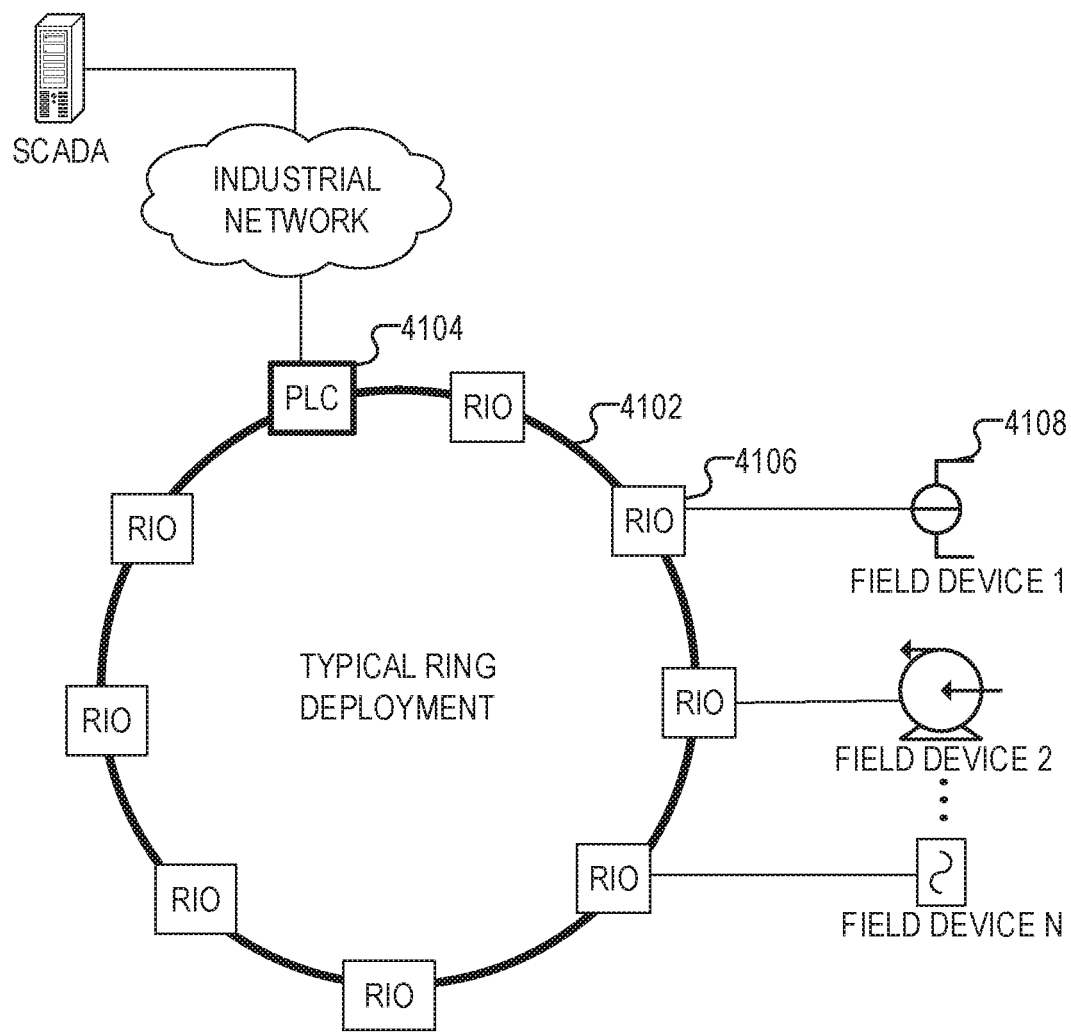
Figure 42:
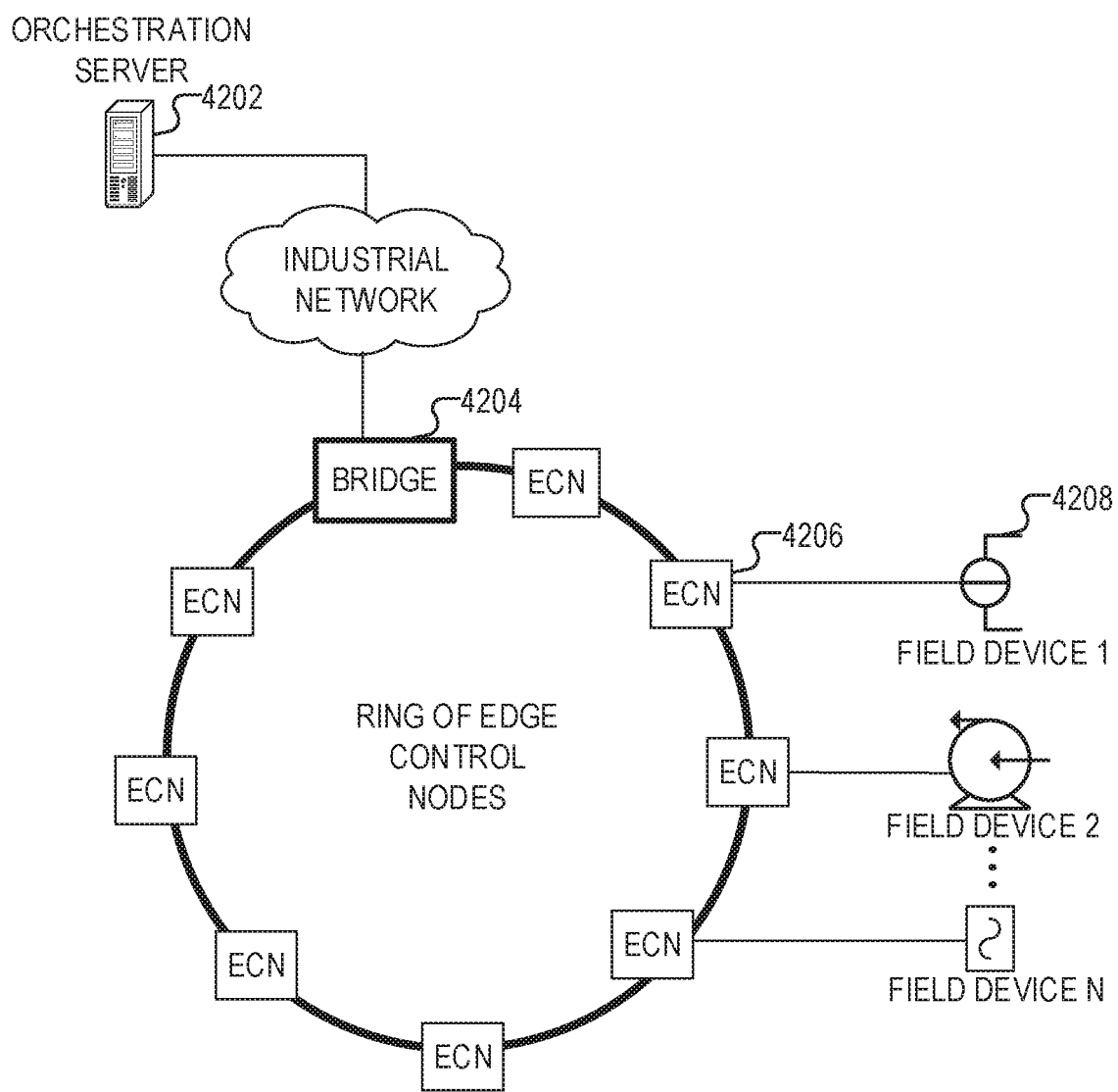
Figure 43:
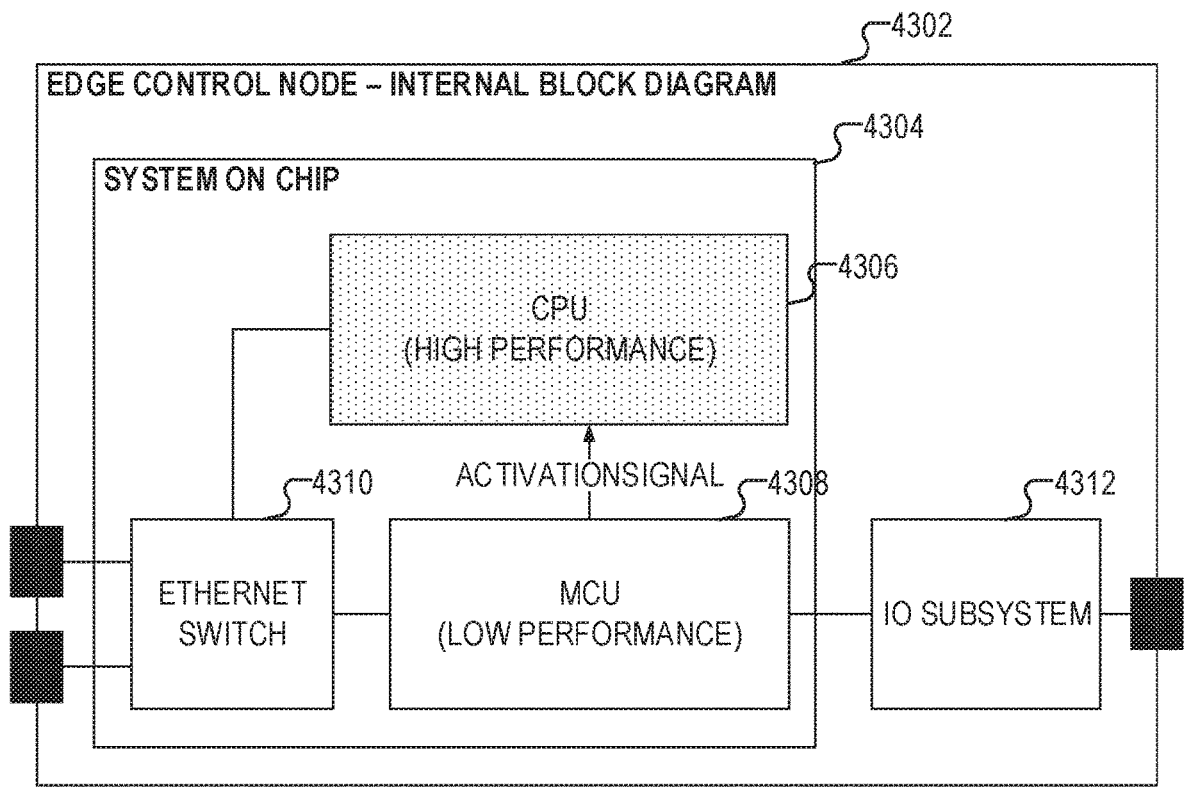
Figure 44:
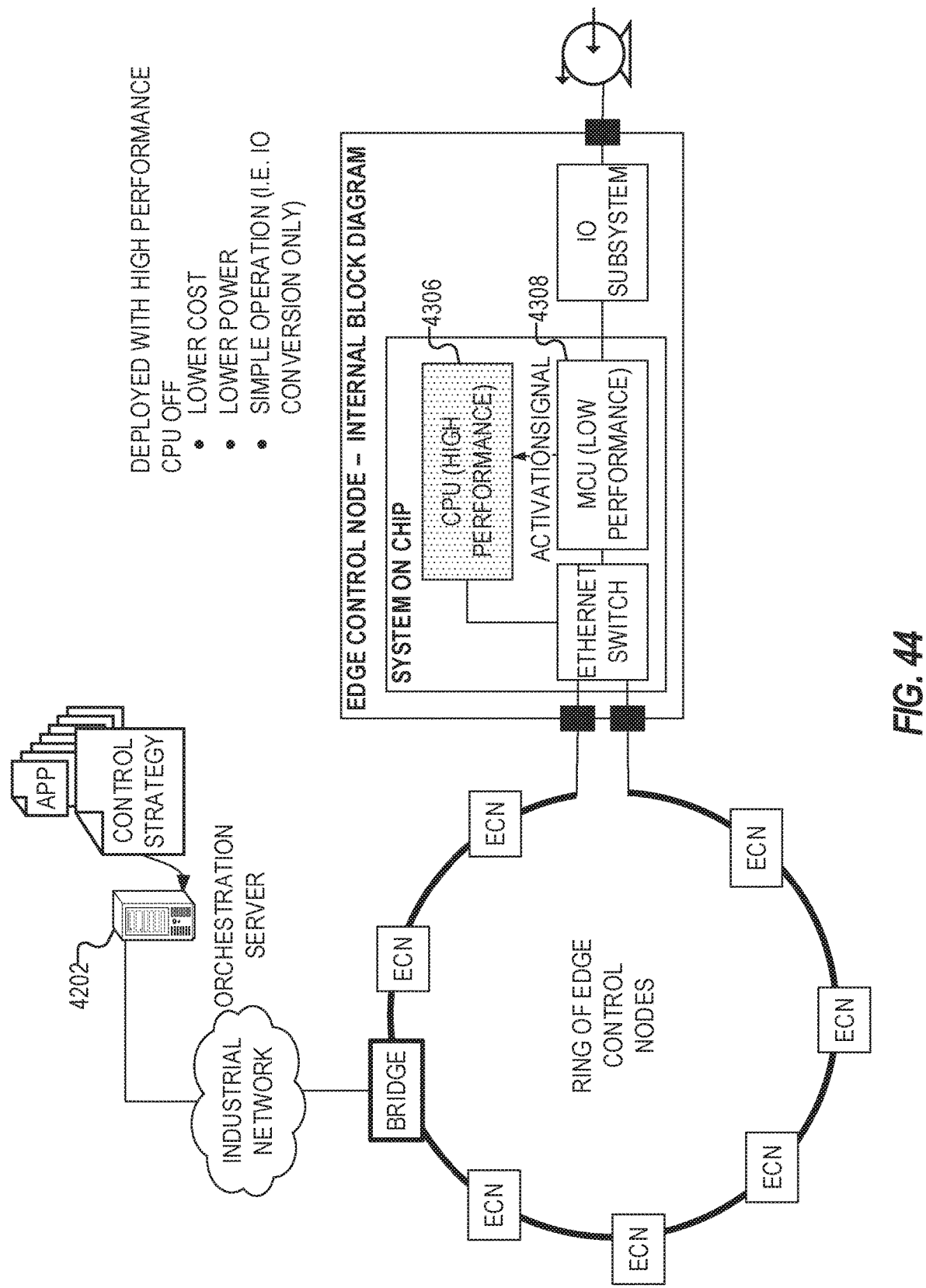
Figure 45:
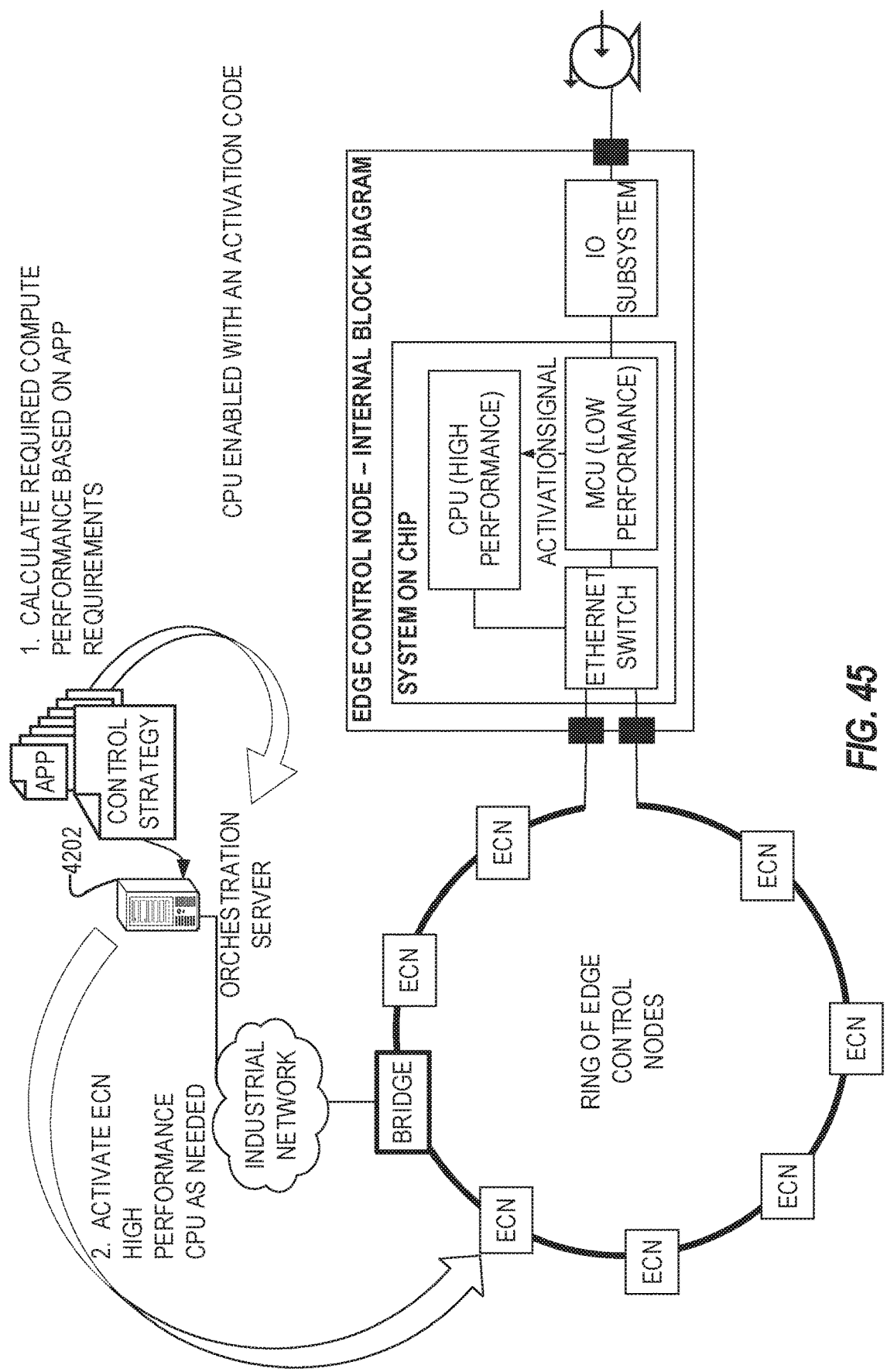
Figure 46A:
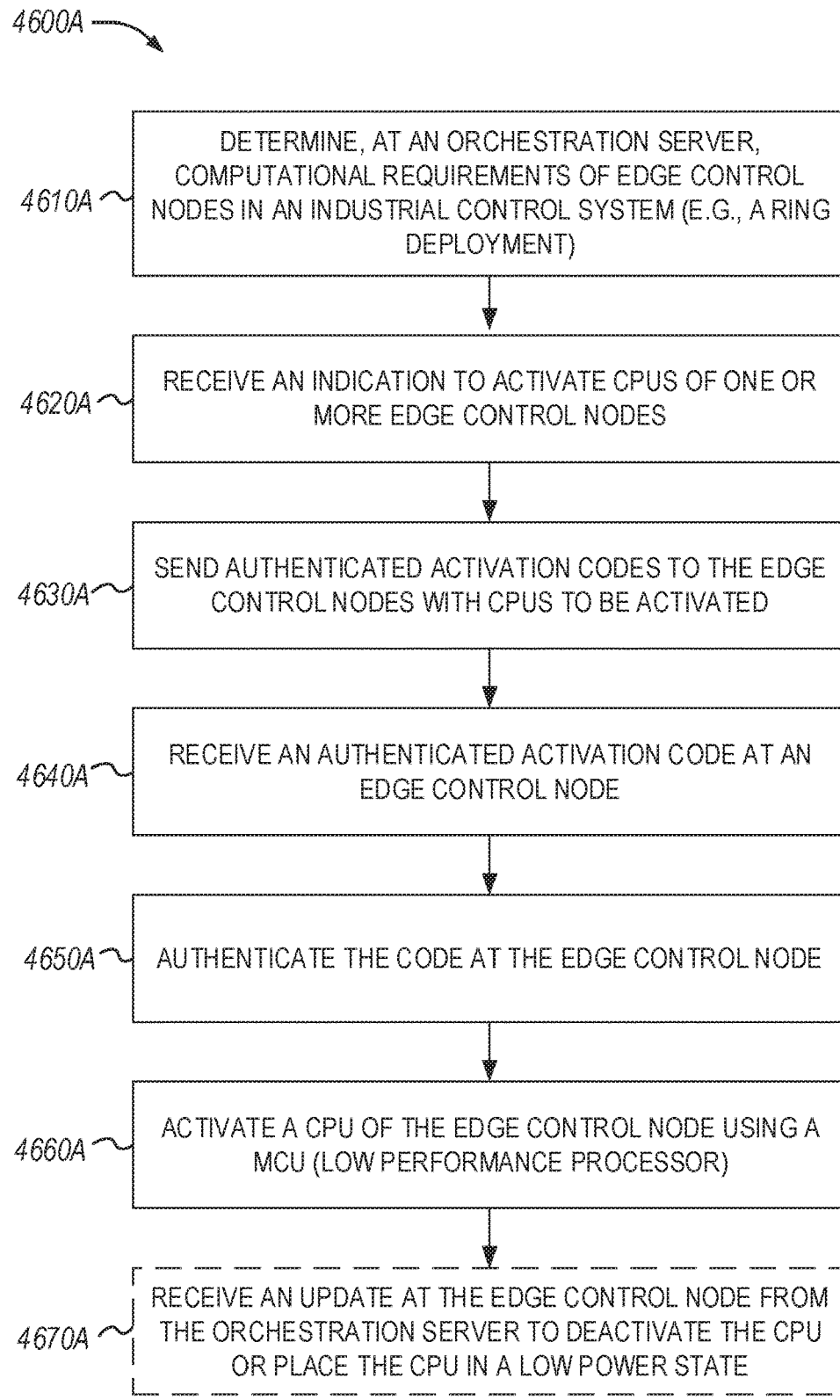
Figure 46B:
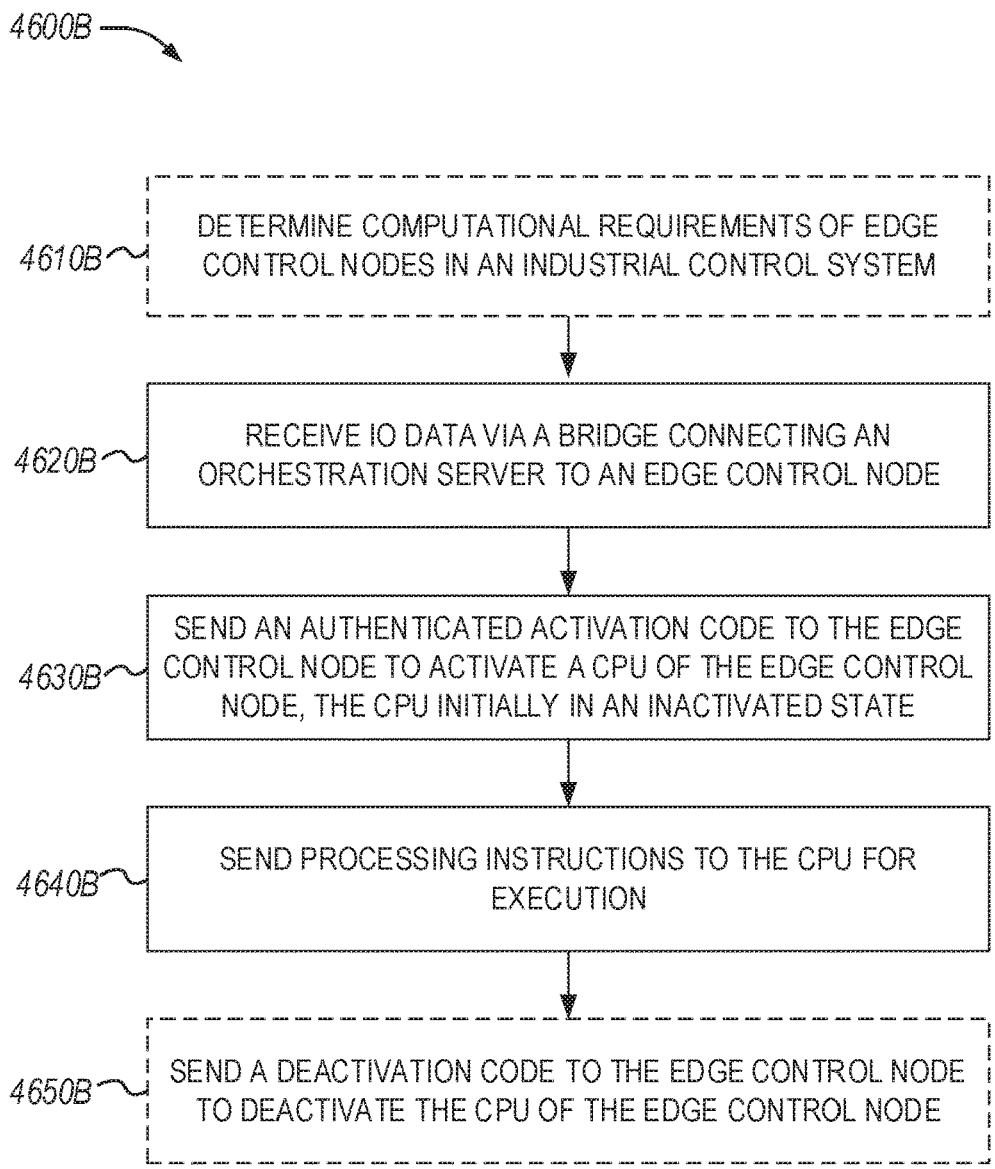
Figure 47:
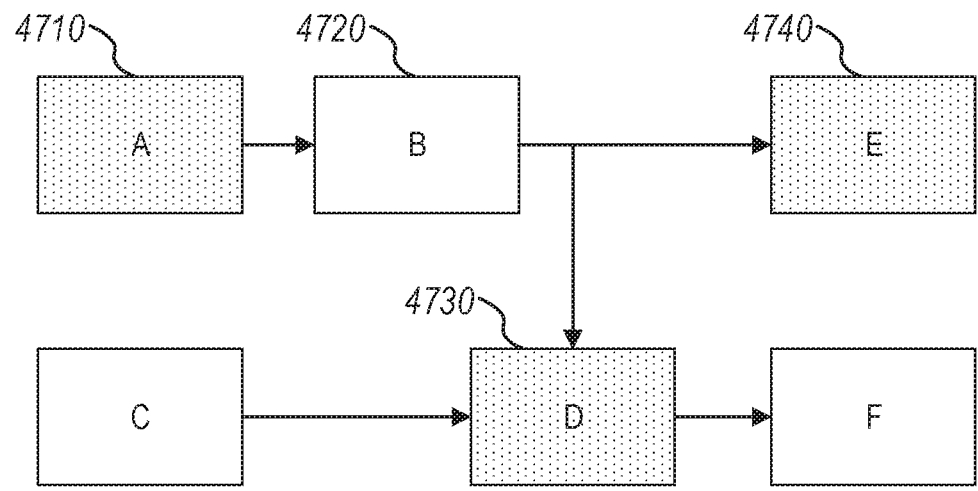
Figure 48:
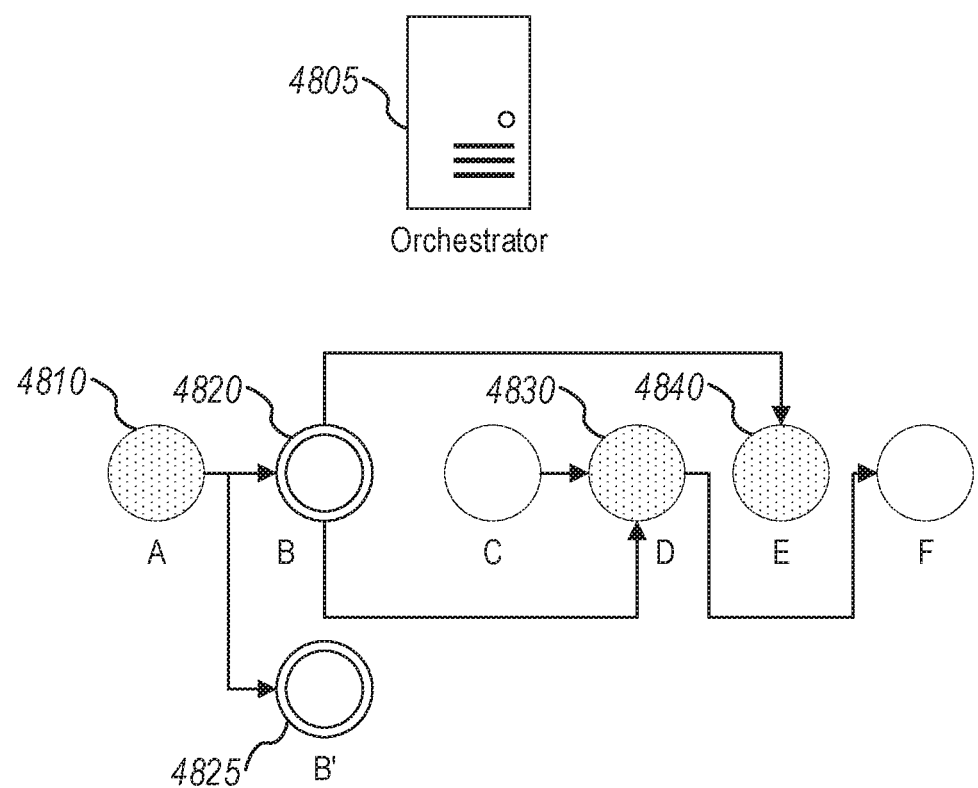
Figure 49A:
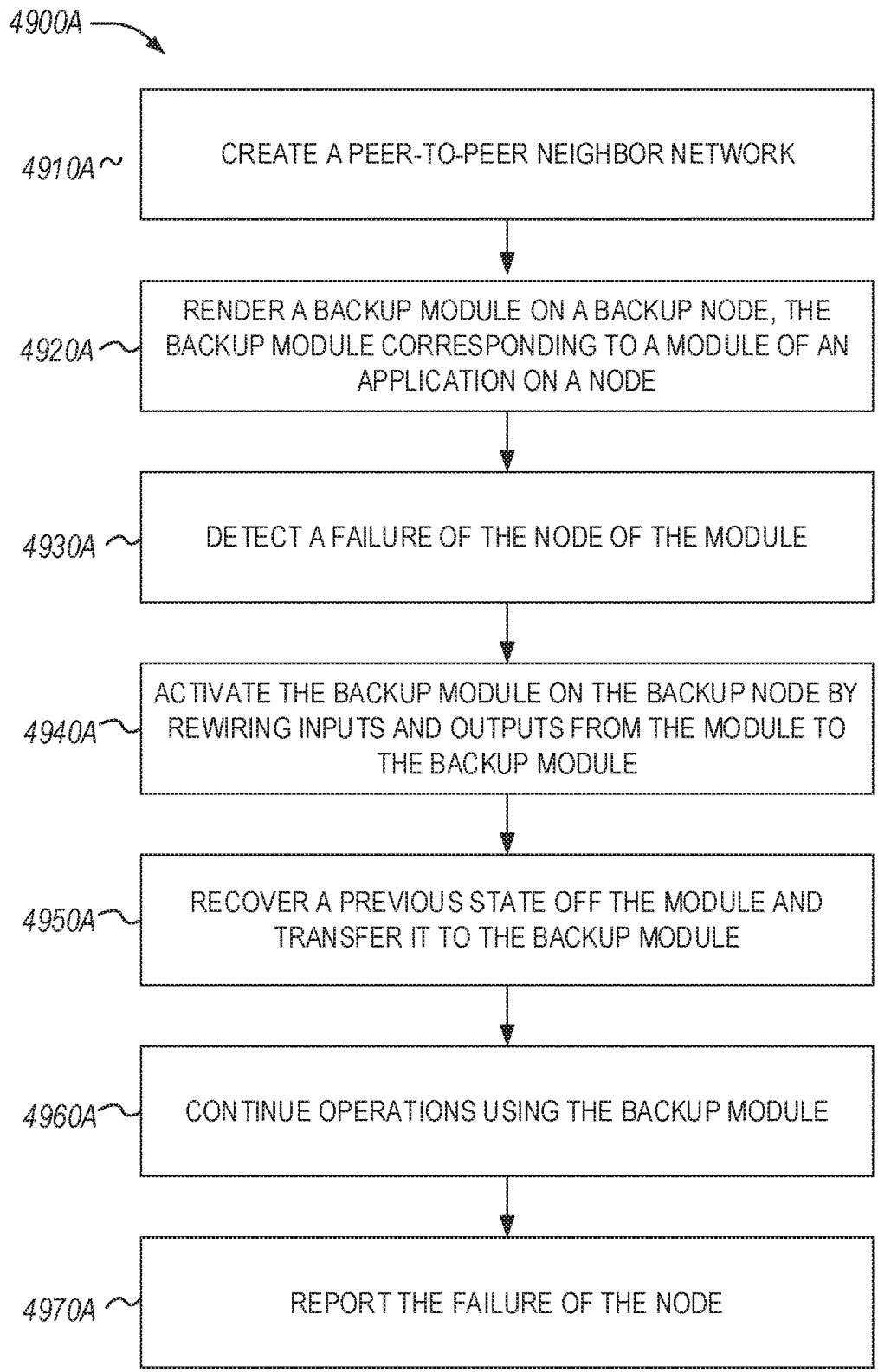
Figure 49B:
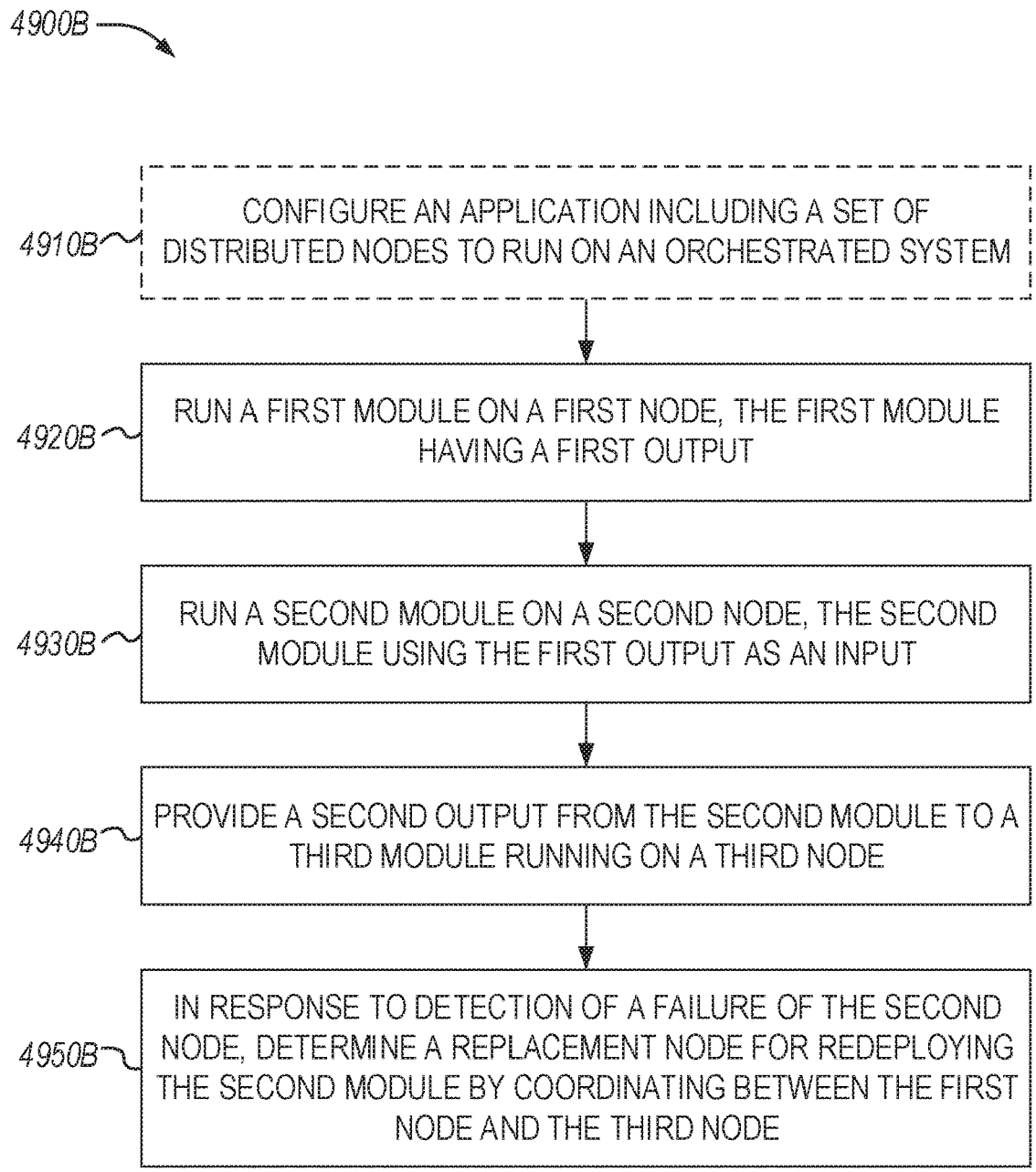
Figure 50:
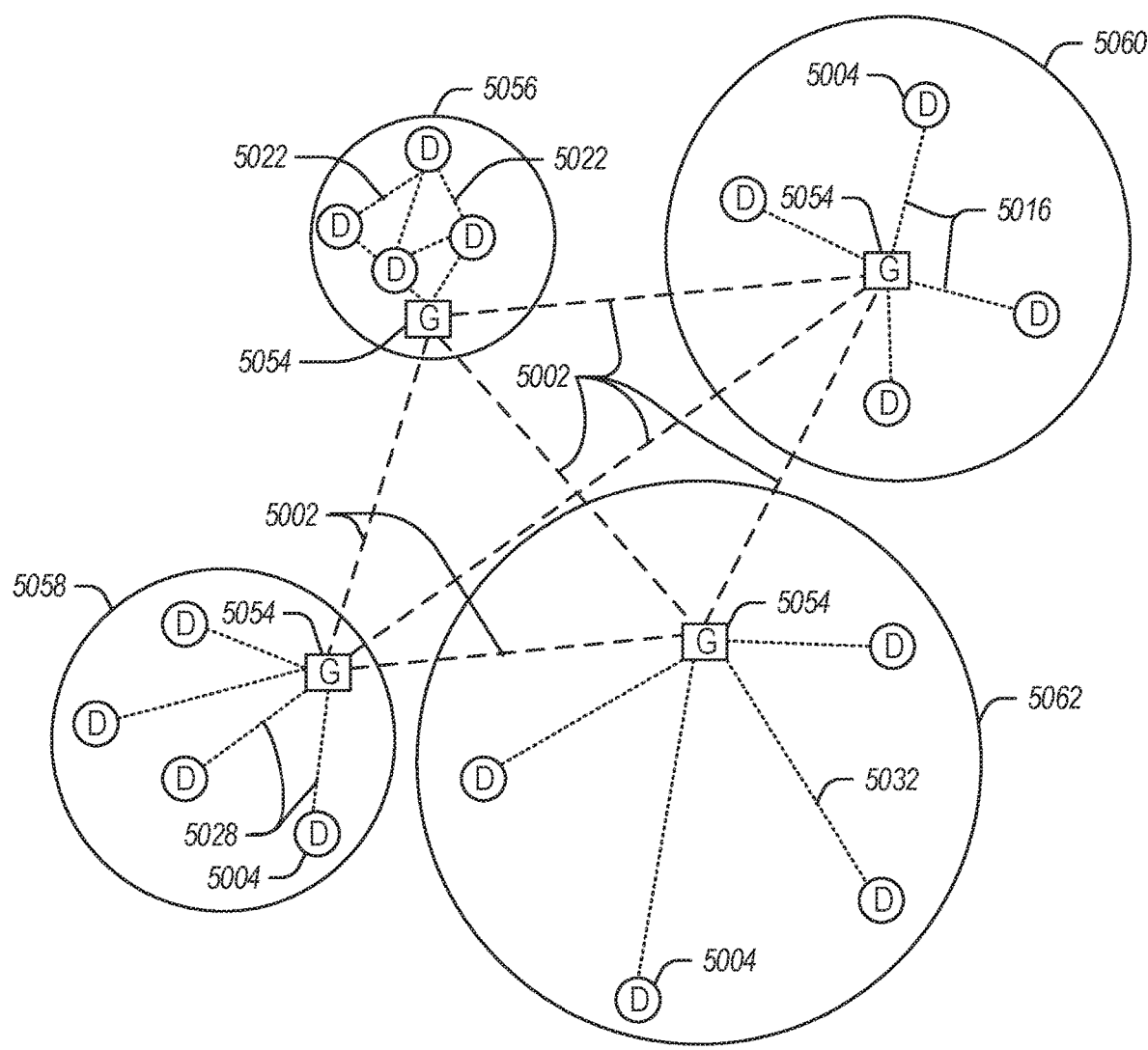
Figure 51:
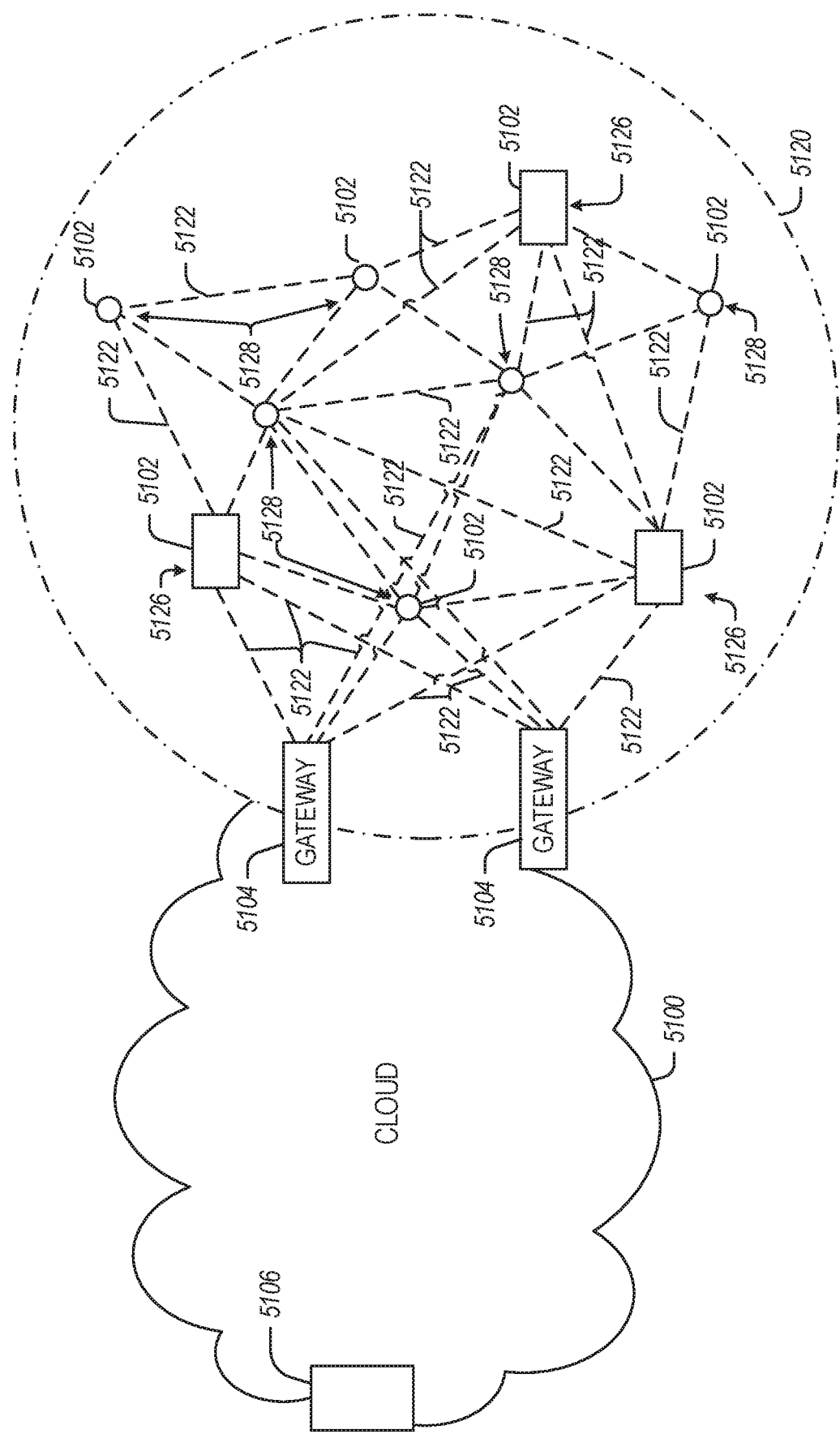
Figure 52:
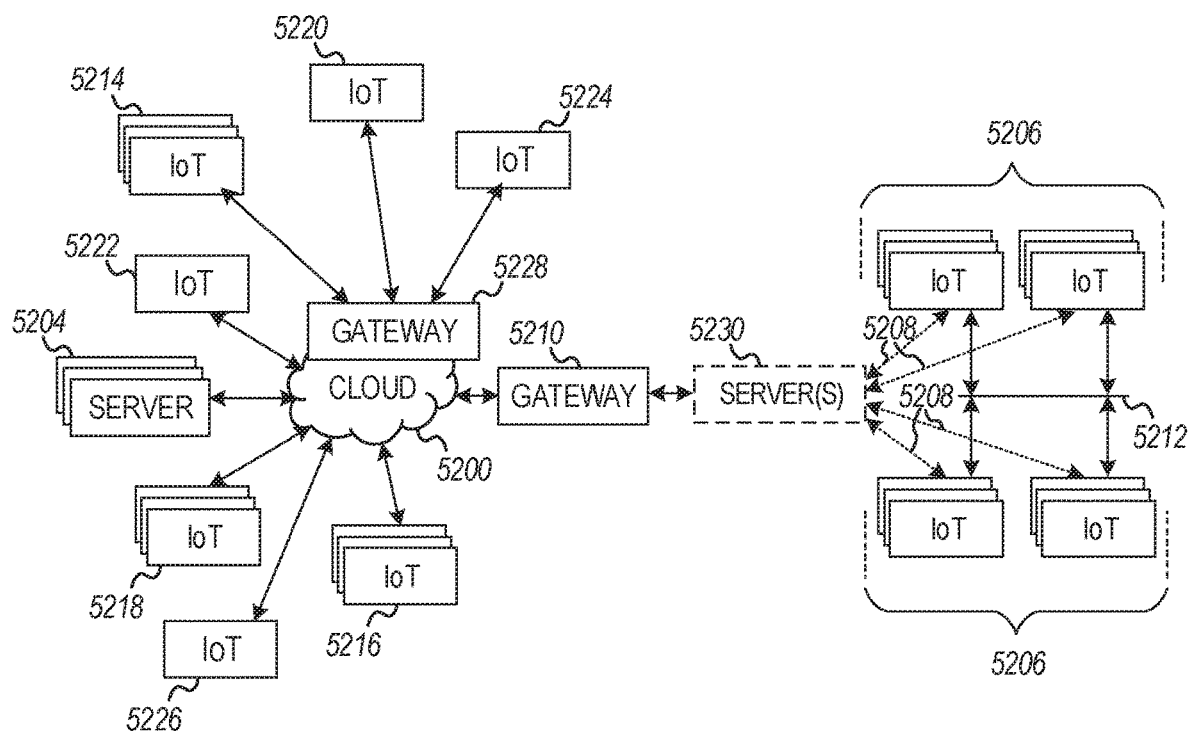
Figure 53:
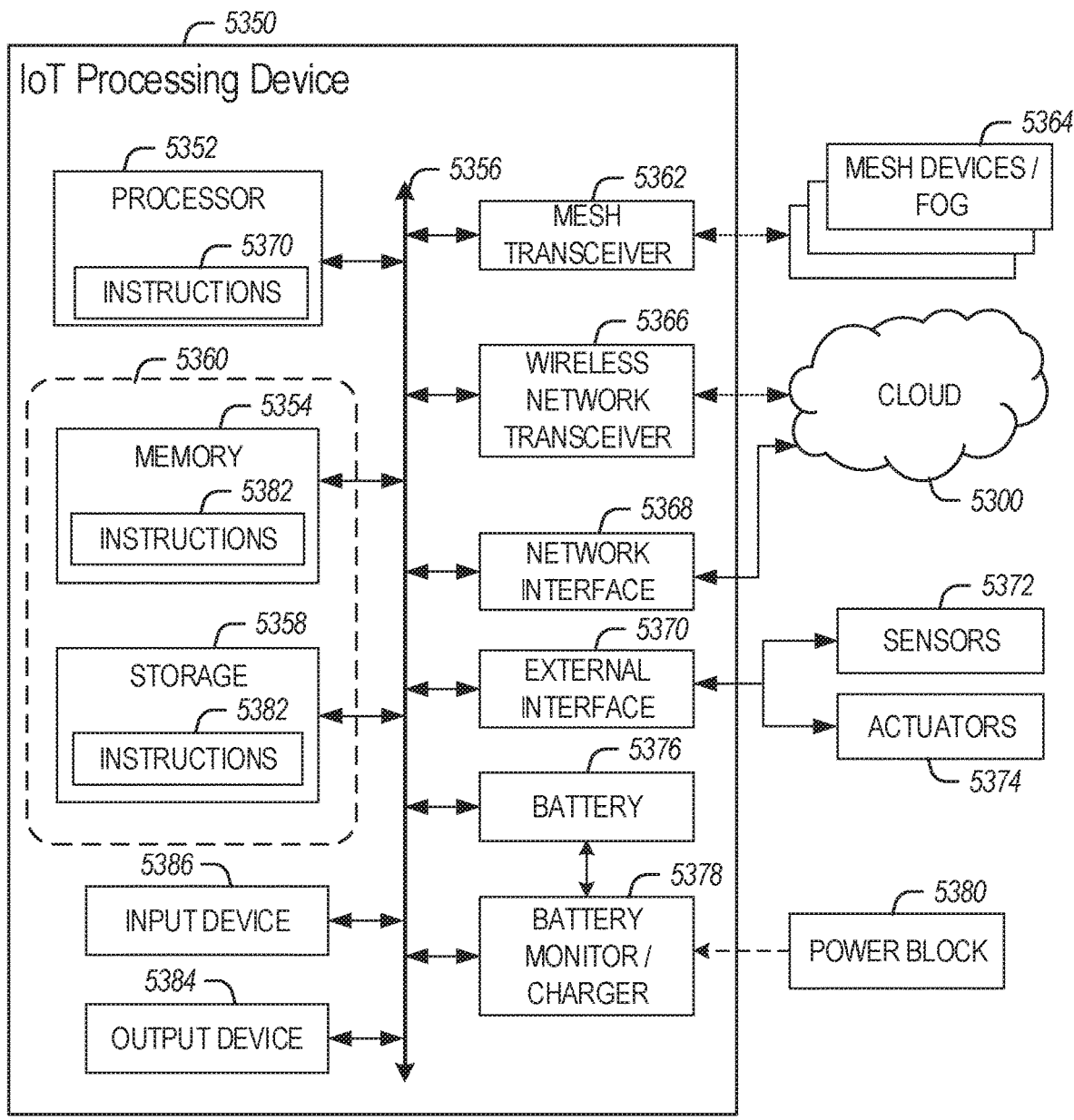

FIG. 15 illustrates a flowchart of a method for orchestration of distributed mission-critical workloads and applications with use of a distributed resource pool, according to an example;

FIG. 16A illustrates a scenario of orchestration between an orchestration engine and associated modules, according to an example;

FIG. 16B illustrates a scenario of orchestration between an orchestration engine and associated modules including a legacy module, according to an example;

FIG. 17A illustrates a scenario of orchestration with an orchestratable device, according to an example;

FIG. 17B illustrates a scenario of orchestration with a legacy device, according to an example;

FIG. 18 illustrates a coordinated scenario of workload orchestration in a single-level orchestration environment, according to an example;

FIG. 19 illustrates a functional hierarchy of orchestration, according to an example;

FIG. 20 illustrates a deployment of a generic hierarchical orchestration solution, according to an example;

FIG. 21 illustrates a hierarchical orchestration provided with use of slave nodes, according to an example;

FIG. 22 illustrates a workflow of a slave node for use in a hierarchical orchestration scenario, according to an example:

FIG. 23 illustrates a configuration of a monitoring and feedback controller adapted for coordination and implementation of orchestration self-monitoring functions, according to an example;

FIG. 24 illustrates a flowchart of an example method for orchestrating devices in legacy settings, according to an example;

FIG. 25 illustrates an industrial control application scenario, according to an example;

FIG. 26 illustrates an overview of a control application as represented by a control application graph, according to an example;

FIG. 27 illustrates a self-descriptive software module definition for implementation of a control application, according to an example;

FIG. 28 illustrates an architecture for automatic evaluation of software module alternative implementations, according to an example;

FIG. 29 illustrates a flowchart of a method for evaluating alternative implementations of software modules, according to an example;

FIG. 30A illustrates a flowchart of a method for implementing self-descriptive orchestratable software modules, according to an example;

FIG. 30B illustrates a flowchart of a method for using self-descriptive orchestratable software modules in a SDIS system implementation, according to an example;

FIG. 31 illustrates a PLC Based Industrial Control System according to an example;

FIG. 32 illustrates a Multi-Layer Field Device Bus according to an example;

FIG. 33 illustrates IO Converter Functions according to an example;

FIG. 34 illustrates IO Converter Redundancy according to an example;

FIGS. 35A-35B illustrate flowcharts of methods for implementing a Multi-Layer Field Device Bus according to an example;

FIG. 36 illustrates an example of a process with generated alarms according to an example;

FIG. 37 illustrates Dynamic Smart Alarms according to an example;

FIG. 38 illustrates a flowchart of a method for dynamic alarm control according to an example:

FIG. 39 illustrates an Autonomous Control-Learning Integration Flow in an example diagram;

FIG. 40 illustrates a flowchart of a method for managing autonomous creation of a new algorithm for an industrial control system according to an example;

FIG. 41 illustrates an industrial control system ring topology diagram;

FIG. 42 illustrates an edge control topology diagram;

FIG. 43 illustrates an edge control node block diagram;

FIG. 44 illustrates an edge control node-based ring topology diagram;

FIG. 45 illustrates data flow through an edge control node-based ring topology:

FIG. 46A illustrates a flowchart of a method for activating a processor of an edge control node according to an example;

FIG. 46B illustrates a flowchart of a method for activating a CPU according to an example:

FIG. 47 illustrates an example application connection diagram;

FIG. 48 illustrates an example architectural view of an application with a standby node;

FIG. 49A illustrates a flowchart of a method for creating an automatic redundant module of an application on a redundant node based on communication patterns of the application according to an example;

FIG. 49B illustrates a flowchart of a method for activating a CPU according to an example;

FIG. 50 illustrates a domain topology for respective internet-of-things (IoT) networks coupled through links to respective gateways, according to an example;

FIG. 51 illustrates a cloud computing network in communication with a mesh network of IoT devices operating as a fog device at the edge of the cloud computing network, according to an example;

FIG. 52 illustrates a block diagram of a network illustrating communications among a number of IoT devices, according to an example; and FIG. 53 illustrates a block diagram for an example IoT processing system architecture upon which any one or more of the techniques (e.g., operations, processes, methods, and methodologies) discussed herein may be performed.

DETAILED DESCRIPTION

In the following description, methods, configurations, and related apparatuses are disclosed for the configuration, operation, and adaptation of software-defined industrial service (SDIS) deployments. In particular, the following SDIS deployments include features of modern operational architecture-based industrial systems, along with derivative architectures or solution instances of such deployments. For instance, such architectures and instances may include virtualized control server systems, which implement features of an edge control device and a control messages bus within a control or monitoring system. Such architecture and instances may be further integrated with aspects of IoT networks, involving various forms of IoT devices and operations.

The processing techniques and configurations discussed herein include a variety of approaches for managing operations, data, and processing within various types of SDIS architectures. An overview of the following approaches are provided in the following paragraphs; further reference to specific implementation examples and use cases is discussed below.

In an example, a dynamic data model is established for providing a dynamic set of features for an application, a device, or a sensor, of a SDIS architecture. Such dynamic data models may be data-driven by nature, and may be contrasted with statically-defined data models commonly established during development. For instance, a dynamic data model may be represented by a device that is an ensemble of sensors, allowing the device to manifest itself with different output sensors based on changing factors (such as battery and compute availability). This dynamic data model may serve an important role in making various systems and data in IoT to be usable while being adaptable. The features of the dynamic data model provide the ability for a device to modify and expand at runtime, and to even revert to a subset of its components. Additionally, the dynamic data model may be embodied by dynamic metadata, complex representations of values (including providing a probabilistic estimate of a tag instead of a binary on/off status).

Also in an example, a configuration may be established in the SDIS architecture to support a holistic orchestration and management of multiple dependent applications (e.g., function blocks) that execute across a distributed resource pool. An orchestration may be enabled at an embedded control strategy level in a distributed system configuration by including additional application specific dependencies in an extended orchestrator logic rule set. Through the dynamic discovery of network bandwidth, evaluation of resource capacity and the current state, historical information and control application constraints, and like information, a variety of multi-echelon optimization and prediction methods may be executed to accomplish advanced orchestration scenarios. With such features, to real-time events and prediction also may be utilized to stage a reaction to an orchestration event, to maintain an online status of a broader control strategy. Further, prediction and constraint management coupled with real-time optimization of such orchestration may enable advanced levels of embedded infrastructure resiliency and functionality.

Also in an example, orchestration of functions may be extended for existing forms of brownfield environments (with such "brownfield" devices referring to existing device configuration architectures). Orchestration in such legacy settings may be enabled through: the use of shims at both the application and device level to support orchestration of unaware application components and legacy devices; the use of hierarchies to support scale and legacy devices; and the adaptation of self-monitoring to manage heterogeneity, resource utilization, scale, and built-in self-reliance for various devices. The application of such orchestration techniques within an SDIS architecture may be used to increase the scalability of the architecture to include encompass many forms of devices, systems, and industries. In addition, such orchestration techniques allows technology to be applied in situations in which customers already have significant investment in existing technology platforms.

Also in an example, orchestration of functions may be utilized as a key control point by which customers may leverage differentiating capabilities of hardware deployments. Such orchestration may be enabled by self-descriptive modules, which provide a deployable mechanism for using self-describing control applications and software modules in the context of orchestratable distributed systems. Such self-descriptive modules allow tradeoffs between implementations, such as to allow customers to make effective use of platform features when such features are available, while having alternatives when the features are not. The following examples include implementations in an SDIS architecture that is adapted to automatically evaluate these tradeoffs, thus allowing more effective development of features for industrial use cases and deployments.

Also in an example, systems and methods described herein include a multi-layered field device redundancy bus, which enables an "any to any" relationship of Controllers to Field Devices. The decoupling of Controllers and IO enables simple failover and redundancy. Improved system reliability and survivability are achieved by enabling any controller to access any field devices in the event of controller failure. Decreased system cost may also be a benefit, such as by adding a new field device based on a small incremental investment instead of a heavy PLC burden.

Also in an example, the systems and methods described herein may manage alarms using a smart machine learning approach. The systems and methods described herein may: Characterize the data in order to detect anomalies which may trigger alarms; Cluster alarms using either data similarity or common causality so that they are presented as one bundle to combat alarm flooding and fatigue; or Understand human responses to alarms in order to automate those actions in the future.

Also in an example, a sequentially rigorous policy framework and series of methods are presented herein to manage the autonomous creation of new closed loop workloads in mission-critical environments through the following eight step process: Quality and sensitivity assessment of the new algorithm relative to the process; Automated establishment of operating constraint boundaries; Automated safety assessment of the new algorithm relative to the existing process; Automated value assessment for the broader process; Automated system assessment for deployment feasibility in control environments; Physical deployment and monitoring of the new application control strategy; Integration into Lifecycle Management Systems; and Integration into End of Life Processing.

Also in an example, the systems and methods described herein address the problem of over or under provisioning the compute capability at the edge of an industrial control system. Over provisioning the compute resources wastes money, electrical energy, and thermal energy. Under provisioning the compute resources sacrifices reliability, and the ability to execute the control strategy. The proposed solution enables the end user with the performance requirement data to "right" size the amount of compute provisioned in the control environment.

Additionally, the provisioned compute capability is not static and may be adapted to meet the needs of the control system as the requirements change. The techniques discussed herein allow a high performance CPU to be activated, from an initial dormant state, in the Edge Control Nodes by a centralized orchestration system that understands the CPU performance needs of the control strategy.

Also in an example, additional module interconnection techniques are disclosed. In orchestrated systems, typically, an application is defined as a set of modules interconnected through a topology. These modules are deployed on different logical nodes. Each logical node may correspond to a physical node, however, the mapping does not have to be 1:1. As long as the resources requirements are met, multiple logical nodes could potentially map to 1 physical node and multiple modules may be deployed on the same physical environment. In an example, a solution may create automatic backup nodes of modules that are based on communication patterns of the application. A peer-to-peer network created by a collection of nodes on the same layer may negotiate the status of the backup. This community of nodes may also swap backup among themselves with no major impact to the rest of the application.

Other examples will be apparent from the following drawings and text disclosure.

Overview of Industrial Automation Systems

Designing and implementing effective industrial automation systems presents many technical challenges. Because the lifecycle of an industrial plant in many cases far exceeds the lifecycle of the technology that runs the plant, the administration and maintenance costs of technology are often very difficult to manage. In an example, a SDIS deployment may be adapted for dynamic configuration (and re-configuration) of software and hardware resources in industrial systems through resource abstraction with the following approaches. Such resource abstraction provides flexibility for updating the configuration without removing the industrial system out of service; such resource abstraction also provides flexibility for updating the industrial system with improved capabilities over time.

Use of open architectures and abstracted links between software and hardware in the presently disclosed SDIS approaches provides these and other technical benefits, while allowing vendors to focus on the capabilities and implementation of a specific vendor application. The disclosed open architectures also promote innovation, reduce the cost of hardware replacement, and eliminate the risk of hardware obsolescence. The disclosed open architectures enable security to be implemented as an intrinsic part of the SDIS, such as through the use of a hardware root of trust, signed applications, and comprehensive security management. Such configurations enable a simplified control system with inherent security and the capability to easily integrate capabilities over time. These technical improvements, combined with features of open architecture and standards implementations, enable the rapid integration of industrial control within an SDIS.

Some existing approaches such as the Open Group's Open Process Automation Forum have begun development of a standards-based, open, interoperable process control architecture features for industrial automation, targeting industries such as Food and Beverage, Mining and Metals, Oil and Gas, Petrochemical, Pharmaceutical, Pulp and Paper. and Utilities. The present configuration and functionality of a SDIS and the accompanying subsystems and techniques may be integrated with use of this standard or similar approaches within industrial automation and system deployment efforts. Further, the present configuration and functionality of a SDIS and the accompanying subsystems may be utilized in these or other industries. Accordingly, variations and changes to the following implementations will be evident.

Figure 1A:
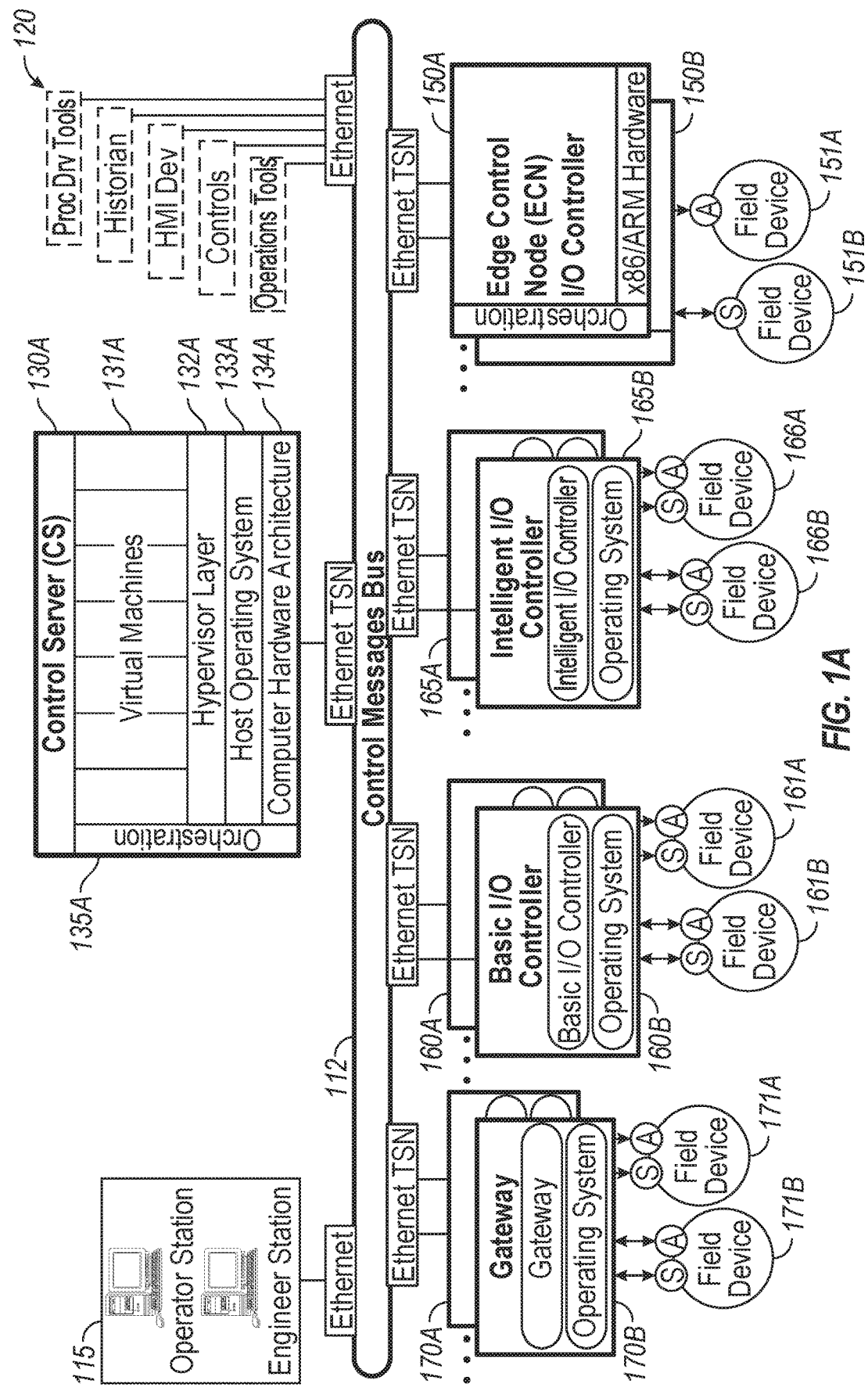
FIG. 1A illustrates a configuration of a software defined infrastructure (SDIS) operational architecture, according to a first example.

FIG. 1A depicts a first example configuration of an SDIS operational architecture. As shown, a control messages bus 112 is used to connect various components of the architecture, with such components including Operational Tools 120, a Control Server (CS) node 130A, Edge Control Node (ECN) systems 150. Intelligent I/O Controller systems 165, Basic I/O Controller systems 160, Gateway systems 170, and Control Stations 115. Various field devices (151, 161, 166, 171) are connected to the respective systems (150, 160, 165, 170). Some of the example use cases and configurations of this operational architecture are further discussed below.

In an example, the Operational Tools 120 may include aspects of: procedure development tools, historian tools, human-machine interface (HMI) development, controls, and operations tools. Various aspects of the Operational Tools 120 may be implemented with respective virtual machines 131A operating in the control server node 130A (as further depicted in FIG. 2A).

In an example, the control server node 130A may include aspects of various virtual machines 131A, coordinated via a hypervisor layer 132A, and operating with features of a host operating system 133A and a computer hardware architecture 134A. The control server node 130A may be used to implement various aspects of orchestration 135A, involving both machine orchestration and operational application orchestration. A further detailed discussion of the control server node 130A is provided below with reference to FIG. 2A below.

In an example, the ECN systems 150 may include various aspects of orchestration (e.g., orchestration implementation) from an ECN I/O controller (e.g., nodes 150A, 150B) operating on specific hardware (e.g., an x86 or ARM hardware implementation). A further detailed example of the ECN systems 150 and its role in orchestration for various connected devices (e.g., field devices 151A, 151B) is provided below with reference to FIG. 2B.

In an example, the Intelligent I/O systems 165 may include various configurable aspects of industrial control from an Intelligent I/O controller (e.g., controller 165A, 165B) and an accompanying operating system, used for control or access of various devices (e.g., field devices 166A, 166B). Also in an example, the Basic I/O systems 160 may include various operating aspects of industrial control from a Basic I/O controller (e.g., controller 160A, 160B) and an accompanying operating system, used for control or access of various devices (e.g., field devices 161A. 161B).

In an example, the Gateway systems 170 may include various configurable aspects for connection to other device networks or deployments, from a gateway (e.g., gateways 170A, 170B), used for control or access of various devices (e.g., field devices 171A, 171B). Within the various devices, roles of a sensor ("S") and actuator ("A") components are labeled throughout the field devices (e.g., on field devices 151A. 151B. 161A. 161B, 166A, 166B, 171A, 171B). It will be understood that additional number and types of devices and components may also be coupled to the various systems 150, 160, 165, 170.

The operational architecture depicted in FIG. 1A is configured to enable many of the same attributes seen in traditional enterprise architectures, such as HW/SW modularity, SW portability, interoperability, application extensibility and computational scalability. Beyond this, the new infrastructure framework components introduced in this architecture, most notably in the implementation of CS and ECN systems, may be deployed to support both centralized and decentralized concepts for the SDIS techniques discussed herein.

For example, the use of an ECN I/O Controller (e.g., in ECN nodes 150A, 150B) is a significant architecture departure from current DCS (Distributed Control System) and PLC (programmable logic controller) control systems, which have evolved for over the last fifty years. Any architectural advancement in this mission-critical portion of the ANSI/ISA-95 automation interface stack must adhere to the strict and resilient requirements of process control. With the SDIS architecture described herein, the ECN system may not only maintain these strict operational requirements, but also may remain open, interoperable, while allowing industry uses to safely, reliably, securely and rapidly introduce or refresh these systems with ongoing technological advancements. The present SDIS architecture enables wider ecosystem participation, innovation and production customization throughout the operational and control stack. For instance, the ECN system may be provided with control disaggregation to serve as a basic control system building block, to amplify control function customization and enable increased process flexibility for a variety of use cases.

Figure 1B:
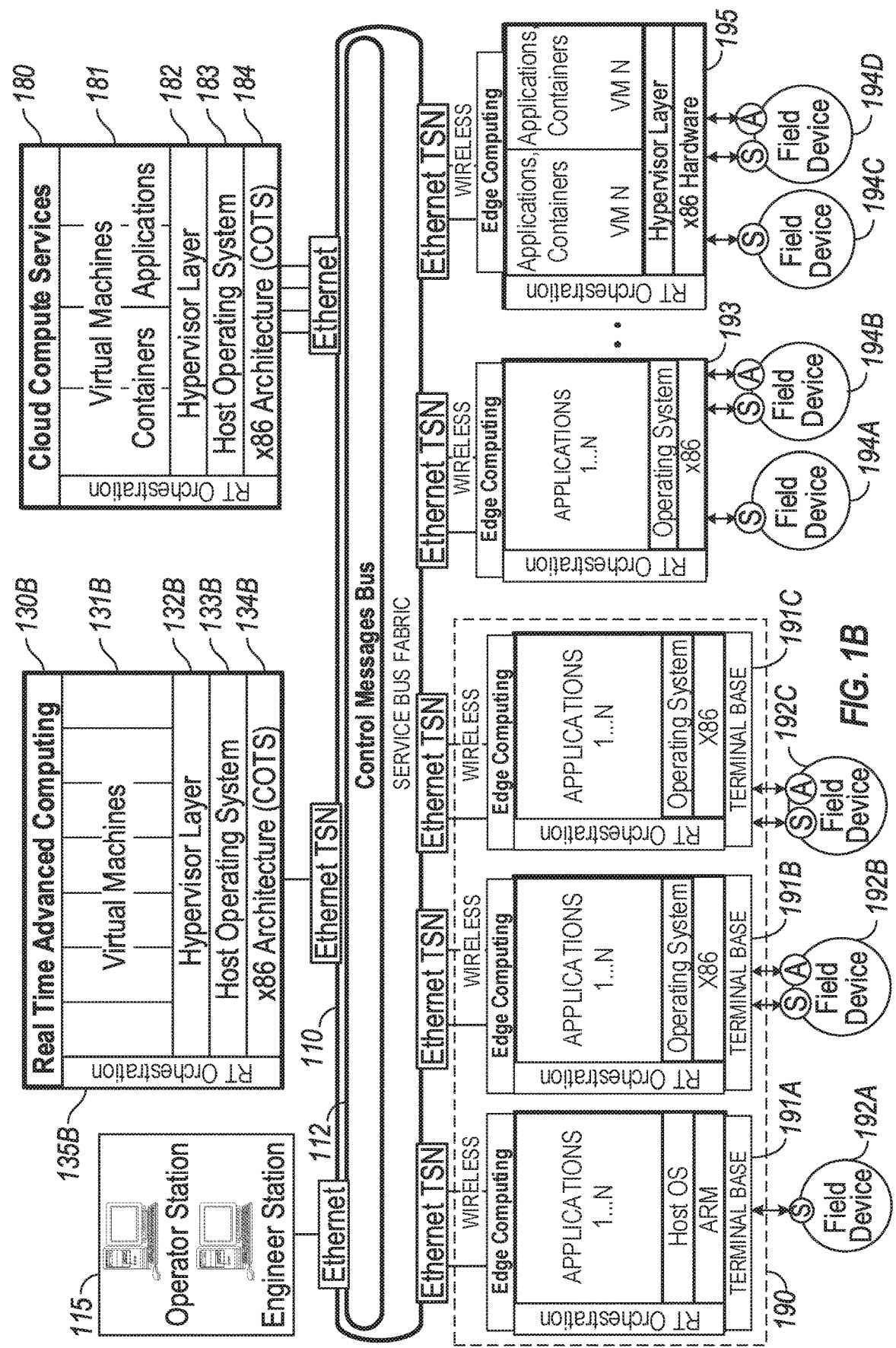
FIG. 1B illustrates a configuration of an SDIS operational architecture, according to a second example.

FIG. 1B depicts a second example configuration of an SDIS operational architecture. In a similar fashion as shown as FIG. 1A, the configuration of FIG. 1B illustrates a control messages bus 112 that is used to connect various components of the operational architecture, with such components including cloud components (a real time advanced computing system 130B, operating as a control server, and cloud computing services 180) edge components (an edge ecosystem 190 with constituent edge computing nodes 191A, 191B, 191C, a first edge computing platform 193, and a second edge computing platform 195), and Control Stations 115. Various field devices (192, 194) with sensors and actuators are connected to the respective edge computing nodes (in the edge ecosystem 190 and edge computing platforms 193, 195). The operational goals and features discussed above are also applicable to the configuration of FIG. 1B.

Figure 3A:
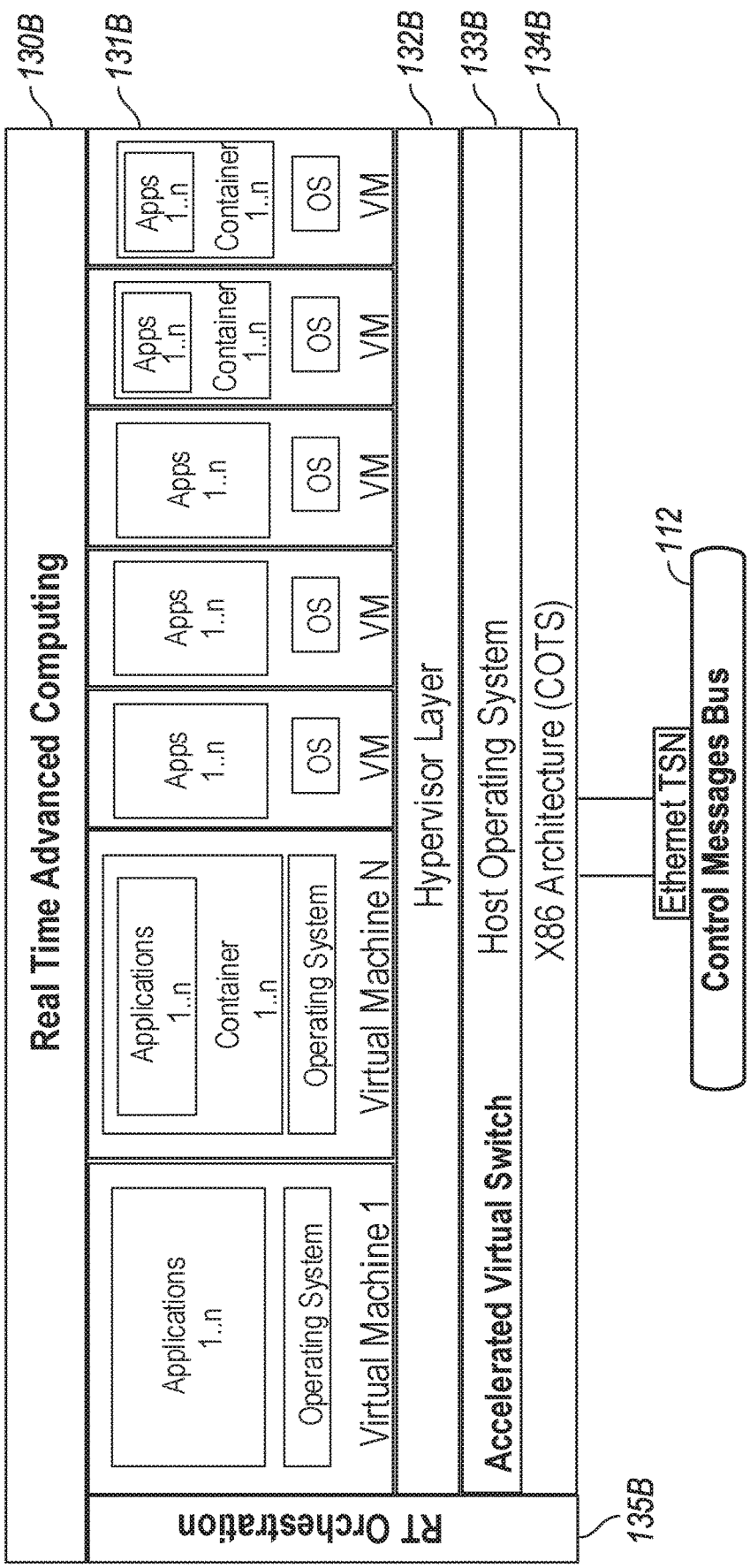
FIG. 3A illustrates a configuration of a real-time advanced computing subsystem deployable within the SDIS operational architecture of FIG. 1B, according to an example.

As a further extension of the SDIS operational architecture introduced in FIG. 1A, the configuration of FIG. 1B illustrates a scenario where the operations of the controllers and servers across the various cloud and edge components are virtualized through respective virtual machines, deployed with respective containers, deployed with respective applications, or any combination thereof. As a result, the SDIS operational architecture of FIG. 1B allows a reconfigurable and flexible deployment to a variety of hardware settings (including both ARM and x86 hardware architectures). A further breakout of the real time advanced computing system 130B is depicted in FIG. 3A, and further breakout of the cloud computing services node 180 and the edge computing node 193 is discussed in FIGS. 3B and 3C respectively.

Another aspect of the SDIS architecture may involve the use of real-time communications. The control messages bus 112, hosted on a service bus fabric 110, may be utilized to enable internetworking convergence on multiple levels. For instance, the control messages bus 112 may enable use of Ethernet transports with time-sensitivity, such as through Ethernet-based time-sensitive networking (TSN) open standards (e.g., the IEEE 802.1 TSN Task Group). Further, use of the control messages bus 112 may allow greater performance and scale at the cloud server rack level and across large networked or chassis of edge nodes.

In the SDIS architecture, real-time services may operate on top of a real-time physical transport via the control messages bus 112, such as via Ethernet TSN. The control messages bus 112 may be adapted to address the heterogeneity of existing middleware or communication stacks in an IoT setting (e.g., with use of Open Platform Communications Unified Architecture (OPC-UA), Object Management Group Data Distribution Service (DDS), OpenDXL, Open Connectivity Foundation (OCF), or the like standards), to enable seamless device-to-device connectivity to address the emerging implementations of IoT deployments.

Figure 2A:
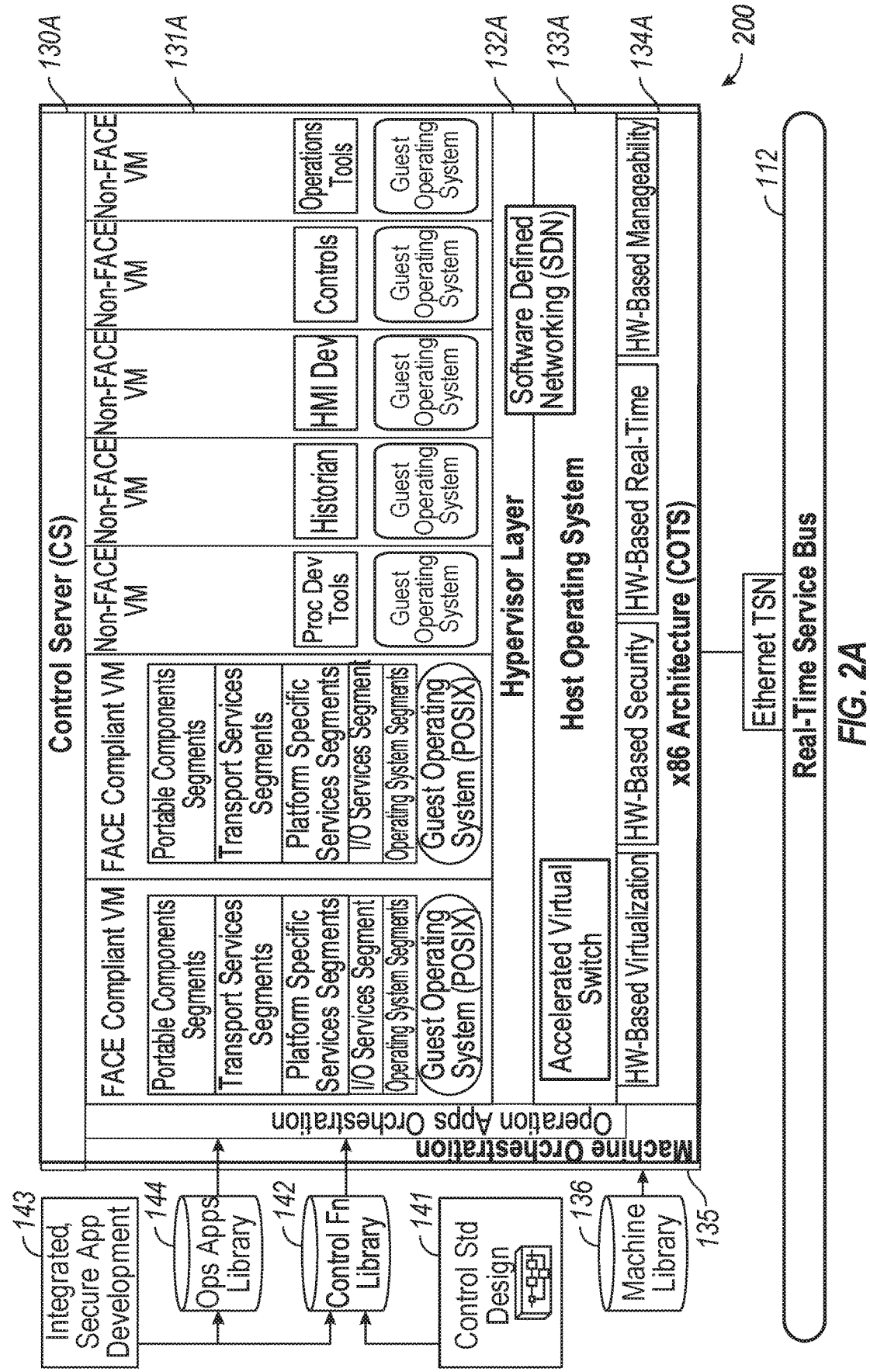
FIG. 2A illustrates a configuration of a real-time advanced computing subsystem deployable within the SDIS operational architecture of FIG. 1A, according to an example.

In an example, the orchestration management for a SDIS architecture may be implemented by a Control Server (CS) design. FIG. 2A illustrates a configuration of a control server subsystem (e.g., implementing the CS node 130A) within an SDIS operational architecture (e.g., the operational architecture discussed above with reference to FIG. 1A). Specifically. FIG. 2A provides a further illustration of the CS node 130A and its component virtual machines 131A, hypervisor 132A, host operating system 133A, and hardware architecture 134A; as depicted, the CS node 130A is shown as a single node but may include two or more nodes with many virtual machines distributed across these nodes.

In an example, the CS node 130A may include orchestration 135A that is facilitated from machine and operation application orchestration. The machine orchestration may be defined with use of a machine library 136, such as a database for implementing platform management; the operation application orchestration may be defined with use of a control function library 142 and operational application library 144. For instance, control standards design 141 and integrated (and secure) application development processes 143 may be used to define the libraries 142, 144.

In an example, the CS node 130A is designed to host ISA level L1-L3 applications in a virtualized environment. This may be accomplished by running virtual machines (VMs) 131A on top of a hypervisor 132A with each VM encapsulating Future Airborne Capability Environment (FACE)-compliant stacks and applications, or non-FACE applications such as a human-machine interfaces (HMIs). Historians, Operations Tools, etc. In an example, FACE-compliant VMs may provide an entire FACE stack (operating system, FACE segments, and one or more portable components) that is encapsulated in a VM.

The encapsulation means that each VM may have its own virtual resources (compute, storage, memory, virtual networks, QoS, security policies, etc.) isolated from the host and other VMs by the hypervisor 132A, even as each VM may be running different operating systems such as Linux, VxWorks, or Windows.

To maximize the benefit of virtualization and robustness, related groups of portable components may be grouped in a FACE-compliant VM and with the use of multiple FACE-compliant VMs. Using this approach spreads the workload across the CS hardware and isolates resources specific to that group of components (such as networks), while still allowing the applications to communicate with other virtualized and physical devices such as ECNs through the network. Distributing the FACE portable components across VMs increases security by isolating unrelated components from each other, provides robustness to failures, allows independent update of functions, and eases integration to allow individual vendors to provide fully functioning VMs into the system.

In a further example. Layer 2 components may be separated from Layer 3 components within separate VMs (or groups of VMs) to provide isolation between the layers and allow different network connectivity, security controls, and monitoring to be implemented between the layers. Grouping portable components may also provide benefits to integration, to allow multiple vendor solutions to be easily combined running multiple virtual machines and configuring the network between them. Also in a further example, additional operating systems such as Windows, Linux, and other Intel architecture-compatible operating systems (e.g. VxWorks real-time operating system) may each be deployed as virtual machines. Other configurations of the presently disclosed VMs within a CS node 130A may also enable other technical benefits.

In an example, a cloud infrastructure platform may be utilized in the CS node 130A, such as a real-time advanced computing system adapted with use of open source standards and implementations such as Linux, KVM, OpenStack, and Ceph. For instance, the cloud infrastructure platform may be adapted to address critical infrastructure requirements such as high availability of the platform and workloads, continuous 24/7 operation, determinism/latency, high performance, real-time virtualization, scalability, upgradeability, and security. The cloud infrastructure platform also may be adapted to meet software-defined industrial automation-specific critical infrastructure requirements.

Figure 2B:
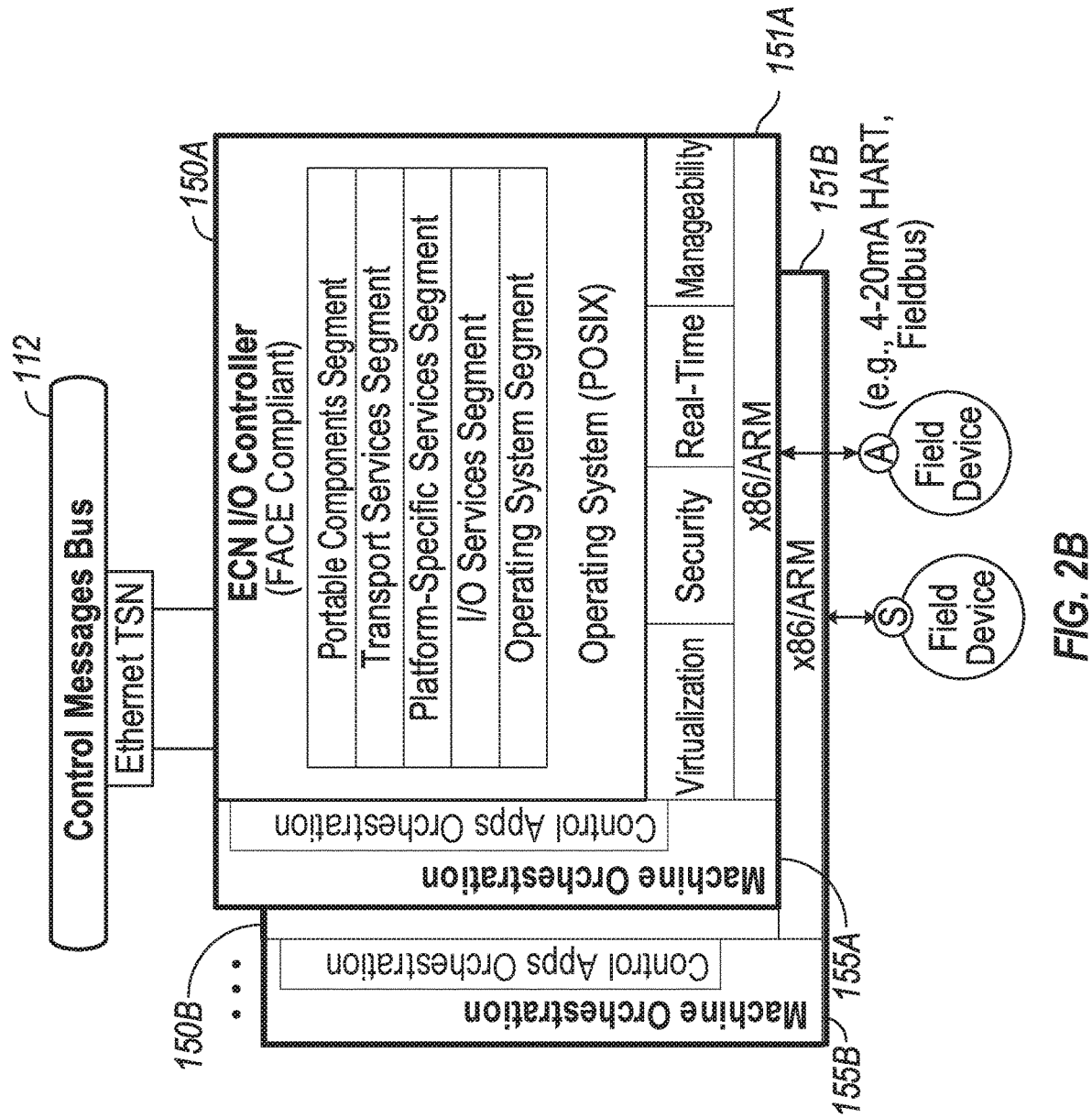
FIG. 2B illustrates a configuration of an edge control node subsystem deployable within the SDIS operational architecture of FIG. 1A, according to an example.

FIG. 2B illustrates an example configuration of a distributed edge control node (ECN) subsystem within an SDIS operational architecture (e.g., the operational architecture discussed above with reference to FIG. 1A). In an example, the ECN nodes 150A, 150B reside in the ISA-95 Level 1/Level 2 and are positioned as a fundamental, basic HW/SW building block.

In an example, the ECN nodes 150A, 150B support a single input or output to a single field-bus device via a sensor or actuator or smart device (e.g., located externally to an ECN cabinet). The ECN device architecture may be extended through an ECN cabinet or rack system that extends the openness and flexibility of the distributed control system addressing wiring, upgrade, and fault-tolerance limitations with existing proprietary DCS systems. In an example, the ECN architecture operates in a standard POSIX OS with a FACE-compliant stack implemented as segments or groups software modules. Various approaches for deployment of these software modules are referenced in the examples below.

The ECN nodes 150A, 150B may support a variety of software-defined machines for aspects of orchestration and services (such as the orchestrations depicted below for FIG. 6). In an example, the ECN nodes 150A, 150B may integrate with various hardware security features and trusted execution environment, such as Intel® Software Guard eXtensions (SGX), Dynamic Application Loader (DAL), secure VMM environments, and trusted computing-standard Trusted Platform Module (TPM). In a further example, secure boot may be enabled with fused and protected key material accessed within protected hardware cryptographic engines, such as Intel® Converged Security and Manageability Engine (CSME) and Platform Trust Technology (PTT). Additionally, cryptographic functions may be made more secure with special hardware instructions for AES encryption and SHA computations. Other forms of security such as an Intel® Enhanced Privacy ID (EPID) may be being adopted across the industry as a preferred device identity key, which can be enabled through automated device registration (e.g., Intel Secure Device Onboarding (SDO)) technology for secure, zero-touch onboarding of devices. In further examples, the ECN nodes 150A, 150B and other subsystems of the SDIS architecture may be interoperable with these or other security approaches.

FIG. 3A illustrates a more detailed configuration of the real-time advanced computing system 130B deployable within the SDIS operational architecture of FIG. 1B. Specifically, the configuration of FIG. 3A illustrates the operation of respective virtual machines 131B which may include different deployment types of virtual machines, containers, and applications, operating on a hypervisor layer 132B. The hypervisor layer 132B may be controlled with use of a host operating system 133B, as the VMs, hypervisor, and operating system execute on the hardware architecture 134B (e.g., a commercial off-the-shelf (COTS) x86 architecture). The aspects of real time orchestration 135B may be integrated into all levels of the computing system operation. Thus, a x86 computing system may be adapted to coordinate any of the cloud- or server-based SDIS functions or operations discussed herein. Other aspects of functionality or hardware configuration discussed for the CS node 130A may also be applicable to the computing system 130B.

Figures 3B, 3C:
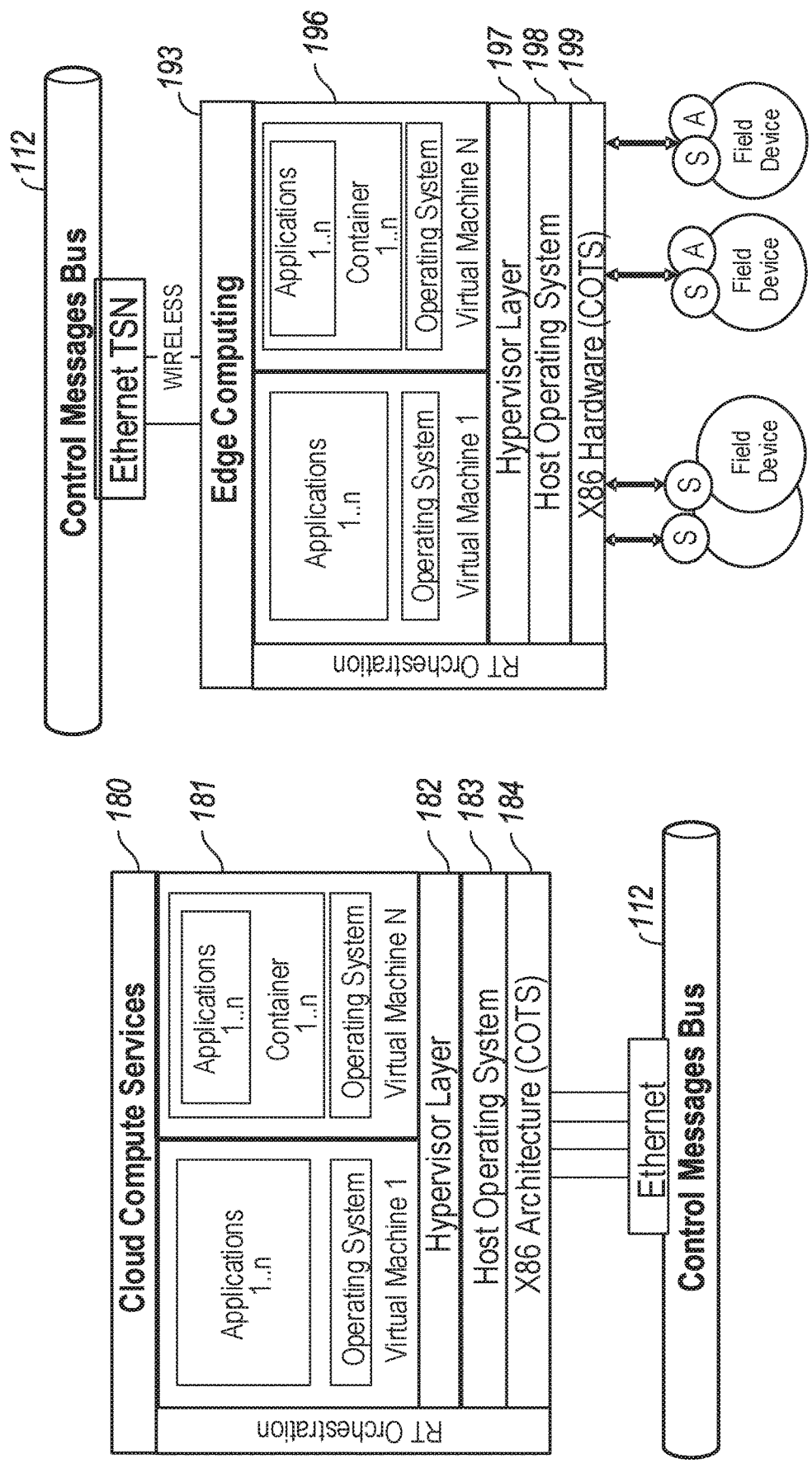
FIGS. 3B and 3C illustrates a configuration of cloud computing and edge computing subsystems deployable within the SDIS operational architecture of FIG. 1B, according to an example.

FIGS. 3B and 3C illustrates a more detailed configuration of cloud computing 180 and edge computing 193 subsystems, respectively, deployable within the SDIS operational architecture of FIG. 1B. In a similar fashion as depicted in FIG. 3A, a series of virtual machines 181, 196, hypervisor layers 182, 197, host operating systems 183, 198, and COTS x86 hardware architectures 184, 199 depicted in FIGS. 3B and 3C may be adapted to implement the respective systems 180, 193. Applications and containers may be used to coordinate the cloud- and edge-based functionality, under the control of real-time orchestration. Other aspects of functionality or hardware configuration discussed for the ECN nodes 150 may also be applicable to the edge computing node 193. The edge computing node 193 may implement control functions to control a field device.

Systems and techniques described herein may integrate "Mobile-edge Computing" or "Multi-Access Edge Computing" (MEC) concepts, which accesses one or multiple types of Radio Access Networks (RANs) to allow increases in speed for content, services, and applications. MEC allows base stations to act as intelligent service hubs, capable of delivering highly personalized services in edge networks. MEC provides proximity, speed, and flexible solutions to a variety of mobile devices, including devices used in next-generation SDIS operational environments. As an example, a MEC approach is described in "Mobile-Edge Computing, A key technology towards 5G," a paper published by the European Telecommunications Standards Institute (ETSI) as ETSI White Paper No. 11, by Yun Chao Hu, et al., ISBN No. 979-10-92620-08-5, available at http://www.etsi.org/news-events/news/1009-2015-09-news-new-white-paper-etsi-s-mobile-edge-computing-initiative-explained, which is incorporated herein in its entirety. It will be understood that other aspects of 5G/next generation wireless networks, software-defined networks, and network function virtualization, may be used with the present SIDS operational architecture.

Figure 4:
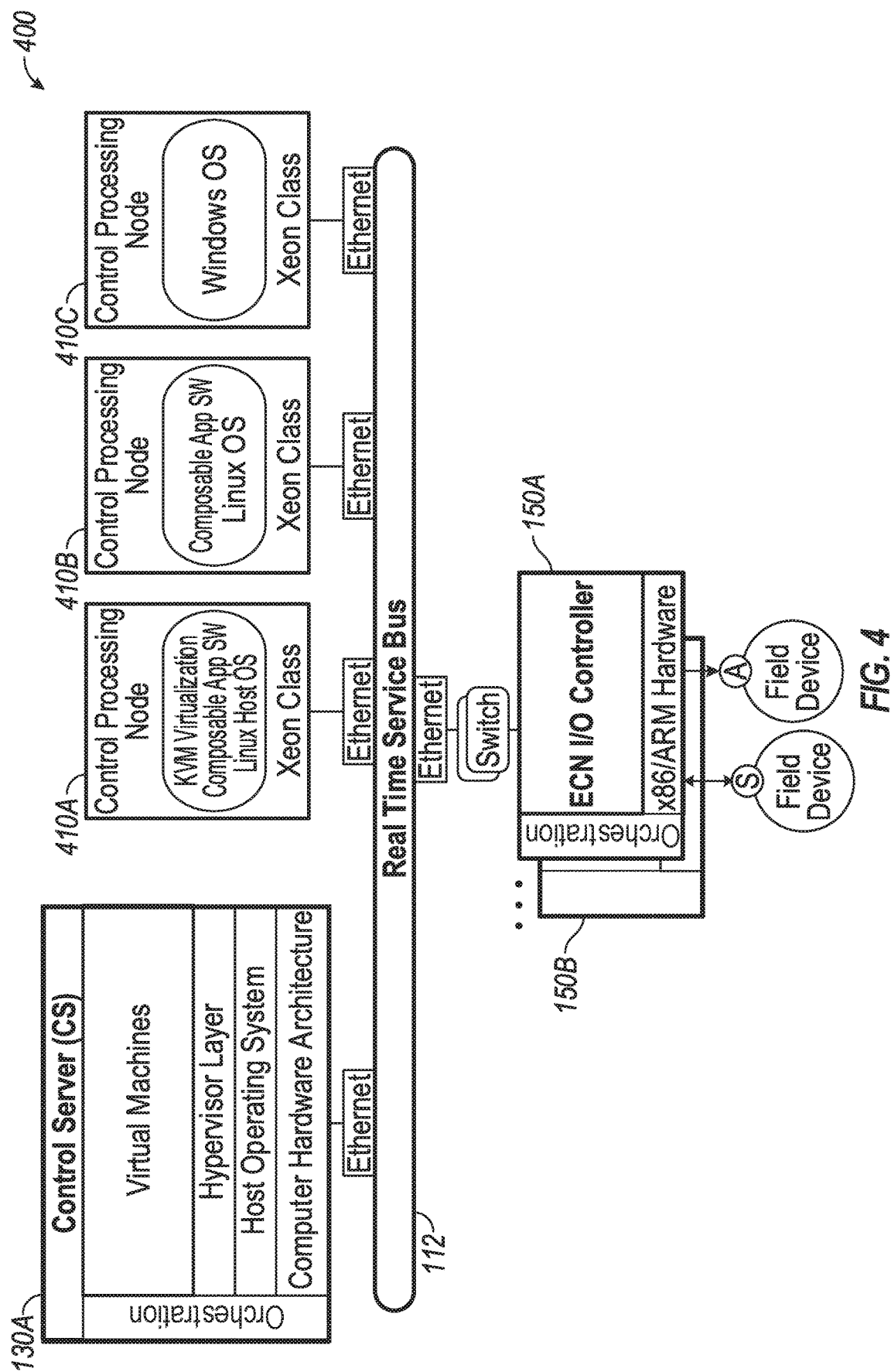
FIG. 4 illustrates a configuration of a control messages bus used within an SDIS operational architecture, according to an example.

FIG. 4 illustrates an example configuration 400 of a real-time service bus (e.g., a configuration of the control messages bus 112) used within an SDIS operational architecture. This configuration allows support for various processing control nodes, as discussed herein. For instance, the control messages bus 112 may be used to connect respective control processing nodes 410 (including various hardware and software implementations on nodes 410A, 410B. 410C) and cloud-based services or control server(s) 130A with various edge devices 420 (e.g., I/O controllers 150, 160, 165, or edge computing nodes 191, 193, 195).

In an example, the control messages bus 112 may be implemented to support packet level, deterministic, control networks, with rate monotonic control requirements. These features have conventionally been provided by proprietary Distributed Control System (DCS), Supervisory Control And Data Acquisition (SCADA) or Programmable Logic Controller (PLC) components.

Most of these systems were engineered to design parameters that limited the number of nodes and data elements with little ability to dynamically manage the quantity and quality of the data for what is commonly a closed and isolated network within the facility. Over the lifecycle of these systems, the desire to implement emerging new use cases has been severely limited by the underlying inflexibility and limited scalability of expensive control system infrastructure.

With prior approaches, both open source and open standards-based service bus middleware options have matured to the point that the critical mission ecosystem of solution providers have embraced these technologies as "best-in-breed" capabilities to build scalable, highly redundant, fault tolerant, real-time systems at a fraction of the historical cost. This has sparked a realization of new use cases that may be achieved for both discrete and continuous processing where commodity level hardware and open source, standards based software have converged to enable real-time compute methods, while maintaining service oriented architecture based design principles.

In an example, control messages bus technologies may be extended further by enabling real-time compute at the hardware level by enabling Time Sensitive Networking (TSN) and Time Coordinated Compute (TCC) both between and within platform nodes of a network. Both proprietary and open standard-based solutions may be integrated with commodity hardware enabled enhancements, including utilizing industry standards offered by the OPC-UA (OPC Unified Architecture) and DDS (Data Distribution Service) groups, and proprietary implementations like the SERCOS standards where hard real-time requirements for discrete motion control are mandatory in robotic and machine control applications.

In an example, the control messages bus and the overall SDIS architecture may also be integrated with the Industrial Internet Consortium (IIC) features. These may include various formulating and testing standards for the industrial use of TSN, which may enhance the performance and QoS of both DDS and OPC-UA based solutions by dramatically reducing both packet level latency and jitter. Further, aspects of Object Management Group (OMG) and the OPC Foundation standards may be positioned to support increased integration of OPC-UA and DDS implementation models that leverage the information modeling of OPC-UA, and the QoS and performance capabilities of DDS in architectural design. New use cases may include analytics and autonomous capabilities.

In an example, the SDIS architecture may be integrated with the use of Software Defined Networking (SDN) features. SDN is a movement towards a software programmable network that separates the control plane from the data plane to make the network and network functions more flexible, agile, scalable, and less dependent on networking equipment, vendors, and service providers. Two key use cases of SDN relevant to SDIS include: service function chaining, which allows dynamic insertion of intrusion detection/prevention functions, and dynamic reconfiguration to respond to events such as larger scale outages such as zone maintenance, natural disasters, etc. Further, the SDIS architecture may be integrated with an SDN controller to control virtual switches using networking protocols such as Open vSwitch Database Management Protocol (OVSDB). Other use cases of SDN features may involve dynamic network configurations, monitoring, and the abstraction of network functions in virtualized and dynamic systems.

FIG. 5A illustrates a first network configuration 500 for an example deployment of SDIS subsystems. The first network configuration 500 illustrates a scaled-down, small-footprint deployment option that combines controller, storage, and compute functionality on a redundant pair of hosts (nodes 510A, 510B). In this configuration, the controller functionality (for control applications or implementations) is active/standby across the nodes 510A. 510B while the compute functionality (for all remaining processes) is active/active, meaning that VMs may be deployed to perform compute functionality on either host.

For example, LVM/iSCSI may be used as the volume backend that is replicated across the compute nodes, while each node also has a local disk for ephemeral storage. Processor bandwidth and memory may be also reserved for the controller function. This two-node solution may provide a lower cost and lower footprint solution when less processing and redundancy is needed.

FIG. 5B illustrates a second network configuration for deployment of SDIS subsystems. The second network configuration 550 may provide dedicated storage nodes with high capacity, scalability, and performance. As compared with the first network configuration 500, the second network configuration 550 allows controller, storage, and compute functionalities to be deployed on separate physical hosts, allowing storage and compute capacity to scale independently from each other.

In an example, the second network configuration may be provided from a configuration of up to eight storage nodes (nodes 530A-530N) and eight disks per storage node in a high availability (e.g., Ceph) cluster (e.g., coordinated by controller nodes 520A. 520B), with the high availability cluster providing image, volume, and objects storage for the compute nodes. For instance, up to 100 compute nodes (e.g., node 540) may be supported, each with its own local ephemeral storage for use by VMs. As will be understood, a variety of other network configurations may be implemented with use of the present SDIS architecture.

The SDIS architecture and accompanying data flows, orchestrations, and other features extended below, may also utilize aspects of Machine Learning, Cognitive Computing and Artificial Intelligence. For instance, The SDIS architecture may be integrated with a reference platform with foundations in hardware-based security, interoperable services, and open-source projects, including the use of big data analytics and machine learning for cybersecurity. The SDIS architecture may utilize immutable hardware elements to prove device trust, and characterize network traffic behavior based on filters augmented with machine learning to separate bad traffic from benign.

The various components of the SDIS architecture may be integrated with a rich set of security capabilities to enable an interoperable and secure industrial system within real-world industrial settings. For example, such security capabilities may include hardware-based roots of trust, trusted execution environments, protected device identity, virtualization capabilities, and cryptographic services upon which a robust, real-time security architecture may be founded. The configuration and functionality of such components within a functional SDIS architecture deployment is further discussed in the following sections.

Overview of Data Models

In an example, the SDIS architecture may further integrate with various data models for managing data from sensors, actuators, and other deployed components. A time-series stream of numerical data is of limited usefulness if it is not known how or where the data was generated, what measurements the data is collecting, or other characteristics. Data Models may be used to provide context of such information in many domains, and even in the extreme case when the user would like to obfuscate the identity of the data.

A data model may be defined to provide a representation of the structure of the data. A data model also may be defined to allow the different stakeholders to define multiple objects and how such objects interact or relate to each other. For instance, a semantic data model may be utilized in multiple domains, and assist the processing and storage among various in information systems within the SDIS architecture.

In an example, a semantic data model may define aspects of any combination of the following components:

Metadata: (e.g., the information that describes what the data is about). For example, a data stream or point could have metadata that includes a name, such as "Temperature". Another piece of metadata could be the location, "Second floor, Pole J2", indicating where the data originated. Further, such metadata may be flexible and extensible.

Taxonomy: In the taxonomy, the data could describe the categories and relationships among data points. Taxonomy may include information about to perform analytics on a piece of data, and how is this data related to other data or devices in a particular site. A library of tags may be defined for the system and to guarantee interoperability and support of multiple devices.

Object structure: The object structure may be used to describe what pieces of metadata and taxonomy an object may and should have.

Data Flow: A data flow may describe data transformation and flows, and such a data flow may be abstract or physical. In a further example, the data flow may rely on standard definitions or approaches such as REST.

Data Store: Data storage and utilization of a particular data store configuration may impact a data model and the performance of producers and consumers of data.

The SDIS architecture, as extended with the examples below, may provide a common data model to address heterogeneity in data propagation across applications and machines. As also discussed below, a dynamic data model may be utilized in the SDIS architecture to provide an abstract representation of the structure of the data, and to further allow different stakeholders to define flexible data objects, their representation, and their interrelation. These and other semantic data models may be essential to the processing and storage in many information systems deployments.

Dynamic Data Models

As indicated above, data models may be an essential component for use in IoT deployments such as SDIS implementations. Data models are abstractions of the data and the relationships of different structures and streams. Based on the implementation, a data model may be implemented with simple as on-the-fly tagging (such as used in Project Haystack, an open source initiative to develop naming conventions and taxonomies for building equipment and operational data) or with extensive definitions of the structures/classes and the flow of data (e.g., with such definitions commonly being established during the design phase and prior to the development of a system). The data model is important in many systems because provides a mechanism for developers, designers, architects, and deployment technicians to describe and find data sources.

Most data models involve time and effort (and multiple iterations) to produce a definition. Further, most data models are static and require considerable modification and iteration in order to add new tags, components, or connections to existing models, often rendering them backward incompatible.

This prevents extensive change of the data models during deployment to describe the tags that are used by applications of the data (such as in data visualizations, analytics, or provisioning tool applications).

While existing solutions may provide limited flexibility in defining a data model, such solutions are not dynamic. For example, although a data designer may define a device with a number of characteristics where some of the characteristics are optional, the specific characteristics may not be changed during runtime. This makes a data model very complicated to create, change and maintain, especially in an industrial use environment.

By definition, data model creation tends to be static. Meaning, once the data model is defined and implemented, any changes to the structure (e.g., of the data model, and not data values) often require a development effort and deployment of a new version of code for the data model. However, this does not address scenarios of when an application, a device, or a sensor has a dynamic set of features. An example would be a device that is an ensemble of sensors that may manifest itself as different output sensors based on battery and compute availability. Such a device could contain multiple physical sensors (proximity, contact, light. Bluetooth, temperature, etc.) and could report occupancy in a room. However, if for some reason this device needs to conserve power or is experiencing faulty modules, the device could revert to a subset of its components. The concept of dynamic data models (and dynamic metadata and features) in such cases is very valuable, and may even be implemented by complex representations such as a probabilistic estimate of a tag instead of a binary on/off status. The concept of dynamic data models may also provide a valuable input for forecasting when orchestration is deployed (or should be deployed) in an IoT environment.

The following techniques enable the creation and deployment of a dynamic data model to address these and other technical considerations in an SDIS architecture and like settings. In a dynamic data model the data designer may identify a set of fields that are mandatory such as name, unit, type, and so on. In addition, the data designer may keep the definition open for nodes and modules to add metadata (or any type and quantity), or this definition may restrict what may be added and by whom.

In an example, when a node sees certain behavior occurring in a data stream, the node may query the sensor for its metadata expansion rules. For example, a module may use analytics to generate predictive maintenance outputs. As part of the computation, if the model applies un-supervised learning, the model could detect that a certain stream of sensed data has become more important over time and should be added to the feature set. The feature set is important for the analytics computation and depending on the application, the feature set may also lead to real-time requirements.

Adding this flag to the metadata, for example, would allow a TSN switch to upgrade the traffic priority of a network in support of the learning algorithm. When the dynamic metadata is added, the data will be assigned an expiry or refresh period. This would guarantee that data needs to continue to support this particular feature, otherwise the feature may no longer be valid and may be updated accordingly. Alternatively, a revoking mechanism could be implemented that would allow a system to revoke pieces of the metadata when the metadata is no longer valid or needed.

In an example implementation, each data stream is assigned to a data stream manager. The data stream manager may be a device that generates the data, or a virtual implementation located in the fog/cloud. The data stream manager carries the policies of the dynamic metadata. When another module or node in the system needs to contribute to the dynamic data model, this another module or node will contact the stream manager. The stream manager could then offer it a token with an equivalent key to allow the data stream manager to add and update the metadata as the data stream manager sees and analyzes the traffic.

In a further example implementation, the system may add provenance metadata. The provenance provides a trail of ownership and modifications that a node could use to understand the history of a stream or just parts of the metadata.

FIG. 6 illustrates a protocol for establishing a dynamic data model, according to an example. In this example, a sensor 610 produces streaming data in a data flow 630. This data flow is obtained and processed by a plurality of nodes (e.g., servers 640, 650 that monitor the data flow 630). The sensor data produced in the data flow 630 is flagged to indicate that the sensor 610 supports dynamic data modeling. This sensor data is then obtained and processed by a data model manager (e.g., operating on server 640).

The data model manager could reside anywhere in the network as long as it is accessible to the sensor 610 and other modules and devices that are allowed to modify the data model of the subject sensor. For instance, as data flows upstream, a device (e.g., server 650) may run a set of analytics to determine whether data streams should be considered in the set of features for an algorithm. Due to changes in the system, the device determines that the data stream generated by the sensor 610 is now of value to a process that controls a robot 620. The device then sends a request with its credentials to the data model manager asking to modify or add a flag to the sensor data stream that would indicate the relevance to the robot arm. The data model manager determines whether the algorithm in question has the right to request such a change.

Using predefined policies, the data model manager sends a command to the device requesting to implement the modification requested by the algorithm. These changes will take effect based on a policy or may be part of the request. The newly added metadata to the data model may have a further ramification such as affecting further factors, such as connectivity QoS (e.g., involved with enabling TSN communication). Similarly, if for some reason the sensor data is no longer of interest to an algorithm or application, the data model could be modified to omit the tags in question. The request could include complete removal of the tag or even temporary suspension until further data is analyzed.

FIG. 7 illustrates a flowchart 700 of an example process for generating and utilizing a dynamically updated data model in a SDIS operational architecture. As depicted, the following flowchart includes a number of high-level operations, which may be performed by one or more systems or subsystems (e.g., servers 640, 650 in the configuration of FIG. 6). In an SDIS architecture, however, the following operations may be adapted among various computing or controller nodes, for use with various connected sensors and actuators.

In the flowchart 700, the operations include the monitoring of a data flow provided from sensors or actuators in a controlled system (operation 710). This monitoring may be provided on an ongoing basis in a data stream, with sampling of data from a data source, or with any number of monitoring approaches. Based on this monitoring, one or more patterns may be detected from the data flow (operation 720). For instance, a combination of data values, a data value trend, a data value confidence or probability, or other values indicated by one or more data value types and sources may be analyzed for the one or more patterns. In an example, machine learning, artificial intelligence, or rules may be employed for this pattern detection.

The one or more detected patterns may be used to identify data model changes (operation 730). For instance, a combination of certain data values may be used to trigger the addition of an aggregated data value type to be added to the data model: also for instance, the trend or confidence in a certain data value may cause a data value type to be removed or changed. The identified data model changes may then be incorporated to the data model (operation 740) and deployed for use among the various system components. Consequently, subsequent system operations (including system commands and workflows) may be performed in the system deployment based on the data model changes (operation 750). Other types of data analysis and system operations adaptations may also occur as a result of the data model changes.

As an extension to the dynamic data model changes discussed above, the presence of a tag in a data stream may also be used to represent a confidence level of a data value or a data type. For example, suppose that the relevance of a particular data stream to an analytical function is determined using a feature selection component. The feature selection component may determine a relevance score of this data stream. As a further example, a feature selection component could generate a 0.8 relevance score for a particular information field in the data stream. Such a relevance score may be used as a confidence level defined in the metadata to be added to the data model.

In a similar manner, the same data stream could have a very low score of relevance (0.4) for being used for another information field such as occupancy. Another device or algorithm might query the device for its metadata with a filter set to high confidence. As a result, the device would return the metadata associated with the 0.8 relevance score but would omit the metadata with 0.4 relevance score.

In such examples, not only is the data model dynamic, but the relevance score used for evaluating a particular data field may be dynamic and may be recomputed on a periodic basis or based on an event. In still a further example, the relevance score is not defined as a single value but is represented by a vector with a set of conditions associated to values. An example of a vector may look as follows:

Tag: "algorithm": "occupancy"
Confidence Vector [0.7, 0.3, 0.8]
Context Vector ["7:00 am-5:00 pm", "5:01 pm-8:00 pm", "8:01:pm-6:59 am"]

In this example, there are three confidence levels with three associated contexts. The context may be as simple as time of data, or more complicated to provide an event-based expression.

Continuing with a previous example, consider a scenario where a light sensor is used for determining room occupancy in a smart building deployment.

The sensor values may provide an accurate indicator of an occupancy state during normal office hours. However, the sensor values may be thrown off by the unusual activity of a cleaning crew after business hours, when a number of lighting fixtures are turned on and off quickly which is not a normal behavior. However, after 8:00 pm, when the cleaning crew is typically gone, the existence of lighting may again be used as an accurate indicator of occupancy.

A dynamic data model may allow a useful addition and removal of tags based on context and data generated (or the properties of data). This may allow a SDIS deployment to add traffic priority, policies, and even routing decisions based on those dynamic tags, without the need to re-create a new data model to add or remove those extensions.

From a developer and application perspective, to support dynamic data models, each device will support, modify, and add suitable queries to such device's data model. The devices also will support a query to return a data model based on a set of criteria. As a result, device interfaces to modify, add, and return a data model are utilized for the runtime modifications of a data model.

In a further example, data models could also be synced among multiple devices and nodes. For example, an algorithm could determine that a certain sensor typically placed in conference rooms is now very relevant to the occupancy algorithm based on data from one part of a building in a certain deployment. If that is the case, then the data model of the sensor may be modified to reflect this new finding. In addition, other sensors may be asked to execute a piece of code to determine whether the sensors are exhibiting a similar behavior. If the feature extraction shows similar behavior, then the data model may be extended as well. As a result, an app developer or even a system integrator could potentially allow for the modification to occur even if it was not validated across all sensors. Such capabilities may serve as tradeoff between accuracy/validation and assuming that similar sensor data is valuable and should be routed and managed accordingly.

Tags or metadata that are added dynamically to a data model may also be allowed to age (e.g., decay) and be removed or downgraded (by decreasing the relevance score) unless a device or an algorithm continues to verify the need and relevance of such a piece of metadata. Such aging may allow the natural pruning of metadata that has become obsolete even if not identified by the developer. In a basic implementation, the aging may be strictly time-based; however, other implementations may include advanced concepts including aging based on lack of use. Similarly, if the device or algorithm that requested the addition is not consuming data coming from a sensor, then the metadata could be aged or archived (e.g., continues to be available but is not given any priority). However, periodic use of the metadata (though queries or other QoS decisions made by the system) may keep the interest level in the metadata fresh.

FIG. 8 illustrates a flowchart 800 of an example method for maintaining aspects of a dynamic data model in a SDIS operational architecture. In an example, the method may include: an optional precondition of identifying one or more conditions for data model evaluation (operation 810); obtaining data from one or more sensors via data flow, for data that is provided in the data flow according to data model (operation 820); identifying one or more threshold(S) for a data model modification (operation 830); and evaluating data from sensor(s), using pattern(s) or rule(s) and identified threshold(s), for the data model modification (operation 840).

The method may further include: defining a feature addition, or change, or removal for the data model modification (operation 850); requesting an approval for the data model modification from a data model administrator (operation 860): receiving and processing the approval for the data model modification from the data model administrator (operation 870); incorporating the data model modification into a data model for one or more sensor(s) or the data flow (operation 880); and implementing changes for data processing in the system architecture based on the data model modification (operation 890).

Any of these dynamic data model operations may be extended based on the further examples, scenarios, or conditions discussed above. Further, additional aspects of maintaining and utilizing a dynamic data model may be combined in connection with features of functional orchestration or other management of the presently disclosed SDIS architecture.

Overview of Functional Orchestration

FIG. 9 illustrates an example of dynamically established set of orchestration operations 900 with use of a Composable Application System Layer (CSL) in a SDIS operational architecture. The CSL may be utilized to enable a secure design and orchestration of control functions and applications to support industrial operations.

In an example, the CSL maintains a library 980 of functional blocks 990, each representing control-loop logic and application components. Each functional block may be interoperable with other functional blocks. A functional block may have multiple implementations, making it portable, such that it may operate on various platform architectures and leverage special features if available (e.g. hardware accelerators). In an example, the CSL provides a control function for a cluster of edge nodes (e.g., ECNs); in further examples, the CSL provides control for VMs in the control server or other computation points in the SDIS operational architecture.

In an example, a process engineer (or other operator) defines control flows and applications by combining and configuring existing functional blocks 990 from the library 980. These functional blocks 990 may represent application logic or control loops (e.g., control loops 970, data storage, analytics modules, data acquisition or actuation modules, or the like), control modules, or any other computation elements. Because these functional blocks 990 are reusable and interoperable, new code needs to be written only when new functional blocks are required. In further examples, such functional blocks may be utilized to implement end-to-end logic, including control flows or end-to-end applications using a graphical, drag-and-drop environment.

Starting from this application design, the CSL generates an orchestration plan 940 that specifies the required functional blocks and the requirements for points of computation to execute those functional blocks. As discussed in the following sections, orchestration 920 may encompass the process of mapping the orchestration plan 940 to available compute and communication resources. The orchestration 920 may be further adapted based on control standards design 910 (e.g., to conform the resulting orchestration to various control laws, standards, or requirements).

In an example, the CSL maintains a map 930 of computing and control resources across the SDIS network. The map 930 comprehends the topology of various compute points, from virtual machines in a data center to control points and the attached sensors and actuators. The map 930 also includes the hardware capabilities and dynamic characteristics of the control points. The map is updated regularly, allowing the system to constantly adapt to component failures. The orchestration 920 and the control loop 970 communicate using monitoring logic 950 and function deployments 960. The monitoring logic 950 outputs information from a field device or the control loop 970, which is used as an input to the map 930. The function deployment 960 is used as an input or state setting for the control loop 970.

When an operator deploys a new application definition (e.g., the orchestration 920 receives an output from the control standards design 910), the orchestration 920 determines how to best fit the functional blocks 990 to the set of available resources in map 930, and deploys the underlying software components that implement the functional blocks

990. Deployment of an end-to-end application may include, for example, creating virtual machines within a server, injecting code into control loops (e.g., control loops 970), and creating communication paths between components, as needed. Orchestration 920 also may be dynamic to allow functional blocks to be migrated upon failure of a computational resource, without requiring a system-wide restart. In addition, updates to the implementation of a component may be pushed, causing code to be updated as needed.

The CSL may also incorporate security and privacy features, such as to establish trust with participating devices (including edge nodes or a control server). In further examples, the CSL may be integrated with key-management used for onboarding new devices and revoking obsolete devices. The CSL may deliver keys to function blocks 960 to enable secure communication with other function blocks 960. The CSL may also deliver secured telemetry and control, integrity and isolated execution of deployed code, and integrity of communication among functional blocks 990.

Additional examples of orchestration functionality, developed within an orchestration architecture of the SDIS, are further discussed in the following sections.

Orchestration for Distributed Mission-Critical Workloads

Orchestration technologies today predominantly execute by function, application, virtual machine, or container technology. However, inherent dependencies between distributed applications are not generally managed in low-latency, high frequency mission-critical timeframes for control strategy implementations today. For embedded systems in general, dynamic orchestration historically has not been applied due to the technical limitations of managing application dependencies at runtime.

The following techniques address the orchestration of distributed workloads that define real-time mission-critical control strategies for industrial systems. The orchestrated control strategies may operate in new Distributed Control Systems (DCS) designs currently under definition and may be applied to discrete, continuous and batch manufacturing operations. For these systems, real-time mission-critical control applications may be built with adherence to IEC 61499 standards and may be represented as the combination of multiple scheduled and coordinated synchronous or asynchronous, event driven building block applications. With the application functions unique, the building blocks may be executed in concert in a specific order, and frequency, within defined system latency boundaries.

In contrast to the following approaches, many existing embedded applications generally run on dedicated fixed purpose hardware. Traditional application orchestration does not consider the dependency of application processing on other application building blocks that make up a complete control strategy where the total compute, memory, storage and scheduling are required to perform together for a mission-critical control strategy to execute error-free.

In an example, features of an SDIS architecture may be adapted to support the holistic orchestration and management of multiple dependent applications (function blocks) that execute across a distributed resource pool, to enable orchestration at an embedded control strategy level in a distributed system configuration. This provides a control strategy orchestration capability to operational technology environments while elevating overall system performance at an expected reduced total cost. For instance, an example orchestration method may incorporate dynamic network discovery, resource simulation in advance of any orchestration action, and simulation coupled with global resource optimization and prediction utilized as part of an orchestrator rule set decision tree.

The distributed resource pool may encompass applications that span: (a) a single application running in a single native device, where a second redundant application is available on an additional native device; (b) multiple coordinated applications running in multiple native devices; (c) multiple coordinated applications running in a single virtual machine, where the virtual machine is running on a single embedded device or server; (d) multiple coordinated applications running across multiple virtual machines, where each virtual machine runs in a dedicated embedded device or server; (e) multiple coordinated applications that span multiple containers contained in one virtual machine, where the virtual machine runs in a dedicated embedded device or server; or (f) multiple coordinated applications spanning multiple containers, where the containers are running on multiple embedded devices or servers. Any mixture of these application scenarios may also apply.

In an example, orchestration may include measurement of resources or reservation of resources, such as compute resources on a node (e.g., on the CPU or special purpose compute blocks like an FPGA or GPU), particular device capabilities (access to a sensor/actuator, security device (e.g., TPM), pre-installed software), storage resources on a node (memory or disk), network resources (latency or bandwidth, perhaps guaranteed via TSN), or the like.

An extended orchestrator rule set may be defined to include criteria beyond standard compute, storage, and memory metrics, such as to specify application cycle time, application runtime, application input/output signal dependency, or application process sequencing (e.g. a mandatory sequence that specifies which application(s) runs before or after other application blocks). This orchestration technique may provide the ability, at a distributed application control strategy level, to leverage lower cost commodity hardware and software to achieve better system performance at a control strategy level, while enabling new levels of system redundancy and failover at a lower cost across multiple applications running in ISA levels L1-L3. Further, orchestration sensitivity at the broader control strategy level may enable new levels of high availability for embedded systems at a lower cost. This may result in an increase of general system and application uptime for orchestrated and coordinated control applications, while reducing unplanned downtime for production operations at a higher ISA level than available with conventional approaches.

The following orchestration techniques may also enable additional maintenance tasks to occur (without production downtime) for systems where system redundancy is designed into the automation configuration. These techniques enable increased interoperability for where control strategies execute among vendor hardware where platform agnostic virtualization and containerization is leveraged. These techniques also leverage current, historical and simulation results to optimize workload placement for operational technology environments for real-time operations. Further, these techniques may leverage predictions of future orchestration events to pre-plan workload placement.

In an example, a distributed resource pool is defined as a combination of compute, storage, memory across networked computing assets with the addition of function block scheduling frequency, before and after processing assignments, latency tolerance for the purpose of executing application control strategies. For instance, a control strategy (or application), may be defined by a physically distributed, coordinated set of building blocks with very strict time, block-to-block scheduling, and run-time requirements for execution. The orchestration of these building blocks in time is coordinated with respect to the order of execution, processing latency and full execution cycle of all building blocks that make up the overall application control strategy.

FIG. 10 illustrates an orchestration arrangement of an example cascade control application 1040 based on configuration of distributed system building blocks 1010. Specifically, this figure depicts an example set of building blocks 1005 based on the IEC61499 function block standard. The application shown in FIG. 10 demonstrates a common layering strategy that is applied in modern distributed control systems. For this example, a subset of the total application blocks (blocks 1010) are illustrated for illustration purposes; however, all of the application blocks shown may be included as dependencies for a specific implementation.

For the control application 1040 example shown in FIG. 10, function blocks A, B, C, and D (1022, 1024, 1026, 1028) are configured in a cascade control design a control subsystem. Each generic building block (an independent Function Block or Application), executes a specified algorithm as part of a distributed control strategy, for control of an output (flow valve 1030). In this example, control function block outputs are sent to the next function block as an input value. When a specific block is taken offline or "sheds" due to some system anomaly, links to the dependent building blocks are handed back over to the operator for manual control.

For cascade strategies to work, the application cycle time, application runtime, application input/output signal dependency, and application process sequencing of each block of the control loop must be maintained. When these links are lost in production, much less efficient operations ensues and represents a major inherent loss at an industry level. The definition of an extended orchestrator rule set with the present techniques may address each of these resource concerns.

The layering of capability within an extended orchestrator rule set enables the addition of more advanced algorithms that directly impact production cost, improve product quality and process efficiency while protecting worker safety through a loose coupling set of design principles that enables individual applications to go off-line and degrade to lower levels of control to protect the overall operation. Without this layering of the application control, new solutions would be difficult to implement and operations would be more prone to accidents. Further, orchestration of these application assets at a control strategy level, further improves overall uptime and system performance, which directly contributes to manufacturing and process operations.

Conventional IT orchestration strategies generally would provide the ability to move individual application assets (function blocks) around a system in a dynamic manner; however, in the present example, coordination of the distributed function block applications is orchestrated across all function blocks that define a specific control strategy. The collective function block links and associated state information is maintained to orchestrate these building blocks across systems resources to keep the application on-line and avoid shedding to more basic safe control states.

FIG. 11 depicts an example application distribution mapping for a control strategy of an orchestration scenario that includes four applications, where application redundancy is depicted in designs 1120 for native, virtual machine, container, and container in a virtual machine deployments. As illustrated, the orchestration of application assets may encompass different deployment options to consider for dynamic allocation of resources, subject to various compute, storage, memory, and application constraints.

Note that for the case shown in FIG. 11, the defined applications in the orchestration scenario 1110 (applications 1 to 4) are specified to run at different frequencies. In this example, the cycle and runtime dependencies are major factors in orchestration decisions at runtime. Specifically, in the depicted example, Application 1 may be orchestrated within a 30 minute window and preserve the control strategy execution; Application 2 may be orchestrated within a 5 second window and preserve the control strategy execution; Applications 3 and 4 may be orchestrated within a 1 second window and preserve the control strategy execution. If an execution window is missed for orchestration, the application links are broken, and the control strategy degrades to a SAFE state until Operations closes the loop again.

FIG. 12 illustrates example orchestration scenarios 1210A. 1210B adapted for handling a function block application timing dependency. As shown, application cycle, runtime dependencies, and current state play an important role in addition to more standard resource metrics in defining where an application may be deployed to maintain operations error-free. For example, a control strategy executing with relatively slow cycle time and frequency could be run in a device with lower compute resources and does not need to be co-located with the other dependent application blocks of the control strategy. In contrast, applications that need to execute at a very fast cycle time and frequency may all need to be co-located on the same device for the control strategy to run error-free.

In the example of FIG. 12, orchestration scenario 1210A shows a scenario where applications 1-4 (application deployment 1230A) may be distributed across independent nodes of the system to conduct process 1220A. In contrast, orchestration scenario 1210B shows a scenario where applications 1-4 (application deployment 1230B) may not be distributed across independent nodes of the system, due to cycle and runtime limitations. Rather, applications 1-4 must be orchestrated together for any orchestration event, to successfully conduct process 1220B.

FIG. 13 depicts an example orchestration asset deployment, showing various deployments of orchestration assets (applications 1320) under the control of an orchestrator 1310. Specifically, this example illustrates one potential dynamic application outcome based on the available system resources. As depicted, the examples cover VM, Container. VM+Container, and Native node deployment. In the example of FIG. 13, nodes 1, 6, 10, and 14 are active, demonstrating how different applications within the same orchestration may operate in different system deployment types.

FIG. 14 depicts a flowchart 1400 of an example orchestration sequence for a distributed control application strategy. In this example, each function block application resides in a different compute node of the system. Specifically, FIG. 14 implements an orchestration method that considers the application cycle time, application runtime, application input/output signal dependency, and application process sequencing of each block of the control loop in addition to compute, storage and memory and network resource availability to effectively allow orchestration of the control application to occur across the available resources without interrupting control execution.

The orchestration of the individual building (or function) blocks occurs within the boundaries of the defined boundary conditions of the complete Control Strategy Application as depicted in FIG. 14, discussed above.

Furthermore, the current state and historical information when combined with the defined set of individual function block application constraints provides the means to execute a variety of multi-echelon optimization methods for resource allocation that may also include prediction of the likely hood of an orchestration for the broader control strategy. With prediction and constraint management coupled with optimization in real-time, new levels of embedded infrastructure resiliency may be achieved.

In an example, operations to monitor function blocks of the distributed control application (operation 1410) may include monitoring various forms of current and historical state data. This may include monitoring of: available compute overhead; available compute speed; available storage; available memory; application cycle time; application runtime; application link dependency: application process sequence dependency: or application specific orchestration error.

In still a further example, operations for update prediction (operation 1420) may include: orchestration optimization=f (current state data, historical state data, constraints) per control strategy; orchestration optimization=f (current state data, historical state data, constraints) per application building block; or, orchestration prediction=f (current state data, historical state data, constraints) per application building block.

In a further example, operations to detect a system anomaly for an application building block (operation 1430) may be evaluated. These may be subject to defined constraints for each application, such as: compute overhead allowed limit; compute speed minimum requirement; storage minimum requirement: memory minimum requirement; application cycle time limit; application runtime limit; application link dependency for input and output dependencies; application process sequence dependency for input and output variables; application system error trigger for orchestration event.

In still a further example, operations may evaluate whether orchestration of any function block is required (operation 1440). For instance, if application constraint 1 . . . n is violated, an orchestration event is required. In still a further example, operations may also evaluate whether a control strategy orchestration is feasible (operation 1450). This may evaluate, whether the application needs to be moved to another node within the constraints defined, do multiple applications need to be moved because of application dependencies, and if required, may the group of applications be distributed and how. In still a further example, a degrade or shed control strategy may be implemented if the orchestration is not feasible (operation 1460), and the active function block profile may be updated accordingly (operation 1480).

In still a further example, operations are performed to orchestrate a building block application of a control strategy (operation 1470), in response to verification that the orchestration of the function block is required, and that the control strategy orchestration is feasible. If the orchestration is successful, this results in a reset of the prediction (operation 1490). If the orchestration fails, this results in the use of a degrade or shedding control strategy (operation 1460), and the update of an active function block profile (operation 1480).

FIG. 15 illustrates a flowchart of an example method for orchestration of distributed mission-critical workloads and applications with use of a distributed resource pool. Based on the previous examples, this method may enable the ability to dynamically orchestrate groups of distributed and dependent applications based on an expanded set of application specific dependencies (e.g., as depicted and described with reference to FIGS. 10-13). This method may also enable the ability to dynamically analyze and simulate network bandwidth prior to committing to an orchestration strategy. This method may also provide the ability to predict an orchestration event before it happens and proactively plan for potential optimized resource placement for control strategy workload orchestration.

In the flowchart 1500, the example operations include: identifying application specific dependencies (operation 1510); dynamically creating orchestration groups of distributed and dependent applications based on identified dependencies (operation 1520); and predicting an orchestration event (operation 1540), with use of the orchestration groups. In an example, predicting an orchestration event includes dynamically analyzing and simulating network bandwidth (or other resources) in an example scenario (operation 1530), and analyzing an occurrence of the orchestration event in this example scenario.

Based on the predicted orchestration event, operations may be performed to define and modify an extended orchestrator logic rule set. These operations may also include detecting the predicted orchestration event (operation 1550), and optimizing resource placement based on the predicted orchestration event (operation 1560). For instance, the techniques discussed with reference to FIG. 14 may incorporate aspects of a changed orchestration strategy.

Orchestration for Legacy (Brown Field) Environments

Orchestration is the act of matching a user's requirements for an application (which may be composed of many processing, networking, and/or storage components) to the capabilities of the physical world and deploying the application (such as by configuring the physical world and distributing and configuring the application components). Orchestration is often applied to enterprise environments to deploy highly scalable services into homogeneous and virtualized environments. These applications are designed to operate in this environment.

As orchestration is applied to IoT environments, particularly those with existing ("legacy") devices (e.g., "brownfield" deployments), the problem changes in several ways: there are often a large number of devices; the set of target devices is highly heterogeneous; some application components may not be designed to be orchestrated; some hardware devices may not be designed for use for an orchestration solution; and some devices may be proprietary and closed/fixed-function devices.

With conventional approaches, a software module must conform to a particular API to be orchestrated, so that it may be properly deployed and configured. Typically, to receive software being orchestrated, a hardware node runs orchestration software and provides specific APIs to the software being executed. Thus, several issues that may arise include: how to scale many devices and applications; how to allow orchestration of software modules that are not designed to be orchestrated without modification; how to allow orchestration of software modules to a legacy hardware node or hardware nodes that are otherwise not capable of supporting an orchestration stack; and how to self-monitor a set of heterogeneous physical nodes to manage resource utilization.

In an example, the following techniques enable orchestration-unaware code to be orchestrated by wrapping the code inside of an orchestration-aware shim. In a further example, the following techniques enable orchestration-unaware devices to participate in orchestration. In contrast, prior approaches do not consider the problem of orchestration (particularly end-to-end orchestration in heterogeneous environments) which introduces significantly different problems and requirements. Also in a further example, orchestration self-monitoring may be utilized to enable self-reliant and self-organizing orchestration that learns from failures and incorporates the feedback into better orchestration approaches.

Orchestration technology allows individual software components of a distributed IoT application to be dynamically deployed across a set of available hardware resources, taking into account resource capabilities and application requirements and constraints. Current orchestration technology tends to assume that (1) the software components are designed to be orchestrated by implementing an orchestration API and (2) the devices are designed to receive orchestratable software by providing an orchestration middleware. The techniques herein enable orchestration of legacy software components by wrapping such legacy components inside of an orchestratable component, which provides a plugin architecture to interact with the legacy software in either standard or custom mechanisms. For example, a standard plugin may receive a communication port number from the orchestration API and set the port number on a standard piece of software, such as a web server, via a configuration file or environment variable. Also for example, a custom plugin may be written to support proprietary software.

FIG. 16A illustrates an example scenario of orchestration between an orchestration engine 1610A and associated modules. As shown, the orchestration engine 1610A deploys the two orchestratable modules 1620A, 1630A. The two modules each use an Orchestration API (1640A. 1640B, respectively) to receive configuration parameters from the orchestration engine 1610A. For example, if module 1 1620A is an http client and module 2 1630 is an http server, module 1 1620A may receive the endpoint information that this module needs to communicate with module 2 1630, such as an IP address and port number. In some cases, the port number that module 2 1630 should bind to is provided to module 2 1630 by the orchestration engine 1610A, while in other cases, module 2 1630 may provide communication information to the orchestration engine after it binds. In either case, an API (e.g., APIs 1640A, 1640B) is used by the two modules to establish communication parameters and become connected.

FIG. 16B illustrates an example scenario of orchestration between an orchestration engine and associated modules (including a legacy module). The orchestration engine 1610B deploys two different modules (1620B and 1660), one that is aware of orchestration and one that is a legacy module that is unaware of orchestration. In this case, the orchestration engine 1610B also deploys a shim layer 1650 along with the legacy module 1660. This shim layer 1650 understands any custom configuration mechanisms associated with the legacy module 1660. For example, if the legacy module 1660 was an apache web server, the shim layer 1650 may be configured to negotiate the port number via an orchestration API 1640D and then configure the port number of the web server using a configuration file, command line parameter, or environment variable (or similar mechanism) prior to the launch of the Apache server. The client in the orchestratable module 1640C will behave in the same manner as the previous example, using the orchestratable API 1640 to negotiate client communication parameters, and will thus be able to connect to the Apache web server.

In an example, workloads that are performed by legacy hardware devices may be processed in a similar manner by pairing each legacy device with an orchestratable device. As an example, FIG. 17A illustrates a scenario of orchestration with an orchestratable device. The agent on an orchestratable device 1710A collects information about the device's available resources and reports it as telemetry to the orchestration engine 1720A. A typical orchestratable device is able to represent its capabilities to an orchestrator and is able to receive a workload execution request from the orchestrator and execute the workload 1730A. Legacy devices do not support these functions and are thus paired with orchestratable devices.

As a further example, FIG. 17B illustrates a scenario of orchestration with a legacy device 1780. Each orchestratable device (e.g., device 1750B) represents to the orchestration system the capabilities of the legacy system. When the orchestration system requests a workload on the legacy system, the paired device is responsible for causing execution of the function on the legacy device. This could take the form of a remote procedure call or custom API. As a result, the orchestration engine 1720B is able to match and deploy appropriate workloads to the device. For legacy devices, an agent on an orchestratable device 1750B paired with the legacy device 1780 is able to discover the presence of the legacy device 1780 and measure the capabilities of this legacy device (e.g., via an RPC mechanism). This information is then passed by the agent as telemetry 1740B to the orchestration engine 1710B. When the orchestration engine 1720B passes a workload 1730B for the legacy device 1780, the agent 1760B deploys it to the legacy device 1780 (e.g., via an RPC mechanism).

Accordingly, the wrapper mechanisms allow participation of both legacy hardware and software in modern IoT orchestration solution.

Orchestration technology typically provides scheduling and management of a flat set of resources. Resources being orchestrated may include compute (physical or virtual devices), networking (physical or virtual interfaces, links, or switching equipment), or storage capabilities (databases or storage devices). Orchestration may take the form of task (units of execution) orchestration, container orchestration, virtual machine orchestration, network orchestration, or storage orchestration. Or it may be all of these at once and take the form of end-to-end application orchestration.

FIG. 18 depicts a coordinated scenario of workload orchestration in a single-level orchestration environment. This single-level orchestration environment shows the scenario where all platforms participate equally in orchestration: Each node (e.g., nodes 1830A, 1830B, 1830C) describes its available resources to an orchestration engine 1820 (typically centralized, such as at an orchestrator 1810) that performs a scheduling function by sending telemetry, and the orchestration engine 1820 assigns a subset of the nodes to run portions of the overall application workload. Thus, as shown in FIG. 18, the various workloads (1821A. 1821B. 1822, 1823A, 1823B) are distributed to the various nodes 1830A, 1830B, 1830C, and executed with use of respective agents 1840A. 1840B. 1840C. This approach provides a flat orchestration structure and implies a minimum level of capability of the individual nodes 1830A, 1830B, 1830C, so that each node may participate fully in the orchestration process.

Orchestration may be made hierarchical, however, by separating it into various functions and functional operations. FIG. 19 depicts an example functional hierarchy of orchestration, illustrating how application orchestration

1910 provides a controlling, top level domain of orchestration. If end-to-end application orchestration is accomplished at the top level, the details of Network Orchestration 1920, Virtual Machine orchestration 1930. Task Orchestration 1940, and Storage Orchestration 1950 may be delegated to sub-orchestration modules. The sub-orchestrators may be used to determine how to optimize each sub-problem and configure the resources in each sub-domain.

FIG. 20 illustrates an example deployment of a generic hierarchical orchestration solution. The deployment in FIG. 20 depicts a generic hierarchy of sub-orchestrators 2040A. 2040B, 2040C, in which pools of orchestratable devices may be called upon to implement portions of the overall application.

In an example, each sub-orchestrator (e.g., 2040A-C) receives telemetry from orchestratable devices (e.g., 2050A-2050G) in a given pool of orchestratable devices. The telemetry indicates the resources available in that pool. The sub-orchestrator aggregates that telemetry and forwards it to the top-level orchestrator 2010. The top-level orchestrator receives telemetry from sub-orchestrators (2040A-C) which informs the top-level orchestrator 2010 of the total resources available in that pool. The top-level orchestrator 2010 then assigns a subset of the overall workload to that orchestration engine 2020 based on the telemetry. The sub-orchestrator in turn schedules a subset of the workload onto each orchestratable device in the pool. Note that while two levels of orchestration are used in this example, additional levels could be implemented.

In some scenarios, it may be possible for the orchestrator 2010 to oversubscribe the resources in one pool, under the assumption that resources may be shared across both time and space (between pools). In addition, a sub-orchestrator may be able to borrow devices from an underutilized pool to temporarily handle a surplus in load. For example, in the example of FIG. 20, if cluster 1 2030A becomes overloaded, one or more slaves could be borrowed from cluster 2 2030B or cluster 3 2030C.

While the approach depicted in FIG. 20 assumes that all devices are orchestratable, in reality, many of the orchestratable devices may be a very low cost microcontroller, with minimal memory and storage. Each group of perhaps hundreds or thousands of those low cost sensing solutions could in turn be controlled by a more capable device. To address this scenario, FIG. 21 illustrates an example of hierarchical orchestration, provided with use of slave nodes.

The scenario of FIG. 21 provides a similar approach as discussed in the hierarchical orchestration scenario above, where the Master Orchestration Device 2110 may represent the capabilities of many other slave nodes. Such capabilities might include, for example, the ability to sense from a particular sensor device, or the ability to perform computations with a specific FPGA part. The agent reports those capabilities up to the Orchestrator 2110, which assigns the workload to that individual Master Orchestratable Device. The master node, however, does not necessarily run that workload, but may instead farm it out to the slave nodes (e.g., nodes 2150A-2150H) that have the individual capabilities needed by the workloads. This process happens transparently to the Orchestrator 2110, which only cares that the work is performed.

To enable this master/slave relationship, a few simple primitives are implemented on the slave nodes, including: (a) detection, such that the presence of slave nodes must be detected by master nodes, and failure of a slave node (and thus a deployed workload) must also be detected; (b) discovery, such that the resources available on slave nodes must be discoverable by master nodes, and such information helps determine the type and number of workloads that may be deployed; (c) deployment, such that master nodes are able to deploy workloads on slave nodes (e.g., RPC, firmware deployment, etc.)

FIG. 22 illustrates an example workflow of a slave node for use in a hierarchical orchestration scenario. In an example, the node would wait to receive a discovery request (operation 2210) from the master orchestratable device leading its cluster. This node may be waiting in a lower power state during this time. The request may include some sort of cryptographic challenge, such as a nonce to be encrypted by the slave node. When the slave node receives this request, the slave node may send back some credentials (operation 2220) to prove that the node belongs to the cluster. For example, the node may encrypt the nonce with a private key and send back the result. The slave node may also send telemetry to the cluster leader in the form of a set of capabilities (operation 2230). The slave node will then await its instructions (operation 2240), presumably in the form of a workload to be executed. When the slave node receives a workload (operation 2250), the slave may need to reprogram itself (operation 2260), perhaps reflashing its programmable memory; after reprogramming, the slave node then may proceed with executing the workload (operation 2270).

Scheduling in a hierarchical solution may introduce complexity. For instance, the agent on the master nodes must be careful to properly describe the relationships between the resources that it represents so that the orchestrator does not incorrectly believe that those resources are actually collocated on the same node, when the resources are actually spread across many slave nodes.

The above hierarchical orchestration mechanism allows the creation of dynamic SDIS solutions that are more heterogeneous in nature, including to enable the use of components with limited (and inexpensive) resources that would otherwise not fully participate in orchestration. Further, this deployment allows a smaller number of IA based nodes (expensive resources) to be used as master nodes, providing the orchestration mechanisms for each cluster.

In a very large IoT framework, while the solution chosen by the orchestration in terms of what software to deploy on specific hardware components may be initially correct, this may change as over time. In addition, the overall capacity of the system must be monitored to ensure that the system is not running out of available resources. Thus, there is a need to monitor the overall solution for software and hardware issues such as CPU overload and take appropriate steps to solve it. The following techniques enable self-reliant and self-organizing orchestration that learns from failures and incorporates the feedback into better orchestration.

In a further example, control-loop-like checks and feedback mechanisms may be added to the orchestration approaches discussed above. Individual components, including software, networking, storage and processing may have built-in monitoring mechanism, or may require frequent polling to enable such management. This may be provided by expanding the orchestration layer, which tracks all available resources, to include tags of what operations are needed to monitor such as CPU, memory, delay in app response, app behavior, network delay, network bandwidth, specific hardware.

FIG. 23 illustrates an example configuration of a monitoring and feedback controller 2310, adapted for coordination and implementation of orchestration self-monitoring functions. In an example, the monitoring and feedback controller 2310 collects software data 2320, hardware data 2330, and network data 2340, from a variety of client nodes 2350, 2360. These client nodes 2350, 2360 in turn operate the orchestrated operations and workloads, under the direction of the orchestration server 2370.

In an example, the client nodes 2350, 2360 are monitored for hardware and software overload. For example, if CPU or memory of a device reaches 50% of capacity, the device may be monitored closely. If the capacity reaches 80%, the device may be swapped, or the workload may be migrated to one that better matches the executing workload. If there is a hardware dependency, then additional nodes may be added to take up software load. In a similar example, network traffic may also be monitored. If a significant amount of unknown traffic is seen or less traffic is seen than expected, the system may check the performance of client nodes. Such checks may also suggest hacking or loss in network connectivity.

The monitoring and feedback controller 2310 enable loop back to the managing server that dynamically controls the behavior. The feedback loop is not only meant for client nodes, but for servers as well. For example, the monitoring mechanism may monitor the performance of the server nodes, perhaps by watching network traffic between servers. If, for example, a gossip protocol that monitors server cluster health and ensures the elected leader is always available is consuming too much bandwidth, the protocol parameters could be dynamically modified to better suit the current number of servers, link conditions, and traffic level.

The monitoring and feedback controller 2310 may also incorporate logic to learn from failures. If a node fails consistently, there could be underlying hardware issue, and the node could be scheduled for maintenance. If there are many nodes failing in a particular physical area, the pattern may be detected, and the nodes may be scheduled for manual inspection. In further examples, nodes may monitor themselves for potential problems. For example, rather than requiring the monitoring solution to poll individual nodes to determine their health, each node may monitor itself. If, for instance, a node is running low on memory, it may report its condition to the central monitor.

Other aspects of self-monitoring and management may also be incorporated in connection with orchestration. The system may specify a repair schedule for individual nodes. Each node may be scheduled for service after a certain amount of operational time, at which point the node will be taken out of the set of nodes available for scheduling by the orchestrator.

In further examples, self-monitoring functions may also provide capacity planning. For instance, if the amount of networking or processing usage is nearing capacity, the operator may be notified to increase capacity. The system may help the operator to plan by specifying how many and what kinds of resources are required. For instance, the system could specify that additional nodes are required upon which tasks may be deployed and that those nodes should have a certain minimum memory and storage capacity. Such self-monitoring features allow an orchestration solution to be highly scalable and fit easily into an infrastructure.

FIG. 24 illustrates a flowchart 2400 of an example method for orchestrating devices in legacy settings. As shown, the flowchart 2400 includes a series of end-to-end actions for configuring and operating orchestration in a brownfield environment, with features of establishing communication with a legacy component, establishing an organized orchestration, and operating, monitoring, and adjusting the orchestration. It will be understood that the flowchart 2400 is provided at a high level for illustration purposes, and that the additional configuration and use operations described above may be integrated within the operational flow.

As shown, the flowchart 2400 includes operations to establish an orchestration shim to configure a legacy software module (operation 2410), communicate a configuration to legacy software module via orchestration shim API (operation 2420), and collect telemetry from legacy hardware device via an orchestratable device agent (operation 2430). Further configuration operations (including operations depicted and discussed in FIGS. 16A-17B) may include the configuration of an orchestratable hardware device and an orchestratable software module.

As also shown, the flowchart 2400 includes operations to organize a hierarchy of components (operation 2440), such as the configured legacy and orchestratable components. This organization may include organizing the components into various hierarchies (operation 2450), and performing detection, discovery, and deployment of various slave node components (operation 2460). Further detection and hierarchy organization (including operations depicted and discussed in FIGS. 18-22) may also occur.

As also shown, the flowchart 2400 concludes with operations to distribute the workloads to the various components in the hierarchy of components (operation 2470) (including with the operations depicted and discussed in FIGS. 18-22), based on telemetry and other configuration data from the components within the hierarchy. The flowchart 2400 further operates to permit self-monitoring and configuration changes, such as by collecting and monitoring software data, hardware data, and network data (including with the operations depicted and discussed in FIG. 23), among the components of the organized (hierarchical) orchestration (operation 2480); in response, an orchestrator, an administrator, or other entity may provide feedback and control to the various components of the organized orchestration (operation 2490).

Self-Descriptive Orchestration Components

In the development of an industrial solution, an engineer may design a solution as a graph of modules that may be deployed into an IoT system.

FIG. 25 illustrates an example industrial control application scenario, which specifically depicts the problem of maintaining the temperature of a tank of water 2530 by heating a surrounding oil jacket with a heater 2536. The temperature of the water and the temperature of the oil are monitored by respective sensors 2532, 2534 to control the process. A set of compute nodes 2520 may be available upon which the software modules may be deployed, some of which may be connected to the physical sensors and actuators in the system.

In this example, a control engineer might design a control system application 2510 to perform functional operations, such as to control the temperature as a cascade control loop made up of a graph of software modules that may be deployed on the available compute nodes. A sensor module may read data from the master sensor 2532, which reads the value from a sensor in the water. This value is fed to the input of a PID (Proportional Integral Derivative) controller module (e.g., a controller with one or more proportional integral, or derivative control elements), which attempts to meet a specific set point. The output of this PID controller is fed into a Scaling module, whose output establishes the set point of another PID controller. This second PID controller receives its input from a module that reads from the sensor in the oil (e.g., slave sensor 2534). The output of the second PID controller is sent to an actuator module that controls the heater element 2536. In an example, either PID controller may be a type of a controller incorporating proportional, integral, or derivative control (alone or in any combination), as part of any number of functional operations.

To properly deploy such a configuration, a control engineer describes the control application, as well as the functionality and operations within the control application. The following approach discusses a technique for defining a configuration of a language in which to describe the control system application. The following approach further discusses the use of self-describing modules upon which a control system application may be implemented; and an orchestrator that may utilize the language and the self-describing modules to deploy a working solution onto the compute nodes.

The following approaches specifically enable the use of self-configuring and self-describing modules, for an enhanced implementation of orchestration in the SDIS environments discussed herein. Self-describing modules, as discussed herein, allow better understanding of which platform resources are needed to deploy and makes orchestration easier by clarifying the requirements or constraints. Self-describing modules provide a separation of the self-description of modules, from the self-description of the end-to-end application. Self-describing modules also provide the ability to express multiple alternative implementations of a given software module and the ability to make tradeoffs between implementations. Such approaches may be implemented in an architecture for automatically evaluating tradeoffs between alternative implementations of modules and applications, thus helping a user to orchestrate an optimized application on IA (instruction architecture. e.g., x86, ARM) devices.

In the following examples, a module is a component of an application that an orchestrator deploys. A module has a module manifest that describes its input and outputs, requirements and other things (as shown in FIG. 13 and referenced in the example of Table 1). An application is made up a collection of modules with inputs and outputs connected together. An application is described using an application specification (as shown in FIG. 26 and referenced in the example of Table 2). In an example, this application specification is created by a user to define the end to end application. The application specification provides an input to the orchestrator, along with any applicable module manifests. The application specification also may be used to specify the modules, their interconnections, and any additional requirements that must be met in deploying those modules. Accordingly, the use of the module manifest and the application specification in this manner can achieve and implement the functional operations of the end to end application.

The notion of defining an end-to-end application for application deployment is attempted in many settings; however, prior approaches for orchestration are focused on IT considerations and do not provide a flexible approach for use in industrial systems. Such approaches do not look at an end-to-end application encompassing everything from edge devices to the cloud deployments. Further, prior orchestration systems have not allowed a user to express alternative implementations for a given software module, or provided a means for users to evaluate or express tradeoffs between alternative implementations. The following self-describing modules and self-describing language enable better understanding of which platform resources are needed to deploy, and thus makes orchestration easier and more accurate by clarifying appropriate requirements or constraints.

In an example, a SDIS implementation may be extended to provide a language in which the control system application is described, in addition to self-describing modules upon which the control system application may be implemented. From these two elements, an orchestrator may deploy a working solution onto respective compute nodes and resources. The techniques described herein thus provide mechanisms for (1) building self-descriptions for orchestratable modules to separate an end-to-end application from the individual modules, (2) allowing a system to dynamically select between alternative implementations of modules to deploy, and (3) allowing a system to reason about which alternatives are best in different situations.

FIG. 26 depicts an overview of a control application as represented by an example control application graph 2600, represented at the level of sensors and actuators. As shown, the control application is defined by a control engineer as a graph of software modules in which the outputs of each module (e.g., outputs from Sensor A 2610, and Sensor B 2620) are connected to the inputs of other modules (e.g., inputs into Actuator C 2640, and PID controller 2630). The control engineer may also specify other factors, such as starting values for module parameters. The control engineer may find these software modules in a software library or request that custom modules be implemented by an IT department. In an example, this graph may be defined through use of a graphical user interface, or other visual-based representation. For instance, the example control application graph 2600 may be defined by the control engineer to reflect inputs, outputs, and controllers of an industrial system. The example control application graph 2600 may reflect connections of a physical system, and be used to accomplish the various functional operations (and real-world changes, measurements, and effects) of the control application.

FIG. 27 depicts an example software module definition for implementation of a self-descriptive control application, such as the control system module (a PID controller 2710) depicted in FIG. 26. In an example, the code for this software module is written with several assumptions, including that the module does not know what node it will be deployed on, and the module may communicate with neighboring modules via a set of named interfaces.

Interfaces may be directional to allow for connection-oriented protocols (which often have a client and server endpoint), which are often established in a directional manner, but do not necessarily refer to the direction of data flow (which could flow in either or both directions).

In a further example, the code for this module has requirements (e.g., network requirements 2740) for the channel over which it will communicate with neighboring modules (bandwidth, latency, jitter, etc.). However, the module does not know what modules it will be communicating with or what node those modules will be deployed to. The module does not know the communication parameters for its communication endpoint or the other communication endpoint. The module may require a certain amount/kind of processing resources, memory resources, and storage resources, and may require other hardware and software dependencies (libraries, instruction sets, chipsets, security co-processors, FPGAs, etc.). Further, the module may allow a set of named starting parameters (e.g., parameters 2720) to be specified.

OS, RAM, storage, processing) (e.g., requirements 2750); (d) dependencies (e.g., libraries, hardware, input signals, etc.) (e.g., dependencies 2730); (e) deployment requirements (security, isolation, privacy, orchestration style); or (f) a signature (e.g., signature 2760) of the code module.

An example Module Manifest for the control system application and the module executed in FIG. 27 may be represented by the following definition:

TABLE 1

```
{
    "Name": "PID Controller",
    "SchemaVersion": "0.1",
    "Version": "0.1",
    "Description": "An example PID Control Module",
    "OrchestrationClientApiVersion": "0.1",
    "ModuleType": "Software",
    "Runtime": "java",
    "RuntimeOptions": {
        "Isolation": "true",
        "Jar": "local/ PIDController.jar",
        "Class": "Example.PIDController ",
        "Artifact": "http://repo/PIDController.jar",
        "ArtifactOptions": {
            "checksum":
"1CDAE234F132D52EAB354325DF235234A53AB24523453245E2345324543ABD2C"
        }
    },
    "Constraints": {
        "Software": "DDSLibrary"
    },
    "Parameters": {
        "pGain": "0.1",
        "iGain": "0.3",
        "dGain": "0.0",
        "mode": "AUTO"
    },
    "Resources": {
        "CPU": 30,
        "MemoryMB": 10,
        "StorageMB": 2
    },
    "Endpoints": [
        {
            "Name": "input",
            "Endtype": "pubsub",
            "DataType": "DDS/ContinuousVariable"
        },
        {
            "Name": "setpoint",
            "Endtype": "pubsub",
            "DataType": "DDS/ContinuousVariable "
        },
        {
            "Name": "output",
            "Endtype": "pubsub",
            "DataType": "DDS/ContinuousVariable "
        }
    ]
}
```

To make this code self-descriptive, a module developer may create a module manifest for use with the software module, with the module manifest being used to identify and describe the key characteristics of the control environment for execution of the software module. In an example, the characteristics may include features such as: (a) communication interfaces (of the PID controller 2710), including a name of each interface, type (client, server, pub/sub), protocol (dds, opc-ua, http), or QoS requirements, if any; (b) parameters and default starting values (e.g., control parameters 2720); (c) platform requirements (e.g., instruction set, In a further example, a control engineer may utilize a library of one or more software modules to create or define a control system application. For instance, a graphical user interface (GUI) may be used to design a graph of the control system application (e.g., similar to the control application graph depicted in FIG. 26). The GUI may utilize the module manifest to indicate the details of each code module and illustrate how the respective code modules may be connected to each other. Further, a user may utilize drag and drop and other graphical indication methods to select appropriate modules and connect and configure them to design a graph similar to the control application graph depicted in FIG. 26.

The results of this information, compiled into an application specification for a control system application, may be encoded into an application specification format resembling the following example:

TABLE 2

```
{
    "Name": "PID Control Loop",
    "SchemaVersion": "0.1",
    "Version": "0.1",
    "Description": "An example PID Control Loop",
    "Type": "persistent",
    "Modules": [
        {
            "Name": "Sensor A",
            "Module": "Sensor Reader",
            "checksum": "325DF23524A53A
            BD2C1CDAE234F132D52EAB3543B24523453245E234
            5324543A ",
            "Constraints": {
                "WireID": "Temp1TankA"
            },
            "Resources": {
            },
            "Parameters": {
                "sensitivity": "0.2",
                "frequency": "0.2"
            },
            "Endpoints": [
                {
                    "Name": "output",
                    "Link": "inbound",
                    "Type": "DDS/ContinuousVariable"
                }
            ]
        },
        {
            "Name": "Sensor B",
            "Module": "Sensor Reader",
            "checksum": "325DF23524A53A
            BD2C1CDAE234F132D52EAB3543B24523453245E234
            5324543A",
            "Constraints": {
                "WireID": "Temp2TankA"
            },
            "Resources": {
            },
            "Parameters": {
                "sensitivity": "0.2",
                "frequency": "1"
            },
            "Endpoints": [
                {
                    "Name": "output",
                    "Link": "setpoint",
                    "Type": "DDS/ContinuousVariable"
                }
            ]
        },
        {
            "Name": "My PID Controller",
            "Module": "PID Controller",
            "checksum":
            "1CDAE234F132D52EAB354325DF235234A53AB2452
            3453245E2345324543ABD2C"
            "Constraints": {
            },
            "Resources": {
            },
            "Parameters": {
                "pGain": "0.2",
                "iGain": "0.2",
                "dGain": "0.1",
                "mode": "AUTO"
            },
            "Endpoints": [
```

TABLE 2-continued

```
            {
                "Name": "input",
                "Link": "inbound",
                "Type": "DDS/ContinuousVariable"
            },
            {
                "Name": "output",
                "Link": "outbound",
                "Type": "DDS/ContinuousVariable"
            },
            {
                "Name": "setpoint",
                "Link": "setpoint",
                "Type": "DDS/ContinuousVariable"
            },
        ]
    },
    {
        "Name": "Actuator C",
        "Module": "Actuator",
        "checksum":
        "B423E423513366BBA2354325DF235234A53AB24523
        453245E2345324543ABD00"
        "Constraints": {
            "WireID": "Heater1TankA"
        },
        "Resources": {
        },
        "Parameters": {
            "sensitivity": "0.2",
            "frequency": "0.2"
        },
        "Endpoints": [
            {
                "Name": "input",
                "Link": "outbound",
                "Type": "DDS/ContinuousVariable"
            }
        ]
    }
    ],
    "Links": [
        {
            "Name": "inbound"
        },
        {
            "Name": "outbound",
            "AssignedChannel": {
                "Name": "PIDControlOutput"
            }
        }
        {
            "Name": "setpoint"
        }
    ]
}
```

An application specification defined in this manner allows a control engineer to: select a set of modules to use, specify values for parameters beyond any default values, specify any additional constraints or resources beyond those specified by the module itself, and specify the manner in which the modules will be linked together. In addition, the application specification may assign specific parameters to links, such as assigning a topic name to a publish/subscribe channel, or assigning a port number to a server endpoint (making a communication endpoint accessible from outside of the application).

In an example, an application specification may also specify alternative implementations for the same functionality in an application (e.g., with each version of the functionality implemented by a different module). Consider for example, two versions of a module that implement the same functionality for two different hardware architectures. A module writer could specify these alternatives in a Module Manifest, such as indicated in the following example:

TABLE 3

```
"Implementations": [
    {
        "Runtime": "raw",
        "RuntimeOptions": {
            "Isolation": "true",
            "Package": "local/ PIDControllerr",
            "Executable": "Example.PIDController ",
            "Artifact": "http://repo/ARM/PIDController",
            "ArtifactOptions": {
                "checksum":
"1CDAE234F132D52EA4A245E2345324543ABD2C"
            }
        },
        "Constraints": {
            "Software": "DDSLibrary",
            "Architecture": "ARM"
        },
    },
    {
        "Runtime": "raw",
        "RuntimeOptions": {
            "Isolation": "true",
            "Package": "local/ PIDControllerr",
            "Executable": "Example.PIDController ",
            "Artifact": "http://repo/x86/PIDController",
            "ArtifactOptions": {
                "checksum":
"1CDAE234F132D52EA4A245E2345324543ABD2C"
            }
        },
        "Constraints": {
            "Software": "DDSLibrary",
            "Architecture": "x86"
        },
    }
]
```

In another example, a control engineer could specify these alternatives in an Application Specification as follows:

TABLE 4

```
"Modules": [
    {
        "Name": "Sensor A",
        "Implementations": [
            {
                "Module": "x86 PID Controller",
                "checksum": "325DF23524A53A
                BD2C1CDAE234F132D52E2345324543A "
                "Constraints": {
                    "Architecture": "x86"
                }
            },
            {
                "Module": "ARM PID Controller",
                "checksum": "325DF23524A53A
                BD2C1CDAE234F132D52E2345324543A "
                "Constraints": {
                    "Architecture": "ARM"
                }
            },
        ]
    }
]
```

In this example, the orchestrator may deploy on nodes of either of these two architectures (x86 or ARM), meeting either of these two constraints, by picking the appropriate software module implementation.

The use of self-descriptive module characterizations may be applied to other kinds or types of resources. For example, such self-descriptive characterizations may be applied in cases where an algorithm could be implemented on a general-purpose CPU, a GPU, or an FPGA. In this case, scoring may also be provided in the app or module specification to indicate which module is preferred. The scoring may be both algorithm-specific and data/application-specific and thus requires some knowledge on behalf of the developer or control engineer. Further, the use of scoring may enable a control engineer to optimize a selected control application by leveraging software modules that have been optimized for specific IA hardware platforms (e.g. FPGA or neural network processor (NNP)), as available.

The use of self-descriptive module characterizations may be further generalized to consider more general resources. For example, a first version of an algorithm that is optimized for memory resources while a second version of the algorithm may be optimized for storage resources. In this scenario, the first version has small memory resource requirements and larger storage requirements, whereas the second version has large memory resource requirements and small storage requirements. The orchestrator may choose a module based on the resources available on the available set of nodes. In addition, scoring may help determine which module is preferred, when other factors are not constrained.

The use of self-descriptive characterizations may also be applied in the case of node affinity. For example, a case in which Module A is to be deployed on Node A with preference level N, while Module B is to be deployed on Node B with preference level M. If N indicates higher preference than M, then the system will attempt to deploy Module A to Node A if it is available, and Module B to node B otherwise.

One of the challenges with self-descriptive characterizations, however, is that a control engineer may not actually know which version of a given software module most effectively performs a certain application function, or even what criteria may be used with the software module to produce the best end-to-end results. The control engineer may only observe objective results (e.g., what solution "seems the most responsive."). With many combinations of software modules, criteria, and options, a framework may be used for testing which combinations of system modules and alternative implementations are effective.

FIG. 28 depicts an architecture for automatic evaluation of software module alternative implementations. Specifically, the architecture of FIG. 28 provides a framework for emulating various combinations of modules from an application specification and characterizing the result. Various data from a user's application specification and module manifests 2820 are provided to the system. The system may have access to all of the module images, stored in a module image repository 2810. There may be several alternative implementations of each module.

In an example, a series of experiments are executed and evaluated on various combinations of these implementations. The experiments may be controlled by a characterization controller 2830, which would ensure that the various combinations are executed. The experiments would work with an orchestrator 2840, which is responsible for deploying the modules as specified in the application specification and module manifests 2820 onto a set of emulators 2850. The emulators 2850 simulate the hardware as defined by a given alternative specified in the application specification or module manifest 2820 (e.g., a particular FPGA or a CPU with a certain amount of available memory). The orchestrator 2840 will deploy the app, interconnect the components, and run the app. Then the system will automatically score the system, based on some criteria (e.g., end-to-end latency) with scoring 2860, or the user will score the app based on subjective criteria ("feels snappy"). Finally, the system will reason about the various combinations, and determine the best combinations to use, such as by utilizing a decision tree-based approach.

FIG. 29 illustrates a flowchart 2900 of an example method for evaluating alternative implementations of software modules, further to the example depicted in FIG. 28. In the flowchart 2900, an optional precondition includes operations to determine the configuration of applications and modules as operational within a system, using application specification and module manifest information (operation 2910). This precondition may be performed as a one-time event or on a repeated basis.

The operations of flowchart 2900 continue with the definition and execution of respective orchestration scenarios via a characterization controller (operation 2920), which is used to execute an application module with one or more defined options in a simulator (e.g., an emulator configured according to specific hardware settings) (operation 2930). With the simulator, various modules and various module options may be executed, including the use of alternative application modules with one or more defined options in the simulator or another simulator configuration (operation 2940). The execution of alternative application modules may repeat for a plurality of the various software modules and a plurality of options.

The operations of flowchart 2900 continue with the evaluation of the results of the application module execution (operation 2950), based on defined performance metrics or criteria. The execution scenarios for the one or more application modules are then scored (operation 2960), ranked, or further evaluated, with automated or human-influenced scoring processes. Based on the scores, various execution scenarios of the application modules may be incorporated or updated (operation 2970).

FIG. 30A illustrates a flowchart 3000A of an example method for defining an application using self-descriptive orchestratable software modules.

The method begins with operations that define which software modules or application capabilities are selected and utilized as part of an application orchestration. These operations include the creation of a module manifest (operation 3010A), with the module manifest used to describe respective characteristics for an orchestrated execution of modules of a control system application (e.g., an industrial control application in an SDIS). Further module definition operations also include defining of respective options and alternatives for operation of the various software modules (operation 3020A), and the defining of resource criteria for operation of the various software modules (operation 3030A). The operations also include the definition of a specification for the application (operation 3040A), based on a definition of the respective software modules, and the connection requirements and conditions for features available within the respective software modules. Such definitions may include the various operations discussed above with reference to FIGS. 26 to 28.

The flowchart 3000A continues with the emulation and evaluation of various software modules, such as in one or more simulated application setting(s) (operation 3050A) as discussed above with reference to FIG. 29. The output of the emulation may include priorities or other attributes for various implementations of a module. From this evaluation, specific combinations of software modules and options (priorities, and other attributes) for execution of such software modules may be selected (operation 3060A), and these combinations may be deployed in orchestrated application settings (operation 3070A). Such priorities and options may be used to inform the orchestration process, when combined with the constraints and properties of the physical system.

FIG. 30B illustrates a flowchart 3000B of an example method for using self-descriptive orchestratable software modules in a SDIS system implementation. In an example, the operations of the flowchart 3000B are performed by an orchestration device, for an orchestration device (an orchestrator) that is operably coupled to a plurality of execution devices in the control system environment to execute software modules. With this configuration, the execution of the selected software module via at least one execution devices effects functional operation of one or more control devices in the control system environment. Additionally, the orchestration device (the orchestrator) may coordinate the execution of the selected software module with an orchestration control strategy within the control system environment.

The flowchart 3000B begins at 3010B with an optional precondition to create module manifests and an application specification that lists required system characteristics. The operation 3010B may be performed manually or via automated/computer-assisted features. This module manifest is used by the following process to define an environment for software modules to perform a control system application.

The flowchart 3000B also continues at 3020B with an optional precondition to generate an application specification for the control system application, which includes matching module information and system characteristics (including parameters, values, and the like, for execution). For instance, the application specification for the control system application may define values for control parameters of the selected software module, including indicating relevant connections or relationships between software modules or functions.

The flowchart 3000B continues at 3030B to identify available software modules, and at 3040B to identify characteristics of the control system or control system environment from the module manifest. In an example, operational aspects of available software modules that can perform particular functional operations in the control system environment are identified. The operational characteristics of the system that are identified in the module manifest may relate to relate to one or more of: communication interfaces, starting parameters, platform requirements, dependencies, deployment requirements, or a signature.

The flowchart 3000B continues at 3050B with operations that select one or more matching software modules based on the available software modules and the system characteristics. For instance, this selection may be based on the matching of operational aspects of the available software modules with the identified operational characteristics of the system that are indicated in the module manifest.

The flowchart 3000B concludes at 3060B with operations that perform the control system application, including the execution of relevant software modules, according to the values and characteristics of the application specification. Finally, the flowchart 3000B includes operations at 3070B which allow the evaluation of execution (or simulated execution) of the relevant software modules, which allows further adjustment and feedback for the manifest or application specification. For instance, the evaluation may include evaluating the execution of the selected software module in the control system environment using at least two different hardware architectures; and performing an efficiency measurement of operations executed with the at least two different hardware architectures. Other types of execution characteristics or deployments may also be evaluated.

In various examples, the control system application may be displayed and modified with use of a visual representation displayed in a graphical user interface. For instance, the visual representation may be used to establish relationships of one or more inputs or outputs to the control system application, including for inputs or outputs involving the use of one or more sensor, actuator, or controller.

Sensor Bus Redundancy

A sensor bus may have redundancies, such as using a Multi-Layer Field Device Redundancy in a Distributed Control System. Traditional industrial control systems implement a Programmable Logic Controller (PLC) as a key ingredient to control factory operations. A single PLC may communicate and control hundreds of field devices and run control algorithms like Proportional, Integral, Derivative controllers. Due to the consolidated nature of the PLC, if the PLC fails, data from all downstream field devices becomes unavailable and the control functions being executed on the PLC stop. A simple method to enable complete resiliency of the industrial control system is to deploy a fully redundant environment. However, buying two of everything is costly and creates many logistical challenges.

In the systems and methods described herein, a field device abstraction bus (e.g., Ethernet) is used, which decouples the physical and functional requirements, and improves scalability and may expand possible industrial architectures.

Solving manufacturing process reliability and survivability. The field device abstraction bus enables any wired Controller node in a distributed control environment to communicate with any wired field device. This "any to any" control architecture may have improved survivability by enabling a healthy control node to assume the acquisition and control responsibilities of a failed control node. The healthy control node may be a control node with existing control responsibilities or a "surplus" control node, inserted into system to improve survivability.

Expanding data availability. In existing systems, which are often proprietary and have implement tightly coupled functions, data is not often freely available due to interoperability limitations. The implementation of a field device abstraction bus makes raw field data available to any authenticated consumer.

Previous solutions and architectures have focused on consolidating capabilities into tightly coupled single devices, exacerbating the 'single point of failure" problem. Therefore, field devices data does not sit on a "bus" whether it be physical or virtual. Only the host computer (PLC) has access to the real-time field device data and if the host computer (PLC) fails, access to the downstream field device data is unavailable.

The systems and methods described herein include a multi-layered field device redundancy bus, which enables an "any to any" relationship of Controllers to Field Devices. The decoupling of Controllers and IO enables simple failover and redundancy.

Improved system reliability and survivability are achieved by enabling any controller to access any field devices in the event of controller failure. Decreased system cost may also be a benefit, such as by adding a new field device based on a small incremental investment instead of a heavy PLC burden.

FIG. 31 illustrates a PLC Based Industrial Control System according to an example.

Benefits of the Multi-Layer Field Device Bus (MLFDB) described herein may be understood by comparison to a simplified traditional deployment based on the Programmable Logic Control (PLC). The most common method to implement a control strategy is through the use of a PLC, which integrates the control function, IO interfacing and network access into a single device as shown in FIG. 31. A single PLC may be highly expandable, such that a user may plug in many IO modules to expand the quantity of field devices in the control system. Although the PLC has served the industrial control system market very well for decades, there are a few limitations to this approach. First, if the PLC becomes inoperable, then access to the field devices and control functions are unavailable. For reliability, the industry solves this by buying two PLCs and two of each field devices. However, this method of redundancy is costly from a size, money and power perspective. Second, making small incremental changes to the infrastructure may require heavy investment as a new PLC may be required. In FIG. 31, in each PLC there are y number of IO modules, where y is a finite number. The value of y may be based on PLC Vendor/Model and may range from 5 to 100, for example.

FIG. 32 illustrates a Multi-Layer Field Device Bus (MLFDB) according to an example.

The MLFDB may differs from the traditional PLC based deployment in that the Control Functions are completely decoupled from the Field Device 10, see FIG. 32. The decoupling of the Control Functions and IO enables an "any to any" relationship of Controller to IO, which is the key capability to increase system reliability. FIG. 32 shows that each of the Control Function may access the data coming from any of the connected Field Devices, likewise each control function may control any of the connected field devices. This "any to any" relationship increases system reliability with built in fail-over of control functions. For example, assume Control Function 1 reads data from Field Device 2 (a level sensor), performs a calculation and adjusts the output value to Field Device 1 (a pump). If the device, hosting Control Function 1 malfunctions, the process of Control Function 1 may be executed on another device with access to the Field Device Bus. This is possible because the field devices are still accessible on the Field Device Bus.

FIG. 33 illustrates IO Converter Functions according to an example.

The Field Device Bus includes an IO Converter. The IO converter is an individually addressable device which translates Field Device IO to the protocol of the Field Device Bus. As shown in FIG. 32, there is a physically small, high reliability IO Converter directly attached to each field device. The IO Converters may range in quantity from 1 to n, where n is constrained by the physical environment of the operations. A high level view of the IO Converters functions in a stacked view are shown in FIG. 33.

The IO Converter is responsible for the following functions:

Electrical interface to the Field Devices: Interface from IO Converter to Field Device, which may be anything from 4-20 mA Analog In/Analog Out, 24 VDC Digital IO, serial interface or an Ethernet based protocol. This design implementation of this interface may determine the SKU of the IO converter. For example, IO Converter SKU 1 may be a 4-20 mA analog out or analog in. SKU 2 may be a Discrete Output for a high current relay.

Field Device Protocol: This Function encodes/decodes command, control and data into the appropriate format required to communicate with the downstream field device. For example, assume the downstream field device is a Modbus slave. This function would encode READ requests conformant to the Modbus protocol, and send the request to the field device.

Abstraction: The Abstraction function translates commands and data specific to the field device to a human readable format (as defined by the data model). For example, say the IO converter is connected to a PUMP which communicates over a 4-20 mA analog interface and the control system wants to set the flow rate to 10GPM. This function will translate the 10GPM request to an electrical current setpoint to the corresponding milliamp value. Conversely, when data is coming from a Field Device in a format specific to the field device.

Information Modeling: This function models the data per a schema defined by the system operator (e.g., Haystack).

The Field Device Bus Protocol Layer may be compliant to an industry protocol for transportation of modeled data. For example, a Data Distribution Service (DDS), OPCUA, or Profinet protocol.

Electrical Interface to the Field Device Bus. The electrical interface may include an Ethernet, PCI, Profinet, a proprietary bus technology, or the like.

Provisioning Function: Layer is a discovery layer which detects the identity of the downstream field device. The detection service may be built into the native Field Device Protocol (e.g., HART) or it may need to be added as an additional discovery service. Either way, the Provisioning layer, represents the identity of the downstream connected Field Device.

The Operational Mode & Resource Status layer is responsible for reporting health and status to an orchestration system. Health and Status data includes local resource utilization, workload state, unique module attributes and mode of operation.

Examples of local resource utilization may be CPU loading, memory utilization, storage, page misses, errors, or the like for reliable operation.

Workload state would capture the status and health of running processes, crashed processes may trigger an alarm by which the orchestration system may initiate a fail-over condition.

Unique module attributes consists of artifacts like the IO Converter's Unique Identifier (may be hardware based), IP address, MAC address, or certificates.

Operational mode refers to the IO Converters role in a redundant system. For instance, an IO Converter may be placed in hot-standby mode or may be placed in primary mode. Additionally, an IO converter may be placed in a mode which electrically isolates itself from the Field Device, such as enabling a peer IO converter to physical connect to the field device.

Agent: An agent resident on the IO Converter brokers configuration parameters for the various IO converter functions.

The Field Device Bus shown in FIG. 32 or FIG. 33 is not specific to a particular bus technology and may be instantiated with many different technologies. For example. Ethernet may be used, based on the pervasiveness of Ethernet based devices increasing in the industrial control system space. An Ethernet-based Field Device Abstraction Bus has the advantage of increasing the accessibility of the Field Devices to a wider range of systems. However, to maintain reliable and deterministic capabilities, an Ethernet based Field Device Abstraction Bus may require the integration of Time Sensitive Networking (TSN). The integration of TSN may enable an Ethernet based Field Device Abstraction Bus to match the reliability and timeliness of Profinet or Ethercat based systems.

FIG. 34 illustrates an IO Converter Redundancy according to an example.

Multi-layer redundancy may be used to address the situation when the IO Converter connected directly to the Field Device Fails. To mitigate this scenario, multiple IO Converters are added to the Field Device Bus, and physically wired to single Field Device (in a multi drop configuration) as shown in FIG. 34. Each of the IO converters has 1.x switched outputs, where only 1 output may be actively driven at a time. This enables IO converter redundancy as controlled by an IO Converter Mode Controller. The orchestration system may monitor the health and status of each IO converter of switch the output on/off accordingly. The IO Converter Mode Controller may change which IO converter controls which Field Device.

FIGS. 35A-35B illustrate a flowcharts 3500A-3500B of methods for implementing a MLFDB according to an example.

Flowchart 3500A includes an operation 3510 to receive, at an IO converter, data from a field device (e.g., a sensor). Flowchart 3500A includes an operation 3520 to convert the data from the field device according to a field device bus protocol. Flowchart 3500A includes an operation 3530 to send the converted data to a field device abstraction bus. Flowchart 3500A includes an operation 3540 to receive a control signal from a control device via the field device abstraction bus. Flowchart 3500A includes an operation 3550 to send an electrical signal to the field device based on the control signal.

Flowchart 3500B includes an operation 3560 to receive, at a sensor bus, data from a plurality of field devices (e.g., a sensor) via a plurality of corresponding IO converters. Flowchart 3500B includes an operation 3562 to send the data to one or more control functions. Flowchart 3500B includes an operation 3564 to receive one or more control signals from the one or more control functions based on the data. Flowchart 3500B includes an operation 3566 to send the one or more control signals to respective IO converters of the plurality of IO converters. Flowchart 3500B includes an optional operation 3568 to receive information from an IO converter mode controller. Flowchart 3500B includes an optional operation 3570 to facilitate allocation of IO converters to field devices according to the information received from the IO converter mode controller.

Dynamic Alarming in Industrial Systems

Industrial control systems rely heavily on alarming in supervisory mode as guard rails for operation of machines. In many cases, these alarms are created based on human knowledge and understanding of the system. As a result, the alarms are less than optimal. A typical system will be initiated by a control engineer with many alarms for all conditions that are considered either sub-optimal or detrimental of the system. For example, alarms are created for voltage values that below or above a certain threshold. Alarm in control systems are often created for 1 of the following 3 reasons:

Safety (personnel and environment)
Equipment integrity
Quality control

However, one of the problems in alarm management is that these alarms are created by humans and are often prone to alarm over things that might not be important. Or even worse, alarms are often redundant since multiple alarms could be generated by the same physical incident; this is often referred to as alarm flooding.

Current alarm systems rely heavily on human generation and input. As a result, they tend to suffer from over-assignment. This is easily seen in the cases of alarm flooding when tons of alarms get generated, and are often distracting, in the event of a factory failure.

Existing solutions tend to overproduce alarms which is risky and may result in alarm fatigue. This alarm generation is the result of over-generating of false positives for detecting situations that are problematic in control systems. If the alarms are resulting in a large number of events, it may also potentially over-complicate analytics that are designed to use these events for other applications such as anomaly detection.

The systems and methods described herein manage alarms using a smart machine learning approach. The systems and methods described herein may:

Characterize the data in order to detect anomalies which may trigger alarms;

Cluster alarms using either data similarity or common causality so that they are presented as one bundle to combat alarm flooding and fatigue; or Understand human responses to alarms in order to automate those actions in the future.

FIG. 36 illustrates an example of a process with generated alarms according to an example.

In an industrial system, data is often generated by different modules and sensors. The data is the basis for alarm generation. In its most basic form, an alarm is generated based on a condition, such as sensor data traversing a threshold. For example, if a physical process is connected to a power meter, the control engineer may know that if the equipment (collectively) draws more power than the circuit may handle, that an alarm may be raised for human intervention. The alarm may go through multiple levels of escalation. For example, initially, an alarm is raised, but if the power consumption continues to rise then an additional alarm is generated and power is shutdown from the system. The latter case may be undesirable since it may incur cost associated with loss of productivity and man-hours in order to restore the process to an operating state.

Alarms may have a cascading effect. For example, when a first process is down, the next process along the factory line is stalled which may, in turn, raise one or more alarms. An operator, all of a sudden, may find themselves with an alarm flood. Determining which alarm they should respond to and how, may often be tiring and require further analysis and expertise.

The systems and methods described herein use machine learning to assign alarms, cluster alarms, or propose response actions.

FIG. 36 shows a physical process with examples of alarms generated by the system.

These alarms may at include one or more of the following data fields:

Type of alarm
Physical process generating the alarm
Alarm criticality
Timestamp
Possible flags or causes of alarm
User(s) flagged as alarm recipient
Possible action desired to reset or resolve the alarm The data may be sent to a central location that may be then routed to an HMI screen, a user's mobile device, or a repository for analysis and archival.

In the systems and methods described herein, a user may create an alarm. These alarm configurations may then be saved and analyzed. Based on the data, context, and alarm configurations, additional alarm recommendations may be presented to the user. For example, if an alarm is created for electric meters with metadata indicating that they are on the factory floor.

Using the metadata (and information model) of the factory, other devices are analyzed for similarities to these created alarms and their corresponding physical devices. In addition, the type of data generated by these devices and streams that may trigger the alarms are fed into the similarity module.

FIG. 37 illustrates Dynamic Smart Alarms according to an example.

The system of FIG. 37 includes a data profiler that may be referred to as the Data Signature Manager. This module may use machine learning to determine stream similarities. Some of these similarities may be based on individual streams or as correlation among streams. For example, a liquid level sensor stream may be determined similar to another liquid level sensor that is being generated from a similar physical process. The physical processes may be deemed similar based, for example, on the following:

Metadata of the physical process;
Number and type of streams associated with the same physical process;
Cross-correlation among the different streams of the same physical process; or
Similarity in types and frequency of the streams from the different processes.

For example, when the first physical process has 20 streams and 3 of them are liquid level and 2 are liquid flow, and a second physical process has 21 streams with 3 liquid level and 2 liquid flow, then the 2 streams may rank high on the similarity scale (same number of liquid level and liquid flow, only a difference of 1 stream).

The Data Signature Manager feeds its output to the Dynamic Smart Alarm system. The Dynamic Smart Alarm system acts as a triaging unit identifying potential processes that need their alarms to be adjusted based on existing alarms of similar systems.

The Dynamic Smart Alarm system may be comprised of 3 components:

Alarm Generator: In this module, some pre-alarms are pre-loaded or created by default. These may be human created explicitly or based on a requirement. For example, the power consumption on a certain circuit should never exceed a certain threshold. This module is responsible for generating, editing, or removing alarms. This module uses the output of data similarity in order to decide whether to create, or suggest an alarm. It may create a score for the need for a specific alarm. The alarm generator may create the alarm automatically in a case where the score is very high. However, if the score is moderate, the module may, for example, ask a human operator/expert for input before creating such an alarm. It is also the job of the Alarm Generator to tag alarms as similar, related, or independent. This tag is used by the next module when multiple alarms are being generated.

Alarm Management/Clustering: this module keeps track of the association among the alarms. It may use the tag created by the Alarm Generator. It may also expand on the tag by watching data coming from the actual alarms. The alarm management ay watch the different alarm outputs in order to detect either correlation or a sequence of events. It may run both types of analytics on the data.

The correlation may determine that 2 events are highly correlated and that they may be clustered together. For example, a specific physical process may have 5 different alarms in order to alert for different events. However, if the system is down for a hard failure then all alarms may get activated simultaneously or within a short period of time. These events are then highly correlated and may be clustered to minimize alarm flooding and fatigue. The module may also use the metadata of the alarms and the system they are covering in order to create a meaningful reason to cluster components. Using the same example as above, the 5 different alarms may have the metadata of the physical process associated with them. So these 5 may be collapsed with "Level Tank process, second floor, West, Zone 3". In addition, clustering may use the data in the alarms themselves for meaningful explanation.

FIG. 36 shows examples of what an alarm may contain. The data may be aggregated and the result may say "Level: critical, Cause: power too high". This clustering may use techniques from Natural Language Processing (NLP) for the creation of these meaningful descriptions. Many of the descriptions may be human generated and may differ slightly when describing the same kind of failure, and the NLP may be used to adjust or group those that differ slightly. In an example, if alarm X notices it forwards to system Y, and then system Y causes a user to select a reset, then might as well just reset at alarm X. First the system of FIG. 37 may proceed slowly, suggesting reset after X, then over time, just reset without asking.

This module may also model alarm sequence as a state machine. For example, the module may notice that when process 1 fails, the probability of failures reported in process 2 are very high. Similar techniques may be used in predictive maintenance where a sequence of events are modeled using state machine with probabilities assigned to the edges representing transitions. This allows the algorithms to predict that a State S2 could happen if the system lands on State S1 and the transition between S1 and S2 has a high probability edge. This feature may allow the module to predict that another set of alarms are about to be fired and may potentially notify a user ahead of time. The relationship between or among alarms may be shown before or after the events take place.

The Alarm Output Manager: this module is used to move the system into autonomous operation. Initially, this module may have no policies or some simple transcribed ones. It may then monitor the user actions when alarms are being generated and dealt with. If a set of alarms tend to be ignored, this module may learn over time that these alarms are not meaningful and may potentially be given low priority or even deleted. Deletion may not happen without human approval, in an example. In addition, the module may watch and record other events. For example, a human operator may attempt several courses of action when an alarm is raised. The course of action may include: change configuration of a parameter, reset a module, restart part of the system, etc. This sequence may be avoided, for example by using the Alarm Output Manager to further characterize specific features of the failure or determine that indeed a restart of the system is needed, for example, or that a simple module reset may be used. In addition, when confidence in the system is increased, it may take these actions by itself. In an example, initially the options may be presented as recommendations to a human operator.

FIG. 38 illustrates a flowchart of a method for dynamic alarm control according to an example. Flowchart 3800 includes an operation 3810 to save information about a plurality of alarms of an industrial control system. Flowchart 3800 includes an operation 3820 to analyze data, context, and alarm configuration for the plurality of alarms from the information. Flowchart 3800 includes an optional operation 3830 to recommend a change to one or more of the plurality of alarms or recommend a new alarm. Flowchart 3800 includes an operation 3840 to determine alarm stream similarities from the information. Flowchart 3800 includes an operation 3850 to detect an alarm event at two or more alarms. Flowchart 3800 includes an operation 3860 to prevent the two or more alarms from issuing. Flowchart 3800 includes an operation 3870 to generate a clustered alarm for the two or more alarms prevented from issuing.

Methods for the Autonomous Integration of Learning with Closed-Loop Control Operations The integration of autonomous learning methods continues to grow in practical bounded implementations in industry with most headway being made in robotics and the automated driving space. Forward looking autonomous application of these developing techniques and methods will make their way into the broader continuous and discrete manufacturing industries as IT-OT convergence continues to materialize and enable more modular system flexibility. The ability to autonomously identify new models that have verified value to mission-critical operations and the ability to autonomously deploy validated capabilities and "close-the-loop" with confidence will bring new levels of efficiency, cost savings, and bottom-line value to the manufacturing enterprise for IEC61131-3, IEC-61499 and higher level ISA (L1-L3) control system domains.

The integration of traditional closed loop control systems with autonomous learning techniques requires the creation of new elastic solution architectural methods to support autonomous workflows. These methods will also inherently spawn new autonomously developed closed loop control solution architecture recommendations that will need to be assessed for feasible implementation that fit within the defined reference architecture boundaries for both continuous and discrete manufacturing operations. Such autonomous systems that "close the loop" automatically may support real-time policy assessments for safety, quality, constraint identification, implementation feasibility, value scoring, automated monitoring and systems management integration for feasible mission critical system deployment. Autonomy may extend beyond pure software integration and may integrate with all facets of end-to-end system deployment including hardware selection across compute, storage, and networking assets. For any specific new control application created, real-time coordination and validation across multiple subsystem domains may be required to guarantee safe and bounded operation for autonomously deployed closed loop solutions.

A sequentially rigorous policy framework and series of methods are presented here to manage the autonomous creation of new closed loop workloads in mission-critical environments through the following 8 step process:

Quality and sensitivity assessment of the new algorithm relative to the process;

Automated establishment of operating constraint boundaries;

Automated safety assessment of the new algorithm relative to the existing process;

Automated value assessment for the broader process;

Automated system assessment for deployment feasibility in control environments;

Physical deployment and monitoring of the new application control strategy;

Integration into Lifecycle Management Systems; and

Integration into End of Life Processing.

Order of operations of the 8 step process may be changed. For example, safety assessment may come after value assessment.

Typical automation systems, while very advanced in terms of the implementation of control strategies, are inherently locked into legacy system deployments where such system elasticity does not generally exist. New systems may have new levels of flexibility and elasticity that mirror the system advancements found in IT systems, and neither current IT or OT systems today currently possess this level of autonomous intelligence.

In general previous solutions implemented in the distributed control system design space do not allow for any level autonomous creation of new control strategies, with subsequent implementation and commissioning (closing the loop) to occur without a high degree of engineering oversight. Furthermore, control strategy design today is not autonomous, and requires a high degree of engineering. Control implementation is also a highly resource intensive engineering activity. Control commissioning activities where the loop is closed and the algorithm is tuned is also a hand-held and highly engineered process.

Doing any of these tasks today autonomously is unheard of in practice.

Previous solutions may not have taken advantage of an ability to create an automated general safety assessment of a newly created algorithm relative to the existing process. Previous solutions may not have taken advantage of an ability to create an automated quality and sensitivity assessment of the new algorithm relative to the existing process. Previous solutions may not have taken advantage of an ability to create an automated establishment of operating constraint boundaries. Previous solutions may not have taken advantage of an ability to create an automated system assessment for deployment feasibility into the control environment. Previous solutions may not have taken advantage of an ability to create an automated value assessment for the broader process based on available data.

Previous solutions may not have taken advantage of an ability to create an automated physical deployment and monitoring of the new control application. Previous solutions may not have taken advantage of an ability to create an automated integration into existing standardized Lifecycle Management Systems. Previous solutions may have been locked into application and device specific implementations where dynamic workload modification and portability would not be possible. Previous solutions may be tightly coupled to hardware and software. Previous solutions may be prohibitively expensive in most cases. Previous solutions may require custom hardware with custom interrupt management. Previous solutions may not include dynamic discovery, simulation and optimization with prediction of a value event as part of the rule set for a decision tree.

A sequentially rigorous policy framework and series of methods are presented here to manage the autonomous creation of new closed loop workloads in mission-critical environments though these 8 steps (which may be ordered as below, occur in other orders, or have some steps occur during the same time period or overlapping):

Quality and sensitivity assessment of the new algorithm relative to the process:

Automated establishment of operating constraint boundaries;

Automated safety assessment of the new algorithm relative to the existing process;

Automated value assessment for the broader process;

Automated system assessment for deployment feasibility in control environments;

Physical deployment and monitoring of the new application control strategy;

Integration into Lifecycle Management Systems: and

Integration into End of Life Processing.

The systems and techniques described herein provide the ability at a distributed application control strategy level to:

Enable overall learning system operations integration with existing control systems hierarchies under control.

Enable automated safety assessment for new algorithm relative to the existing operational processes under control.

Enable quality and sensitivity assessment of the new algorithm relative to the existing physical process under control.

Enable automated establishment of operating constraint boundaries for systems under control.

Enable an automated system assessment of the deployment feasibility of an autonomously created application for a control environment.

Enable an automated valuation assessment for the broader process under control to insure positive economic impact for autonomously created control algorithms.

Enable the ability to autonomously physically deploy and create new monitoring for new autonomously created control applications.

Enable autonomous integration into standard Lifecycle Management Systems.

Enable integration into End of Life processing though continuous ROI monitoring.

Continue to advance and leverage lower cost commodity hardware and software to achieve better system performance at a control strategy level.

Enable many maintenance tasks to occur autonomously, where autonomous functions are designed into the automation configuration.

FIG. 39 illustrates an Autonomous Control-Learning Integration Flow diagram.

A sequentially rigorous policy framework and series of methods are presented here to manage the autonomous creation of new closed loop workloads in mission-critical environments though these 8 steps (which may be ordered as below, occur in other orders, or have some steps occur during the same time period or overlapping):

Quality and sensitivity assessment of the new algorithm relative to the process;

Automated establishment of operating constraint boundaries;

Automated safety assessment of the new algorithm relative to the existing process;

Automated value assessment for the broader process;

Automated system assessment for deployment feasibility in control environments;

Physical deployment and monitoring of the new application control strategy;

Integration into Lifecycle Management Systems: and

Integration into End of Life Processing.

The interaction of these eight sequential processes is shown below and each is described in more detail in FIG. 39 with iterative feedback analysis fundamental to support continuous 24/7 mission-critical operations A. New Learning Algorithm Creation The process may begin with the creation of a new learning algorithm.

The autonomous processes employed will have system wide access to all data associated with system resources, physical process and control system parameters that includes basic ISA Level 1 control (IEC61131-3/IEC61499-3 function block, binary, ladder logic, PID etc.), constraint and supervisory control (L2/L3), multivariable model predictive control (L3), production scheduling (L3), and planning system access (Enterprise). A learning systems scope may include unconventional systems access associated with finance and accounting, contract management and general enterprise or supply chain operations. While algorithms created with significant correlations may cover broad families of algorithms including simple small data oriented mathematical solutions (summation, division, multiplication. PID, statistics etc. . . . ), first principal based autonomous model development, empirical based autonomous model development, big data analytics, machine learning and deep learning algorithms, etc., the present disclosure does not describe the full environment of algorithms that could be produced. Such algorithms may be open ended from a data science point of view.

Sequentially as the analysis moves from Steps-A to Step-I, pass and fail tests are autonomously created and executed to evaluate and validate the new autonomous learning and control loops created. Iterative processes are employed to support pass/fail analysis in real-time. Some steps may be performed out of order, concurrently, etc.

B. Quality and Sensitivity Assessment

Once a model of significance is autonomously discovered in Step-A, Step-B is invoked to form an initial quality and sensitivity Assessment of the algorithm created. The autonomous quality and sensitivity assessment relies on an up to date real-time simulated process model of the process (a digital twin). The simulated process scope may be a subset of the entire process, which could include an item as small as a valve or pump or cover a complete process unit under control (a refinery crude unit, a reactor or broader section of the plant). This general quality and sensitivity assessment takes the model created in Step-A and overlays it onto the simulated physical process and control algorithms actively in use within the distributed control system. The quality and sensitivity assessment then exercises each independent process variable by generating an input signal (PRBS, Schroeder wave, etc.) to the new model and tracks the impact on the dependent process variables over time for the simulated process and active control strategies deployed in the system. The process output results are both absolute and statistically measured against a quality assessment profile that considers the sensitivity of the new model on the simulated process operations.

TABLE 1

Architectural Subsystem Evaluation for Quality and Sensitivity

| Subsystem Evaluation for Quality & Sensitivity | Criteria |
|---|---|
| Connectivity and Data Management subsystems, | Sensitivity to quality of I/O data (noisy data, missing data, bad data) |
| Deterministic and Real-Time Control subsystems, | Sensitivity and Quality of performance to variations of latency and jitter in networked and compute based workloads. |
| Application, Virtual Machine and Container based subsystems, | Sensitivity and Quality of performance to distributed integration variation of I/O and control workloads (does the proposed autonomous algorithm support native apps, virtualized apps, containerized apps, etc.) |

TABLE 1-continued

Architectural Subsystem Evaluation for Quality and Sensitivity

| Subsystem Evaluation for Quality & Sensitivity | Criteria |
|---|---|
| Orchestration Control subsystems, | Sensitivity and Quality of performance against expected distributed orchestration metrics |
| Security subsystems | Sensitivity and Quality of performance (including degradation robustness) for security violations on I/O for distributed application components. |
| Functional Safety subsystems, and | No negative impact to certified safe systems |
| Systems Management subsystems. | Sensitivity of distributed application to expected system management tasks and workloads |

TABLE 2

Quality and Sensitivity Evaluation

| Quality & Sensitivity Evaluation | Criteria |
|---|---|
| Process Safety Limit Evaluation | High or Low limit criteria for key process variables not exceeded |
| System resource safety limits for compute | High limits for expected CPU consumption not exceeded |
| System resource safety limits for storage | High limits for expected storage consumption not exceeded |
| System resource safety limits for networking | High limits for expected network bandwidth not exceeded |
| System resource safety limits for memory | High limits for expected network bandwidth not exceeded |

If the test passes, the model evaluation moves to Step-C. If the test fails, the results are sent back to the learning system for re-evaluation.

C. Constraint Boundary Identification

Results from Step B are used to set constraint boundaries for the new model created that encompass and enforce operational safety, quality and sensitivity criteria for the process scope of the new algorithm created. The new constraint boundaries identified are then run through simulation (e.g., add noise, perturb, see how the system reacts using the new model) and the results compared to the newly generated constraint profile.

TABLE 3

Architectural Subsystem Evaluation for Constraint Boundary Identification

| Subsystem Evaluation for Constraint Boundary Identification | Criteria |
|---|---|
| Connectivity and Data Management subsystems, | Expected new I/O range limits are not exceeded |
| Deterministic and Real-Time Control subsystems, | Expected new I/O frequency and latency required boundaries are supported within the deterministic network. |
| Application, Virtual Machine and Container based subsystems, | Expected application, virtual machine and container boundaries are supported within the system |

TABLE 3-continued

Architectural Subsystem Evaluation for
Constraint Boundary Identification

| Subsystem Evaluation for Constraint Boundary Identification | Criteria |
|---|---|
| Orchestration Control subsystems, | Expected orchestration required for the new mission critical workload is supported by the system |
| Security subsystems | Expected security minimum boundary requirements are supported by the system. |
| Functional Safety subsystems, and | No negative impact to certified safe systems with new identified boundary conditions |
| Systems Management subsystems. | Boundary conditions identified due not negate automated systems management integration |

TABLE 4

Process Constraint Boundary Identification

| Process Constraint Identification & Evaluation | Criteria |
|---|---|
| Process Safety Limit Evaluation | High or Low limit criteria for key process variables not exceeded with new identified boundary conditions |
| System resource safety limits for compute | High limits for expected CPU consumption not exceeded with new identified boundary conditions |
| System resource safety limits for storage | High limits for expected storage consumption not exceeded with new identified boundary conditions |
| System resource safety limits for networking | High limits for expected network bandwidth not exceeded with new identified boundary conditions |
| System resource safety limits for memory | High limits for expected network bandwidth not exceeded with new identified boundary conditions |

If the test passes the evaluation of the process simulation and associated existing and new control model then the evaluation is allowed to move to step D. If the test fails to pass any of the criteria described above, the results are sent back to the learning system for re-evaluation.

D. Safety Assessment

Once a new set of constraints are identified in Step-C. Step-D is invoked to form an initial safety assessment of the algorithm created. Step-D covers the safety assessment of the new learning algorithms relative impact to the physical process for closed loop operation with the new learning algorithm. Here the model quality is evaluated over a range of conditions by introducing noise to the model I/O based on the statistical quality established in Step-A during model creation.

The autonomous safety assessment relies on an up to date real-time simulated process model of the process (a digital twin). The simulated process scope may be a subset of the entire process, which could include an item as small as a valve or pump or cover a complete process unit under control (a refinery crude unit, a reactor or broader section of the plant). This general safety assessment takes the model created in Step-A and overlays it onto the simulated physical process and control algorithms actively in use within the distributed control system and overlays the new constraints identified for the control system as described in Step-C. The safety assessment then exercises each independent process variable by generating an input signal (PRBS, Schroeder wave, etc.) to the new model and tracks the impact on the dependent process variables over time for the simulated process, new constraints and active control strategies deployed in the system. Results are then compared against established safety metrics for the process to determine a pass/fail score.

There is a broad range of potential safety checks that may be used that are not covered here but usually may manifest as critical process constraints for flow, pressure, temperature, rpm or other key variables that may not be exceeded for generally safe operations. This analysis is not to be confused with a certified functionally safe system, although impacts to the variables associated with these systems are considered in scope for the general safety analysis and may be included in the process and control simulation in practice.

TABLE 5

Architectural Subsystem Evaluation for Safety

| Subsystem Evaluation for Safety | Criteria |
|---|---|
| Connectivity and Data Management subsystems, | I/O connectivity faults, missing, bad, or poor quality data impacts are assessed against established safety metrics. |
| Deterministic and Real-Time Control subsystems, | Thresholds for safety are tested for message determinism frequency and latency variability |
| Application, Virtual Machine and Container based subsystems, | Creation, deployment, destruction and corruption tests are applied to test safety system response for applications, virtual machines, and containers |
| Orchestration Control subsystems, | Orchestration of distributed assets for the new algorithm are tested for control cycle process safety faults that covers end-to-end data processing of data. |
| Security subsystems | Security fault analysis for all I/O and application runtimes are tested to measure against process safety impacts |
| Functional Safety subsystems, and | No negative impact to certified safe systems |
| Systems Management subsystems. | System management workloads and tasks are exercised and measured for potential process safety impacts. |

TABLE 6

General Process Safety Evaluation (non-certified FuSA)

| Process Evaluation | Criteria |
|---|---|
| Process Safety Limit Evaluation | High or Low limit criteria for key process variables not exceeded |
| System resource safety limits for compute | High limits for expected CPU consumption not exceeded |
| System resource safety limits for storage | High limits for expected storage consumption not exceeded |

TABLE 6-continued

General Process Safety Evaluation (non-certified FuSA)

| Process Evaluation | Criteria |
| --- | --- |
| System resource safety limits for networking | High limits for expected network bandwidth not exceeded |
| System resource safety limits for memory | High limits for expected network bandwidth not exceeded |

The results are measured against a safety profile for the equipment or process under control. If the algorithm passes all safety checks for the equipment or process flow of the manufacturing operation, then the validation process is allowed to move to Step-E. If any safety check fails, the results are returned to the autonomous learning algorithm block for re-assessment and re-creation of an algorithm of significance.

E. Value Assessment

The value assessment is used to autonomously evaluate the impact of the new model on the process segment locally as well as the broader end-to-end manufacturing process. With boundary constraints identified for the simulated process (a digital twin) and control system, evaluation of the new learning algorithm within the context of closed loop performance impact on the enterprise bottom-line is assessed automatically by replaying the historical digital twin simulation results using the new control strategy. Results are compared against a baseline performance using a variety of value criteria. Examples are as shown in Table 7 below.

TABLE 7

Example Value Assessment Criteria

| Value Assessment Evaluation | Criteria |
| --- | --- |
| Machine or Tool or Process Uptime | Higher Uptime Measured in Simulation |
| Production Line Uptime | Higher Uptime Measured in Simulation |
| Production Line Throughput | Higher Throughput Measured in Simulation |
| Production Line Cycle Time | Higher Cycle Time Measured in Simulation |
| Factory Output | Higher Factory Output Measured in Simulation |
| Product Inventory Stock Out Probability | Statistically Lower Probability of Stock Out |
| Product Inventory Reduction | Statistically Lower Inventory Achieved at Same or Lower Probability of Stock Out |
| Increased Product Sales | Product Sales Increase |
| Improved Supply Forecast | Improved Supply Forecast Reduces Inventory Holding Levels at Same or Lower Probability of Stock Out |
| Improved Demand Forecast | Improved Demand Forecast Reduces Inventory Holding Levels at Same or Lower Probability of Stock Out |

If the Value Assessment achieves the specified ROI and NPV criteria as specified by operations, the test is passed and the evaluation moves on to Step-F. If the test is failed, the results are sent back to the learning system for further evaluation.

F. Deployment Feasibility

Deployment feasibility is measured in terms of the ability of the system to deploy the new workload and integrate the algorithm into the existing control structures of the distributed control system. This is where rigororus real-time assessment is completed for the following areas:

TABLE 8

Deployment Feasibility Subsystem Evaluation

| Deployment Subsystem Evaluation | Criteria |
| --- | --- |
| Connectivity and Data Management subsystems, | Model data feeds are available to the control systems and may be autonomously historized. Model Outputs may connect to downstream process Setpoints autonomously. Model Inputs may be setup for standard input filtering as defined at Step-D autonomously. |
| Deterministic and Real-Time Control subsystems, | Data feeds support the real-time criteria of the network and may be autonomously configured. |
| Application, Virtual Machine and Container based subsystems, | The model may be autonomously deployed as an application or in a container or virtual machine with I/O access intact. |
| Orchestration Control subsystems, | The new model and control configuration may be orchestrated and autonomously added to the orchestration system configuration profile. The orchestration feasibility is validated against simulation. |
| Security subsystems | The model and associated I/O may meet all security criteria autonomously. |
| Functional Safety subsystems, and | The model has no negative impact on safety certified systems |
| Systems Management subsystems. | The model and resulting closed loop system objects may be added to systems management profiles through auto generated standardized scripts compliant with the system architecture capability. |

If the deployment test is passed, the deployment is tested by actual deployment onto a digital twin simulated system where training is automatically scheduled with operations.

Automated training simulator deployment and course scheduling:

i. Automated training documentation of the new control loops generated and sent to operations for review.

ii. Training schedules are established and completed by operations.

G. Physical Deployment & Monitoring

With physical deployment and monitoring tested in Step-F using the new constraints identified for the control system, training and sign off by operations is completed with the new control strategy ready for deployment. The physical implementation proceeds as managed by the system orchestrator where input and output configuration of new function blocks and modification to old function blocks are specified. The steps for feasible autonomous deployment are as follows:

Online Deployment to Operations:

1. Procedurally, all control may be automatically shed to its lowest allowed autonomous stable loop configuration as pre-specified by operations for autonomous system implementation and commissioning of new control system features.

2. The physical deployment of the new control and learning model(s) within the defined system constraints and monitoring configuration is completed utilizing available system resources (compute, storage, networking, etc.).

3. Automated commissioning occurs with new loops automatically started to run in a "warm mode" where live I/O is fed into the new control loop and new control moves of the independent variables are analyzed over a specified time period to validate the behavior is as expected.

4. Once the on-line validation test is completed, the loop is closed for the new algorithm and new outputs are written to downstream setpoints that drive the mission-critical process with notification sent to Operations.

If the automonous deployment is successful for all 4 steps described above, the system moves on to automatically register with lifecycle services. If the autonomous physical deployment of the system fails at any of the 4 steps described above, the system is returned to its previous configuration, results are sent back to the learning system, and Operations is notified.

H. Lifecycle Integration

Automatic registration is made of the new control and learning loops for the system deployed for normal operations.

1. Automated scripts are generated, tested and deployed registering the new control application with the lifecycle management system.

2. A Feedback Loop continuously monitors the new control application against the automated metrics for Quality. Constraints, Safety, Value, Deployment. and Lifecycle performance as shown in FIG. 39.

A degradation in any one of the metrics monitored could send the current running control strategy back to the control learning assessment block or result in a change in limits specification, or change tuning parameters, change in deployment, etc.

1. End of Life

With feedback (see FIG. 39), continuous checks against the metrics for economic value assessment may drive automated assessment of operational value for the enterprise. A degradation in value below a defined criteria results in triggering End of Life Processes.

While End of Life Processing could be automated, options for revert to manual review will be desired and could result in automated de-commissioning or require manual removal depending on automation complexity.

FIG. 40 illustrates a flowchart of a method for managing autonomous creation of a new algorithm for an industrial control system according to an example. Flowchart 4000 includes an operation 4010 to manage autonomous creation of a new closed loop workload algorithm. Flowchart 4000 includes an operation 4020 to perform a quality and sensitivity assessment of the new algorithm relative to the process. Flowchart 4000 includes an operation 4030 to autonomously establish operating constraint boundaries. Flowchart 4000 includes an operation 4040 to autonomously assess safety of the new algorithm relative to the existing process. Flowchart 4000 includes an operation 4050 to autonomously assess value for the broader process. Flowchart 4000 includes an operation 4060 to autonomously assess the system for deployment feasibility in control environment. Flowchart 4000 includes an operation 4070 to physically deploy and monitor the new application control strategy. Flowchart 4000 includes an operation 4080 to integrate the new algorithm into lifecycle management systems. Flowchart 4000 includes an operation 4090 to integrate the new algorithm into end of life processing.

Scalable Edge Compute in a Distributed Control Environment

Current solutions require the end user to estimate the amount of compute required, and add additional compute capability to future proof the deployment. These approaches waste money, electrical, and thermal energy. This also risks the over provisioned compute becoming old technology before the compute is actually needed.

The techniques discussed herein allow a high performance CPU to be activated, from an initial dormant or inactive state, in an edge control node of an industrial control system by a centralized orchestration system that understands the CPU performance needs of the control strategy of the industrial system. Initial customer investment is low, as each edge control node is initially sold as a low cost, low performance device. Only the required compute (right sized compute) is purchased and provisioned, which optimizes the monetary investment, thermal footprint and electrical energy consumption. This solution provides an expandable compute footprint in the control system.

FIG. 41 illustrates an industrial control system (ICS) Ring Topology network 4102.

An industrial control system is generally made up of Programmable Logic Controller 4104. Remote IO (RIO) (e.g., 4106) and Field Devices (e.g., 4108). A typical deployment may consist of rings of Remote IO units controlled by a PLC 4104. IO and field compute are typically locked in PLC 4104 (e.g., at FIG. 41).

FIG. 42 illustrates an edge control topology network. The edge control topology network includes an orchestration server 4202 (e.g., as described above for orchestration 920), a bridge 4204, a plurality of edge control nodes (e.g., ECN 4206), and one or more field devices (e.g., 4208). The orchestration server 4202 is used to provision, control, or orchestrate actions at the ECN devices (e.g., 4206), which are connected for example in a ring network to each other, and to the orchestration server 4202 via the bridge 4204).

One way that SDIS improves the functioning of a system is the distribution of control functionality across an ICS. The orchestration server 4202 may be used to control the edge control node 4206, which includes the option of performing both IO and Compute on a single device and uses Orchestration services to distribute workloads to the best available resource.

Typically the ring of edge control nodes (ECNs) may be deployed in thermally constrained environments, for example, cabinets with zero airflow or unregulated temperatures. In an example, there may be up to 96 IO in a single cabinet, which means up to 96 ECNs. This may prohibit each ECN from including both IO and High Performance compute, as the high performance compute device will generate excessive heat and raise the ambient temperature above the safe operating level of the ECNs. Additionally, a high performance processor may not be needed at every ECN when there is not a high compute demand of the control system. Therefore, the systems and techniques described herein provide a capability to install just the compute resources that are needed to execute the control strategy, and to not exceed cost and power targets, while still allowing for changes in each ECN. Thus, in an example, not every ECN has a high performance processor or high control capabilities.

FIG. 43 illustrates an edge control node (ECN) block diagram 4302. In an example, the following techniques provide a "right size" provisioning of a compute problem with the introduction of a compute scalable ECN as shown in FIG. 43.

The primary ingredient of the ECN 4302 may be a system on chip 4304, which has both higher performance compute (e.g., CPU) 4306 and a microprocessor (MCU) 4308 for low performance compute. The MCU 4308 may be used to convert IO data coming from the IO Subsystem 4312 to a network component 4310, such as an Ethernet TSN based middleware such as OPCUA Pub/Sub or DDS. The ECN 4302 may be delivered to customers with the High Performance CPU 4306 in an inactive state. For example, the High Performance CPU 4306 may not be accessible for use in the inactive state, such as until a special "activation signal" is sent to the High Performance CPU 4306, for example from an orchestrator (e.g., the orchestrator may send a signal sent to the MCU 4308 to activate the CPU 4306).

The ECN 4302 may be initially installed as a low cost, low power device for IO conversion using the MCU 4308. For example, the High Performance CPU 4306 is initially disabled, and initially the ECN 4302 includes the SoC 4304 and IO Subsystem 4312 activated, without high control capabilities. The high performance processor 4306 may be inactive, with the ECN 4302 only allowing IO Conversion initially, in an example.

FIG. 44 illustrates an ECN-based ring topology diagram. FIG. 44 shows how a scalable compute ECN may fit into the classic ring topology. FIG. 44 further shows an initial state of deployment, where all high performance CPUs are disabled. As shown in FIG. 44 each ECN has the ability to convert IO to a data bus standard, but no real capability to execute control functions.

In an example, after deployment, the orchestration server 4202 may determine how many high performance CPUs are needed, and then send a code to activate one or more CPUs using respective MCUs at particular ECNs. The orchestration server 4202 may provide a cost/benefit analysis as part of the scheduling function performed by the orchestration server 4202. In an example, a fee may be charged to activate the CPU 4306, such as according to a schedule, such as monthly, yearly licenses, or the like. The CPU 4306 may be activated or deactivated according to need (e.g., as determined by the orchestrator or the user). The limited license may be cheaper than full deployment. In another example, once activated, the CPU 4306 may remain activated indefinitely (e.g., activated permanently for a one-time fee).

In an example, not activating the CPU 4306 may reduce thermal output. This may be controlled separately from any fee schedules. For example, once activated, the CPU 4306 may be deactivated or moved to a low power state to save on thermal output (even in an example where the CPU 4306 was permanently activated). The CPU 4306 may execute control instructions in a high power state and move to a low power state when execution is completed.

In an example, an activation code may be a special packet, sent to the MCU 4308. The activation code may be evaluated for validity by the MCU 4308 including determining how long the code is good for, etc. The MCU 4308 may send an activation signal directly to the CPU (e.g., after receiving a signal from an orchestrator).

The MCU 4308 may turn on power rails, boot the CPU 4306, download latest firmware, etc., when activating the CPU 4306 from the inactive state. In an example, the CPU 4306 may have a low or high power mode, which may be activated or deactivated instead of turning the CPU 4306 off or on. This example may be useful in cases where the CPU 4306 is put in a low power state instead of being powered off to reduce thermal output, such as when the CPU 4306 may be needed to be activated quickly.

In an example, the low power state may be implemented by providing cryptographic tokens that the orchestrator 4202 obtains from the CPU manufacturer. These tokens may be sent to the CPU 4306 via the MCU 4308.

The tokens may, for example, be signed using a key that only the CPU manufacturer and the CPU 4306 know (e.g., burned into CPU 4306 at manufacture), allowing each token to be validated. Each token may be unique, allowing the CPU 4306 to run for some amount of time.

In another example, the tokens are authenticated by the MCU 4308 using a secret known to the manufacturer and the MCU 4308. For example, as long as the MCU 4308 and the CPU 4306 are manufactured together in a single package of an SoC. This example may prevent a denial of service attack created by having the CPU 4306 woken up to validate the token.

FIG. 45 illustrates data flow through an ECN-based ring topology. In an example, the orchestration system 4202 analyzes the control strategy to understand how much compute is required to satisfy the compute needs of the control strategy. Once the orchestration system has generated the compute requirements, the end user may purchase the required amount of High Performance CPU activation codes from the ECN vendor. The orchestration system 4202 will send the authenticated activation codes to specified ECNs in the array of ECNs, which enables the compute resources. This flow is shown in FIG. 45.

The process of enabling compute need not be a one-time event. As the complexity of the control strategy increases and compute demands increase, the end user may continue to purchase and activate more compute resources (or deactivate CPU resources when not needed). For example, the orchestrator may send a deactivation signal to an ECN to deactivate a CPU at that ECN. The ECN vendor may implement a temporal service model, where the end user buys activation licenses on a monthly or yearly basis. This models also allows the end users to let the activation codes expire, allowing some of the compute resources to go back into low power dormant state saving the recurring fees.

FIG. 46A illustrates a flowchart 4600A of a method for activating a CPU (e.g., of an ECN) according to an example. Flowchart 4600A includes an operation 4610A to determine, at an orchestration server, computational requirements of edge control nodes in an industrial control system (e.g., a ring deployment). Flowchart 4600A includes an operation 4620A to receive an indication to activate CPUs of one or more edge control nodes or determine that one or more CPUs need to be activated. Flowchart 4600A includes an operation 4630A to send authenticated activation codes to the edge control nodes with CPUs to be activated. In an example, operations 4610A-4630A (above) may be performed by the orchestration server, and operations 4640A-4670A (below) may be performed by an ECN. A method using the flowchart 4600A may include performing operations 4610A-4630A or 4640A-4670A or both.

Flowchart 4600A includes an operation 4640A to receive an authenticated activation code at an edge control node. Flowchart 4600A includes an operation 4650A to authenticate the code at the edge control node (e.g., at the CPU). Flowchart 4600A includes an operation 4660A to activate a CPU of the edge control node using a MCU (low performance processor). Flowchart 4600A includes an optional operation 4670A to receive an update at the edge control node from the orchestration server to deactivate the CPU or place the CPU in a low power state. In an example, the ECN may be part of a ring network of an industrial control system.

FIG. 46B illustrates a flowchart 4600B of a method for activating a CPU according to an example. The operations of flowchart 4600B may be performed by an orchestration server. The orchestration server may be communicatively coupled to a ring network of edge control nodes, such as via a bridge device.

The flowchart 4600B includes an optional operation 4610B to determine computational requirements of edge control nodes in an industrial control system. In an example, the edge control nodes may be nodes in a ring topology network with a bridge device connecting the network to the orchestration server.

The flowchart 4600B includes an operation 4620B to receive IO data via a bridge connecting an orchestration server to an edge control node. The IO data may be converted at a microcontroller (MCU) of the edge control node from data generated at an IO subsystem. The conversion may be to a packet sent by an Ethernet switch of a system on a chip of the edge control node (which may include the MCU as well). In another example, the data converted by the MCU may be data generated by the MCU itself, such as a power state of the field device or the edge control node.

The flowchart 4600B includes an operation 4630B to send an authenticated activation code to the edge control node to activate a CPU of the edge control node, with this CPU initially in an inactivated state. In an example, the authenticated activation code is authenticated by the MCU before the CPU is activated.

The flowchart 4600B includes an operation 4640B to send processing instructions to the CPU for execution.

The flowchart 4600B includes an optional operation 4650B to send a deactivation code to the edge control node to deactivate the CPU of the edge control node.

The method may include an operation to determine computational requirements of edge control nodes in an industrial control system including the edge control node. In an example, the CPU is activated based on a determination by the orchestration server that the CPU is to be activated to satisfy a control strategy for the industrial control system. In another example, the orchestration server may receive an indication to activate the CPU of the edge control node of the edge control nodes.

Distributed Dynamic Architecture for Apps and Client Server Frameworks

In orchestrated systems, in an example, an application is defined as a set of modules interconnected through a topology. These modules are deployed on different logical nodes. Each logical node may correspond to a physical node, however, the mapping does not have to be 1:1. As long as the resources requirements are met, multiple logical nodes may be mapped to one physical node or multiple modules may be deployed on the same physical environment.

As the different modules are deployed, various errors, crashes or reboots of the module or the node may occur. In order to improve the resilience of the deployed application, redundancy may be used to improve availability. For example, a module may be deployed on two nodes (e.g., as a primary and a backup). When the primary node has an error, or otherwise fails, the orchestrator may switch to the backup node allowing it to take over. However, saving state of the module that went down is often non-trivial. In the systems and techniques disclosed herein, a system includes a peer-to-peer relationship among nodes on the same level in an application topology that may act as automatic backup nodes or coordinate to generate a backup. Using peer-to-peer coordination may allow for a saved state to be used, which may include listening to communication channels and redeploying the module on a different node in the case where a module or node fails or crashes.

Current redundancy solutions are manually defined or created in a redundant fashion. This makes it so that the reliability is high but the cost is also considerable since it requires duplication of resources. Manual redundancy is often challenging to define and maintain. Policies are often too simplistic and require too many resources. Further, requiring a central orchestrator to identify redundant nodes or replace failed nodes is costly and slow.

In an example, the techniques described herein may create automatic redundant nodes of modules that are based on communication patterns of the application. For example, when a first module sends data to a second module, then the node hosting the second module may become an automatic redundancy for the first module. The data generate by the first module is fed into the second module, allowing the first module to know what the inputs are to the second module. When the first module sends data to multiple modules instead of only the second module, then other issues may occur (or when the second module receives input from modules other than the first module). In these scenarios, it may be difficult to create a redundancy on any of these leaf nodes. Instead a peer-to-peer network created by the collection of nodes on the same layer may negotiate the status of a redundant node. This network of nodes may swap redundant sets among themselves with no major impact to the rest of the application.

FIG. 47 illustrates an example application connection diagram. In an example, different modules that form an application may be configured in an arrangement, such as the example shown in FIG. 47. The connections show the flow of data among the different modules. These modules send data using a communication channel which could be running in either client/server or pub/sub mode. In this example, when an orchestrator deploys these modules, the orchestrator may choose to deploy each module on a separate compute node or with multiple modules on a single node. In this example, for simplicity, a single module is deployed on a single node. Other examples may supply redundant options when multiple modules are on a failed node, or when a module has an error (e.g., when another module on the node does not have an error).

In an example, the module B on node 4720 is sending data to both modules E on node 4740 and D on node 4730. When module B experiences a failure then the following operations may be executed. The operations may be executed by peer-to-peer nodes, such as node 4710, node 4730 and node 4740. The executions may include detecting the failure, redeploying module B on a replacement node (e.g., when the node 4720 fails), rewire inputs (e.g., from module A) or outputs (e.g., to modules E or D), as needed, and recover a previous state of module B, which may be transferred to the replacement node.

In the example shown in FIG. 47, the neighbors of module B (e.g., modules A. D, and E) may create a peer-to-peer network with the purpose of taking over when module B fails (e.g., when node 4720 fails). In this example, the neighboring modules are positioned to re-create the state of module B because modules A, D, and E have direct contact with the input and output channels of module B. These three neighboring modules may go through a leader-election algorithm or other technique for selecting a replacement node.

In an example, the executable for module B may be deployed on one or more of the three nodes (e.g., 4710, 4730, or 4740) or one or more of the three nodes may manage where the redundant software resides. In an example, one or more of these three nodes may manage routing the inputs or outputs in case of failure of node 4720. In another example, the data may be routed even if no failure is detected (e.g., for redundancy purposes). Backing up module B using one of these techniques allows for a seamless switch to the redundant node in case of failure since these nodes are in control of where the data is flowing. In an example, a redundant node or nodes may run a shadow node with the software for the entire period of operation as a redundancy.

In the example shown in FIG. 47, module B has neighbors of modules A, D. and E. These four modules establish a neighborhood around B. (e.g., a peer-to-peer network), and create a contingency plan for when module B fails. The plan may include using a leader-election algorithm or other technique to select a control node (e.g., node 4710 is elected as having more resources to run the redundant node for module B, such as on additional resources of node 4710). The control node or a selected replacement node may not be connected directly to the failed node 4720, may store a redundancy of module B. When the node 4720 fails, there is a redundancy for module B, the redundant node may then execute module B seamlessly. For example, module A may create a channel to let module B know about a redundant node running a redundant version of module B. Then module B and the redundant version may be in contact, where module B may send state details to the redundant module to let the redundant module be aware of context in case module B crashes.

FIG. 48 illustrates an example architectural view of an application with a redundant node. In FIG. 48, the 3 nodes (4810, 4830, and 4840) hosting modules A, D. and E form a peer-to-peer network. Module A is the leader of the network and manages hosting Module B' on a redundant node 4825. Module A may also route its output as inputs to both nodes 4820 and 4825. In the example of FIG. 48, module B' is constantly computing an output (e.g., the same as module B) even though module B' is not connected to anything.

With this arrangement, the application takes ownership of its own resilience independent of the Orchestrator 4805 (which may be used to set up the application or network configuration and then may be disconnected). The independence of the application may allow for a complete disconnect from the Orchestrator 4805 without sacrificing reliability.

In certain examples, when the physical nodes hosting the modules are resource-restricted, it may not be feasible to have module B' run all computations. However, in order to achieve full redundancy, one of the options as described below may be implemented.

One option includes executing module B in a virtual machine. In this example, the system may make a copy of the virtual machine whenever available resources may allow it to do so without compromising the operation of the rest of the application (e.g., by waiting for downtime or extra resources on a node becoming available). By doing so, the state of Module B may be reserved (e.g., as an image of the virtual machine).

In another option, module B may support swapping, which allows module B to have an interface to submit its internal parameters and state information to module B'. This redundant operation may be performed regularly allowing module B to save its state. The frequency of the update may be dependent on how large the module B is and whether the update may be done while continuing to meet the requirements of the different modules and the application as a whole.

In an example, when module D is elected as a leader, module D may listen to all the channels that module B' needs to make sure that data is not lost (e.g., output from module A). This makes it possible to forward the data to module B' when needed. Similarly, module D may set up module B' to listen to the channel (e.g., output from module A) without module D directly listening to the channel.

In some examples, an orchestrator or application developer may decide that a certain module is too important for the application or is a single point of failure. In this scenario, this module may be assigned more than one redundant module. For example, the network formed by the three nodes may then create multiple redundant modules, (e.g., module B' and module B", not shown). Each one of these modules may have a different synchronization policy to create diversity or add resilience.

Typically, applications do not exist in a silo, but are often connected to other applications. Similar to the techniques and systems described above, replacing a module with an application allows a system to provide redundancy on a micro or macro level. For example, Application 1 may connect to Application II and become a leader in creating a redundancy and redundant policy (e.g., in case an application fails).

In the case of cascading failures or major disruptions, creating such strategies and allowing applications to take ownership of their own policies may provide redundancies without unnecessary costs. Fully distributed systems are often harder to manage but offer a higher degree of resilience due to the lack of a central authority which may turn into a single point of failure. So, in this case, each application may have its own reliability policy and strategies. In an example, applications may interconnect and apply their own macro reliability strategies. In an example, when two or more modules, nodes, or applications fail, remaining modules, nodes, or applications may act as redundancies for the failures. For example, if two nodes fail, a single node may replace both or two or more nodes may replace the two failed nodes.

The redundant applications or modules with macro or micro reliability strategies may provide protection when a system is under a security attack. Multiple failures may be detected on the macro level and accordingly strategies may change. For example, when a failure threatens to potentially wipe out applications that are in close vicinity, the strategy of the deployment may assign, on purpose, a distant neighbor as part of the community to save the state, module, or application from total failure. When security is considered in the example of FIG. 48, module F or module C may join the network and be assigned a role. The role may not be the leader but rather a member of the community. In other words, module C may not spend too many resources managing module B'. Instead module C may make a redundant copy of module B (e.g., every so often) but not instantiate it. This may sacrifice some of the seamless properties (e.g., state may be a bit stale) but offers additional guarantees and layers of redundancy with minimal cost to the system as a whole. The concept same may apply to applications such that if part of an on premise data center becomes unusable, another data center in a different location may take over with slightly stale state and internal variable values allowing the operations to continue.

FIG. 49A illustrates a flowchart of a method for creating an automatic redundant module of an application on a redundant node based on communication patterns of the application according to an example. Flowchart 4900A includes an operation 4910A to create a peer-to-peer neighbor network. Flowchart 4900A includes an operation 4920A to render a redundant module on a redundant node, the redundant module corresponding to a module of an application on a node. Flowchart 4900A includes an operation 4930A to detect a failure of the node of the module. Flowchart 4900A includes an operation 4940A to activate the redundant module on the redundant node by rewiring inputs and outputs from the module to the redundant module. Flowchart 4900A includes an operation 4950A to recover a previous state off the module and transfer it to the redundant module. Flowchart 4900A includes an operation 4960A to continue executing the module using the redundant module. Flowchart 4900A includes an operation 4970A to report the failure of the node.

FIG. 49B illustrates a flowchart 4900B of a method for activating a CPU according to an example. The operations of flowchart 4900B may be performed by an orchestration server.

The flowchart 4900B includes an optional operation 4910B to configure an application including a set of distributed nodes to run on an orchestrated system. The flowchart 4900B includes an operation 4920B to run a first module on a first node, the first module having a first output. The flowchart 4900B includes an operation 4930B to run a second module on a second node, the second module using the first output as an input. The flowchart 4900B includes an operation 4940B to provide a second output from the second module to a third module running on a third node.

The flowchart 4900B includes an operation 4950B performed in response to detection of a failure of the second node, to determine a replacement node for redeploying the second module by coordinating between the first node and the third node. In an example, determining the replacement node includes identifying a redundant node preconfigured to receive the first output and operate the second module. The redundant node may be disconnected from any nodes (e.g., prevented from providing output to any nodes) until after the redundant node is operating as the replacement node, for example receiving input and calculating an output for maintaining a state of the second module, but not being connected to any other node. In an example, parameters and state information about the second module may be sent from the second node, the first node, or the third node, to the redundant node, such as periodically, whenever an output is generated, or the like. In another example, in response to the redundant node failing, a second redundant node may be identified to become the replacement node (e.g., for critical modules).

In an example, determining the redundant node includes determining a set of nodes connected to the second node. The set of nodes may include one or more input nodes or one or more output nodes, such as with directional indications. The replacement node may be connected to the first node to receive output from the first module and connected to the third node to provide output from the second module to the third module, for example.

A further operation may include saving, such as at the first node, a redundant state of the second module when the first output is generated. In an example, an orchestration server may initially generate a configuration of modules on nodes (e.g., the first module on the first node, etc.). In this example the orchestration server may be disconnected, for example, before any failures such as the second node failure. The first node and the third node may coordinate to determine the replacement node without help from the orchestration server. In an example, the second node may be implanted on a virtual machine. The second module may then be instantiated in the replacement node based on an image of the second node on the virtual machine.

IoT Devices and Networks

The techniques described above may be implemented in connection with a variety of device deployments, including in those of any number of IoT networks and topologies. Accordingly, it will be understood that various embodiments of the present techniques may involve the coordination of edge devices, the fog and intermediary devices, and cloud entities among heterogeneous and homogeneous networks. Some of the example topologies and arrangements of such networks are provided in the following paragraphs.

FIG. 50 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

IoT devices are physical objects that may communicate on a network, and may include sensors, actuators, and other input/output components, such as to collect data or perform actions from a real world environment. For example. IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Often. IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in the system examples discussed above, present a number of new challenges in a heterogeneous network of connectivity comprising a combination of wired and wireless technologies.

FIG. 50 specifically provides a simplified drawing of a domain topology that may be used for a number of internet-of-things (IoT) networks comprising IoT devices 5004, with the IoT networks 5056, 5058, 5060, 5062, coupled through backbone links 5002 to respective gateways 5054. For example, a number of IoT devices 5004 may communicate with a gateway 5054, and with each other through the gateway 5054. To simplify the drawing, not every IoT device 5004, or communications link (e.g., link 5016, 5022, 5028, or 5032) is labeled. The backbone links 5002 may include any number of wired or wireless technologies, including optical networks, and may be part of a local area network (LAN), a wide area network (WAN), or the Internet. Additionally, such communication links facilitate optical signal paths among both IoT devices 5004 and gateways 5054, including the use of MUXing/deMUXing components that facilitate interconnection of the various devices.

The network topology may include any number of types of IoT networks, such as a mesh network provided with the network 5056 using Bluetooth low energy (BLE) links 5022. Other types of IoT networks that may be present include a wireless local area network (WLAN) network 5058 used to communicate with IoT devices 5004 through IEEE 802.11 (Wi-Fi®) links 5028, a cellular network 5060 used to communicate with IoT devices 5004 through an LTE/LTE-A (4G) or 5G cellular network, and a low-power wide area (LPWA) network 5062, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 5004, such as over the backbone links 5002, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 5056, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 5058, for instance, may use systems that perform standards conversion to provide multi-standard connectivity, enabling IoT devices 5004 using different protocols to communicate. Further systems may provide seamless interconnectivity across a multi-standard infrastructure comprising visible Internet resources and hidden Internet resources.

Communications in the cellular network 5060, for instance, may be enhanced by systems that offload data, extend communications to more remote devices, or both. The LPWA network 5062 may include systems that perform non-Internet protocol (IP) to IP interconnections, addressing, and routing. Further, each of the IoT devices 5004 may include the appropriate transceiver for wide area communications with that device. Further, each IoT device 5004 may include other transceivers for communications using additional protocols and frequencies. This is discussed further with respect to the communication environment and hardware of an IoT processing device depicted in FIGS. 52 and 53.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 51 below.

FIG. 51 illustrates a cloud computing network in communication with a mesh network of IoT devices (devices 5102) operating as a fog device at the edge of the cloud computing network. The mesh network of IoT devices may be termed a fog 5120, operating at the edge of the cloud 5100. To simplify the diagram, not every IoT device 5102 is labeled.

The fog 5120 may be considered to be a massively interconnected network wherein a number of IoT devices 5102 are in communications with each other, for example, by radio links 5122. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T-.M.A.N.) routing protocol, or the OMA Lightweight M2M (LWM2M) protocol, among others.

Three types of IoT devices 5102 are shown in this example, gateways 5104, data aggregators 5126, and sensors 5128, although any combinations of IoT devices 5102 and functionality may be used. The gateways 5104 may be edge devices that provide communications between the cloud 5100 and the fog 5120, and may also provide the backend process function for data obtained from sensors 5128, such as motion data, flow data, temperature data, and the like. The data aggregators 5126 may collect data from any number of the sensors 5128, and perform the processing function for the analysis. The results, raw data, or both may be passed along to the cloud 5100 through the gateways 5104. The sensors 5128 may be full IoT devices 5102, for example, capable of both collecting data and processing the data. In some cases, the sensors 5128 may be more limited in functionality, for example, collecting the data and allowing the data aggregators 5126 or gateways 5104 to process the data.

Communications from any IoT device 5102 may be passed along a convenient path (e.g., a most convenient path) between any of the IoT devices 5102 to reach the gateways 5104. In these networks, the number of interconnections provide substantial redundancy, allowing communications to be maintained, even with the loss of a number of IoT devices 5102. Further, the use of a mesh network may allow IoT devices 5102 that are very low power or located at a distance from infrastructure to be used, as the range to connect to another IoT device 5102 may be much less than the range to connect to the gateways 5104.

The fog 5120 provided from these IoT devices 5102 may be presented to devices in the cloud 5100, such as a server 5106, as a single device located at the edge of the cloud 5100, e.g., a fog device. In this example, the alerts coming from the fog device may be sent without being identified as coming from a specific IoT device 5102 within the fog 5120. In this fashion, the fog 5120 may be considered a distributed platform that provides computing and storage resources to perform processing or data-intensive tasks such as data analytics, data aggregation, and machine-learning, among others.

In some examples, the IoT devices 5102 may be configured using an imperative programming style, e.g., with each IoT device 5102 having a specific function and communication partners. However, the IoT devices 5102 forming the fog device may be configured in a declarative programming style, allowing the IoT devices 5102 to reconfigure their operations and communications, such as to determine needed resources in response to conditions, queries, and device failures. As an example, a query from a user located at a server 5106 about the operations of a subset of equipment monitored by the IoT devices 5102 may result in the fog 5120 device selecting the IoT devices 5102, such as particular sensors 5128, needed to answer the query. The data from these sensors 5128 may then be aggregated and analyzed by any combination of the sensors 5128, data aggregators 5126, or gateways 5104, before being sent on by the fog 5120 device to the server 5106 to answer the query. In this example. IoT devices 5102 in the fog 5120 may select the sensors 5128 used based on the query, such as adding data from flow sensors or temperature sensors. Further, if some of the IoT devices 5102 are not operational, other IoT devices 5102 in the fog 5120 device may provide analogous data, if available.

In an example, the various aspects of workload orchestration and operations may be adapted to the various network topologies and approaches depicted in FIG. 51. For example, a system may establish a variety of workloads executing in the cloud 5100 in coordination with the IoT devices 5102. These workloads could be orchestrated in the cloud 5100 or fog 5120 from the edge (e.g., from IoT devices 5102), or such workloads may be orchestrated on the edge by the cloud 5100 or the fog 5120. Such concepts may also apply to gateways 5104 and data aggregators 5126 and other devices and nodes within the network topology.

In other examples, the operations and functionality described above with reference to the systems described above may be embodied by an IoT device machine in the example form of an electronic processing system, within which a set or sequence of instructions may be executed to cause the electronic processing system to perform any one of the methodologies discussed herein, according to an example. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

FIG. 52 illustrates a drawing of a cloud computing network, or cloud 5200, in communication with a number of Internet of Things (IoT) devices. The cloud 5200 may represent the Internet, or may be a local area network (LAN), or a wide area network (WAN), such as a proprietary network for a company. The IoT devices may include any number of different types of devices, grouped in various combinations. For example, a traffic control group 5206 may include IoT devices along streets in a city. These IoT devices may include stoplights, traffic flow monitors, cameras, weather sensors, and the like. The traffic control group 5206, or other subgroups, may be in communication with the cloud 5200 through wired or wireless links 5208, such as LPWA links, optical links, and the like. Further, a wired or wireless sub-network 5212 may allow the IoT devices to communicate with each other, such as through a local area network, a wireless local area network, and the like. The IoT devices may use another device, such as a gateway 5210 or 5228 to communicate with remote locations such as the cloud 5200; the IoT devices may also use one or more servers 5230 to facilitate communication with the cloud 5200 or with the gateway 5210. For example, the one or more servers 5230 may operate as an intermediate network node to support a local edge cloud or fog implementation among a local area network. Further, the gateway 5228 that is depicted may operate in a cloud-to-gateway-to-many edge devices configuration, such as with the various IoT devices 5214, 5220, 5224 being constrained or dynamic to an assignment and use of resources in the cloud 5200.

Other example groups of IoT devices may include remote weather stations 5214, local information terminals 5216, alarm systems 5218, automated teller machines 5220, alarm panels 5222, or moving vehicles, such as emergency vehicles 5224 or other vehicles 5226, among many others. Each of these IoT devices may be in communication with other IoT devices, with servers 5204, with another IoT fog device or system (not shown, but depicted in FIG. 51), or a combination therein. The groups of IoT devices may be deployed in various residential, commercial, and industrial settings (including in both private or public environments).

As may be seen from FIG. 52, a large number of IoT devices may be communicating through the cloud 5200. This may allow different IoT devices to request or provide information to other devices autonomously. For example, a group of IoT devices (e.g., the traffic control group 5206) may request a current weather forecast from a group of remote weather stations 5214, which may provide the forecast without human intervention. Further, an emergency vehicle 5224 may be alerted by an automated teller machine 5220 that a burglary is in progress. As the emergency vehicle 5224 proceeds towards the automated teller machine 5220, it may access the traffic control group 5206 to request clearance to the location, for example, by lights turning red to block cross traffic at an intersection in sufficient time for the emergency vehicle 5224 to have unimpeded access to the intersection.

Clusters of IoT devices, such as the remote weather stations 5214 or the traffic control group 5206, may be equipped to communicate with other IoT devices as well as with the cloud 5200. This may allow the IoT devices to form an ad-hoc network between the devices, allowing them to function as a single device, which may be termed a fog device or system (e.g., as described above with reference to FIG. 51).

FIG. 53 is a block diagram of an example of components that may be present in an IoT device 5350 for implementing the techniques described herein. The IoT device 5350 may include any combinations of the components shown in the example or referenced in the disclosure above. The components may be implemented as ICs, portions thereof, discrete electronic devices, or other modules, logic, hardware, software, firmware, or a combination thereof adapted in the IoT device 5350, or as components otherwise incorporated within a chassis of a larger system. Additionally, the block diagram of FIG. 53 is intended to depict a high-level view of components of the IoT device 5350.

However, some of the components shown may be omitted, additional components may be present, and different arrangement of the components shown may occur in other implementations.

The IoT device 5350 may include a processor 5352, which may be a microprocessor, a multi-core processor, a multithreaded processor, an ultra-low voltage processor, an embedded processor, or other known processing element. The processor 5352 may be a part of a system on a chip (SoC) in which the processor 5352 and other components are formed into a single integrated circuit, or a single package, such as the Edison™ or Galileo™ SoC boards from Intel. As an example, the processor 5352 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale. California, an ARM-based design licensed from ARM Holdings. Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 5352 may communicate with a system memory 5354 over an interconnect 5356 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 5358 may also couple to the processor 5352 via the interconnect 5356. In an example the storage 5358 may be implemented via a solid state disk drive (SSDD). Other devices that may be used for the storage 5358 include flash memory cards, such as SD cards, microSD cards, xD picture cards, and the like, and USB flash drives. In low power implementations, the storage 5358 may be on-die memory or registers associated with the processor 5352. However, in some examples, the storage 5358 may be implemented using a micro hard disk drive (HDD). Further, any number of new technologies may be used for the storage 5358 in addition to, or instead of, the technologies described, such resistance change memories, phase change memories, holographic memories, or chemical memories, among others.

The components may communicate over the interconnect 5356. The interconnect 5356 may include any number of technologies, including industry standard architecture (ISA), extended ISA (EISA), peripheral component interconnect (PCI), peripheral component interconnect extended (PCIx), PCI express (PCIe), or any number of other technologies. The interconnect 5356 may be a proprietary bus, for example, used in a SoC based system. Other bus systems may be included, such as an I2C interface, an SPI interface, point to point interfaces, and a power bus, among others.

The interconnect 5356 may couple the processor 5352 to a mesh transceiver 5362, for communications with other mesh devices 5364. The mesh transceiver 5362 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 5364. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 5362 may communicate using multiple standards or radios for communications at different range. For example, the IoT device 5350 may communicate with close devices, e.g., within about 10 meters, using a local transceiver based on BLE, or another low power radio, to save power. More distant mesh devices 5364, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 5366 may be included to communicate with devices or services in the cloud 5300 via local or wide area network protocols. The wireless network transceiver 5366 may be a LPWA transceiver that follows the IEEE 802.15.4, or IEEE 802.15.4g standards, among others. The IoT device 5350 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 5362 and wireless network transceiver 5366, as described herein. For example, the radio transceivers 5362 and 5366 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 5362 and 5366 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 5366, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 5368 may be included to provide a wired communication to the cloud 5300 or to other devices, such as the mesh devices 5364. The wired communication may provide an Ethernet connection, or may be based on other types of networks, such as Controller Area Network (CAN). Local Interconnect Network (LIN), DeviceNet, ControlNet, Data Highway+, PROFIBUS, or PROFINET, among many others. An additional NIC 5368 may be included to allow connect to a second network, for example, a NIC 5368 providing communications to the cloud over Ethernet, and a second NIC 5368 providing communications to other devices over another type of network.

The interconnect 5356 may couple the processor 5352 to an external interface 5370 that is used to connect external devices or subsystems. The external devices may include sensors 5372, such as accelerometers, level sensors, flow sensors, optical light sensors, camera sensors, temperature sensors, a global positioning system (GPS) sensors, pressure sensors, barometric pressure sensors, and the like. The external interface 5370 further may be used to connect the IoT device 5350 to actuators 5374, such as power switches, valve actuators, an audible sound generator, a visual warning device, and the like.

In some optional examples, various input/output (I/O) devices may be present within, or connected to, the IoT device 5350. For example, a display or other output device 5384 may be included to show information, such as sensor readings or actuator position. An input device 5386, such as a touch screen or keypad may be included to accept input. An output device 5384 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 5350.

A battery 5376 may power the IoT device 5350, although in examples in which the IoT device 5350 is mounted in a fixed location, it may have a power supply coupled to an electrical grid. The battery 5376 may be a lithium ion battery, or a metal-air battery, such as a zinc-air battery, an aluminum-air battery, a lithium-air battery, and the like.

A battery monitor/charger 5378 may be included in the IoT device 5350 to track the state of charge (SoCh) of the battery 5376. The battery monitor/charger 5378 may be used to monitor other parameters of the battery 5376 to provide failure predictions, such as the state of health (SoH) and the state of function (SoF) of the battery 5376. The battery monitor/charger 5378 may include a battery monitoring integrated circuit, such as an LTC4020 or an LTC2990 from Linear Technologies, an ADT7488A from ON Semiconductor of Phoenix Ariz. or an IC from the UCD90xxx family from Texas Instruments of Dallas, Tex. The battery monitor/charger 5378 may communicate the information on the battery 5376 to the processor 5352 over the interconnect 5356. The battery monitor/charger 5378 may also include an analog-to-digital (ADC) convertor that allows the processor 5352 to directly monitor the voltage of the battery 5376 or the current flow from the battery 5376. The battery parameters may be used to determine actions that the IoT device 5350 may perform, such as transmission frequency, mesh network operation, sensing frequency, and the like.

A power block 5380, or other power supply coupled to a grid, may be coupled with the battery monitor/charger 5378 to charge the battery 5376. In some examples, the power block 5380 may be replaced with a wireless power receiver to obtain the power wirelessly, for example, through a loop antenna in the IoT device 5350. A wireless battery charging circuit, such as an LTC4020 chip from Linear Technologies of Milpitas, Calif., among others, may be included in the battery monitor/charger 5378. The specific charging circuits chosen depend on the size of the battery 5376, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 5358 may include instructions 5382 in the form of software, firmware, or hardware commands to implement the techniques described herein. Although such instructions 5382 are shown as code blocks included in the memory 5354 and the storage 5358, it may be understood that any of the code blocks may be replaced with hardwired circuits, for example, built into an application specific integrated circuit (ASIC).

In an example, the instructions 5382 provided via the memory 5354, the storage 5358, or the processor 5352 may be embodied as a non-transitory, machine readable medium 5360 including code to direct the processor 5352 to perform electronic operations in the IoT device 5350. The processor 5352 may access the non-transitory, machine readable medium 5360 over the interconnect 5356. For instance, the non-transitory, machine readable medium 5360 may be embodied by devices described for the storage 5358 of FIG. 53 or may include specific storage units such as optical disks, flash drives, or any number of other hardware devices. The non-transitory, machine readable medium 5360 may include instructions to direct the processor 5352 to perform a specific sequence or flow of actions, for example, as described with respect to the flowchart(s) and block diagram(s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Examples

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a method for operation of a software defined industrial system, comprising: establishing respective functional definitions of a software defined industrial system, the software defined industrial system to interface with a plurality of devices, wherein the plurality of devices include, respective sensors and respective actuators; and operating the software defined industrial system using the respective functional definitions.

In Example 2, the subject matter of Example 1 includes: establishing a dynamic data model to define properties of a plurality of components of the software defined industrial system; and updating the dynamic data model based on operational metadata associated with the plurality of components.

In Example 3, the subject matter of Example 2 includes, wherein the plurality of components includes respective applications, devices, sensors, or architecture definitions.

In Example 4, the subject matter of Examples 2-3 includes, wherein plurality of components includes a device, wherein the device represents an ensemble of sensors.

In Example 5, the subject matter of Examples 2-4 includes, wherein the dynamic data model is updated to indicate changes to the dynamic data model in a subset of components of the plurality of components, and wherein the dynamic data model is updated based on a resource availability change or an error condition occurring with the subset of components.

In Example 6, the subject matter of Examples 2-5 includes, wherein establishing the dynamic data model includes defining mandatory fields and restrictions for changes to the dynamic data model.

In Example 7, the subject matter of Examples 2-6 includes, wherein the operational metadata represents a probabilistic estimate of a value associated with a component of the plurality of components.

In Example 8, the subject matter of Examples 2-7 includes, querying a component of the plurality of components for metadata expansion rules; receiving a response from the component in response to the querying; wherein the updating of the dynamic data model is further based on the metadata expansion rules, and a confidence or relevancy score associated with updating respective data fields.

In Example 9, the subject matter of Examples 2-8 includes, monitoring the data flow from the plurality of components, to identify the operational metadata; detecting one or more patterns from the plurality of components; and identifying changes to the dynamic data model based on the detected one or more patterns; wherein the updating of the dynamic data model includes incorporating the identified changes.

In Example 10, the subject matter of Examples 2-9 includes, performing system operations in an edge, fog, or cloud network, based on the updated dynamic data model.

In Example 11, the subject matter of Examples 1-10 includes, defining at least one condition in the software defined industrial system for data model evaluation; obtaining data from a plurality of sensors in the software defined industrial system; identifying at least one pattern, rule, or threshold, for data model modification; evaluating data from the plurality of sensors using at least one identified pattern, rule, or identified threshold; defining a modification to the data model, based on the at least one identified pattern, rule, or identified threshold: and incorporating the modification to the data model for the plurality of sensors and a data flow associated with the plurality of sensors.

In Example 12, the subject matter of Example 11 includes, requesting approval for the data model modification from a data model administrator; and receiving approval for the data model modification from the data model administrator; wherein the incorporating of the modification to the data model is performed in response to receiving the approval for the data model modification.

In Example 13, the subject matter of Examples 11-12 includes, implementing changes to data processing operations in the software defirmed industrial system based on the data model modification.

In Example 14, the subject matter of Examples 1-13 includes, establishing an extended orchestrator logic rule set, for function blocks that execute across a distributed resource pool of resources in the software defined industrial system.

In Example 15, the subject matter of Example 14 includes, performing a dynamic discovery of network bandwidth, resource capacity, current state, and control application constraints for the distributed resource pool.

In Example 16, the subject matter of Examples 14-15 includes, establishing orchestration with respective legacy devices, through shims that interface with respective legacy applications.

In Example 17, the subject matter of Examples 14-16 includes, wherein the extended orchestrator rule set includes one or more of: application cycle time, application runtime, application input/output signal dependency, or application process sequencing.

In Example 18, the subject matter of Examples 14-17 includes, evaluating a function block application timing dependency for an application deployment, based on application cycle, runtime dependencies of the application deployment, and current state of the application deployment; and distributing respective applications of the application deployment among nodes of the software defined industrial system based on the evaluated function block application timing dependency.

In Example 19, the subject matter of Examples 14-18 includes, monitoring respective function blocks of an application deployment: updating optimization and prediction forecast based on current and historical data; orchestrating execution of one or more of the respective function blocks in a distributed resource pool according to a control strategy, in response to detecting a system anomaly from one or more of the respective function blocks.

In Example 20, the subject matter of Example 19 includes, determining whether the control strategy is feasible, wherein orchestrating execution of the one or more of the respective function blocks is performed in response to determining that the control strategy is feasible.

In Example 21, the subject matter of Example 20 includes, implementing a degrade or shed control strategy for at least a portion of the one or more of the respective function blocks, in response to determining that the control strategy is not feasible.

In Example 22, the subject matter of Examples 14-21 includes, wherein the distributed resource pool encompasses applications that span one or more of: a single application running in a single native device, where a second redundant application is available on an additional native device; multiple coordinated applications running in multiple native devices; multiple coordinated applications running in a single virtual machine, where the virtual machine is running on a single embedded device or server; multiple coordinated applications running across multiple virtual machines, where each virtual machine runs in a dedicated embedded device or server; multiple coordinated applications that span multiple containers contained in one virtual machine, where the virtual machine runs in a dedicated embedded device or server; or multiple coordinated applications spanning multiple containers, where the containers are running on multiple embedded devices or servers.

In Example 23, the subject matter of Examples 14-22 includes, wherein establishing the extended orchestrator logic rule set, for function blocks that execute across a distributed resource pool of resources, includes: identifying application specific dependencies: dynamically creating orchestration groups of distributed and dependent applications based on identified dependencies; predicting an orchestration event; detecting the predicted orchestration event; and optimizing resource placement in response to detection of the predicted orchestration event.

In Example 24, the subject matter of Example 23 includes, wherein predicting an orchestration event includes dynamically analyzing and simulating network bandwidth in an example scenario, and analyzing an occurrence of the orchestration event in the example scenario.

In Example 25, the subject matter of Examples 1-24 includes, establishing communication with a legacy component, wherein the legacy component is a legacy software module or a legacy hardware device; establishing communication with a orchestratable component, wherein the orchestratable component is a orchestratable software module or a orchestratable hardware device; and establishing an organized orchestration for control and distribution of workloads among the orchestratable component and the legacy component.

In Example 26, the subject matter of Example 25 includes, establishing a orchestration shim to configure a legacy software module, and wherein the orchestration shim is adapted to provide a custom configuration to the legacy software module; and directly communicating with the legacy software module based on the custom configuration, for the control and distribution of the workloads.

In Example 27, the subject matter of Example 26 includes, communicating, to the legacy software module via an application programming interface (API) of the orchestration shim, the custom configuration; and communicating, from the legacy software module via the API of the orchestration shim, legacy module communication information, wherein the communicating with the legacy software module is further performed using the legacy module communication information.

In Example 28, the subject matter of Examples 26-27 includes, communicating, to a orchestratable software module via an application programming interface (API) of the orchestration software module, a second configuration; and directly communicating with the orchestratable software module based on the second configuration, for the control and distribution of the workloads.

In Example 29, the subject matter of Examples 25-28 includes, establishing the organized orchestration with a legacy hardware device via an orchestratable hardware device, based on telemetry collected from an agent of the orchestratable hardware device that indicates available resources of the legacy hardware device; and deploying, to the legacy hardware device via the agent of the orchestratable hardware device, a workload based on the organized orchestration.

In Example 30, the subject matter of Examples 25-29 includes, establishing the organized orchestration with a orchestratable hardware device, based on telemetry collected from an agent of the orchestratable hardware device that indicates available resources of the orchestratable hardware device; and deploying, to the orchestratable hardware device via the agent of the orchestratable hardware device, a workload based on the organized orchestration.

In Example 31, the subject matter of Examples 25-30 includes, receiving, at an orchestration engine of an orchestrator, a description of available resources from respective orchestratable devices, wherein the description of the available resources is based on telemetry received from the respective orchestratable devices; organizing a hierarchy of orchestration, defined from the orchestrator to respective orchestratable devices, based on the description of available resources: and distributing workloads from the orchestration engine to the respective orchestratable devices based on the hierarchy of orchestration.

In Example 32, the subject matter of Example 31 includes, wherein the hierarchy is a functional hierarchy of orchestration, wherein the hierarchy defines application orchestration through use of sub-orchestration software modules, and wherein the sub-orchestration software modules include respective software modules for network orchestration, virtual machine orchestration, task orchestration, and storage orchestration.

In Example 33, the subject matter of Examples 31-32 includes, wherein the hierarchy of orchestration is a single level hierarchy, and wherein the orchestration engine assigns a subset of the respective orchestratable devices to run portions of the respective workloads.

In Example 34, the subject matter of Examples 31-33 includes, wherein the hierarchy of orchestration is a multiple level hierarchy, the multiple level hierarchy including sub-orchestrators with respective coordinating orchestration engines at an intermediate level of the multiple level hierarchy, wherein the orchestration engine and orchestrator operate at a top level of the multiple level hierarchy, and wherein the respective coordinating orchestration engines operate to coordinate a collection of the telemetry and a distribution of the workloads among respective orchestratable devices at a bottom level of the multiple level hierarchy.

In Example 35, the subject matter of Example 34 includes, wherein groups of the respective orchestratable devices are organized into respective clusters, and wherein respective sub-orchestrators coordinate a collection of the telemetry and the distribution of the workloads in the respective clusters.

In Example 36, the subject matter of Examples 31-35 includes, wherein the hierarchy of orchestration is a multiple level hierarchy, the multiple level hierarchy including master orchestratable devices at an intermediate level of the multiple level hierarchy, and slave nodes at a bottom level of the multiple level hierarchy, wherein the orchestration engine and orchestrator operate at a top level of the multiple level hierarchy, and wherein the master orchestratable devices include respective agents to coordinate collection of the telemetry and the distribution of the workloads among the slave nodes.

In Example 37, the subject matter of Example 36 includes, wherein respective clusters are organized based on a pairing of respective master orchestratable devices to at least one slave node: wherein the respective agents coordinate the distribution of the workloads in the respective clusters.

In Example 38, the subject matter of Examples 36-37 includes, performing detection, discovery, and deployment of respective slave nodes at the bottom level of the multiple level hierarchy.

In Example 39, the subject matter of Examples 31-38 includes, collecting software data, hardware data, and network data, from among components of the organized orchestration, the components of the organized orchestration including the legacy component and the orchestratable component; performing monitoring, by an orchestration server, based on the collected software data, hardware data, and network data; and providing feedback and control from the orchestration server to the components of the organized orchestration, to control the organized orchestration in response to the monitoring.

In Example 40, the subject matter of Examples 1-39 includes, defining and deploying self-describing control applications and software modules for the software defined industrial system, wherein the self-describing control applications comprise a plurality of self-descriptive orchestratable software modules.

In Example 41, the subject matter of Example 40 includes, creating a module manifest to describe characteristics of the orchestratable software modules; defining an application specification based on definition and connection of features available within the orchestratable software modules; defining options and alternatives for operation of the orchestratable software modules; and executing a selection of the orchestratable software modules, based on the options and alternatives.

In Example 42, the subject matter of Example 41 includes, emulate and evaluate operation of the orchestratable software modules in a simulated application setting, wherein the selection of the orchestratable software modules is based on a result of the simulated application setting.

In Example 43, the subject matter of Example 42 includes, wherein the operations to emulate and evaluate operation of the orchestratable software modules comprises: determining available application and software module configurations, using an application specification and one or more module manifests; defining a plurality of orchestration scenarios via a characterization controller; execute application module and at least one alternative application module with defined option(s), with a simulator, to achieve the plurality of orchestration scenarios; evaluate results of execution for the application module and the at least one alternative application module based on hardware performance and user input; and generating respective scores for the results of execution for the application module and the at least one alternative application module.

In Example 44, the subject matter of Examples 42-43 includes, wherein scenarios associated with the results of execution are automatically incorporated for use in the application based on the respective scores.

In Example 45, the subject matter of Example 1 includes: receiving data from a field device (e.g., a sensor), such as at an IO converter, converting the data from the field device according to a field device bus protocol, sending the converted data to a field device abstraction bus, receiving a control signal from a control device via the field device abstraction bus, and sending an electrical signal to the field device based on the control signal.

In Example 46, the subject matter of Example 1 includes: receiving data from a plurality of field devices (e.g., a sensor) via a plurality of corresponding IO converters, such as at a sensor bus, sending the data to one or more control functions, receiving one or more control signals from the one or more control functions based on the data, and sending the one or more control signals to respective 10 converters of the plurality of IO converters.

In Example 47, the subject matter of Example 46 include, receiving information from an IO converter mode controller and facilitating allocation of IO converters to field devices according to the information received from the IO converter mode controller.

In Example 48, the subject matter of Example 1 includes: saving information about a plurality of alarms of an industrial control system, analyzing data, context, or alarm configuration for the plurality of alarms from the information, determining alarm stream similarities from the information, detecting an alarm event at two or more alarms, preventing the two or more alarms from issuing, and generating a clustered alarm for the two or more alarms prevented from issuing.

In Example 49, the subject matter of Example 48 includes recommending a change to one or more of the plurality of alarms or recommending a new alarm.

In Example 50, the subject matter of Example 1 includes: managing autonomous creation of a new closed loop workload algorithm.

In Example 51, the subject matter of Example 50 includes, performing a quality or sensitivity assessment of the new algorithm relative to a current process (e.g., an industrial control system process).

In Example 52, the subject matter of Examples 50-51 includes, autonomously establishing operating constraint boundaries.

In Example 53, the subject matter of Examples 50-52 includes, autonomously assessing safety of the new algorithm relative to the existing process.

In Example 54, the subject matter of Examples 50-53 includes, autonomously assessing value for the broader process.

In Example 55, the subject matter of Examples 50-54 includes, autonomously assessing the system for deployment feasibility in a control environment.

In Example 56, the subject matter of Examples 50-55 includes, physically deploying or monitoring the new application control strategy.

In Example 57, the subject matter of Examples 50-56 includes, integrating the new algorithm into lifecycle management systems.

In Example 58, the subject matter of Examples 50-57 includes, integrating the new algorithm into end of life processing.

In Example 59, the subject matter of Examples 50-58 includes, performing Examples 51-58 in order.

In Example 60, the subject matter of Example 1 includes: determining computational requirements of edge control nodes in an industrial control system (e.g., a ring deployment), such as at an orchestration server, receiving an indication to activate CPUs of one or more edge control nodes, and sending authenticated activation codes to the edge control nodes with CPUs to be activated.

In Example 61, the subject matter of Example 1 includes: receiving an authenticated activation code at an edge control node, authenticating the code at the edge control node, and activating a CPU of the edge control node using a microprocessor (MCU) (e.g., a low performance processor).

In Example 62, the subject matter of Examples 60-61 includes:
  performing Examples 60-61 at a ring deployment of edge control nodes arranged by an orchestration system of an industrial control system.

In Example 63, the subject matter of Example 61 includes: receiving an update at the edge control node from the orchestration server to deactivate the CPU or place the CPU in a low power state.

Example 64 is at least one machine readable medium including instructions, which when executed by a computing system, cause the computing system to perform any of Examples 1-63.

Example 65 is an apparatus comprising respective means for performing any of Examples 1-63.

Example 66 is a software defined industrial system, comprising respective devices and respective circuitry in the respective devices, with the respective circuitry configured to perform the operations of any of Examples 1-63.

Example 67 is an apparatus, comprising circuitry configured to perform the operations of any of the Examples 1-63.

In Example 68, the subject matter of Example 67 includes, wherein the apparatus is a gateway enabling connection to adapted plurality of field devices, other device networks, or other network deployments.

In Example 69, the subject matter of Examples 67-68 includes, wherein the apparatus is a device operably coupled to at least one sensor and at least one actuator.

In Example 70, the subject matter of Examples 67-69 includes, wherein the apparatus is an Edge Control Node device adapted for connection to a plurality of field devices.

In Example 71, the subject matter of Examples 67-70 includes, wherein the apparatus is an Intelligent I/O Controller device adapted for connection to a plurality of field devices.

In Example 72, the subject matter of Examples 67-71 includes, wherein the apparatus is a Basic I/O Controller device adapted for connection to a plurality of field devices.

In Example 73, the subject matter of Examples 67-72 includes, wherein the apparatus is a control server computing system adapted for connection to a plurality of networked systems.

In Example 74, the subject matter of Examples 67-73 includes, wherein the apparatus is a control processing node computing system adapted for connection to a plurality of networked systems.

Example 75 is a networked system, comprising respective devices connected within a fog or cloud network topology, the respective devices comprising circuitry configured to perform the operations of any of the Examples 1-63.

In Example 76, the subject matter of Example 75 includes, wherein the respective devices are connected via a real-time service bus.

In Example 77, the subject matter of Examples 75-76 includes, wherein the network topology includes controller, storage, and compute functionality for the software defined industrial system via a redundant pair of hosts.

In Example 78, the subject matter of Examples 75-77 includes, wherein the network topology includes controller, storage, and compute functionalities for the software defined industrial system via separate physical hosts.

Example 79 is an edge control node of an industrial control system comprising: an input/output (IO) subsystem for receiving a signal from a field device and generating IO data; and a system on a chip including: a networking component communicatively coupled to a network: a microcontroller (MCU) to convert the IO data from the IO subsystem and send the converted data via the networking component to an orchestration server via the network; and a central processing unit (CPU) initially in an inactive state to change to an activated state in response to an activation signal being received at the edge control node from the orchestration server via the networking component.

In Example 80, the subject matter of Example 79 includes, wherein the activated state of the CPU includes a low power mode and a high power mode.

In Example 81, the subject matter of Examples 79-80 includes, wherein the CPU is further configured to receive a deactivation signal from the orchestration server after a period of time in the activated state, and in response, return to the inactive state.

In Example 82, the subject matter of Examples 79-81 includes, wherein the edge control node is one of a plurality of edge control nodes in the industrial control system, the plurality of edge control nodes including at least one edge control node with an inactive CPU after the CPU is activated.

In Example 83, the subject matter of Examples 79-82 includes, wherein the CPU is activated based on a determination by the orchestration server that the CPU is to be activated to satisfy a control strategy for the industrial control system.

In Example 84, the subject matter of Examples 79-83 includes, wherein the networking component is a time-sensitive networking ethernet switch.

In Example 85, the subject matter of Examples 79-84 includes, wherein the network has a ring topology with a bridge device connecting the network to the orchestration server.

In Example 86, the subject matter of Examples 79-85 includes, wherein the activation signal is received at the CPU directly from the MCU.

In Example 87, the subject matter of Examples 79-86 includes, wherein the CPU is further to receive processing instructions from the orchestration server, the CPU to execute the processing instructions when in the activated state.

Example 88 is at least one non-transitory machine-readable medium including instructions, which when executed by a processor of an orchestration server, cause the processor to perform operations to: receive input/output (IO) data, the IO data received via a bridge connecting the orchestration server to an edge control node, wherein the IO data is converted at a microcontroller (MCU) of the edge control node from data generated at an IO subsystem to a packet sent by a networking component; send an authenticated activation code to the edge control node to activate a central processing unit (CPU) of the edge control node, wherein the CPU is initially placed in an inactivated state; and send processing instructions to the CPU for execution.

In Example 89, the subject matter of Example 88 includes, wherein the operations further cause the processor to determine computational requirements of edge control nodes in an industrial control system including the edge control node, and wherein the CPU is activated based on a determination by the orchestration server that activating the CPU satisfies a control strategy for the industrial control system.

In Example 90, the subject matter of Examples 88-89 includes, wherein the operations further cause the processor to receive an indication to activate the CPU of the edge control node in the industrial control system.

In Example 91, the subject matter of Examples 88-90 includes, wherein the authenticated activation code is authenticated by the MCU before the CPU is activated.

In Example 92, the subject matter of Examples 88-91 includes, wherein the operations further cause the processor to send a deactivation code, from the orchestration server, to the CPU to deactivate the CPU.

In Example 93, the subject matter of Examples 88-92 includes, wherein the edge control node is a node in a ring topology network with a bridge device connecting the network to the orchestration server.

Example 94 is an industrial control system comprising: a ring network including a plurality of edge control nodes; an orchestration server; a bridge connecting the orchestration server to the ring network; and wherein the plurality of edge control nodes includes, a first edge control node comprising: a system on a chip including: a microcontroller (MCU) to convert input/output (IO) data from an IO subsystem and send the converted data via a networking component to the orchestration server via the bridge; and a processor in an initial inactive state to: receive an activation signal from the orchestration server; and change to an activated state in response to receiving the activation signal.

In Example 95, the subject matter of Example 94 includes, wherein the processor is further configured to receive a deactivation signal from the orchestration server after a period of time in the activated state, and in response, return to the inactive state.

In Example 96, the subject matter of Examples 94-95 includes, wherein the processor is activated based on a determination by the orchestration server that activating the processor satisfies a control strategy for the industrial control system.

In Example 97, the subject matter of Examples 94-96 includes, wherein the activation signal is received at the processor directly from the MCU.

In Example 98, the subject matter of Examples 94-97 includes, wherein the plurality of edge control nodes includes a second edge node with a second processor remaining in an inactive state after the processor of the first edge control node is activated.

In Example 99, the subject matter of Examples 94-98 includes, wherein the orchestration server is further configured to send processing instructions to the processor for execution.

In Example 100, the subject matter of Examples 94-99 includes, wherein the processor is a central processing unit (CPU).

Example 101 is at least one machine-readable medium including instructions that, when executed by processing circuitry, cause the processing circuitry to perform operations to implement of any of Examples 79-100.

Example 102 is an apparatus comprising means to implement of any of Examples 79-100.

Example 103 is a system to implement of any of Examples 79-100.

Example 104 is a method to implement of any of Examples 79-100.

Example 105 is an apparatus, comprising processing circuitry adapted to: identify operational aspects of available software modules, the available software modules adapted to perform functional operations in a control system environment; identify operational characteristics from a module manifest, wherein the operational characteristics define an environment for the available software modules to perform a control system application; select a software module of the available software modules, based on the identified operational aspects of the available software modules and the identified operational characteristics from the module manifest; and cause execution of the selected software module in the control system environment, wherein the execution occurs according to an application specification for the control system application.

In Example 106, the subject matter of Example 105 includes, wherein the operational aspects of the available software modules relate to one or more of: communication interfaces, starting parameters, platform requirements, dependencies, deployment requirements, or a signature.

In Example 107, the subject matter of Examples 105-106 includes, the processing circuitry further adapted to: generate the application specification for the control system application, based on the operational characteristics, and the selected software module; wherein the application specification defines values for control parameters of the selected software module.

In Example 108, the subject matter of Example 107 includes, wherein the application specification indicates a connection from the selected software module to a second selected software module.

In Example 109, the subject matter of Examples 105-108 includes, the processing circuitry further adapted to: evaluate the execution of the selected software module in the control system environment using at least two different hardware architectures; and perform an efficiency measurement of operations executed with the at least two different hardware architectures.

In Example 110, the subject matter of Examples 105-109 includes, wherein the control system application and respective software modules are displayed as a visual representation in a graphical user interface, wherein the visual representation is used to establish relationships of one or more inputs or outputs of the software modules within the control system application, wherein the inputs or outputs to the software modules include use of one or more of: a sensor, an actuator, or a controller.

In Example 111, the subject matter of Examples 105-110 includes, wherein the apparatus is an orchestration device, wherein the orchestration device is operably coupled to a plurality of execution devices in the control system environment that execute software modules, and wherein the execution of the selected software module via at least one execution devices effects functional operation of one or more control devices in the control system environment.

In Example 112, the subject matter of Example 111 includes, wherein the processing circuitry is further adapted to coordinate the execution of the selected software module with an orchestration control strategy within the control system environment.

In Example 113, the subject matter of Examples 105-112 includes, wherein the processing circuitry is further adapted to: select a plurality of software modules, the plurality of software modules including a selection of the software module: and connect the plurality of software modules to each other according to the operational characteristics.

Example 114 is a method, comprising: identifying operational aspects of available software modules, the available software modules adapted to perform functional operations in a control system environment; identifying operational characteristics from a module manifest, wherein the operational characteristics define an environment for the available software modules to perform a control system application; selecting a software module of the available software modules, based on the identified operational aspects of the available software modules and the identified operational characteristics from the module manifest; and causing execution of the selected software module in the control system environment, wherein the execution occurs according to an application specification for the control system application.

In Example 115, the subject matter of Example 114 includes, wherein the operational aspects of the available software modules relate to one or more of: communication interfaces, starting parameters, platform requirements, dependencies, deployment requirements, or a signature.

In Example 116, the subject matter of Examples 114-115 includes, generating the application specification for the control system application, based on the operational characteristics, and the selected software module; wherein the application specification defines values for control parameters of the selected software module, and wherein the application specification indicates a connection from the selected software module to a second selected software module.

In Example 117, the subject matter of Examples 114-116 includes, evaluating the execution of the selected software module in the control system environment using at least two different hardware architectures; and identifying an efficiency measurement of operations executed with the at least two different hardware architectures.

In Example 118, the subject matter of Examples 114-117 includes, wherein the control system application and respective software modules are displayed as a visual representation in a graphical user interface, wherein the visual representation is used to establish relationships of one or more inputs or outputs of the software modules within the control system application, wherein the inputs or outputs to the software modules include use of one or more of: a sensor, an actuator, or a controller.

In Example 119, the subject matter of Examples 114-118 includes, wherein the method is performed by an orchestration device, wherein the orchestration device is operably coupled to a plurality of execution devices in the control system environment that execute software modules, and wherein the execution of the selected software module via at least one execution devices effects functional operation of one or more control devices in the control system environment.

In Example 120, the subject matter of Example 119 includes, coordinating the execution of the selected software module with an orchestration control strategy within the control system environment.

In Example 121, the subject matter of Examples 119-120 includes, selecting a plurality of software modules for use in the control system environment, the plurality of software modules including the selection of the software module: and connecting the plurality of software modules to each other according to the operational characteristics.

Example 122 is at least one non-transitory machine-readable storage medium including instructions, wherein the instructions, when executed by a processing circuitry of a device, cause the processing circuitry to perform operations comprising: identifying operational aspects of available software modules, the available software modules adapted to perform functional operations in a control system environment; identifying operational characteristics from a module manifest, wherein the operational characteristics define an environment for the available software modules to perform a control system application; selecting a software module of the available software modules, based on the identified operational aspects of the available software modules and the identified operational characteristics from the module manifest; and causing execution of the selected software module in the control system environment, wherein the execution occurs according to an application specification for the control system application.

In Example 123, the subject matter of Example 122 includes, wherein the operational aspects of the available software modules relate to one or more of: communication interfaces, starting parameters, platform requirements, dependencies, deployment requirements, or a signature.

In Example 124, the subject matter of Examples 122-123 includes, the operations further comprising: generating the application specification for the control system application, based on the operational characteristics, and the selected software module; wherein the application specification defines values for control parameters of the selected software module, and wherein the application specification indicates a connection from the selected software module to a second selected software module.

In Example 125, the subject matter of Examples 122-124 includes, the operations further comprising: evaluating the execution of the selected software module in the control system environment using at least two different hardware architectures; and identifying an efficiency measurement of operations executed with the at least two different hardware architectures.

In Example 126, the subject matter of Examples 122-125 includes, wherein the control system application and respective software modules are displayed as a visual representation in a graphical user interface, wherein the visual representation is used to establish relationships of one or more inputs or outputs of the software modules within the control system application, wherein the inputs or outputs to the software modules include use of one or more of: a sensor, an actuator, or a controller.

In Example 127, the subject matter of Examples 122-126 includes, wherein the operations are performed by an orchestration device, wherein the orchestration device is operably coupled to a plurality of execution devices in the control system environment that execute software modules, and wherein the execution of the selected software module via at least one execution devices effects functional operation of one or more control devices in the control system environment.

In Example 128, the subject matter of Example 127 includes, the operations further comprising: coordinating the execution of the selected software module with an orchestration control strategy within the control system environment.

In Example 129, the subject matter of Examples 127-128 includes, the operations further comprising: selecting a plurality of software modules for use in the control system environment, the plurality of software modules including the selection of the software module; and connecting the plurality of software modules to each other according to the operational characteristics.

Example 130 is at least one machine-readable medium including instructions that, when executed by processing circuitry, cause the processing circuitry to perform operations to implement of any of Examples 105-129.

Example 131 is an apparatus comprising means to implement of any of Examples 105-129.

Example 132 is a system to implement of any of Examples 105-129.

Example 133 is a method to implement of any of Examples 105-129.

Example 134 is an orchestrated system of distributed nodes running an application, the orchestrated system comprising: a first node executing a first module with a first output; and a second node executing a second module, the second module using the first output as an input, and providing a second output to a third module executing on a third node: wherein, in response to detection of a failure of the second node, the first node and the third node are configured to coordinate to determine a replacement node for redeploying the second module.

In Example 135, the subject matter of Example 134 includes, wherein the replacement node is a redundant node preconfigured to receive the first output and operate the second module.

In Example 136, the subject matter of Example 135 includes, wherein the redundant node is not connected to provide output to any nodes until after the redundant node is operating as the replacement node.

In Example 137, the subject matter of Examples 135-136 includes, wherein the second node is configured to periodically send parameters and state information about the second module to the redundant node.

In Example 138, the subject matter of Examples 135-137 includes, wherein in response to the redundant node failing, a second redundant node is designated as the replacement node.

In Example 139, the subject matter of Examples 134-138 includes, wherein the first node is configured to save a redundant state of the second module when the first output is generated.

In Example 140, the subject matter of Examples 134-139 includes, wherein when coordinating, the first node and the third node are configured to determine a set of nodes connected to the second node.

In Example 141, the subject matter of Examples 134-140 includes, wherein the replacement node is configured to connect to the first node to receive output from the first module and to connect to the third node to provide output from the second module to the third module.

In Example 142, the subject matter of Examples 134-141 includes, wherein the configuration of the first, second, and third modules on the first, second, and third nodes is initially generated by an orchestration server, and wherein the orchestration server is configured to be disconnected from the first node, the second node, and the third node.

In Example 143, the subject matter of Examples 134-142 includes, wherein the second node is implemented on a virtual machine and wherein the second module is instantiated in the replacement node based on an image of the second node on the virtual machine.

In Example 144, the subject matter of Examples 134-143 includes, wherein the first node is selected as a leader node using a leader-election algorithm.

Example 145 is a method of running an application using distributed nodes of an orchestrated system, the method comprising: executing a first module on a first node, the first module having a first output; executing a second module on a second node, the second module using the first output as an input; providing a second output from the second module to a third module executing on a third node; and in response to detection of a failure of the second node, determining a replacement node for redeploying the second module by coordinating between the first node and the third node.

In Example 146, the subject matter of Example 145 includes, wherein determining the replacement node includes identifying a redundant node preconfigured to receive the first output and operate the second module.

In Example 147, the subject matter of Example 146 includes, wherein the redundant node is not connected to provide output to any nodes until after the redundant node is operating as the replacement node.

In Example 148, the subject matter of Examples 146-147 includes, periodically sending parameters and state information about the second module from the second node to the redundant node.

In Example 149, the subject matter of Examples 146-148 includes, wherein in response to the redundant node failing, designating a second redundant node as the replacement node.

In Example 150, the subject matter of Examples 145-149 includes, at the first node, saving a redundant state of the second module when the first output is generated.

In Example 151, the subject matter of Examples 145-150 includes, wherein determining the replacement node includes determining a set of nodes connected to the second node.

In Example 152, the subject matter of Examples 149-151 includes, connecting the replacement node to the first node to receive output from the first module and connecting the replacement node to the third node to provide output from the second module to the third module.

In Example 153, the subject matter of Examples 145-152 includes, initially generating a configuration of the first, second, and third modules on the first, second, and third nodes using an orchestration server, and further comprising disconnecting the orchestration server from the first node, the second node, and the third node before the second node fails.

In Example 154, the subject matter of Examples 145-153 includes, implementing the second node on a virtual machine and further comprising instantiating the second module in the replacement node based on an image of the second node on the virtual machine.

In Example 155, the subject matter of Examples 145-154 includes, selecting the first node as a leader node using a leader-election algorithm.

Example 156 is at least one machine-readable medium including instructions that, when executed by processing circuitry, cause the processing circuitry to perform operations to implement of any of Examples 134-155.

Example 157 is an apparatus comprising means to implement of any of Examples 134-155.

Example 158 is a system to implement of any of Examples 134-155.

Example 159 is a method to implement of any of Examples 134-155.

What is claimed is:

1. A method for operation of a software defined industrial system, comprising:
    establishing respective functional definitions of a software defined industrial system, the software defined industrial system to interface with a plurality of devices, wherein the plurality of devices include respective sensors and respective actuators; and
    establishing a dynamic data model to define properties of a plurality of components of the software defined industrial system;
    operating the software defined industrial system using the respective functional definitions;
    monitoring data from the plurality of components, to identify operational metadata;
    detecting one or more patterns from the operational metadata;
    identifying changes to the dynamic data model based on the detected one or more patterns; and
    updating the dynamic data model based on the identified changes.

2. The method of claim 1, wherein the plurality of components includes respective applications, devices, sensors, or architecture definitions.

3. The method of claim 1, wherein plurality of components includes a device, wherein the device represents an ensemble of sensors.

4. The method of claim 1, wherein the dynamic data model is updated to indicate changes to the dynamic data model in a subset of components of the plurality of components, and wherein the dynamic data model is updated based on a resource availability change or an error condition occurring with the subset of components.

5. The method of claim 1, wherein establishing the dynamic data model includes defining mandatory fields and restrictions for changes to the dynamic data model.

6. The method of claim 1, wherein the operational metadata represents a probabilistic estimate of a value associated with a component of the plurality of components.

7. The method of claim 1, further comprising:
    querying a component of the plurality of components for metadata expansion rules;
    receiving a response from the component in response to the querying;

wherein the updating of the dynamic data model is further based on the metadata expansion rules, and a confidence or relevancy score associated with updating respective data fields.

8. The method of claim 1, further comprising:
performing system operations in an edge, fog, or cloud network, based on the updated dynamic data model.

9. The method of claim 1, comprising:
defining at least one condition in the software defined industrial system for data model evaluation;
obtaining data from a plurality of sensors in the software defined industrial system;
identifying at least one pattern, rule, or threshold, for data model modification;
evaluating data from the plurality of sensors using at least one identified pattern, rule, or identified threshold;
defining a modification to the data model, based on the at least one identified pattern, rule, or identified threshold; and
incorporating the modification to the data model for the plurality of sensors and a data flow associated with the plurality of sensors.

10. The method of claim 9, further comprising:
requesting approval for the data model modification from a data model administrator; and
receiving approval for the data model modification from the data model administrator;
wherein the incorporating of the modification to the data model is performed in response to receiving the approval for the data model modification.

11. The method of claim 9, further comprising:
implementing changes to data processing operations in the software defined industrial system based on the data model modification.

12. At least one non-transitory machine-readable storage medium including instructions, wherein the instructions, when executed by a processing circuitry of a device, cause the processing circuitry to perform operations comprising:
establishing respective functional definitions of a software defined industrial system, the software defined industrial system to interface with a plurality of devices, wherein the plurality of devices include respective sensors and respective actuators; and
establishing a dynamic data model to define properties of a plurality of components of the software defined industrial system;
operating the software defined industrial system using the respective functional definitions;
monitoring data from the plurality of components, to identify operational metadata;
detecting one or more patterns from the operational metadata;
identifying changes to the dynamic data model based on the detected one or more patterns; and
updating the dynamic data model based on the identified changes.

13. The machine-readable storage medium of claim 12, wherein the plurality of components includes respective applications, devices, sensors, or architecture definitions.

14. The machine-readable storage medium of claim 12, wherein plurality of components includes a device, wherein the device represents an ensemble of sensors.

15. The machine-readable storage medium of claim 12, wherein the dynamic data model is updated to indicate changes to the dynamic data model in a subset of components of the plurality of components, and wherein the dynamic data model is updated based on a resource availability change or an error condition occurring with the subset of components.

16. The machine-readable storage medium of claim 12, wherein establishing the dynamic data model includes defining mandatory fields and restrictions for changes to the dynamic data model.

17. The machine-readable storage medium of claim 12, wherein the operational metadata represents a probabilistic estimate of a value associated with a component of the plurality of components.

18. The machine-readable storage medium of claim 12, the operations further comprising:
querying a component of the plurality of components for metadata expansion rules;
receiving a response from the component in response to the querying;
wherein the updating of the dynamic data model is further based on the metadata expansion rules, and a confidence or relevancy score associated with updating respective data fields.

19. The machine-readable storage medium of claim 12, the operations further comprising:
performing system operations in an edge, fog, or cloud network, based on the updated dynamic data model.

20. The machine-readable storage medium of claim 12, the operations further comprising:
defining at least one condition in the software defined industrial system for data model evaluation;
obtaining data from a plurality of sensors in the software defined industrial system;
identifying at least one pattern, rule, or threshold, for data model modification;
evaluating data from the plurality of sensors using at least one identified pattern, rule, or identified threshold;
defining a modification to the data model, based on the at least one identified pattern, rule, or identified threshold; and
incorporating the modification to the data model for the plurality of sensors and a data flow associated with the plurality of sensors.

21. The machine-readable storage medium of claim 20, the operations further comprising:
requesting approval for the data model modification from a data model administrator; and
receiving approval for the data model modification from the data model administrator;
wherein the incorporating of the modification to the data model is performed in response to receiving the approval for the data model modification.

22. The machine-readable storage medium of claim 20, the operations further comprising:
implementing changes to data processing operations in the software defined industrial system based on the data model modification.

\* \* \* \* \*